United States Patent
Wang et al.

(10) Patent No.: US 11,802,243 B2
(45) Date of Patent: Oct. 31, 2023

(54) LIQUID-CRYSTAL MEDIUM

(71) Applicant: Merck Patent GmbH, Darmstadt (DE)

(72) Inventors: Jing Wang, Shanghai (CN); Ping Zhao, Shanghai (CN); Chang-Suk Choi, Shanghai (CN)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 17/678,137

(22) Filed: Feb. 23, 2022

(65) Prior Publication Data
US 2022/0282158 A1    Sep. 8, 2022

(30) Foreign Application Priority Data
Feb. 26, 2021 (EP) ..................................... 21159636

(51) Int. Cl.
*G02F 1/1333* (2006.01)
*C09K 19/12* (2006.01)
*C09K 19/04* (2006.01)
*C09K 19/30* (2006.01)

(52) U.S. Cl.
CPC .......... *C09K 19/12* (2013.01); *C09K 19/0403* (2013.01); *C09K 19/3003* (2013.01); *C09K 2019/0414* (2013.01); *C09K 2019/0448* (2013.01); *C09K 2019/123* (2013.01); *C09K 2019/301* (2013.01); *C09K 2019/3004* (2013.01); *C09K 2019/3015* (2013.01); *C09K 2019/3016* (2013.01)

(58) Field of Classification Search
CPC ................ C09K 19/12; C09K 19/0403; C09K 19/3003; C09K 2019/0414; C09K 2019/0448; C09K 2019/123; C09K 2019/3004; C09K 2019/301; C09K 2019/3015; C09K 2019/3016; G02F 1/1333
See application file for complete search history.

(56) References Cited

U.S. PATENT DOCUMENTS

| | | | |
|---|---|---|---|
| 6,027,665 A | 2/2000 | Pausch et al. | |
| 6,146,720 A | 11/2000 | Pausch et al. | |
| 11,008,515 B2 * | 5/2021 | Hirschmann | C09K 19/3068 |
| 2020/0199451 A1 | 6/2020 | Sakamoto et al. | |

FOREIGN PATENT DOCUMENTS

| | | | |
|---|---|---|---|
| CN | 106010580 B | 8/2018 | |
| DE | 19528106 A1 | 8/1996 | |
| DE | 19509410 A1 | 9/1996 | |
| DE | 19528107 A1 | 9/1996 | |
| EP | 0667555 A1 | 8/1995 | |
| EP | 0673986 A2 | 9/1995 | |
| JP | 7-181439 A | 7/1995 | |
| TW | 202014504 A | 4/2020 | |
| WO | WO2018/193859 A1 * | 10/2018 | ............. C09K 19/12 |

OTHER PUBLICATIONS

S.H. Jung et al., "Analysis of Optimal Phase Retardation of a Fringe Field-Driven Homogeneously Aligned Nematic Liquid Crystal Cell", Japanese Journal of Applied Physics, vol. 43, No. 3 (2004) pp. 1028-1031.
S.H. Lee et al., "Electro-Optic Characteristics and Switching Principle of a Nematic Liquid Crystal Cell Controlled by Fringe-Field Switching", Applied Physics Letters, vol. 73, No. 20 (1998) pp. 2881-2883.
H.J. Yun et al., "Achieving High Light Efficiency and Fast Response Time in Fringe Field Switching Mode Using a Liquid Crystal With Negative Dielectric Anisotropy", Liquid Crystals, vol. 39, No. 9 (2012) pp. 1141-1148.

* cited by examiner

*Primary Examiner* — Geraldina Visconti
(74) *Attorney, Agent, or Firm* — MILLEN WHITE ZELANO AND BRANIGAN, PC; Csaba Henter

(57) ABSTRACT

A liquid-crystal (LC) media having a negative dielectric anisotropy containing a compound of formula I

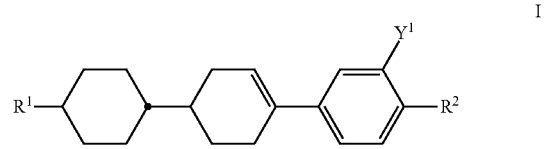

and the use of the LC media for optical, electro-optical and electronic purposes, in particular in energy-efficient LC displays, especially in IPS, FFS, VA or PS-VA displays.

24 Claims, No Drawings

LIQUID-CRYSTAL MEDIUM

The present invention relates to liquid-crystal (LC) media having a negative dielectric anisotropy comprising a compound of formula I as defined herein, and to the use of the LC media for optical, electro-optical and electronic purposes, in particular in energy-efficient LC displays, especially in IPS, FFS, VA or PS-VA displays.

Liquid-crystal displays (LCDs) are used in many areas for the display of information. LCDs are used both for direct-view displays and for projection-type displays. The electro-optical modes used are, for example, the twisted nematic (TN), super twisted nematic (STN), optically compensated bend (OCB) and electrically controlled birefringence (ECB) modes together with their various modifications, as well as others. All these modes utilise an electric field which is generated substantially perpendicular to the substrates and the liquid-crystal layer.

So-called VA ("vertically aligned") displays are known which have a broad viewing angle. The LC cell of a VA display contains a layer of an LC medium between two transparent electrodes, where the LC medium usually has a negative dielectric anisotropy. In the switched-off state, the molecules of the LC layer are aligned perpendicular to the electrode surfaces, i.e. homeotropically, or have a tilted homeotropic alignment. On application of an electrical voltage to the two electrodes, a realignment of the LC molecules parallel to the electrode surfaces takes place.

A further development are displays of the so-called PS ("polymer sustained") or PSA ("polymer sustained alignment") type, for which the term "polymer stabilised" is also occasionally used. In these, a small amount, for example 0.3% by weight, typically <1% by weight, of one or more polymerisable, compound(s), preferably polymerisable monomeric compound(s), is added to the LC medium and, after filling the LC medium into the display, is polymerised or crosslinked in situ, usually by UV photopolymerisation, optionally while a voltage is applied to the electrodes of the display. The polymerisation is carried out at a temperature where the LC medium exhibits a liquid crystal phase, usually at room temperature. The addition of polymer-isable mesogenic or liquid-crystalline compounds, also known as reactive mesogens or "RMs", to the LC mixture has proven particularly suitable.

Also known are so-called IPS ("in-plane switching") displays, which contain an LC layer between two substrates, where the two electrodes are arranged on only one of the two substrates and preferably have intermeshed, comb-shaped structures. On application of a voltage to the electrodes, an electric field which has a significant component parallel to the LC layer is thereby generated between them. This causes realignment of the LC molecules in the layer plane.

Furthermore, so-called FFS ("fringe-field switching") displays have been reported, see inter alia S. H. Jung et al., Jpn. J. Appl. Phys., Volume 43, No. 3, 2004, 1028, which contain two electrodes on the same substrate, one of which is structured in a comb-shaped manner and the other is unstructured. A strong, so-called "fringe field" is thereby generated, i.e. a strong electric field close to the edge of the electrodes, and, throughout the cell, an electric field which has both a strong vertical component and also a strong horizontal component. FFS displays have a low viewing-angle dependence of the contrast. FFS displays usually contain an LC medium with positive dielectric anisotropy, and an alignment layer, usually of polyimide, which provides planar alignment to the molecules of the LC medium.

Further FFS displays have been disclosed, see S. H. Lee et al., Appl. Phys. Lett. 73(20), 1998, 2882-2883 and S. H. Lee et al., Liquid Crystals 39(9), 2012, 1141-1148, which have similar electrode design and layer thickness as previous FFS displays, but comprise a layer of an LC medium with negative dielectric anisotropy instead of an LC medium with positive dielectric anisotropy. The LC medium with negative dielectric anisotropy can show a more favourable director orientation that has less tilt and more twist orientation compared to the LC medium with positive dielectric anisotropy, as a result of which these displays can exhibit a higher transmission. The displays further comprise an alignment layer, preferably of polyimide provided on at least one of the substrates that is in contact with the LC medium and induces planar alignment of the LC molecules of the LC medium. These displays are also known as "Ultra Brightness FFS (UB-FFS)" mode displays.

Typical applications of in-plane switching (IPS) and fringe field switching (FFS) technologies are monitors, notebooks, televisions, mobile telephones, tablet PCs, etc.

Both the IPS and the FFS technology have certain advantages over other LCD technologies, such as, for example, the vertical alignment (VA) technology, e.g. an even broader improved viewing angle dependency of the contrast.

Liquid-crystal compositions which are suitable for LCDs and especially for FFS and IPS displays are known from, for example, JP 07-181 439 (A), EP 0 667 555, EP 0 673 986, DE 195 09 410, DE 195 28 106, DE 195 28 107, WO 96/23 851 and WO 96/28 521. However, these compositions have certain disadvantages. Amongst other deficiencies, most of them result in disadvantageously long addressing times, have inadequate values of the resistivity and/or require excessively high operating voltages. Both an improvement in the operating properties and also in the shelf life are desirable.

The PS(A) principle is being used in various conventional LC display modes. Thus, for example, PS-VA, PS-OCB, PS-IPS, PS-FFS, PS-UB-FFS and PS-TN displays are known. The polymerisation of the RMs preferably takes place with an applied voltage in the case of PS-VA and PS-OCB displays, and with or without, preferably without, an applied voltage in the case of PS-IPS displays.

For some display modes a self-alignment agent or additive is added to the LC medium that induces the desired alignment, for example homeotropic or planar alignment, in situ by a self-assembling mechanism. Thereby the conventional alignment layer can be omitted on one or both of the substrates. These display modes are also known as "self-aligned" or "self-aligning" (SA) modes.

There is still a need in the art for further liquid-crystalline media and the use thereof in displays having high transmission, a good black state and a high contrast ratio, especially in FFS and IPS applications giving good low-temperature stability and fast addressing times.

An object of the present invention is therefore to provide liquid-crystalline media, in particular for FFS, UB-FFS and IPS displays, but also for VA or PS-VA displays, and in particular for active-matrix displays like those addressed by TFTs, which do not exhibit the disadvantages indicated above or only do so to a lesser extent and which preferably have high specific resistance, low threshold voltage, suitable dielectric anisotropy, a good low-temperature stability (LTS), fast response times and low rotational viscosities, enable high brightness and high transmittance, and which in addition exhibit favourable reliability and stability.

It is a further object of the present invention to provide displays with a high contrast ratio, a high transmittance in one optical state, fast addressing times and a favourable stability, in particular at low temperatures and at high temperatures. Further objects of the present invention are immediately evident to the person skilled in the art from the following detailed description.

The objects are solved by the subject-matter defined in the independent claims, while preferred embodiments are set forth in the respective dependent claims and are further described below.

The present invention in particular provides the following items including main aspects, preferred embodiments and particular features, which respectively alone and in combination contribute to solving the above object and eventually provide additional advantages.

A first aspect of the present invention provides a liquid-crystal medium having a negative dielectric anisotropy and comprising one or more compounds of formula I

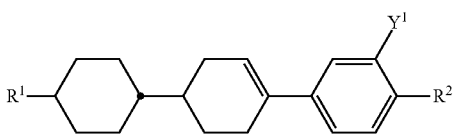

I in which
$R^1$ denotes a straight-chain or branched alkenyl radical having 2 to 15 C atoms, where one or more $CH_2$ groups may each be replaced, independently of one another, by,

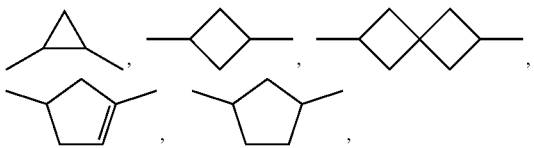

—C≡C—, —$CF_2$O—, —O$CF_2$—, —O—, —CO—O— or —O—CO— in such a way that O atoms are not linked directly to one another, and in which, in addition, one or more H atoms may be replaced by halogen,
$R^2$ denotes H, a straight-chain or branched alkyl or alkoxy radical having 1 to 15 C atoms, where one or more $CH_2$ groups in these radicals may each be replaced, independently of one another, by,

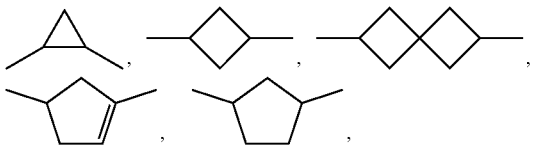

C≡C—, —$CF_2$O—, —O$CF_2$—, —CH=CH—, —O—, —CO—O— or —O—CO— in such a way that O atoms are not linked directly to one another, and in which, in addition, one or more H atoms may be replaced by halogen, and
$Y^1$ denotes H, F, Cl or $CH_3$, preferably H or $CH_3$, more preferably H.

It has favourably been recognized that using liquid-crystal media according to the invention enables an advantageous optical and electro-optical performance, in particular fast response times, high brightness and high contrast in displays as described and claimed herein. In addition, the media according to the invention surprisingly and favourably exhibit a suitably high optical anisotropy and excellent stability, especially at high and at low temperatures, and excellent reliability, in particular an advantageous voltage holding ratio (VHR), with respect to light, especially UV light, and heat, also under extreme load. In particular, the voltage holding ratio after UV light load is improved.

This enables the provision of liquid-crystal displays, especially of the UB-FFS, FFS and IPS modes, with high brightness and transmittance and short response times.

The liquid-crystal media according to the invention are suitable for electro-optical displays, such as large size TV applications, and mobile applications, such as, for example, mobile telephones and PDAs, based on dielectrically negative liquid crystals, and polymer stabilised variants thereof.

Another aspect of the invention therefore relates to a liquid-crystal display which comprises the liquid-crystal medium according to the invention, preferably a VA, IPS, U-IPS, FFS, UB-FFS, SA-FFS, SA-VA, PSA PS-VA, PS-IPS, PS-FFS or PS-UB-FFS display or a polymer stabilised SA-VA or polymer stabilised SA-FFS display.

A further aspect of the present invention relates to the use of the liquid-crystal medium according to the invention in electro-optical switching applications, in particular in electro-optical displays, but also in light shutters, in switchable windows, or for 3D applications.

Without limiting the present invention thereby, in the following the invention is illustrated by the detailed description of the aspects, embodiments and particular features, and particular embodiments are described in more detail.

Herein, halogen denotes F, Cl, Br or I, preferably F or Cl, and more preferably F.

In the present invention, all atoms also include their isotopes. In particular, one or more hydrogen atoms (H) may be replaced by deuterium (D), which is particularly preferred in some embodiments; a high degree of deuteration enables or simplifies analytical determination of compounds, in particular in the case of low concentrations.

Herein, an alkyl radical and/or an alkoxy radical is taken to mean straight-chain or branched alkyl. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Herein, oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl.

Herein, alkenyl, i.e. an alkyl radical in which one $CH_2$ group has been replaced by —CH=CH—, may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

Herein, an alkyl or alkenyl radical which is at least monosubstituted by halogen, is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the w-position.

Herein, a mono- or polyfluorinated alkyl or alkoxy radical having 1, 2 or 3 C atoms or a mono- or polyfluorinated alkenyl radical having 2 or 3 C atoms is particularly preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$, $OCH=CF_2$ or $CH=CF_2$, very particularly preferably F or $OCF_3$, furthermore $CF_3$, $OCF=CF_2$, $OCHF_2$ or $OCH=CF_2$.

Herein, 1,4-cyclohexylene rings and 1,4-phenylene rings are respectively depicted as follows:

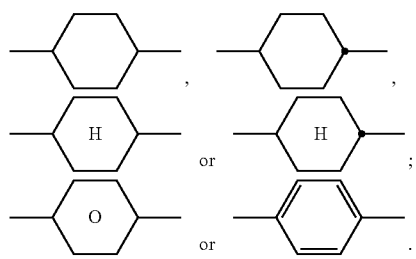

The cyclohexylene rings are trans-1,4-cyclohexylene rings.

The liquid-crystal medium according to the invention has a negative dielectric anisotropy $\Delta\varepsilon$.

Above and below, $\Delta\varepsilon$ denotes the dielectric anisotropy, wherein $\Delta\varepsilon=\varepsilon=\varepsilon\|-\varepsilon_\perp$. The dielectric anisotropy $\Delta\varepsilon$ is preferably determined at 20° C. and 1 kHz.

In particular, the liquid-crystal medium preferably has a negative dielectric anisotropy $\Delta\varepsilon$ of −0.5 or less, more preferably of −1.5 or less, and even more preferably of −2.5 or less. It is particularly preferred that the liquid-crystal medium exhibits a dielectric anisotropy $\Delta\varepsilon$ in the range of from −6 to −2, more preferably from −5.5 to −2.5, even more preferably from −5 to −3 and in particular from −4.5 to −3.5.

The liquid-crystal medium preferably has an optical anisotropy $\Delta n$ of 0.08 or more, more preferably 0.09 or more and even more preferably 0.10 or more.

Above and below, $\Delta n$ denotes the optical anisotropy, wherein $\Delta n=n_e-n_o$, and wherein preferably the optical anisotropy $\Delta n$ is determined at 20° C. and at a wavelength of 589.3 nm. The liquid-crystal medium preferably has an optical anisotropy in the range of from 0.08 to 0.13 and in particular from 0.10 to 0.12.

According to the invention the liquid-crystal medium comprises one or more compounds of the formula I as set forth herein.

Preferably, $R^1$ in formula I denotes an alkenyl radical having 2 to 7 C atoms, more preferably a straight-chain alkenyl radical having 2 to 7 C atoms. $R^1$ particularly preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Preferably, $R^2$ in formula I denotes an alkyl or alkoxy radical having 1 to 7 C atoms, more preferably a straight-chain alkyl radical having 1 to 7 C atoms. $R^2$ particularly preferably denotes methyl, ethyl, n-propyl, n-butyl or n-pentyl.

In an embodiment the liquid-crystal medium comprises precisely one compound of formula I.

In another embodiment the liquid-crystal medium comprises two or more compounds of formula I.

Preferably, the one or more compounds of formula I and in particular the further preferred compounds thereof are contained in the liquid-crystal medium in a total amount of 10% by weight or less, more preferably 7% by weight or less and even more preferably 4% by weight or less. It is preferred that the total amount of the one or more compounds of formula I and in particular the further preferred compounds thereof contained in the liquid-crystal medium is in the range of from 0.25% by weight to 8% by weight, more preferably from 0.5% by weight to 5% by weight and in particular from 1% by weight to 3% by weight.

The compounds of formula I are preferably selected form the group of compounds of the formulae I-1 to I-10

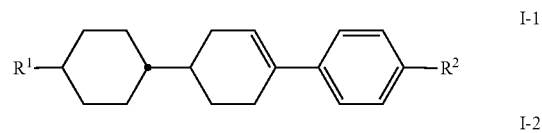
I-1

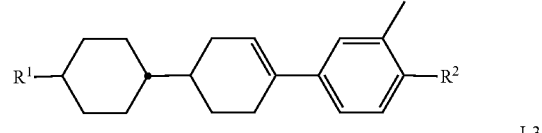
I-2

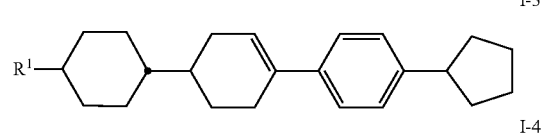
I-3

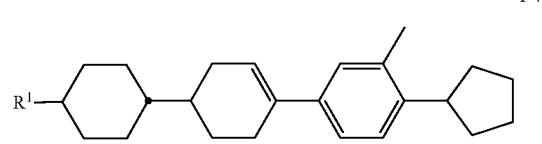
I-4

I-5

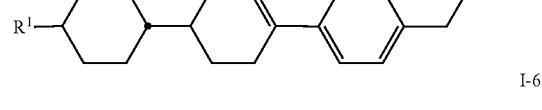
I-6

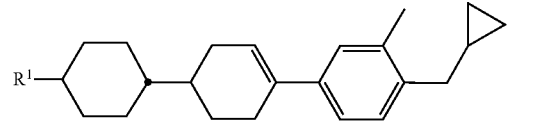
I-7

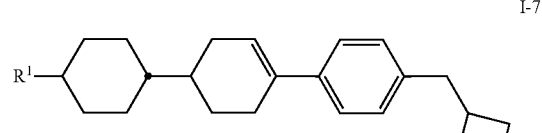
I-8

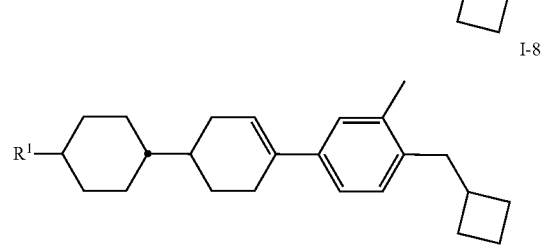

-continued

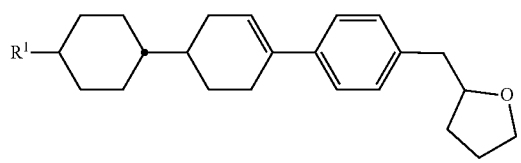
I-9

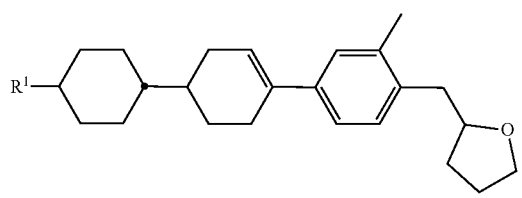
I-10 in which $R^1$ and $R^2$ have the meanings given above for formula I, and wherein $R^1$ preferably denotes a straight-chain alkenyl radical having 2 to 7 C atoms and more preferably denotes $CH_2$=CH—, $CH_2$=CHCH$_2$CH$_2$—, $CH_3$—CH=CH—, $CH_3$—CH$_2$—CH=CH—, $CH_3$—(CH$_2$)$_2$—CH=CH—, $CH_3$—(CH$_2$)$_3$—CH=CH— or $CH_3$—CH=CH—(CH$_2$)$_2$—
and $R^2$ preferably denotes a straight-chain alkyl radical having 1 to 7 C atoms In a preferred embodiment the one or more compounds of formula I are selected form the group of compounds of the formulae I-a to I-f

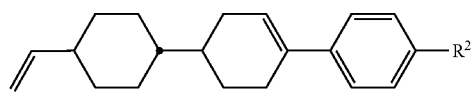
I-a

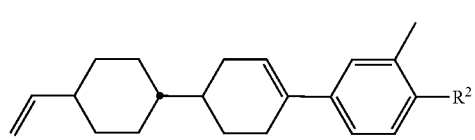
I-b

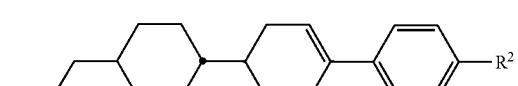
I-c

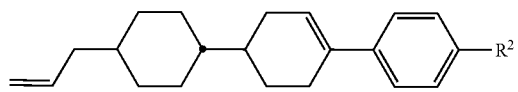
I-d

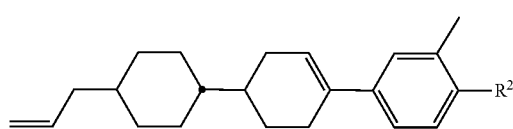
I-e

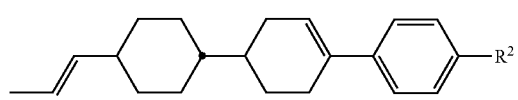
I-f in which $R^2$ has the meaning given for formula I above, preferably denotes methyl, ethyl, n-propyl, methoxy, ethoxy or n-propoxy, more preferably denotes methyl or ethyl, and in particular denotes methyl.

It is particularly preferred that the liquid-crystal medium comprises the compound of formula I-a-1

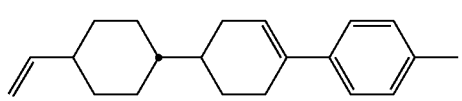
I-a-1 which in the following and according to the acronyms explained in Tables A to C is also designated as compound CLP-V-1.

Preferably, the compound of formula I-a-1 is contained in the liquid-crystal medium in an amount of 10% by weight or less, more preferably 7% by weight or less and even more preferably 4% by weight or less. It is preferred that the amount of the compound of formula I-a-1 contained in the liquid-crystal medium is in the range of from 0.25% by weight to 8% by weight, more preferably from 0.5% by weight to 5% by weight and in particular from 1% by weight to 3% by weight.

In an embodiment the compound of formula I-a-1 is the only compound of formula I contained in the medium. However, according to another embodiment in addition to the compound of formula I-a-1 the medium may contain one, two or more compounds which also conform to formula I.

In another embodiment the liquid-crystal medium comprises the compound I-a-2

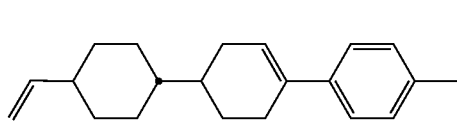
I-a-2

Preferably, the liquid-crystal medium further comprises one or more compounds selected from the group of compounds of formulae IIA, IIB, IIC and IID

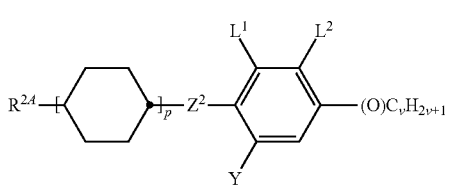
IIA

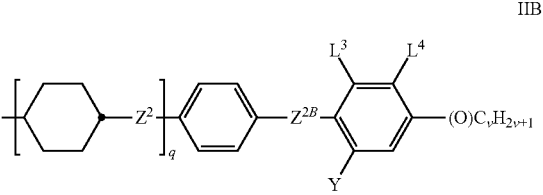
IIB

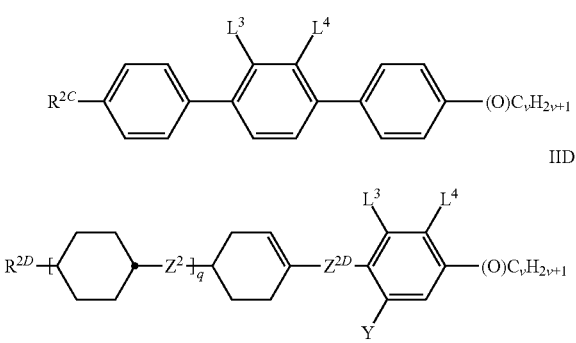

in which
 $R^{2A}$, $R^{2B}$, $R^{2C}$ and $R^{2D}$ each, independently of one another, denote H, an alkyl or alkenyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

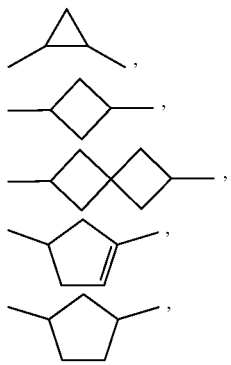

—C≡C—, —$CF_2$O—, —O$CF_2$—, —OC—O— or —O—CO— in such a way that O atoms are not linked directly to one another,
 $L^1$ to $L^4$ each, independently of one another, denote F, Cl, $CF_3$ or $CHF_2$,
 Y denotes H, F, Cl, $CF_3$, $CHF_2$ or $CH_3$,
 $Z^2$, $Z^{2B}$ and $Z^{2D}$ each, independently of one another, denote a single bond, —$CH_2CH_2$—, —CH=CH—, —$CF_2$O—, —$OCF_2$—, —$CH_2$O—, —$OCH_2$—, —COO—, —OCO—, —$C_2F_4$—, —CF=CF— or —CH=CH$CH_2$O—,
 p denotes 0, 1 or 2,
 q denotes 0 or 1, and
 v denotes 1, 2, 3, 4, 5 or 6.

The medium preferably comprises the one or more compounds selected from the group of compounds of formulae IIA, IIB, IIC and IID in a total amount of 5% by weight or more, more preferably 12.5% by weight or more, even more preferably 25% by weight or more and in particular 40% by weight or more. In a particular embodiment the total amount of the one or more compounds selected from the group of compounds of formulae IIA, IIB, IIC and IID, and in particular the further preferred compounds thereof, contained in the liquid-crystal medium is in the range of from 10% by weight to 60% by weight, more preferably from 20% by weight to 55% by weight and in particular from 30% by weight to 50% by weight.

In the compounds of the formulae IIA, IIB and IID, $Z^2$ may have identical or different meanings. In the compounds of the formula IIB, $Z^2$ and $Z^{2B}$ may have identical or different meanings. In the compounds of the formula IID, $Z^2$ and $Z^{2D}$ may have identical or different meanings.

In the compounds of the formulae IIA, IIB, IIC and IID, $R^{2A}$, $R^{2B}$, $R^{2C}$ and $R^{2D}$ each preferably denotes alkyl having 1 to 6 C atoms, in particular $CH_3$, $C_2H_5$, n-$C_3H_7$, n-$C_4H_9$, n-$C_5H_{11}$.

In the compounds of the formulae IIA, IIB and IID, $L^1$, $L^2$, $L^3$ and $L^4$ preferably denote $L^1=L^2=F$ and $L^3=L^4=F$. Furthermore, the groups may preferably denote $L^1=F$ and $L^2=Cl$, $L^1=Cl$ and $L^2=F$, $L^3=F$ and $L^4=Cl$, $L^3=Cl$ and $L^4=F$. $Z^2$ and $Z^{2B}$ in the formulae IIA and IIB preferably each, independently of one another, denotes a single bond, furthermore a —$C_2H_4$— bridge group.

If, in the formula IIB, $Z^2$=—$C_2H_4$— or —$CH_2$O—, $Z^{2B}$ is preferably a single bond or, if $Z^{2B}$=—$C_2H_4$— or —$CH_2$O—, $Z^2$ is preferably a single bond.

In formula IID, $Z^{2D}$ is preferably a single bond.

In the compounds of the formulae IIA, IIB, IIC and IID, (O)$C_vH_{2v+1}$ denotes either O$C_vH_{2v+1}$ or $C_vH_{2v+1}$. In the compounds of the formulae IIA, IIB and IID, (O)$C_vH_{2v+1}$ preferably denotes O$C_vH_{2v+1}$. In the compounds of the formula IIC, (O)$C_vH_{2v+1}$ preferably denotes $C_vH_{2v+1}$.

In the compounds of the formula IIC, $L^3$ and $L^4$ preferably each denotes F.

Preferred compounds of the formulae IIA, IIB, IIC and IID are indicated below:

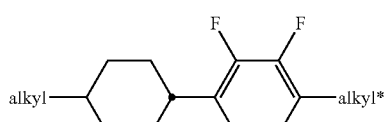

IIA-1

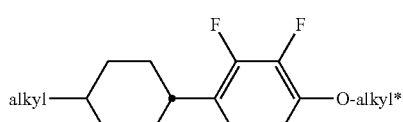

IIA-2

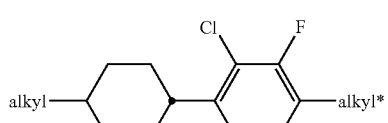

IIA-3

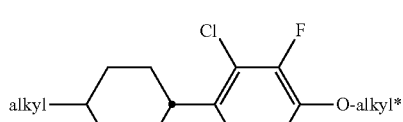

IIA-4

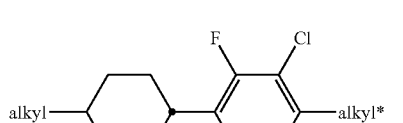

IIA-5

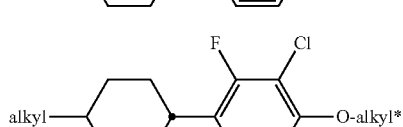

IIA-6

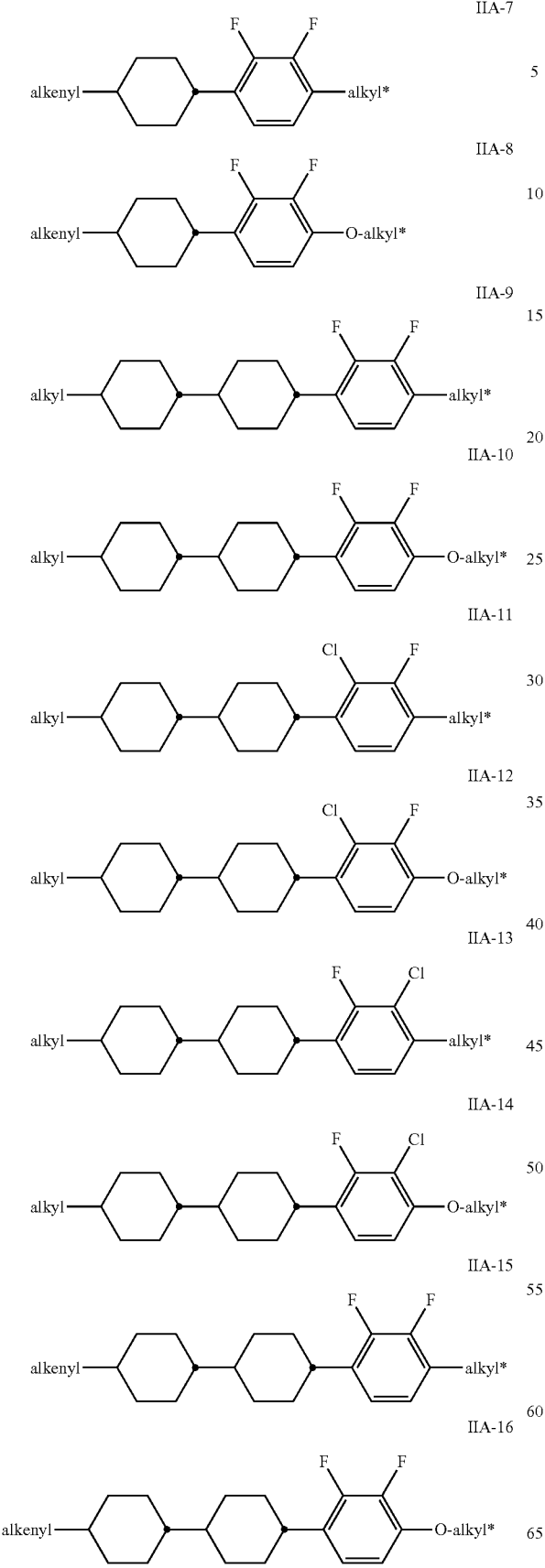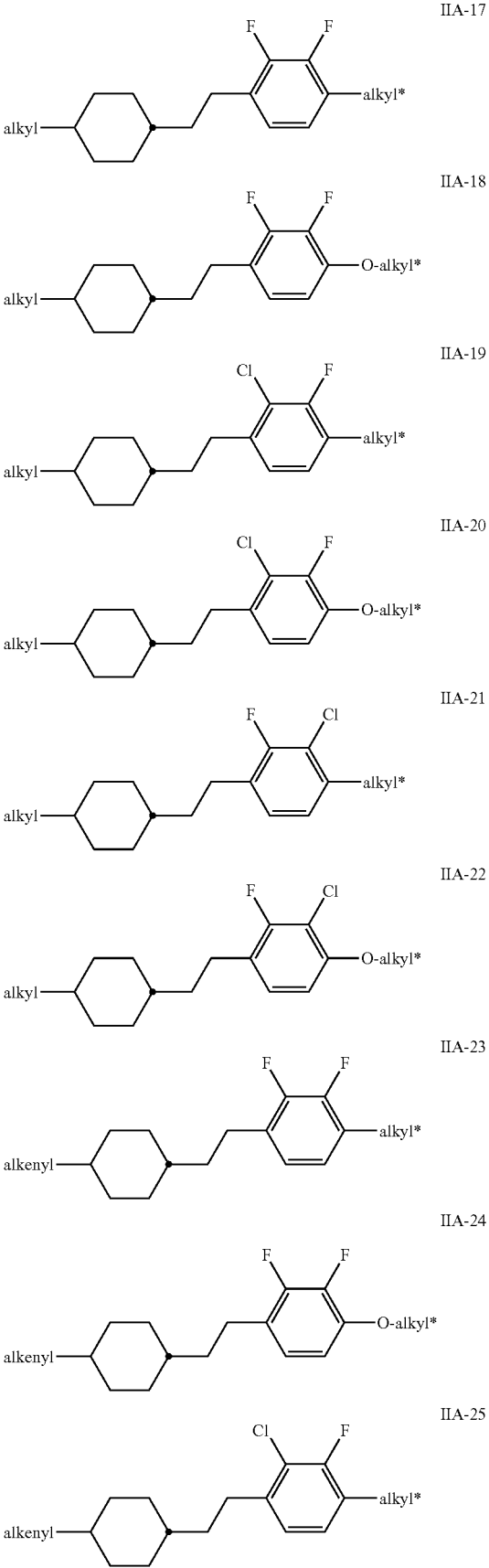

IIA-26
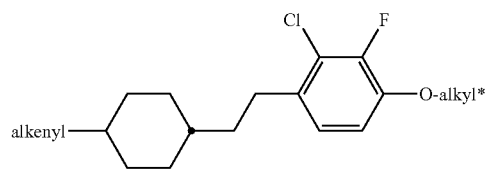
IIA-27
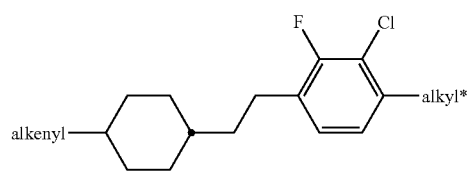
IIA-28
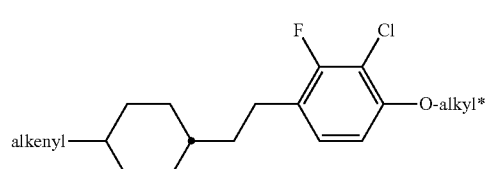
IIA-29
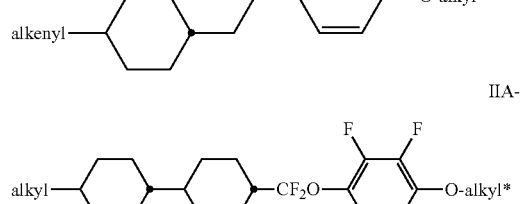
IIA-30
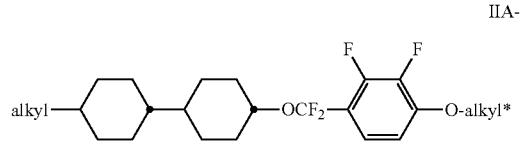
IIA-31
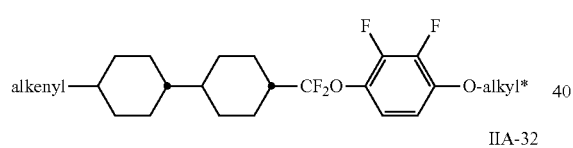
IIA-32
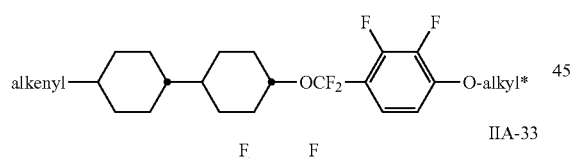
IIA-33
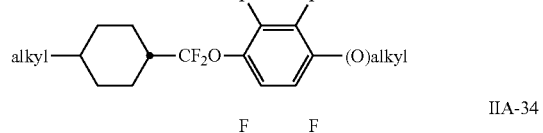
IIA-34
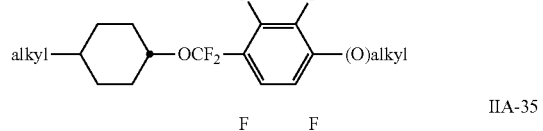
IIA-35
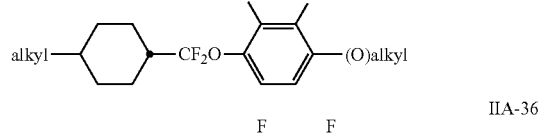
IIA-36
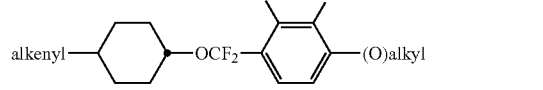
IIA-37
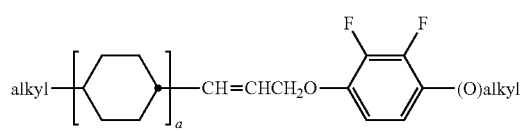
IIA-38
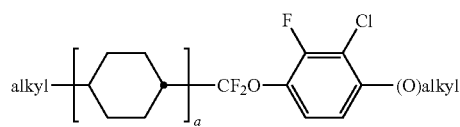
IIA-39
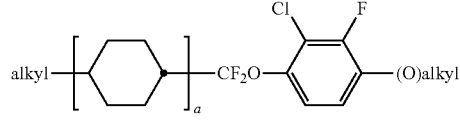
IIA-40
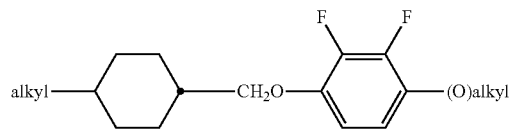
IIA-41
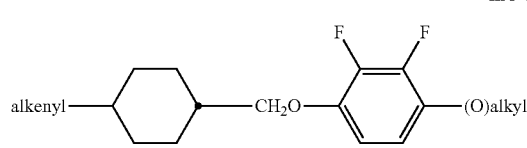
IIA-42
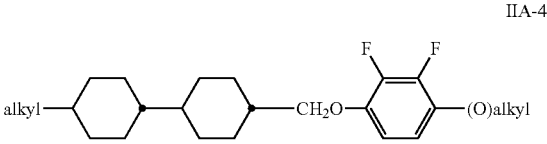
IIA-43
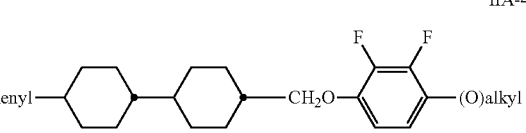
IIA-44
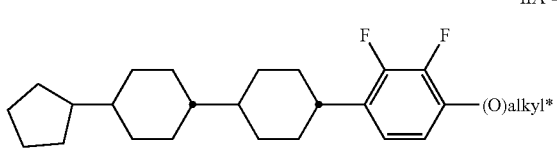
IIA-45
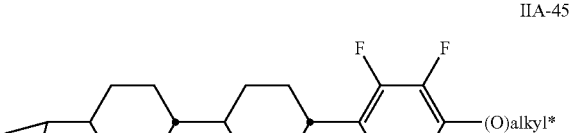
IIA-46
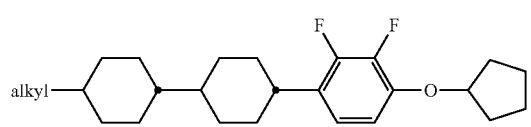

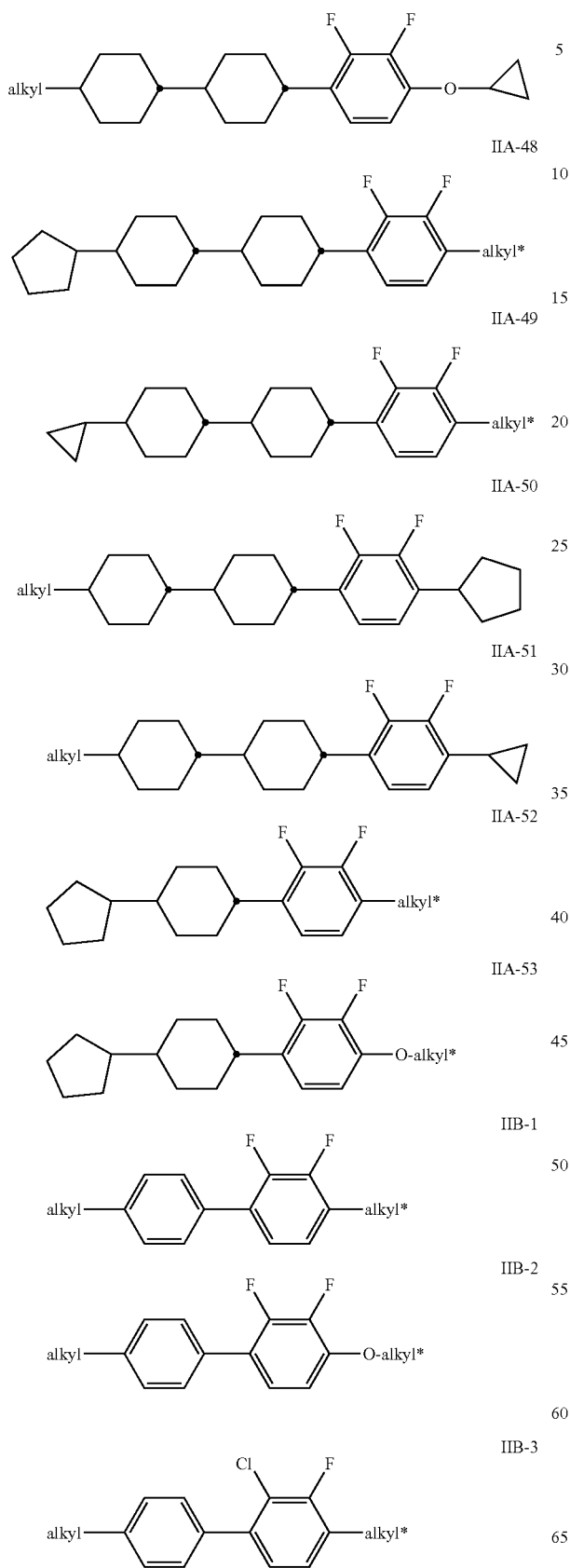
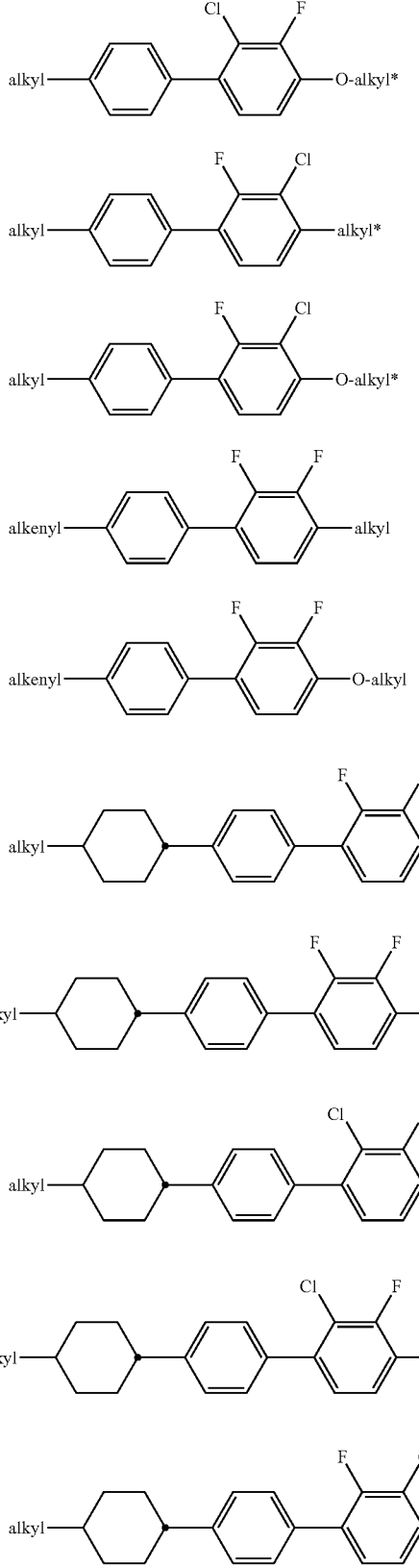

IIB-14
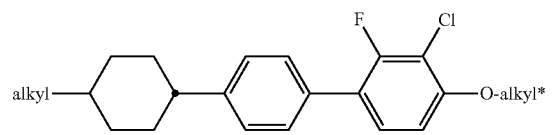
IIB-15
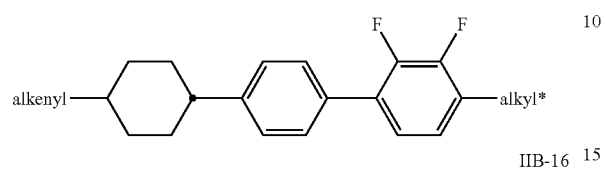
IIB-16
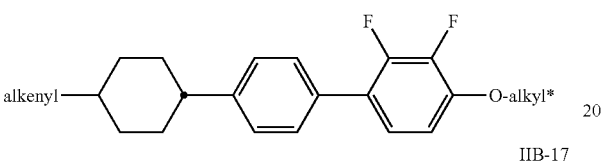
IIB-17
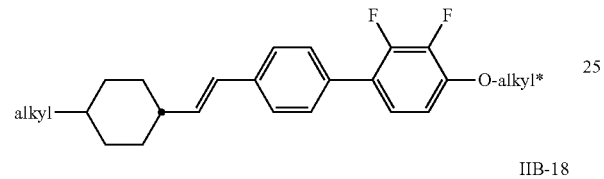
IIB-18
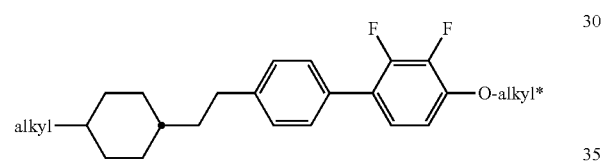
IIB-19
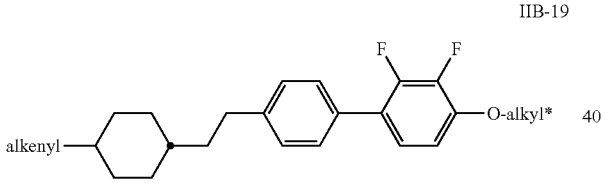
IIB-20
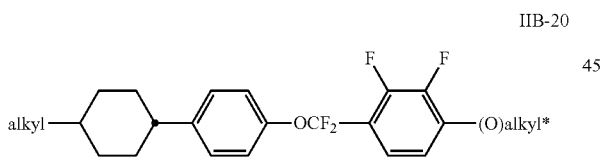
IIB-21
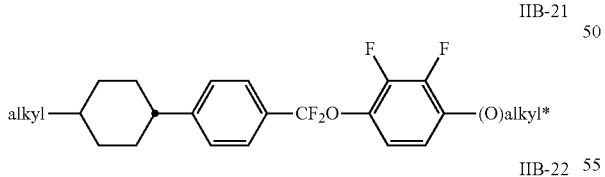
IIB-22
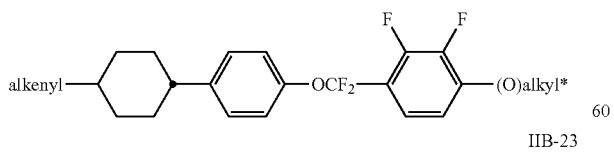
IIB-23
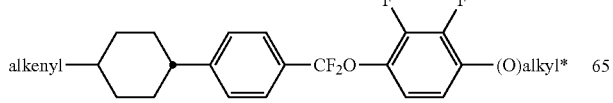
IIB-24
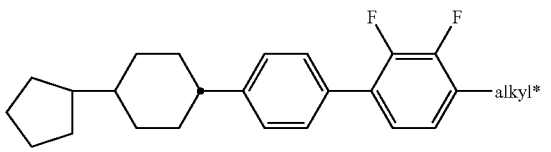
IIB-25
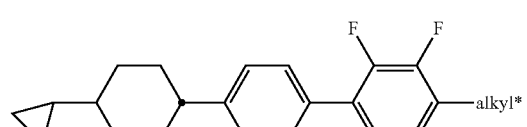
IIB-26
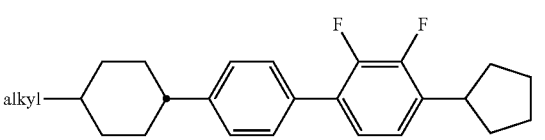
IIB-27
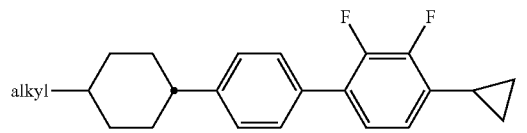
IIB-28
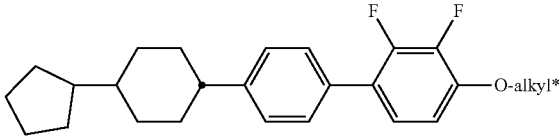
IIB-29
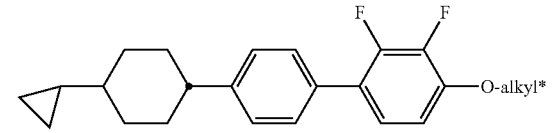
IIB-30
IIB-31
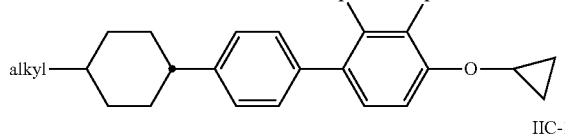
IIC-1
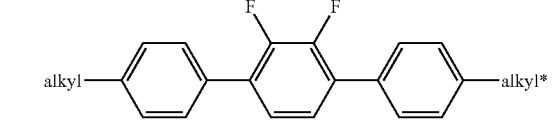
IID-1
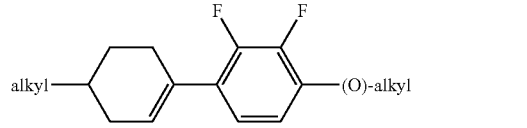

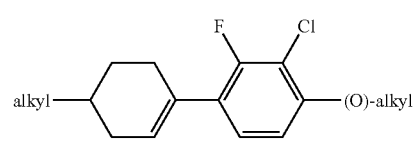

IID-2

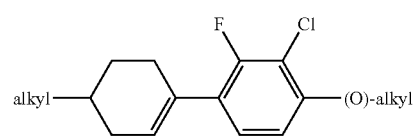

IID-3

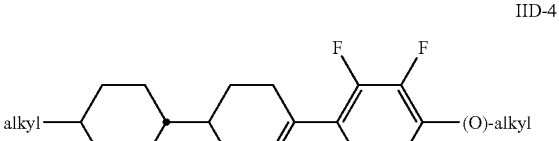

IID-4

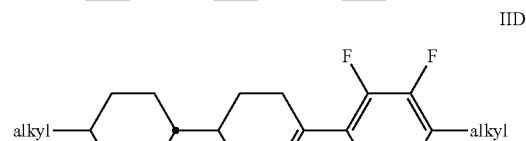

IID-5

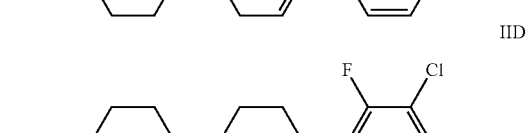

IID-6

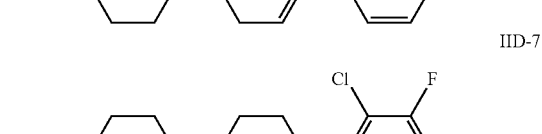

IID-7

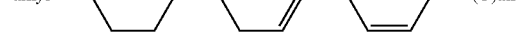

in which the parameter a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Preferred liquid-crystal mixtures according to the invention comprise one or more compounds of the formulae IIA-2, IIA-8, IIA-10, IIA-16, II-18, IIA-40, IIA-41, IIA-42, IIA-43, IIB-2, IIB-10, IIB-16, IIC-1, and IID-4.

It is particularly preferred that the liquid-crystal medium comprises one or more compounds of the formulae IIA-2, IIA-10 and/or IIB-10. In a particularly preferred embodiment the liquid-crystal medium comprises at least one compound of formula IIA-2, at least one compound of formula IIA-10 and at least one compound of formula IIB-10.

The proportion of compounds of the formulae IIA and/or IIB in the mixture as a whole is preferably at least 20% by weight, more preferably at least 30% by weight and even more preferably at least 40% by weight.

In an embodiment the media according to the invention comprise at least one compound of the formula IIC-1

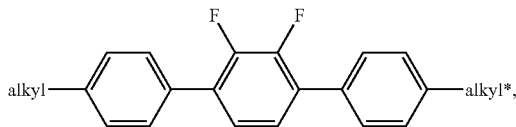

in which alkyl and alkyl* have the meanings indicated above, preferably in amounts of >3% by weight, in particular >5% by weight.

In a particular embodiment, the liquid-crystal medium according to the invention does not comprise any compounds of formula IID-4, more preferably does not comprise any compounds of formulae IID-4 and IID-5, and in particular does not comprise any compounds of formula IID.

In a preferred embodiment, the medium according to the invention comprises one or more compounds of formula III

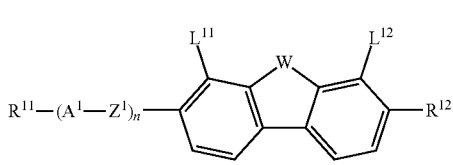

III in which
$R^{11}$ and $R^{12}$ each, independently of one another, denote H, an alkyl or alkoxy radical having 1 to 15 C atoms, where one or more $CH_2$ groups in these radicals may each be replaced, independently of one another, by

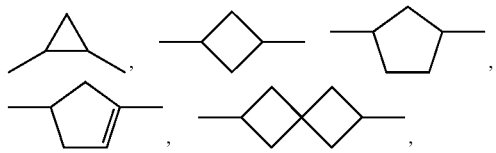

$-C\equiv C-$, $CF_2O-$, $-OCF_2-$, $-CH=CH-$, by $-O-$, $-CO-O-$ or $-O-CO-$ in such a way that O atoms are not linked directly to one another, and in which, in addition, one or more H atoms may be replaced by halogen, $A^1$ on each occurrence, independently of one another, denotes
a) 1,4-cyclohexenylene or 1,4-cyclohexylene radical, in which one or two non-adjacent $CH_2$ groups may be replaced by $-O-$ or $-S-$,
b) a 1,4-phenylene radical, in which one or two CH groups may be replaced by N, or
c) a radical from the group spiro[3.3]heptane-2,6-diyl, 1,4-bicyclo-[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl, where the radicals a), b) and c) may be mono- or polysubstituted by halogen atoms, n denotes 0, 1 or 2, preferably 0 or 1, $Z^1$ on each occurrence independently of one another denotes $-CO-O-$, $-O-CO-$, $-CF_2O-$, $-OCF_2-$, $-CH_2O-$, $-OCH_2-$, $-CH_2-$, $-CH_2CH_2-$, $-(CH_2)_4-$, $-CH=CH-CH_2O-$, $-C_2F_4-$, $-CH_2CF_2-$, $-CF_2CH_2-$, $-CF=CF-$, —CH═CF—, —CF═CH—, —CH═CH—, —C≡C— or a single bond, and L$^{11}$ and L$^{12}$ each, independently of one another, denote F, Cl, CF$_3$ or CHF$_2$, preferably H or F, most preferably F, and W denotes O or S.

Preferably, the one or more compounds of formula III and in particular the further preferred compounds thereof are contained in the liquid-crystal medium in a total amount of 20% by weight or less, more preferably 15% by weight or less and even more preferably 10% by weight or less. It is preferred that the total amount of the one or more compounds of formula III and in particular the further preferred compounds thereof contained in the liquid-crystal medium is in the range of from 2.5% by weight to 15% by weight, more preferably from 5% by weight to 10% by weight and in particular from 6% by weight to 9% by weight.

In a preferred embodiment of the present invention the medium comprises one or more compounds of the formula III-1 and/or III-2

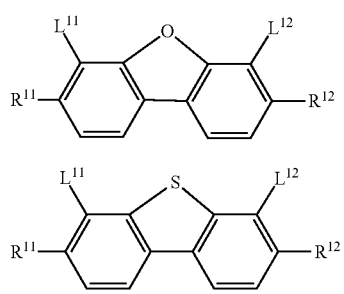

in which the occurring groups have the same meanings as given under formula III above, and preferably R$^{11}$ and R$^{12}$ each, independently of one another, denote an alkyl, alkenyl or alkoxy radical having up to 15 C atoms, more preferably one or both of them denote an alkoxy radical, and L$^{11}$ and L$^{12}$ each denote F.

In a preferred embodiment the media comprise one or more compounds of the formula III-1 selected from the group of compounds of formulae III-1-1 to III-1-10, preferably of formula III-1-6,

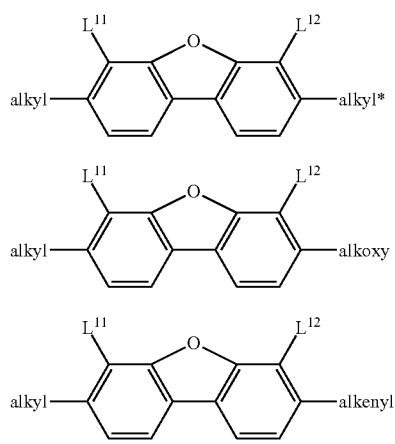

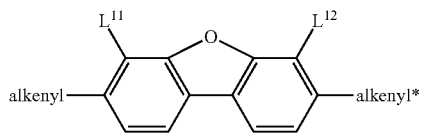

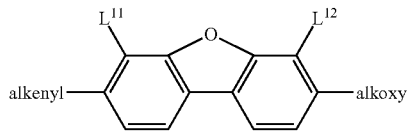

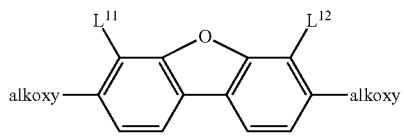

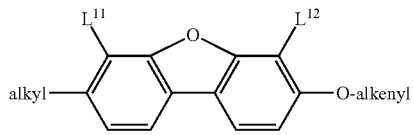

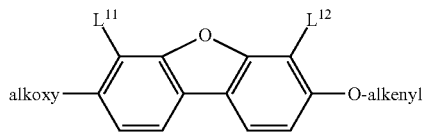

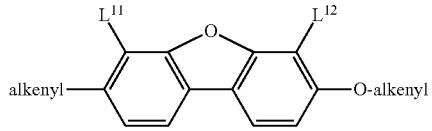

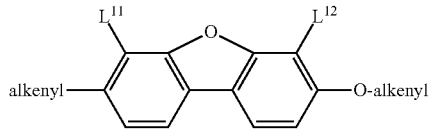

in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and L$^{11}$ and L$^{12}$ each, independently of one another, denote F or Cl, preferably both F.

In a preferred embodiment the media comprise one or more compounds of the formula III-2 selected from the group of compounds of formulae III-2-1 to III-2-10, preferably of formula III-2-6,

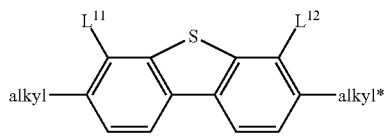

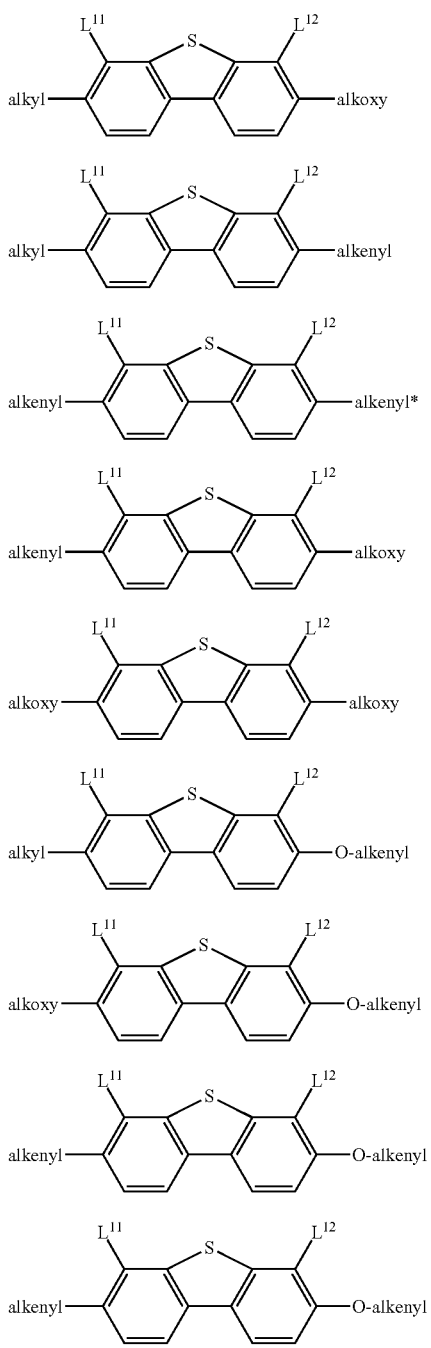

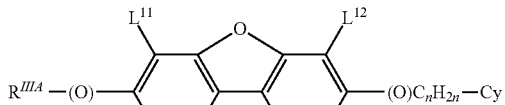

in which $L^{11}$ and $L^{12}$ have the same meanings as given under formula III, (O) denotes O or a single bond, $R^{IIIA}$ denotes alkyl or alkenyl having up to 7 C atoms or a group Cy-$C_mH_{2m+1}$—, m and n are, identically or differently, 0, 1, 2, 3, 4, 5 or 6, preferably 1, 2 or 3, more preferably 1, and Cy denotes a cycloaliphatic group having 3, 4 or 5 ring atoms, which is optionally substituted with alkyl or alkenyl each having up to 3 C atoms, or with halogen or CN, and preferably denotes cyclopropyl, cyclobutyl or cyclopentyl.

The compounds of formula IIIA-1 and/or IIIA-2 are contained in the medium either alternatively or additionally to the compounds of formula III, preferably additionally.

Particularly preferred compounds of the formulae IIIA-1 and IIIA-2 are the following:

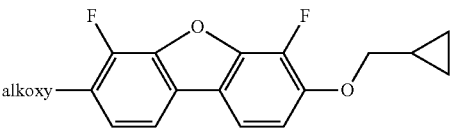

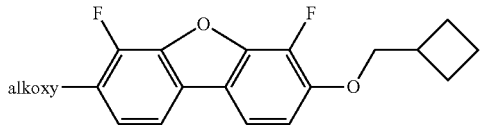

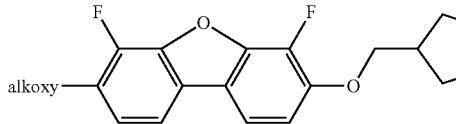

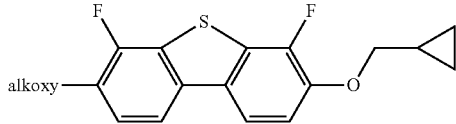

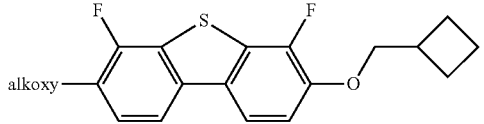

in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^1$ and $L^2$ each, independently of one another, denote F or Cl, preferably both F.

In a preferred embodiment of the present invention the medium comprises one or more compounds of the formula IIIA-1 and/or IIIA-2

IIIA-1-3

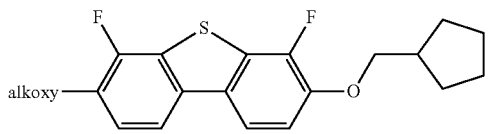

in which alkoxy denotes a straight-chain alkoxy radical having 1-6 C atoms.

In a preferred embodiment of the present invention, the medium comprises one or more compounds of formula III-3, preferably in a total amount in the range of from 2.5% by weight to 15% by weight, more preferably from 5% by weight to 10% by weight,

III-3

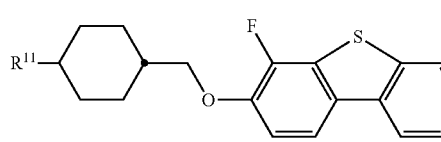

in which
R$^{11}$, R$^{12}$ identically or differently, denote H, an alkyl or alkoxy radical having 1 to 15 C atoms, in which one or more CH$_2$ groups in these radicals are optionally replaced, independently of one another, by —C≡C—, —CF$_2$O—, —OCF$_2$—, —CH=CH—,

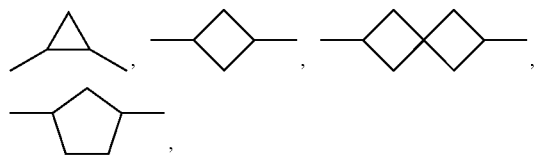

—O—, —CO—O— or —O—CO— in such a way that O atoms are not linked directly to one another, and in which, in addition, one or more H atoms may be replaced by halogen.

The one or more compounds of formula III-3 are preferably selected from the group of compounds of the formulae III-3-1 to III-3-10:

III-3-1

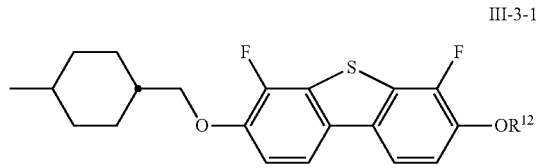

III-3-2

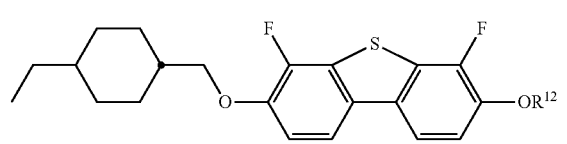

III-3-3

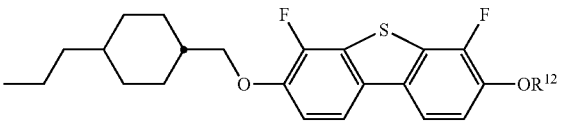

III-3-4

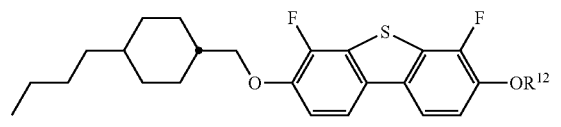

III-3-5

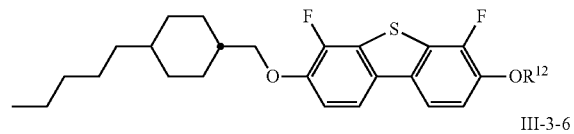

III-3-6

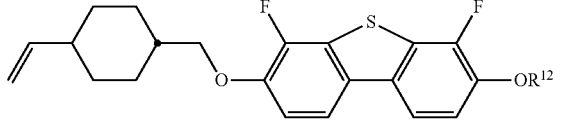

III-3-7

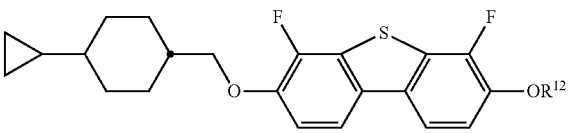

III-3-8

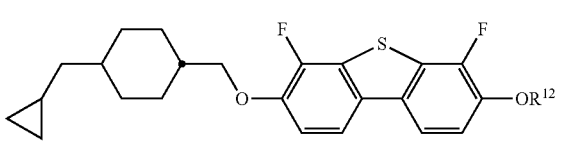

III-3-9

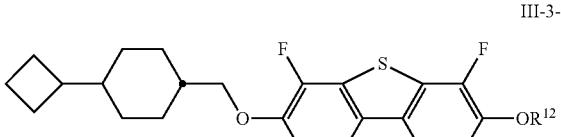

III-3-10

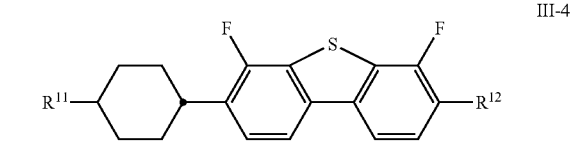

in which R$^{12}$ denotes alkyl having 1 to 7 C atoms, preferably ethyl, n-propyl or n-butyl, or alternatively cyclopropylmethyl, cyclobutylmethyl or cyclopentylmethyl.

The medium particularly preferably contains one or more compounds of formula III-3-2.

In a preferred embodiment of the present invention, the medium comprises one or more compounds of the formulae III-4 to III-6, preferably of the formula III-5,

III-4

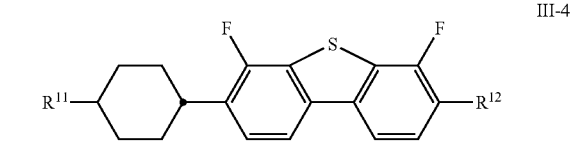

-continued

III-5

R$^{11}$—⬡—⬢(F)—S—⬢(F)—R$^{12}$

III-6

R$^{11}$—⬢—⬢(F)—S—⬢(F)—R$^{12}$ in which the parameters have the meanings given above, R$^{11}$ preferably denotes straight-chain alkyl and R$^{12}$ preferably denotes alkoxy, each having 1 to 7 C atoms.

In a preferred embodiment the media comprise one or more compounds of the formula III selected from the group of compounds of formulae III-7 to III-9, preferably of formula III-8,

III-7

R$^{11}$—⬡—⬢(F)—O—⬢(F)—R$^{12}$

III-8

R$^{11}$—⬡—⬢(F)—O—⬢(F)—R$^{12}$

III-9

R$^{11}$—⬢—⬢(F)—O—⬢(F)—R$^{12}$ in which the parameters have the meanings given above, R$^{11}$ preferably denotes straight-chain alkyl and R$^{12}$ preferably denotes alkoxy each having 1 to 7 C atoms.

In a preferred embodiment, the medium comprises one or more compounds of the formula IV

IV

R$^{41}$—⬡—⬡—R$^{42}$ in which
- R$^{41}$ denotes an unsubstituted alkyl radical having 1 to 7 C atoms or an unsubstituted alkenyl radical having 2 to 7 C atoms, preferably an n-alkyl radical, particularly preferably having 2, 3, 4 or 5 C atoms, and
- R$^{42}$ denotes an unsubstituted alkyl radical having 1 to 7 C atoms or an unsubstituted alkoxy radical having 1 to 6 C atoms, both preferably having 2 to 5 C atoms, or an unsubstituted alkenyl radical having 2 to 7 C atoms, preferably having 2, 3 or 4 C atoms, more preferably a vinyl radical or a 1-propenyl radical and in particular a vinyl radical.

Preferably, the liquid-crystal medium comprises the one or more compounds of formula IV in a total amount of at least 10% by weight, more preferably at least 20% by weight, even more preferably at least 30% by weight and in particular at least 35% by weight.

The compounds of the formula IV are preferably selected from the group of the compounds of the formulae IV-1 to IV-4,

IV-1 alkyl—⬡—⬡—alkyl'

IV-2 alkyl—⬡—⬡—alkoxy

IV-3 alkyl—⬡—⬡—alkenyl

IV-4 alkenyl—⬡—⬡—alkenyl' in which
- alkyl and alkyl' independently of one another, denote alkyl having 1 to 7 C atoms, preferably having 2 to 5 C atoms,
- alkenyl denotes an alkenyl radical having 2 to 5 C atoms, preferably having 2 to 4 C atoms, particularly preferably 2 C atoms,
- alkenyl' denotes an alkenyl radical having 2 to 5 C atoms, preferably having 2 to 4 C atoms, particularly preferably having 2 to 3 C atoms, and
- alkoxy denotes alkoxy having 1 to 5 C atoms, preferably having 2 to 4 C atoms.

Preferably, the medium comprises one or more compounds selected from the compounds of the formulae IV-1-1 to IV-1-5

IV-1-1

$C_2H_5$—⬡—⬡—$C_3H_7$

IV-1-2

$C_2H_5$—⬡—⬡—$C_5H_{11}$

IV-1-3

$C_3H_7$—⬡—⬡—$C_5H_{11}$

IV-1-4

$C_3H_7$—⬡—⬡—$C_4H_9$

IV-1-5

$C_2H_5$—⬡—⬡—$C_4H_9$.

Preferably, the medium according to the invention comprises one or more compounds of the formulae IV-2-1 and/or IV-2-2

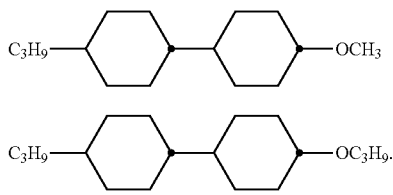
IV-2-1

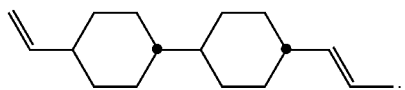
IV-4-2

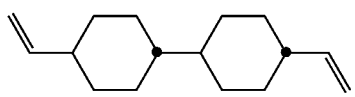
IV-2-2

The liquid-crystalline medium preferably additionally comprises one or more compounds of the formula IVa In a preferred embodiment the liquid-crystal medium according to the invention comprises one or more compounds of formula IV-3, in particular selected from the compounds of the formulae IV-3-1 to IV-3-5

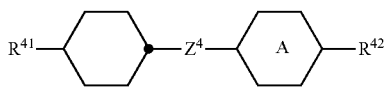
IVa in which
R$^{41}$ and R$^{42}$ each, independently of one another, denote a straight-chain alkyl, alkoxy, alkenyl, alkoxyalkyl or alkoxy radical having up to 12 C atoms, and

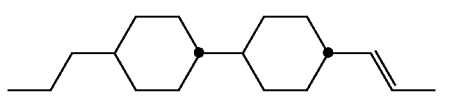
IV-3-1

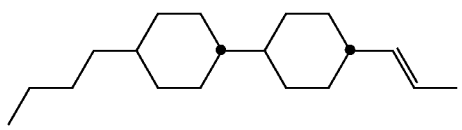
IV-3-2

denotes

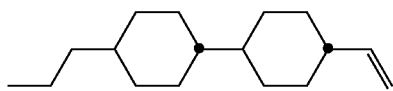
IV-3-3

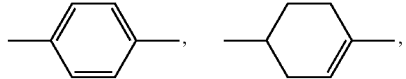

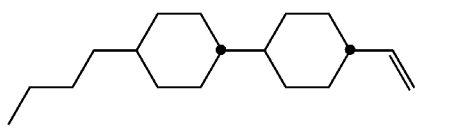
IV-3-4

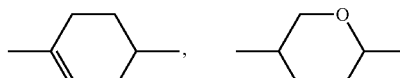
or

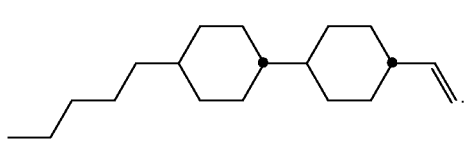
IV-3-5

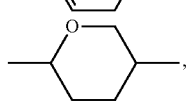
, and
Z$^4$ denotes a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —C$_4$H$_8$— or —CF=CF—.

Preferably, the liquid-crystal medium comprises the one or more compounds of formulae IV-3-1 to IV-3-5 in a total amount of at least 10% by weight, more preferably at least 20% by weight, even more preferably at least 30% by weight and in particular at least 35% by weight.

It is particularly preferred that the medium comprises one or more compounds selected from the compounds of formulae IV-3-1, IV-3-3 and IV-3-4. It is even more preferred that the medium comprises the compound of formula IV-3-1 and/or the compound of formula IV-3-3, preferably in a total amount of at least 10% by weight, more preferably at least 20% by weight and even more preferably at least 30% by weight.

Preferably, the medium according to the invention comprises a compound of formula IV-4, in particular selected from the compounds of the formulae IV-4-1 and IV-4-2

Preferred compounds of the formula IVa are indicated below:

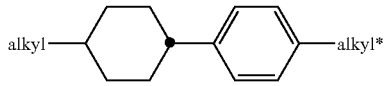
IVa-1

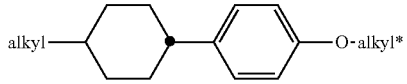
IVa-2

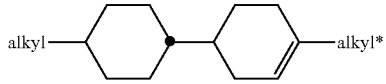
IVa-3

IVa-4

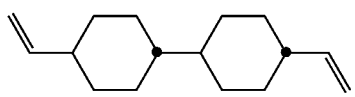
IV-4-1 in which
alkyl and
alkyl* each, independently of one another, denote a straight-chain alkyl radical having 1 to 6 C atoms.

The medium according to the invention preferably comprises at least one compound of the formula IVa-1 and/or formula IVa-2.

In an embodiment the proportion of compounds of the formula IVa in the mixture as a whole is at least 5% by weight.

In a preferred embodiment the liquid-crystal medium comprises one or more compounds of formulae IVb-1 to IVb-3

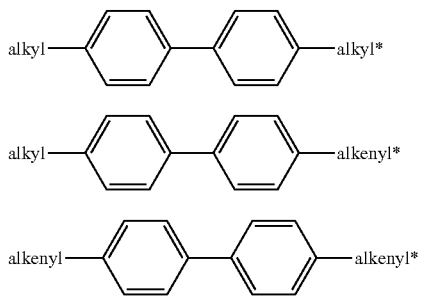

in which
alkyl and alkyl* each, independently of one another, denote a straight-chain alkyl radical having 1 to 6 C atoms, and
alkenyl and alkenyl* each, independently of one another, denote a straight-chain alkenyl radical having 2 to 6 C atoms.

The proportion of the compounds of the formulae IVb-1 to IVb-3 in the mixture as a whole is preferably at least 3% by weight, in particular >5% by weight.

Of the compounds of the formulae IVb-1 to IVb-3, the compounds of the formula IVb-2 are particularly preferred.

Very particularly preferred compounds of formula IVb are the following:

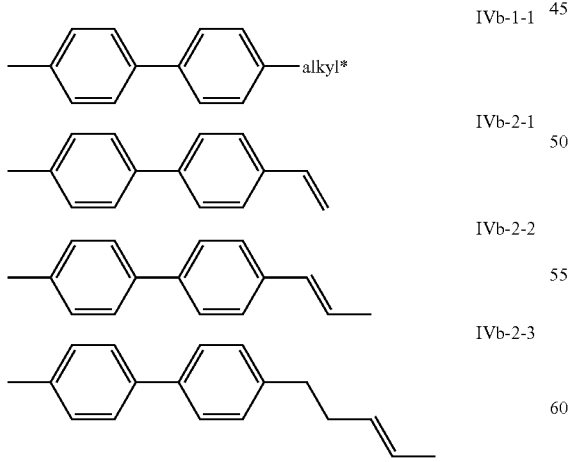

in which alkyl* denotes an alkyl radical having 1 to 6 C atoms and preferably denotes n-propyl. The medium according to the invention particularly preferably comprises one or more compounds of the formulae IVb-1-1 and/or IVb-2-3.

In a particularly preferred embodiment the liquid-crystal medium comprises the compound of formula IVb-2-3, preferably in an amount of at least 3% by weight, in particular at least 5% by weight.

In a preferred embodiment, the medium comprises one or more compounds of formula V

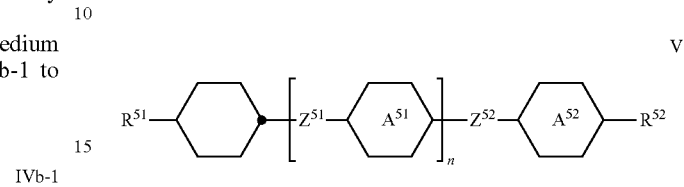

in which
$R^{51}$ and $R^{52}$, independently of one another, have one of the meanings given for $R^{41}$ and $R^{42}$ for formula IV, and preferably denote alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 2 to 5 C atoms, alkoxyalkyl, alkenyl or alkenyloxy having 2 to 7 C atoms, preferably having 2 to 4 C atoms, preferably alkenyloxy,

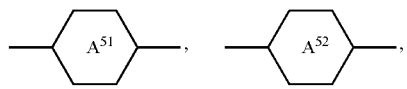

identically or differently, denote

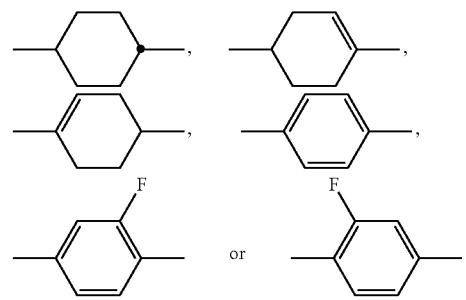

in which

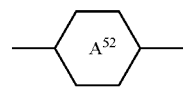

preferably denotes

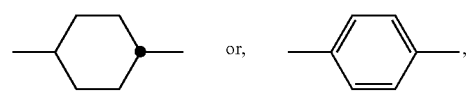

$Z^{51}$, $Z^{52}$ each, independently of one another, denote —$CH_2$—$CH_2$—, —$CH_2$—O—, —CH=CH—, —C≡C—, —COO— or a single bond, preferably —CH$_2$—CH$_2$—, —CH$_2$—O— or a single bond, preferably a single bond, and n is 1 or 2.

The compounds of formula V are preferably selected from the compounds of the formulae V-1 to V-16:

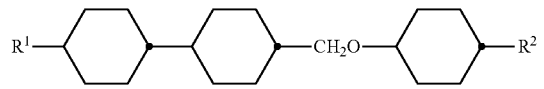
V-1

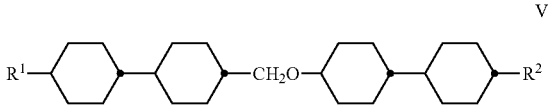
V-2

V-3

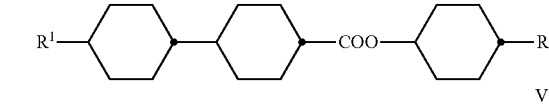
V-4

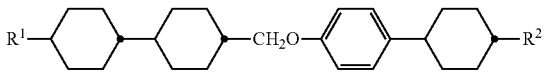
V-5

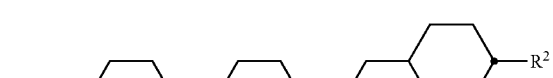
V-6

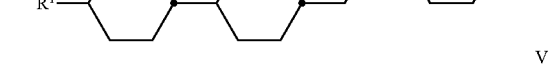
V-7

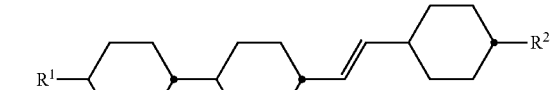
V-8

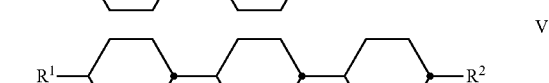
V-9

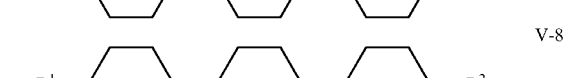
V-10

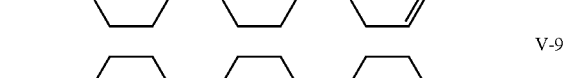
V-11

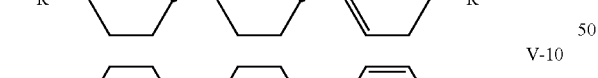
V-12

V-13

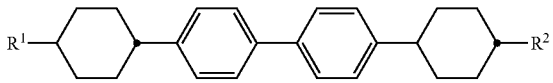
V-14

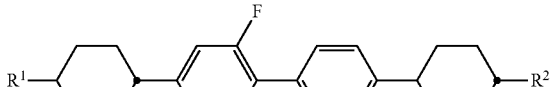
V-15

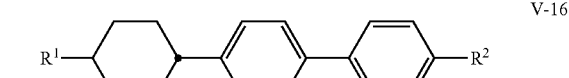
V-16 in which R$^1$ and R$^2$ have the meanings indicated for R$^{51}$ in formula V above. R$^1$ and R$^2$ preferably each, independently of one another, denote straight-chain alkyl or alkenyl.

Preferred media comprise one or more compounds of the formulae V-1, V-3, V-4, V-6, V-7, V-10, V-11, V-12, V-14, V-15, and/or V-16.

Mixtures according to the invention preferably comprise the compounds of the formula V-10, V-12 and/or V-16, in particular in amounts of 5% by weight to 30% by weight.

Preferred compounds of the formula V-10 are indicated below:

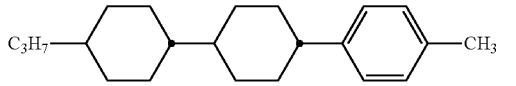
V-10a

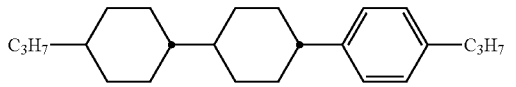
V-10b

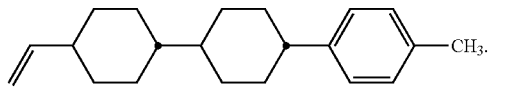
V-10c

In a preferred embodiment the medium additionally comprises one or more compounds of the formulae VI-1 to VI-9

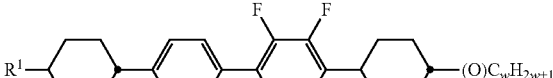
VI-1

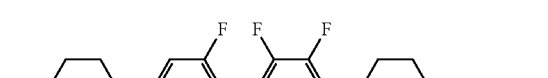
VI-2

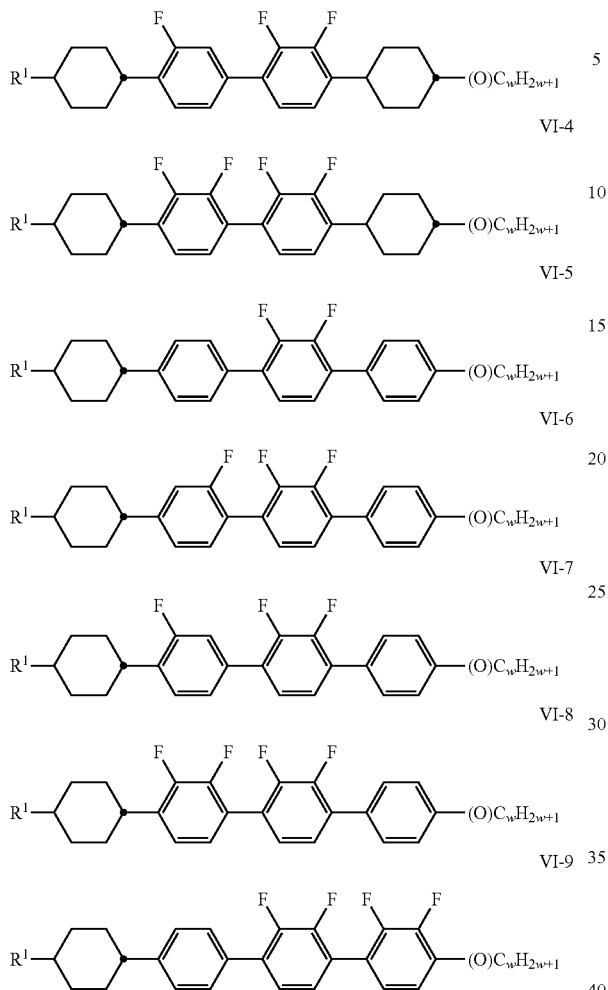
in which
R[7] each, independently of one another, have one of the meanings indicated for R[51] in formula V, and
w and x each, independently of one another, denote 1 to 6.
Particular preference is given to mixtures comprising at least one compound of the formula V-9.
In a preferred embodiment the medium additionally comprises one or more compounds of the formulae-VII-1 to VII-21
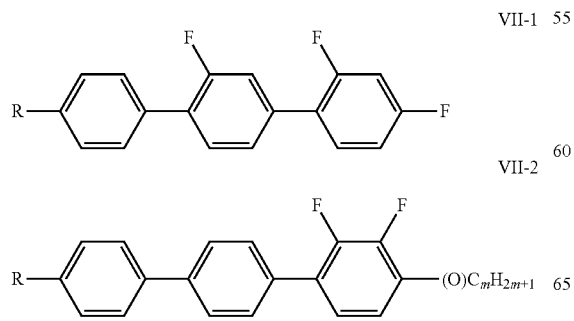
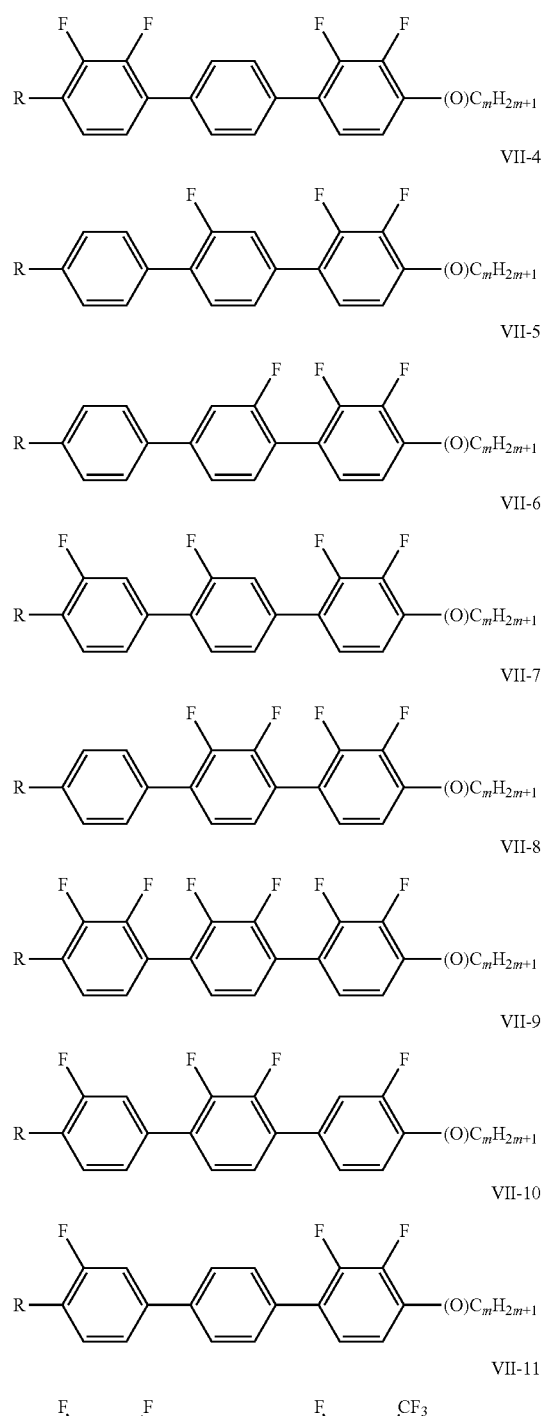
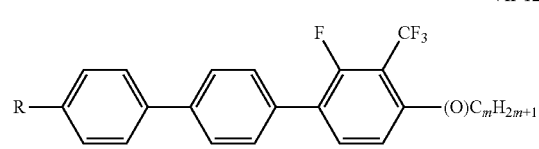

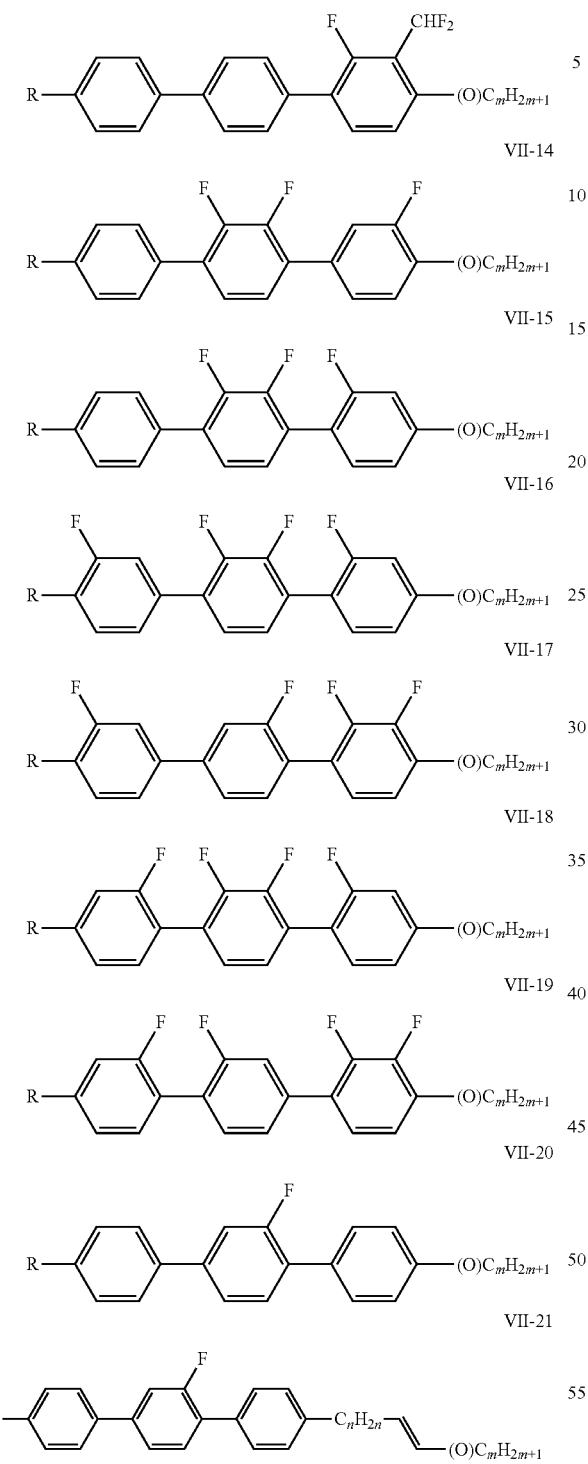

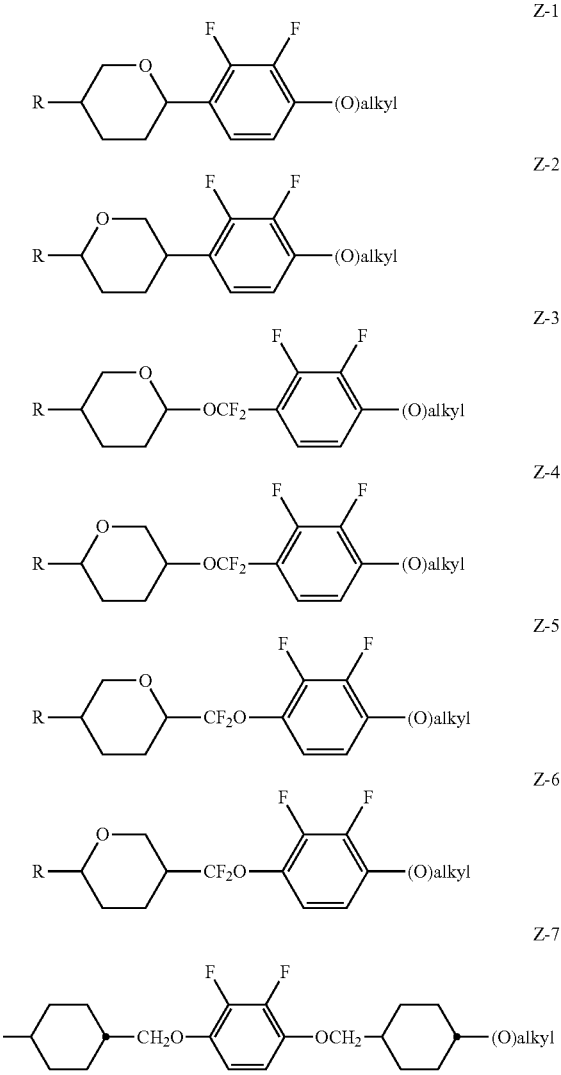

in which R and alkyl have the meanings indicated above for $R^{11}$ for formula III.

b) Preferred liquid-crystalline media comprise one or more substances which contain a tetrahydronaphthyl or naphthyl unit, such as, for example, the compounds of the formulae N-1 to N-5

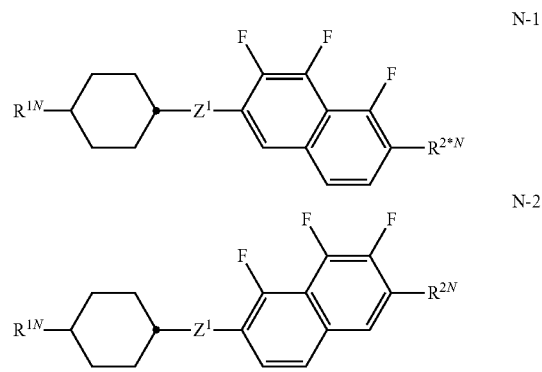

in which R denotes a straight-chain alkyl or alkoxy radical having 1 to 6 C atoms, (O) denotes —O— or a single bond, and m is 0, 1, 2, 3, 4, 5 or 6 and n is 0, 1, 2, 3 or 4. R preferably denotes methyl, ethyl, propyl, butyl, pentyl, hexyl, methoxy, ethoxy, propoxy, butoxy or pentoxy.

Further preferred embodiments are listed below:

a) Liquid-crystalline medium comprising at least one compound of the formulae Z-1 to Z-7

N-3

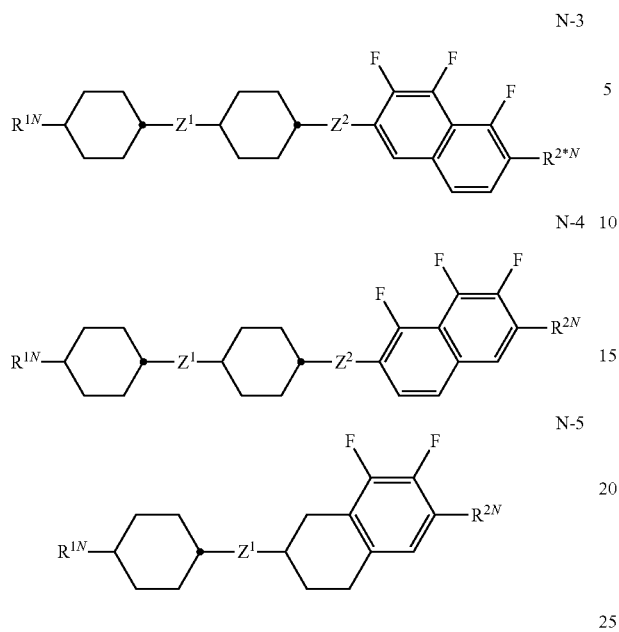

N-4

N-5 in which $R^{1N}$ and $R^{2N}$ each, independently of one another, have the meanings indicated for $R^{11}$ for formula III, preferably denote straight-chain alkyl, straight-chain alkoxy or straight-chain alkenyl, and $Z^1$ and $Z^2$ each, independently of one another, denote —$C_2H_4$—, —CH=CH—, —$(CH_2)_4$—, —$(CH_2)_3O$—, —$O(CH_2)_3$—, —CH=CHCH$_2$CH$_2$—, —CH$_2$CH$_2$CH=CH—, —CH$_2$O—, —OCH$_2$—, —COO—, —OCO—, —$C_2F_4$—, —CF=CF—, —CF=CH—, —CH=CF—, —CF$_2$O—, —OCF$_2$—, —CH$_2$— or a single bond.

c) Preferred mixtures comprise one or more compounds selected from the group of the difluorodibenzochroman compounds of the formula BC, chromans of the formula CR, and fluorinated phenanthrenes of the formulae PH-1 and PH-2

BC

CR

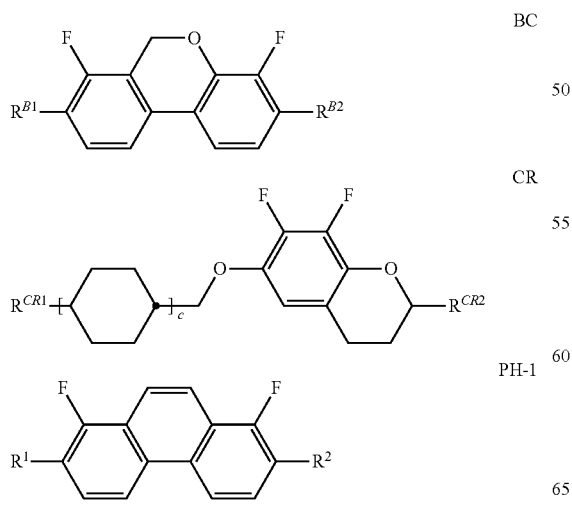

PH-1

PH-2

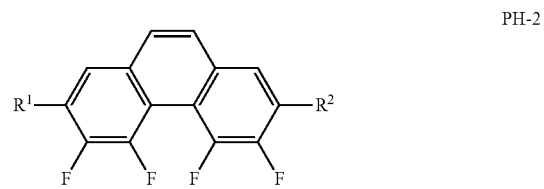

in which $R^{B1}$, $R^{B2}$, $R^{CR1}$, $R^{CR2}$, $R^1$, $R^2$ each, independently of one another, have the meaning of $R^{11}$ for formula III. c is 0, 1 or 2. $R^1$ and $R^2$ preferably, independently of one another, denote alkyl or alkoxy having 1 to 6 C atoms.

The mixtures according to the invention preferably comprise the compounds of the formulae BC, CR, PH-1, PH-2 in amounts of 3 to 20% by weight, in particular in amounts of 3 to 15% by weight.

Particularly preferred compounds of the formulae BC and CR are the compounds BC-1 to BC-7 and CR-1 to CR-5

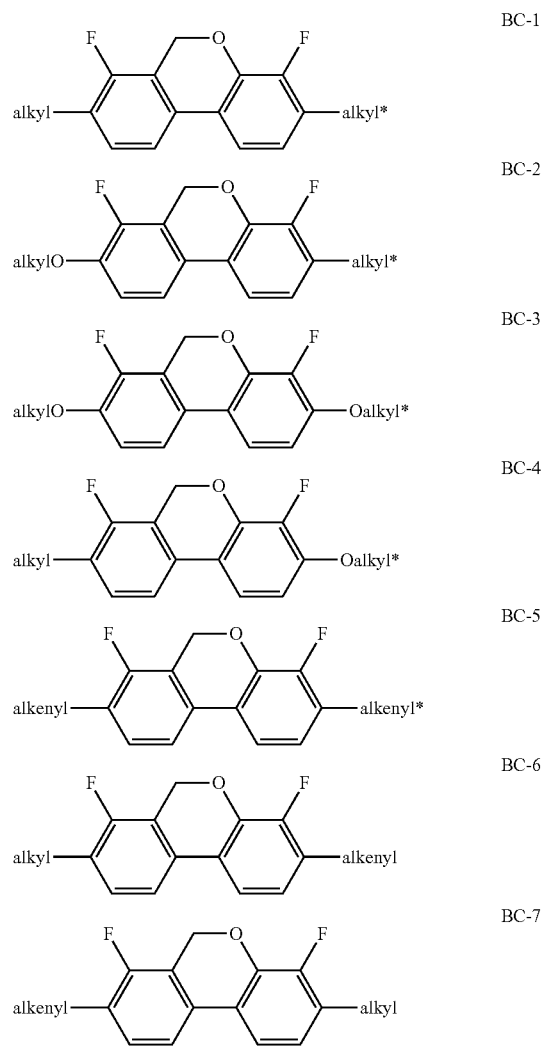

-continued

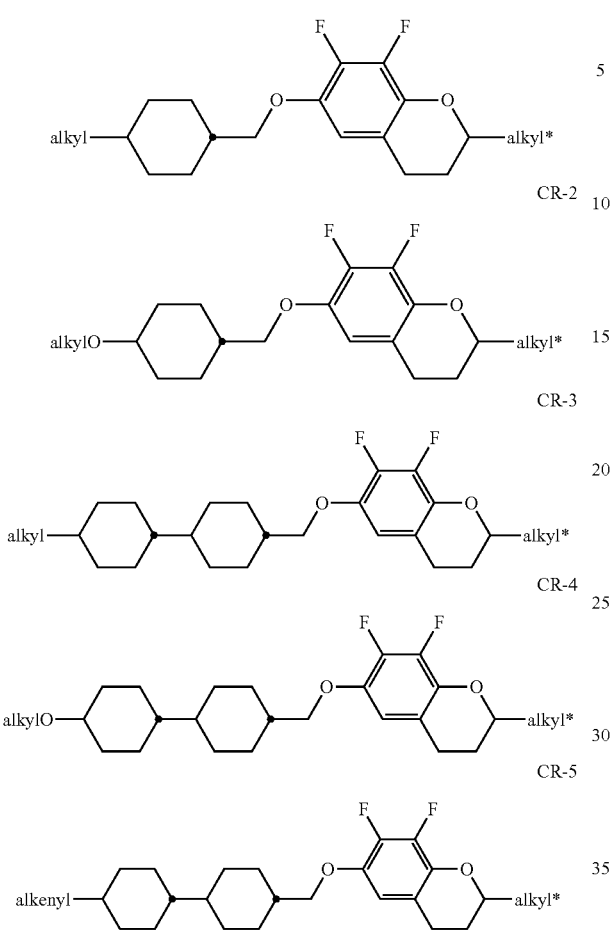

in which
alkyl and alkyl* each, independently of one another, denote a straight-chain alkyl radical having 1 to 6 C atoms, and
alkenyl and
alkenyl* each, independently of one another, denote a straight-chain alkenyl radical having 2 to 6 C atoms.
Very particular preference is given to mixtures comprising one, two or three compounds of the formula BC-2, BF-1 and/or BF-2.

d) Preferred mixtures comprise one or more indane compounds of the formula In,

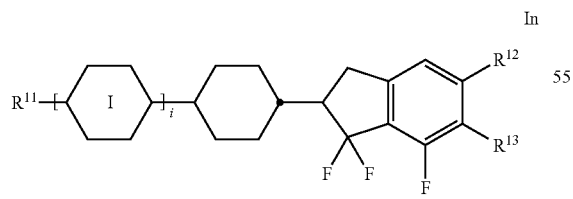

in which
$R^{11}$, $R^{12}$,
$R^{13}$ each, independently of one another, denote a straight-chain alkyl, alkoxy, alkoxyalkyl or alkenyl radical having 1 to 6 C atoms,
$R^{12}$ and $R^{13}$ additionally denote halogen, preferably F,

denotes

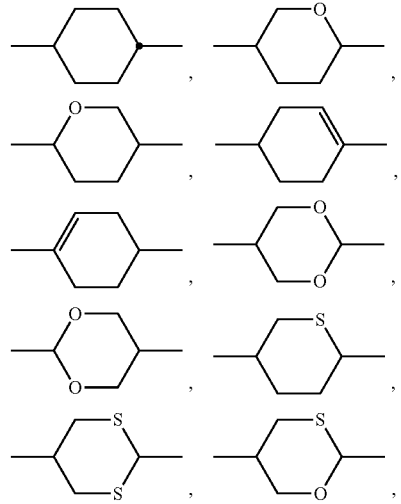

i denotes 0, 1 or 2.

Preferred compounds of the formula In are the compounds of the formulae In-1 to In-16 indicated below:

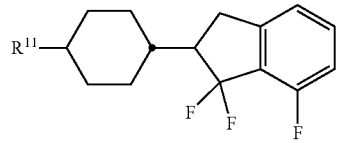

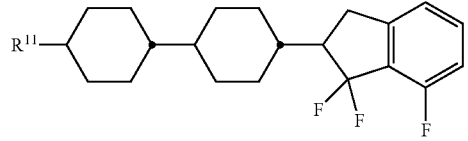

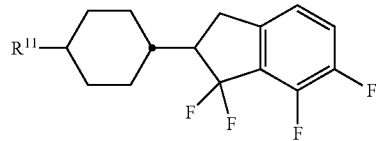

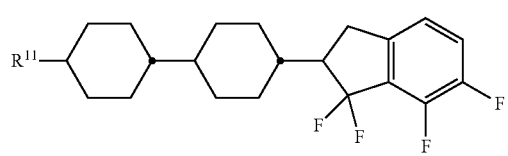

In-5 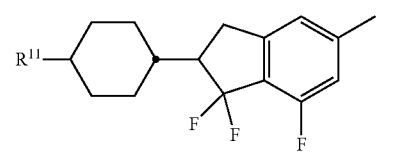

In-6 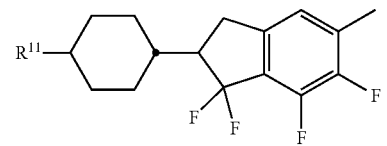

In-7 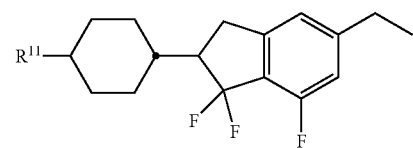

In-8 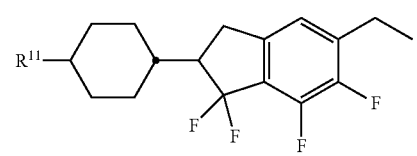

In-9 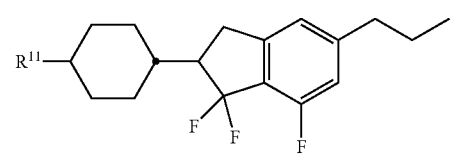

In-10 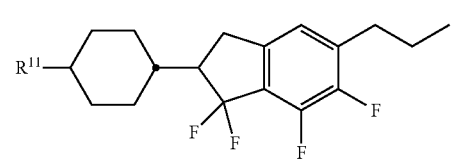

In-11 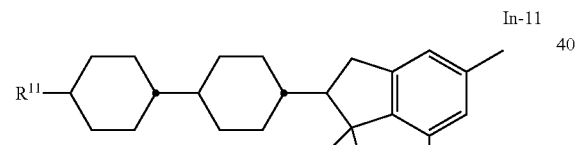

In-12 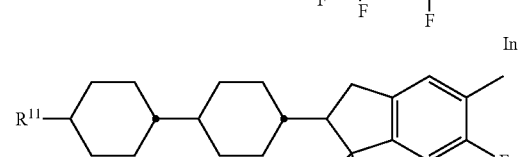

In-13 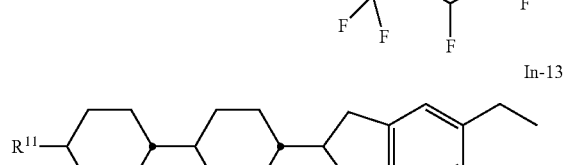

In-14 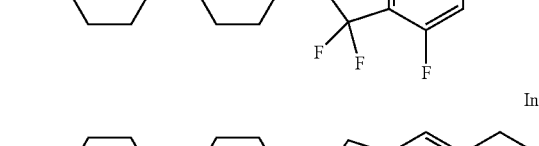

In-15 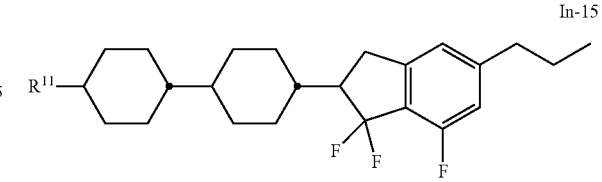

In-16 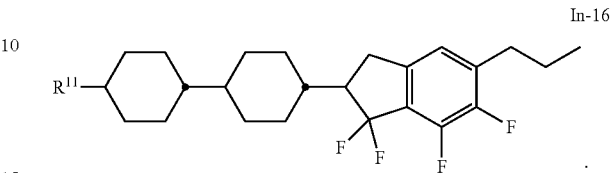

Particular preference is given to the compounds of the formulae In-1, In-2, In-3 and In-4.

The compounds of the formula In and the sub-formulae In-1 to In-16 are preferably employed in the mixtures according to the invention in concentrations of 5% by weight, in particular 5 to 30% by weight and very particularly preferably 5 to 25% by weight.

e) Preferred mixtures additionally comprise one or more compounds of the formulae L-1 to L-5

L-1 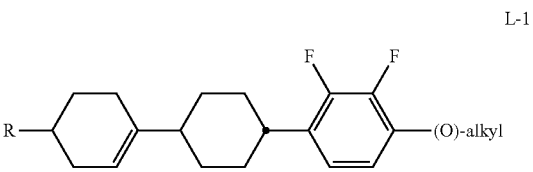

L-2 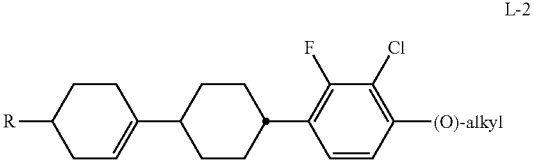

L-3 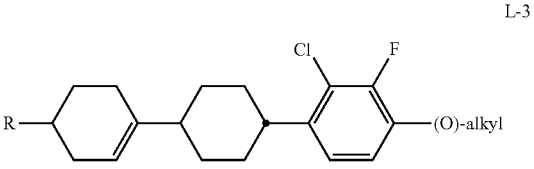

L-4 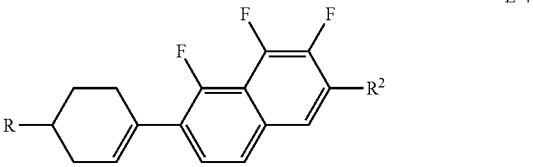

L-5 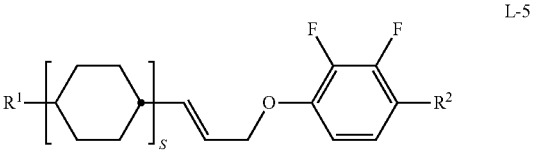

in which

R and $R^1$ each, independently of one another, have the meanings indicated for $R^{11}$ for formula III above, and alkyl denotes an alkyl radical having 1 to 6 C atoms. The parameter s denotes 1 or 2.

The compounds of the formulae L-1 to L-5 are preferably employed in concentrations of 5 to 50% by weight, in particular 5 to 40% by weight and very particularly preferably 10 to 40% by weight.

f) Preferred mixtures additionally comprise one or more compounds of formula IIA-Y

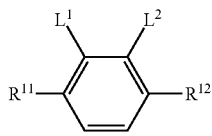
IIA-Y in which $R^{11}$ and $R^{12}$ have one of the meanings given for $R^{11}$ for formula III above, and $L^1$ and $L^2$, identically or differently, denote F or Cl.

Preferred compounds of the formula IIA-Y are selected from the group consisting of the following subformulae

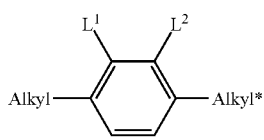
IIA-Y1

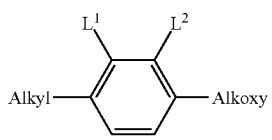
IIA-Y2

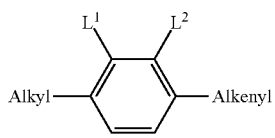
IIA-Y3

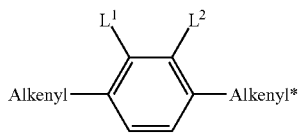
IIA-Y4

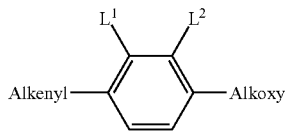
IIA-Y5

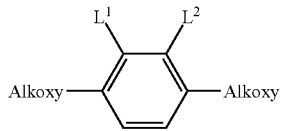
IIA-Y6

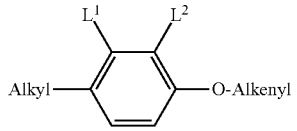
IIA-Y7

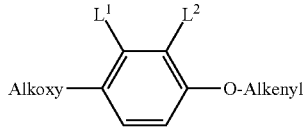
IIA-Y8

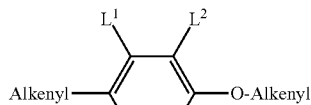
IIA-Y9

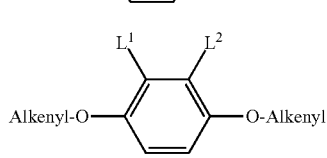
IIA-Y10 in which, Alkyl and Alkyl* each, independently of one another, denote a straight-chain alkyl radical having 1-6 C atoms, Alkoxy denotes a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote $CH_2$=CH—, $CH_2$=CHCH$_2$CH$_2$—, $CH_3$—CH=CH—, $CH_3$—CH$_2$—CH=CH—, $CH_3$—(CH$_2$)$_2$—CH=CH—, $CH_3$—(CH$_2$)$_3$—CH=CH— or $CH_3$—CH=CH—(CH$_2$)$_2$—.

Particularly preferred compounds of the formula IIA-Y are selected from the group consisting of following subformulae:

IIA-Y6a

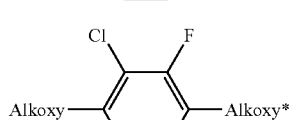
IIA-Y6b in which Alkoxy and Alkoxy* have the meanings defined above and preferably denote methoxy, ethoxy, n-propyloxy, n-butyloxy or n-pentyloxy.

The liquid-crystal medium according to the invention is suitable for the use in polymer stabilised displays.

Therefore, in an embodiment the liquid-crystal medium comprises one or more polymerisable compounds of formula P $$P\text{-Sp-}A^1\text{-}(Z^1\text{-}A^2)_z\text{-}R \qquad P$$

in which the individual radicals, independently of each other and on each occurrence identically or differently, have the following meanings:

P a polymerisable group,
Sp a spacer group or a single bond,
$A^1$, $A^2$ an aromatic, heteroaromatic, alicyclic or heterocyclic group, preferably having 4 to 25 ring atoms, which may also contain fused rings, and which is unsubstituted, or mono- or polysubstituted by L,
$Z^1$ —O—, —S—, —CO—, —CO—O—, —O—CO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —CH=CF—, —CF=CH—, —C≡C—, —CH=CH—CO—O—, —O—CO—CH=CH—, —CH$_2$—CH$_2$—CO—O—, —O—CO—CH$_2$—CH$_2$—, —CR$^0$R$^{00}$—, or a single bond, R$^0$, R$^{00}$ H or alkyl having 1 to 12 C atoms, R H, L, or P-Sp-, L F, Cl, —CN, P-Sp- or straight chain, branched or cyclic alkyl having 1 to 25 C atoms, wherein one or more non-adjacent CH$_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by P-Sp-, F or Cl, z 0, 1, 2 or 3, and n1 1, 2, 3 or 4.

As used herein, the terms "active layer" and "switchable layer" mean a layer in an electrooptical display, for example an LC display, that comprises one or more molecules having structural and optical anisotropy, like for example LC molecules, which change their orientation upon an external stimulus like an electric or magnetic field, resulting in a change of the transmission of the layer for polarized or unpolarized light.

As used herein, the terms "tilt" and "tilt angle" will be understood to mean a tilted alignment of the LC molecules of an LC medium relative to the surfaces of the cell in an LC display (here preferably a PSA display). The tilt angle here denotes the average angle (<90°) between the longitudinal molecular axes of the LC molecules (LC director) and the surface of the plane-parallel outer plates which form the LC cell. A low value for the tilt angle (i.e. a large deviation from the 90° angle) corresponds to a large tilt here.

As used herein, the terms "reactive mesogen" and "RM" will be understood to mean a compound containing a mesogenic or liquid crystalline skeleton, and one or more functional groups attached thereto which are suitable for polymerisation and are also referred to as "polymerisable group" or "P".

Unless stated otherwise, the term "polymerisable compound" as used herein will be understood to mean a polymerisable monomeric compound.

As used herein, the term "low-molecular-weight compound" will be understood to mean to a compound that is monomeric and/or is not prepared by a polymerisation reaction, as opposed to a "polymeric compound" or a "polymer".

As used herein, the term "unpolymerisable compound" will be understood to mean a compound that does not contain a functional group that is suitable for polymerisation under the conditions usually applied for the polymerisation of the RMs.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in *Pure Appl. Chem.* 2001, 73(5), 888 and C. Tschierske, G. Pelzl, S. Diele, *Angew. Chem.* 2004, 116, 6340-6368.

As used herein, the terms "optically active" and "chiral" are synonyms for materials that are able to induce a helical pitch in a nematic host material, also referred to as "chiral dopants".

The term "spacer group", hereinafter also referred to as "Sp", as used herein is known to the person skilled in the art and is described in the literature, see, for example, *Pure Appl. Chem.* 2001, 73(5), 888 and C. Tschierske, G. Pelzl, S. Diele, *Angew. Chem.* 2004, 116, 6340-6368. As used herein, the terms "spacer group" or "spacer" mean a flexible group, for example an alkylene group, which connects the mesogenic group and the polymerisable group(s) in a polymerisable mesogenic compound.

Above and below,

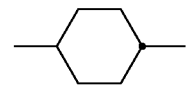

denotes a trans-1,4-cyclohexylene ring.

In a group

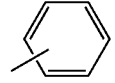

the single bond shown between the two ring atoms can be attached to any free position of the benzene ring.

Above and below "organic group" denotes a carbon or hydrocarbon group.

"Carbon group" denotes a mono- or polyvalent organic group containing at least one carbon atom, where this either contains no further atoms (such as, for example, —C≡C—) or optionally contains one or more further atoms, such as, for example, N, O, S, B, P, Si, Se, As, Te or Ge (for example carbonyl, etc.). The term "hydrocarbon group" denotes a carbon group which additionally contains one or more H atoms and optionally one or more heteroatoms, such as, for example, N, O, S, B, P, Si, Se, As, Te or Ge.

"Halogen" denotes F, Cl, Br or I, preferably F or Cl.

—CO—, —C(=O)— and —C(O)— denote a carbonyl group, i.e.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms, preferably selected from N, O, S, Se, Te, Si and Ge.

Preferred carbon and hydrocarbon groups are optionally substituted, straight-chain, branched or cyclic, alkyl, alkenyl, alkynyl, alkoxy, alkylcarbonyl, alkoxycarbonyl, alkylcarbonyloxy and alkoxycarbonyloxy having 1 to 40, preferably 1 to 20, very preferably 1 to 12, C atoms, optionally substituted aryl or aryloxy having 5 to 30, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 5 to 30, preferably 6 to 25, C atoms, wherein one or more C atoms may also be replaced by hetero atoms, preferably selected from N, O, S, Se, Te, Si and Ge.

Further preferred carbon and hydrocarbon groups are $C_1$-$C_{20}$ alkyl, $C_2$-$C_{20}$ alkenyl, $C_2$-$C_{20}$ alkynyl, $C_3$-$C_{20}$ allyl, $C_4$-$C_{20}$ alkyldienyl, $C_4$-$C_{20}$ polyenyl, $C_6$-$C_{20}$ cycloalkyl, $C_4$-$C_{15}$ cycloalkenyl, $C_6$-$C_{20}$ aryl, $C_6$-$C_{20}$ alkylaryl, $C_6$-$C_{20}$ arylalkyl, $C_6$-$C_{20}$ alkylaryloxy, $C_6$-$C_{20}$ arylalkyloxy, $C_2$-$C_{30}$ heteroaryl, $C_2$-$C_{30}$ heteroaryloxy.

Particular preference is given to $C_1$-$C_{12}$ alkyl, $C_2$-$C_{12}$ alkenyl, $C_2$-$C_{12}$ alkynyl, $C_6$-$C_{25}$ aryl and $C_2$-$C_{25}$ heteroaryl.

Further preferred carbon and hydrocarbon groups are straight-chain, branched or cyclic alkyl having 1 to 20, preferably 1 to 12, C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that 0 and/or S atoms are not linked directly to one another.

$R^x$ preferably denotes H, F, Cl, CN, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O— and in which one or more H atoms may be replaced by F or Cl, or denotes an optionally substituted aryl or aryloxy group with 6 to 30 C atoms, or an optionally substituted heteroaryl or heteroaryloxy group with 2 to 30 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred amino groups are, for example, dimethylamino, methylamino, methylphenylamino, phenylamino, etc.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 5 to 25 ring atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, 9,10-dihydro-phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, aza-carbazole, benzocarboline, phenanthridine, phenanthroline, thieno[2,3b]thiophene, thieno[3,2b]thiophene, dithienothiophene, isobenzothiophene, dibenzothiophene, benzothiophene, benzothiadiazothiophene, or combinations of these groups.

The aryl and heteroaryl groups mentioned above and below may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 5 to 25 ring atoms, which optionally contain fused rings and are optionally substituted. Preference is furthermore given to 5-, 6-, 7- or 8-membered carbocyclic groups, in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]pentane-1,3-diyl, bicyclo[2.2.2]octane-1,4-diyl, spiro[3.3]heptane-2,6-diyl, octahydro-4,7-methanoindane-2,5-diyl.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, hereinafter also referred to as "$L^S$", are, for example, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, straight-chain or branched alkyl, alkoxy, alkylcarbonyl, alkoxycarbonyl, alkylcarbonyloxy or alkoxycarbonyloxy each having 1 to 25 C atoms, in which one or more H atoms may optionally be replaced by F or C, optionally substituted silyl having 1 to 20 Si atoms, or optionally substituted aryl having 6 to 25, preferably 6 to 15, C atoms, wherein $R^x$ denotes H, F, Cl, CN, or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl, P— or P-Sp-, and $Y^1$ denotes halogen.

"Substituted silyl or aryl" preferably means substituted by halogen, —CN, $R^0$, —$OR^0$, —CO—$R^0$, —CO—O—$R^0$, —O—CO—$R^0$ or —O—CO—O—$R^0$, wherein $R^0$ denotes H or alkyl with 1 to 20 C atoms.

Particularly preferred substituents L are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

$A^1$ and $A^2$ very preferably denote

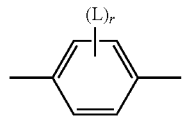

in which L has one of the meanings indicated above and r denotes 0, 1, 2, 3 or 4, in particular

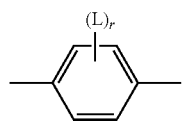

is

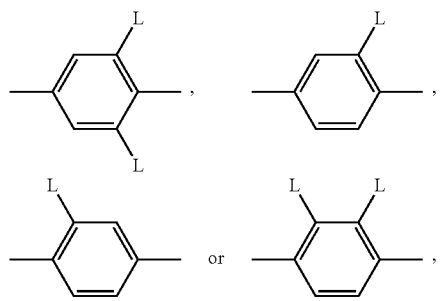

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or —C≡C— triple bond, and groups which are suitable for polymerisation with ring opening, such as, for example, oxetane or epoxide groups.

Preferred groups P are selected from the group consisting of $CH_2$=$CW^1$—CO—O—, $CH_2$=$CW^1$—CO—,

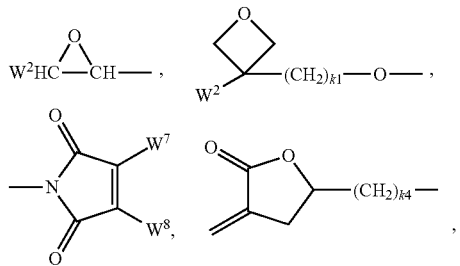

$CH_2$=$CW^2$—(O)$_{k3}$—, $CW^1$=CH—CO—(O)$_{k3}$—, $CW^1$=CH—CO—NH—, $CH_2$=$CW^1$—CO—NH—, $CH_3$—CH=CH—O—, ($CH_2$=CH)$_2$CH—OCO—, ($CH_2$=CH—$CH_2$)$_2$CH—OCO—, ($CH_2$=CH)$_2$CH—O—, ($CH_2$=CH—$CH_2$)$_2$N—, ($CH_2$=CH—$CH_2$)$_2$N—CO—, HO—$CW^2W^3$—, HS—$CW^2W^3$—, $HW^2$N—, HO—$CW^2W^3$—NH—, $CH_2$=$CW^1$—CO—NH—, $CH_2$=CH—(COO)$_{k1}$-Phe-(O)$_{k2}$—, $CH_2$=CH—(CO)$_{k1}$-Phe-(O)$_{k2}$—, Phe-CH=CH—, HOOC—, OCN— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and W$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Very preferred groups P are selected from the group consisting of $CH_2$=$CW^1$—CO—O—, $CH_2$=$CW^1$—CO—,

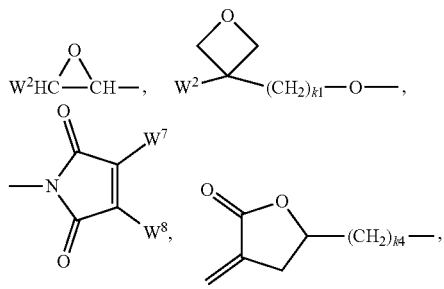

$CH_2$=$CW^2$—O—, $CH_2$=$CW^2$—, $CW^1$=CH—CO—(O)$_{k3}$—, $CW^1$=CH—CO—NH—, $CH_2$=$CW^1$—CO—NH—, ($CH_2$=CH)$_2$CH—OCO—, ($CH_2$=CH—$CH_2$)$_2$CH—OCO—, ($CH_2$=CH)$_2$CH—O—, ($CH_2$=CH—$CH_2$)$_2$N—, ($CH_2$=CH—$CH_2$)$_2$N—CO—, $CH_2$=$CW^1$—CO—NH—, $CH_2=CH-(COO)_{k1}$-Phe-$(O)_{k2}-$, $CH_2=CH-(CO)_{k1}$-Phe-$(O)_{k2}-$, Phe-$CH=CH-$ and $W^4W^5W^6Si-$, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P are selected from the group consisting of $CH_2=CW^1-CO-O-$, in particular $CH_2=CH-CO-O-$, $CH_2=C(CH_3)-CO-O-$ and $CH_2=CF-CO-O-$, furthermore $CH_2=CH-O-$, $(CH_2=CH)_2CH-O-CO-$, $(CH_2=CH)_2CH-O-$,

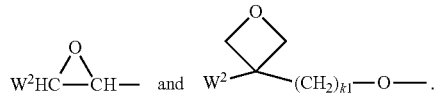

Further preferred polymerisable groups P are selected from the group consisting of vinyloxy, acrylate, methacrylate, fluoroacrylate, chloroacrylate, oxetane and epoxide, most preferably from acrylate and methacrylate.

If the spacer group Sp is different from a single bond, it is preferably of the formula Sp"-X", so that the respective radical P-Sp- conforms to the formula R-Sp"-X"—, wherein Sp" denotes linear or branched alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by $-O-$, $-S-$, $-NH-$, $-N(R^0)-$, $-Si(R^0R^{00})-$, $-CO-$, $-CO-O-$, $-O-CO-$, $-O-CO-O-$, $-S-CO-$, $-CO-S-$, $-N(R^{00})-CO-O-$, $-O-CO-N(R^0)-$, $-N(R^0)-CO-N(R^{00})-$, $-CH=CH-$ or $-C\equiv C-$ in such a way that O and/or S atoms are not linked directly to one another, X" denotes $-O-$, $-S-$, $-CO-$, $-CO-O-$, $-O-CO-$, $-O-CO-O-$, $-CO-N(R^0)-$, $-N(R^0)-CO-$, $-N(R^0)-CO-N(R^{00})-$, $-OCH_2-$, $-CH_2O-$, $-SCH_2-$, $-CH_2S-$, $-CF_2O-$, $-OCF_2-$, $-CF_2S-$, $-SCF_2-$, $-CF_2CH_2-$, $-CH_2CF_2-$, $-CF_2CF_2-$, $-CH=N-$, $-N=CH-$, $-N=N-$, $-CH=CR^0-$, $-CY^2=CY^3-$, $-C\equiv C-$, $-CH=CH-CO-O-$, $-O-CO-CH=CH-$ or a single bond, $R^0$ and $R^{00}$ each, independently of one another, denote H or alkyl having 1 to 20 C atoms, and $Y^2$ and $Y^3$ each, independently of one another, denote H, F, C or CN.

X" is preferably $-O-$, $-S-$, $-CO-$, $-COO-$, $-OCO-$, $-O-COO-$, $-CO-NR^0-$, $-NR^0-CO-$, $-NR^0-CO-NR^{00}-$ or a single bond.

Typical spacer groups Sp and -Sp"—X"— are, for example, $-(CH_2)_{p1}-$, $-(CH_2)_{p1}-O-$, $-(CH_2)_{p1}-O-CO-$, $-(CH_2)_{p1}-CO-O-$, $-(CH_2)_{p1}-O-CO-O-$, $-(CH_2CH_2O)_{q1}-CH_2CH_2-$, $-CH_2CH_2-S-CH_2CH_2-$, $-CH_2CH_2-NH-CH_2CH_2-$ or $-(SiR^0R^{00}-O)_{p1}-$, in which p1 is an integer from 1 to 12, q1 is an integer from 1 to 3, and $R^0$ and $R^{00}$ have the meanings indicated above.

Particularly preferred groups Sp and -Sp"—X"— are $-(CH_2)_{p1}-$, $-(CH_2)_{p1}-O-$, $-(CH_2)_{p1}-O-CO-$, $-(CH_2)_{p1}-CO-O-$, $-(CH_2)_{p1}-O-CO-O-$, in which p1 and q1 have the meanings indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

In a preferred embodiment of the invention the compounds of formula P and its subformulae contain a spacer group Sp that is substituted by one or more polymerisable groups P, so that the group Sp-P corresponds to $Sp(P)_s$, with s being ≥2 (branched polymerisable groups).

Preferred compounds of formula P according to this preferred embodiment are those wherein s is 2, i.e. compounds which contain a group $Sp(P)_2$. Very preferred compounds of formula P according to this preferred embodiment contain a group selected from the following formulae:

| | |
|---|---|
| —X-alkyl-CHPP | S1 |
| —X-alkyl-CH$((CH_2)_{aa}P)((CH_2)_{bb}P)$ | S2 |
| —X—N$((CH_2)_{aa}P)((CH_2)_{bb}P)$ | S3 |
| —X-alkyl-CHP—$CH_2$—$CH_2$P | S4 |
| —X-alkyl-C$(CH_2P)(CH_2P)$—$C_{aa}H_{2aa+1}$ | S5 |
| —X-alkyl-CHP—$CH_2$P | S6 |
| —X-alkyl-CPP—$C_{aa}H_{2aa+1}$ | S7 |
| —X-alkyl-CHPCHP—$C_{aa}H_{2aa+1}$ | S8 | in which P is as defined in formula P,
alkyl denotes a single bond or straight-chain or branched alkylene having 1 to 12 C atoms which is unsubstituted or mono- or polysubstituted by F, Cl or CN and in which one or more non-adjacent $CH_2$ groups may each, independently of one another, be replaced by $-C(R^0)=C(R^0)-$, $-C\equiv C-$, $-N(R^0)-$, $-O-$, $-S-$, $-CO-$, $-CO-O-$, $-O-CO-$, $-O-CO-O-$ in such a way that O and/or S atoms are not linked directly to one another, where $R^0$ has the meaning indicated above,
aa and bb each, independently of one another, denote 0, 1, 2, 3, 4, 5 or 6,
X has one of the meanings indicated for X", and is preferably O, CO, $SO_2$, O—CO—, CO—O or a single bond.

Preferred spacer groups $Sp(P)_2$ are selected from formulae S1, S2 and S3.

Very preferred spacer groups $Sp(P)_2$ are selected from the following subformulae:

| | |
|---|---|
| —CHPP | S1a |
| —O—CHPP | S1b |
| —$CH_2$—CHPP | S1c |
| —$OCH_2$—CHPP | S1d |
| —CH$(CH_2$—P$)(CH_2$—P$)$ | S2a |
| —OCH$(CH_2$—P$)(CH_2$—P$)$ | S2b |
| —$CH_2$—CH$(CH_2$—P$)(CH_2$—P$)$ | S2c |

—OCH$_2$—CH(CH$_2$—P)(CH$_2$—P)  S2d

—CO—NH((CH$_2$)$_2$P)((CH$_2$)$_2$P)  S3a

In the compounds of formula P and its subformulae as described above and below, P is preferably selected from the group consisting of vinyloxy, acrylate, methacrylate, fluoroacrylate, chloroacrylate, oxetane and epoxide, most preferably from acrylate and methacrylate.

Further preferred are compounds of formula P and its subformulae as described above and below, wherein all polymerisable groups P that are present in the compound have the same meaning, and very preferably denote acrylate or methacrylate, most preferably methacrylate.

In the compounds of formula P and its subformulae as described above and below, R preferably denotes P-Sp-.

Further preferred are compounds of formula P and its subformulae as described above and below, wherein Sp denotes a single bond or —(CH$_2$)$_{p1}$—, —O—(CH$_2$)$_{p1}$—, —O—CO—(CH$_2$)$_{p1}$, or —CO—O—(CH$_2$)$_{p1}$, wherein p1 is 2, 3, 4, 5 or 6, and, if Sp is —O—(CH$_2$)$_{p1}$—, —O—CO—(CH$_2$)$_{p1}$ or —CO—O—(CH$_2$)$_{p1}$ the O-atom or CO-group, respectively, is linked to the benzene ring.

Further preferred are compounds of formula P and its subformulae as described above and below, wherein at least one group Sp is a single bond.

Further preferred are compounds of formula P and its subformulae as described above and below, wherein at least one group Sp is different from a single bond, and is preferably selected from —(CH$_2$)$_{p1}$—, —O—(CH$_2$)$_{p1}$—, —O—CO—(CH$_2$)$_{p1}$, or —CO—O—(CH$_2$)$_{p1}$, wherein p1 is 2, 3, 4, 5 or 6, and, if Sp is —O—(CH$_2$)$_{p1}$—, —O—CO—(CH$_2$)$_{p1}$ or —CO—O—(CH$_2$)$_{p1}$ the O-atom or CO-group, respectively, is linked to the benzene ring.

Very preferred groups -A$^1$-(Z-A$^2$)$_z$- in formula P are selected from the following formulae

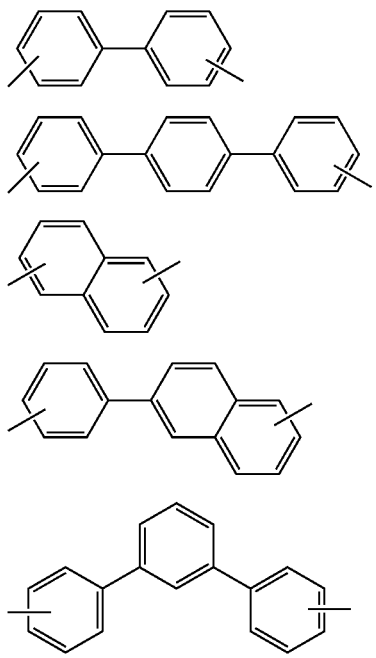

A1

A2

A3

A4

A5

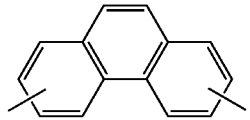

A6 wherein at least one benzene ring is substituted by at last one group L and the benzene rings are optionally further substituted by one or more groups L or P-Sp-.

Preferred compounds of formula P and their subformulae are selected from the following preferred embodiments, including any combination thereof:

All groups P in the compound have the same meaning,
-A$^1$-(Z-A$^2$)$_z$- is selected from formulae A1, A2 and A5,
the compounds contain exactly two polymerizable groups (represented by the groups P),
the compounds contain exactly three polymerizable groups (represented by the groups P),
P is selected from the group consisting of acrylate, methacrylate and oxetane, very preferably acrylate or methacrylate,
P is methacrylate,
all groups Sp are a single bond,
at least one of the groups Sp is a single bond and at least one of the groups Sp is different from a single bond,
Sp, when being different from a single bond, is —(CH$_2$)$_{p2}$—, —(CH$_2$)$_{p2}$—O—, —(CH$_2$)$_{p2}$—CO—O—, —(CH$_2$)$_{p2}$—O—CO—, wherein p2 is 2, 3, 4, 5 or 6, and the O-atom or the CO-group, respectively, is connected to the benzene ring,
Sp is a single bond or denotes —(CH$_2$)$_{p2}$—, —(CH$_2$)$_{p2}$—O—, —(CH$_2$)$_{p2}$—CO—O—, —(CH$_2$)$_{p2}$—O—CO—, wherein p2 is 2, 3, 4, 5 or 6, and the O-atom or the CO-group, respectively, is connected to the benzene ring,
R denotes P-Sp-,
R does not denote or contain a polymerizable group,
R does not denote or contain a polymerizable group and denotes straight chain, branched or cyclic alkyl having 1 to 25 C atoms, wherein one or more non-adjacent CH$_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl or L$^a$,
L or L' denote F, Cl or CN,
L is F.

Suitable and preferred compounds of formula P are selected from the following formulae:

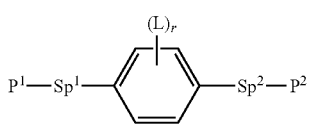

P-1

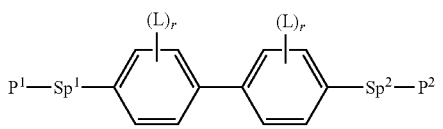

P-2

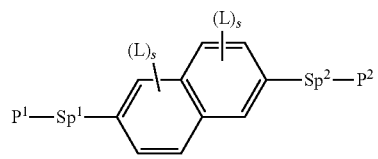 P-3
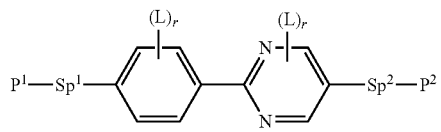 P-4
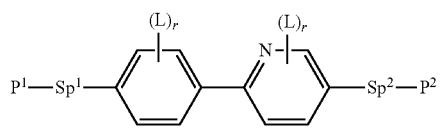 P-5
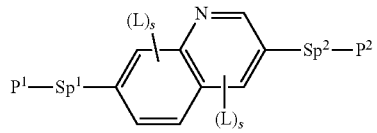 P-6
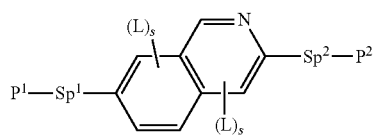 P-7
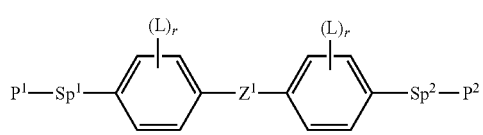 P-8
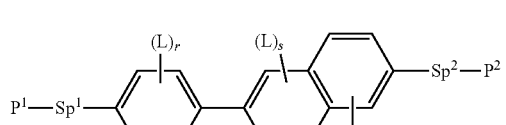 P-9
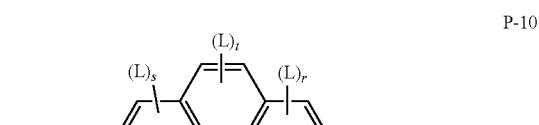 P-10
 P-11
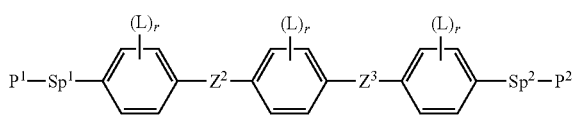 
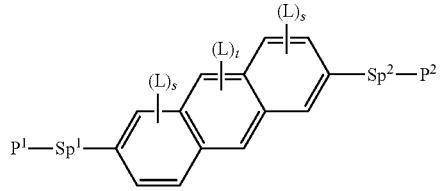 P-12
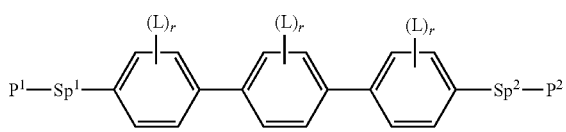 P-13
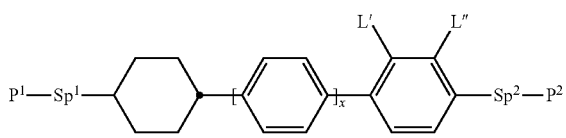 P-14
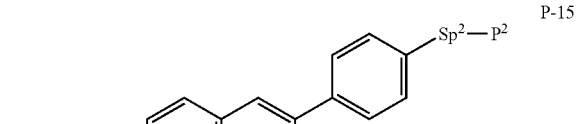 P-15
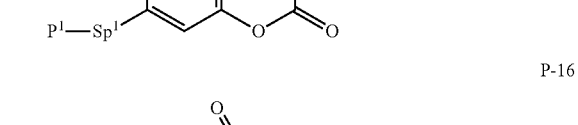 P-16
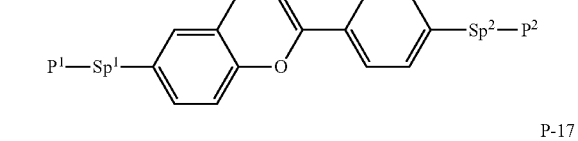 P-17
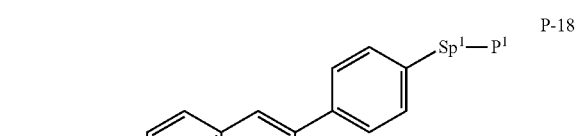 P-18
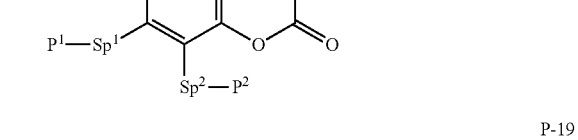 P-19
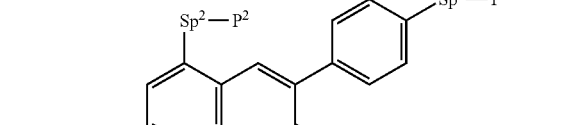 P-20

P-21
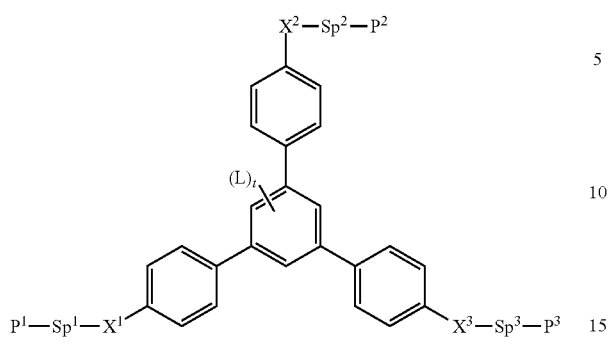

P-22
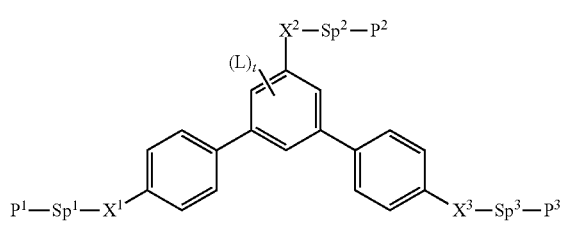

P-23
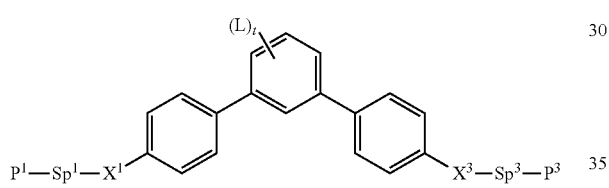

P-24
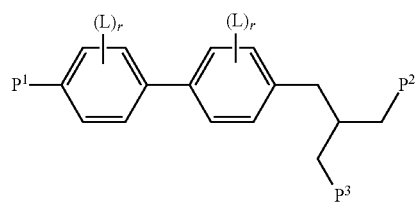

P-25
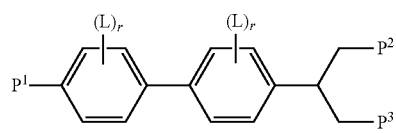

P-26
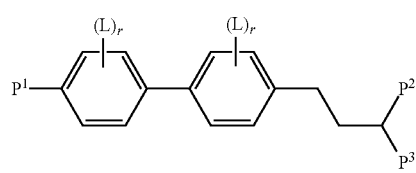

P-27
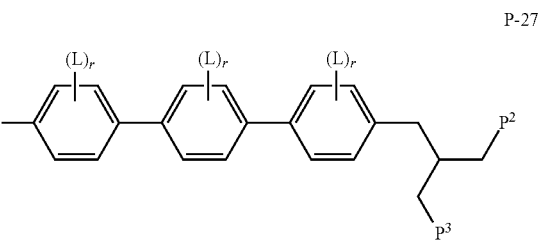

P-28
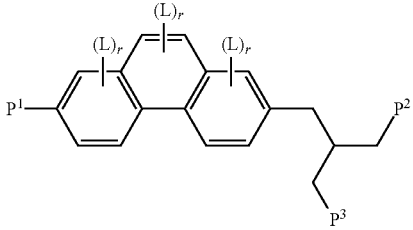

P-29
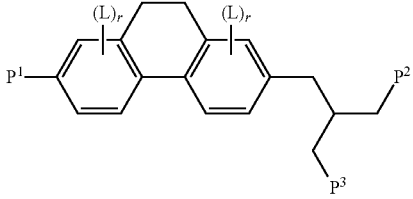

P-30
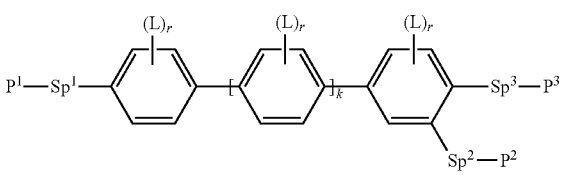

P-31
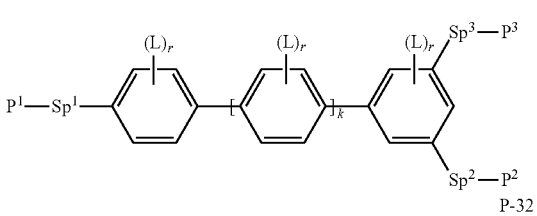

P-32
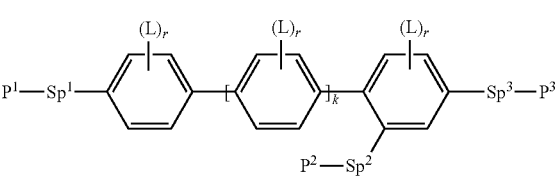

in which the individual radicals have the following meanings:

$P^1$, $P^2$ and $P^3$ each, independently of one another, denote an acrylate or methacrylate group, $Sp^1$, $Sp^2$ and $Sp^3$ each, independently of one another, denote a single bond or a spacer group having one of the meanings indicated above and below for Sp, and particularly preferably denote —(CH$_2$)$_{p1}$—, —(CH$_2$)$_{p1}$—O—, —(CH$_2$)$_{p1}$—CO—O—, —(CH$_2$)$_{p1}$—O—CO— or —(CH$_2$)$_{p1}$—O—CO—O—, in which p1 is an integer from 1 to 12, where, in addition, one or more of the radicals $P^1$-$Sp^1$-, $P^2$—$Sp^2$- and $P^3$—$Sp^3$- may denote $R^{aa}$, with the proviso that at least one of the radicals $P^1$-$Sp^1$-, $P^2$—$Sp^2$- and $P^3$—$Sp^3$- present is different from $R^{aa}$, $R^{aa}$ denotes H, F, Cl, CN or straight-chain or branched alkyl having 1 to 25 C atoms, in which, in addition, one or more non-adjacent CH$_2$ groups may each be replaced, independently of one another, by C(R$^0$)=C(R$^{00}$)—, —C≡C—, —N(R$^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$—$Sp^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, where the alkenyl and alkynyl radicals have at least two C atoms and the branched radicals have at least three C atoms, $R^0$, $R^{00}$ each, independently of one another and identically or differently on each occurrence, denote H or alkyl having 1 to 12 C atoms, $R^y$ and $R^z$ each, independently of one another, denote H, F, $CH_3$ or $CF_3$, $X^1$, $X^2$ and $X^3$ each, independently of one another, denote —CO—O—, —O—CO— or a single bond, $Z^1$ denotes —O—, —CO—, —C($R^y R^z$)— or —$CF_2 CF_2$—, $Z^2$ and $Z^3$ each, independently of one another, denote —CO—O—, —O—CO—, —$CH_2 O$—, —$OCH_2$—, —$CF_2 O$—, —$OCF_2$— or —$(CH_2)_n$—, where n is 2, 3 or 4, L on each occurrence, identically or differently, denotes F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F, L' and L" each, independently of one another, denote H, F or Cl, k denotes 0 or 1, r denotes 0, 1, 2, 3 or 4, s denotes 0, 1, 2 or 3, t denotes 0, 1 or 2, x denotes 0 or 1.

Especially preferred are compounds of formulae P2, P13, P17, P22, P23, P24, P30, P31 and P32.

Further preferred are trireactive compounds P15 to P30, in particular P17, P18, P19, P22, P23, P24, P25, P26, P30, P31 and P32.

In the compounds of formulae P1 to P32 the group

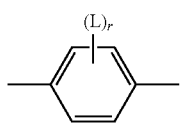

is preferably

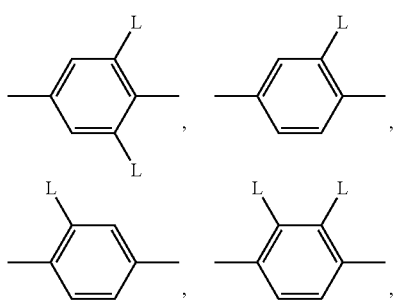

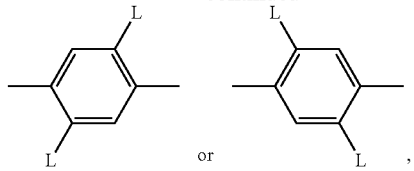

wherein L on each occurrence, identically or differently, has one of the meanings given above or below, and is preferably F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H$, $COCH_3$, $COC_2H$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, $OCH_3$, $COCH_3$, $OCF_3$ or P-Sp-, more preferably F, Cl, $CH_3$, $OCH_3$, $COCH_3$ or $OCF_3$, especially F or $CH_3$.

In an embodiment the liquid-crystal medium is provided, wherein the one or more polymerisable compounds of formula P are polymerised.

The compounds of formula P are optionally added to the medium in concentrations of preferably 0.01% by weight to 5% by weight, particularly preferably 0.2% by weight to 2% by weight, based on the mixture. These mixtures may optionally also comprise an initiator, as described, for example, in U.S. Pat. No. 6,781,665. The initiator, for example Irganox-1076 from BASF, is preferably added to the mixture comprising polymerisable compounds in amounts of 0 to 1% by weight. Mixtures of this type can be used for so-called polymer-stabilised VA modes (PS-VA) or PSA (polymer sustained VA), in which polymerisation of the reactive mesogens is intended to take place in the liquid-crystalline mixture after filling of a display panel. The prerequisite for this is that the liquid-crystalline compounds of the so-called LC host do not react under the polymerisation conditions of the reactive mesogens, i.e. generally on exposure to UV in the wavelength range from 320 to 360 nm. Liquid-crystalline compounds containing an alkenyl side chain, such as, for example, CC-3-V, exhibit no reaction under the polymerisation conditions (UV polymerisation) for the RMs, hence, herein, such compounds are not to be considered as RMs.

In a preferred embodiment the liquid-crystal medium comprises one or more chiral compounds, in particular one or more chiral dopants.

Preferably, these chiral dopants have an absolute value of the helical twisting power (HTP) in the range of from 1 $\mu m^{-1}$ to 150 $\mu m^{-1}$, preferably in the range of from 10 $\mu m^{-1}$ to 100 $\mu m^{-1}$. In case the media comprise two or more chiral dopants, these may have opposite signs of their HTP values. This condition is preferred for some specific embodiments, as it allows to compensate the chirality of the respective compounds to some degree and, thus, may be used to compensate various temperature-dependent properties of the resulting media in the devices. Generally, however, it is preferred that most, preferably all of the chiral compounds present in the media have the same sign of their HTP values.

Preferably, the chiral dopants present in the media are mesogenic compounds and most preferably they exhibit a mesophase on their own.

In a preferred embodiment of the present invention, the medium comprises two or more chiral compounds which all have the same algebraic sign of the HTP.

The temperature dependence of the HTP of the individual compounds may in principle be high or low. The temperature dependence of the pitch of the medium can be compensated by mixing compounds having different temperature dependencies of the HTP in corresponding ratios.

A multitude of chiral dopants, some of which are commercially available, is available to the person skilled in the art, such as, for example, cholesteryl nonanoate, R- and S-811, R- and S-1011, R- and S-2011, R- and S-3011, R- and S-4011, R- and S-5011 or CB15 (all Merck KGaA, Darmstadt).

Particularly suitable chiral dopants are compounds which contain one or more chiral groups and one or more mesogenic groups, or one or more aromatic or alicyclic groups which form a mesogenic group with the chiral group.

Suitable chiral groups are, for example, chiral branched hydrocarbon radicals, chiral ethane diols, binaphthols or dioxolanes, furthermore mono- or polyvalent chiral groups selected from the group consisting of sugar derivatives, sugar alcohols, sugar acids, lactic acids, chiral substituted glycols, steroid derivatives, terpene derivatives, amino acids or sequences of a few, preferably 1-5, amino acids.

Preferred chiral groups are sugar derivatives, such as glucose, mannose, galactose, fructose, arabinose and dextrose; sugar alcohols, such as, for example, sorbitol, mannitol, iditol, galactitol or anhydro derivatives thereof, in particular dianhydrohexitols, such as dianhydrosorbide (1,4: 3,6-dianhydro-D-sorbide, isosorbide), dianhydromannitol (isosorbitol) or dianhydroiditol (isoiditol); sugar acids, such as, for example, gluconic acid, gulonic acid and ketogulonic acid; chiral substituted glycol radicals, such as, for example, mono- or oligoethylene or propylene glycols, in which one or more $CH_2$ groups are substituted by alkyl or alkoxy; amino acids, such as, for example, alanine, valine, phenylglycine or phenylalanine, or sequences of from 1 to 5 of these amino acids; steroid derivatives, such as, for example, cholesteryl or cholic acid radicals; terpene derivatives, such as, for example, menthyl, neomenthyl, campheyl, pineyl, terpineyl, isolongifolyl, fenchyl, carreyl, myrthenyl, nopyl, geraniyl, linaloyl, neryl, citronellyl or dihydrocitronellyl.

Suitable chiral groups and mesogenic chiral compounds are described, for example, in DE 34 25 503, DE 35 34 777, DE 35 34 778, DE 35 34 779 and DE 35 34 780, DE 43 42 280, EP 01 038 941 and DE 195 41 820. Examples are also compounds listed in Table E below.

Further preferred chiral compounds are selected from the group consisting of the formulae shown below.

Particular preference is given to chiral dopants selected from the group consisting of compounds of the following formulae A-I to A-III and A-Ch:

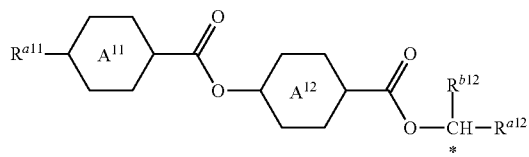
A-I

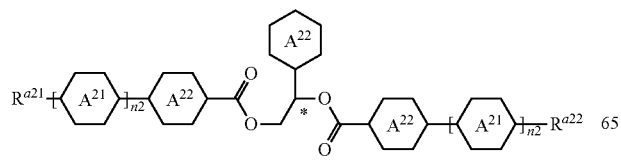
A-II

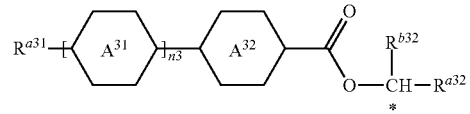
A-III

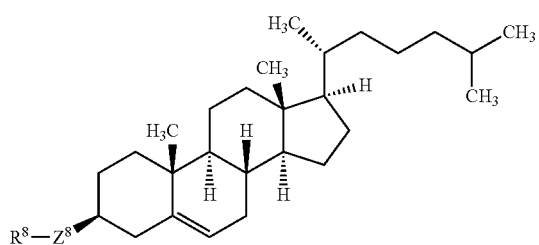
A-Ch in which $R^{a11}$, $R^{a12}$ and $R^{b12}$, independently of one another, denote alkyl having 1 to 15 C atoms, in which, in addition, one or more non-adjacent $CH_2$ groups may each be replaced, independently of one another, by $-C(R^z)=C(R^z)-$, $-C\equiv C-$, $-O-$, $-S-$, $-CO-$, $-CO-O-$, $-O-CO-$ or $-O-CO-O-$ in such a way that 0 and/or S atoms are not linked directly to one another, and in which, in addition, one or more H atoms may each be replaced by F, Cl, Br, I or CN, preferably alkyl, more preferably n-alkyl, with the proviso that $R^{a12}$ is different from $R^{b12}$ $R^{a21}$ and $R^{a22}$, independently of one another, denote alkyl having 1 to 15 C atoms, in which, in addition, one or more non-adjacent $CH_2$ groups may each be replaced, independently of one another, by $-C(R^z)=C(R^z)-$, $-C\equiv C-$, $-O-$, $-S-$, $-CO-$, $-CO-O-$, $-O-CO-$ or $-O-CO-O-$ in such a way that 0 and/or S atoms are not linked directly to one another, and in which, in addition, one or more H atoms may be replaced by F, Cl, Br, I or CN, preferably both are alkyl, more preferably n-alkyl, $R^{a31}$, $R^{a32}$ and $R^{b32}$, independently of one another, denote straight-chain or branched alkyl having 1 to 15 C atoms, in which, in addition, one or more non-adjacent $CH_2$ groups may each be replaced, independently of one another, by $-C(R^z)=C(R^z)-$, $-C\equiv C-$, $-O-$, $-S-$, $-CO-$, $-CO-O-$, $-O-CO-$ or $-O-CO-O-$ in such a way that O and/or S atoms are not linked directly to one another, and in which, in addition, one or more H atoms may be replaced by F, C, Br, I or CN, preferably alkyl, more preferably n-alkyl, with the proviso that $R^{a32}$ is different from $R^{b32}$;

$R^z$ denotes H, $CH_3$, F, Cl, or CN, preferably H or F, $R^8$ has one of the meanings of $R^{a11}$ given above, preferably alkyl, more preferably n-alkyl having 1 to 15 C atoms, $Z^8$ denotes $-C(O)O-$, $CH_2O$, $CF_2O$ or a single bond, preferably $-C(O)O-$, $A^{11}$ is defined as $A^{12}$ below, or alternatively denotes

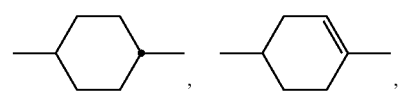

-continued

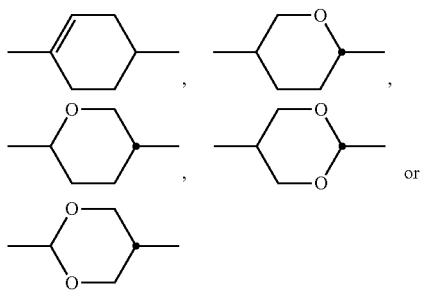

$A^{12}$ denotes

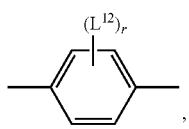

preferably

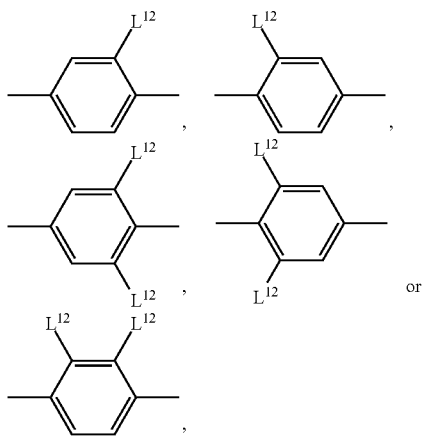

in which
$L^{12}$ on each occurrence, independently of one another, denotes halogen, CN, or alkyl, alkenyl, alkoxy or alkenyloxy having up to 12 C atoms and in which one or more H atoms are optionally replaced with halogen, preferably methyl, ethyl, Cl or F, particularly preferably F, $A^{21}$ denotes

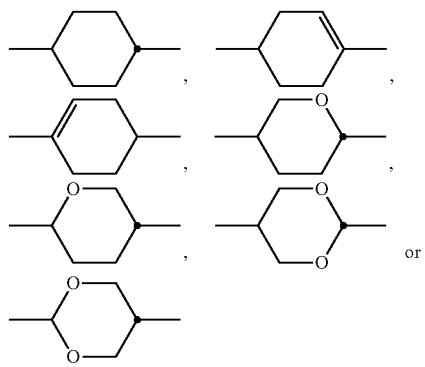

$A^{22}$ has the meanings given for $A^{12}$,
$A^{31}$ has the meanings given for $A^{11}$,
or alternatively denotes

$A^{32}$ has the meanings given for $A^{12}$,
n2 on each occurrence, identically or differently, is 0, 1 or 2,
n3 is 1, 2 or 3, and
r is 0, 1, 2, 3 or 4.

Particular preference is given to chiral dopants selected from the group consisting of the compounds of the following formulae:

A-I-1

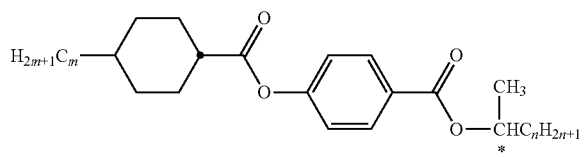

A-II-1

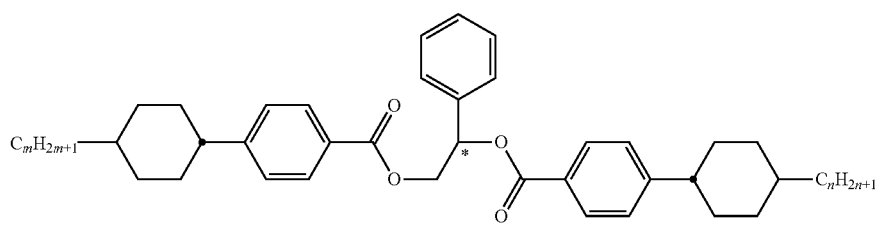

-continued
A-III-1
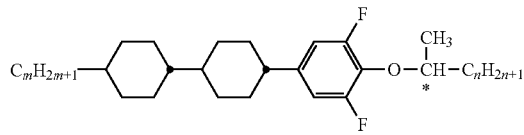
A-III-2
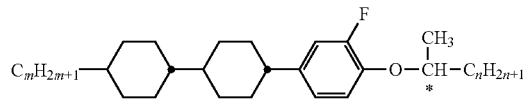
A-III-3
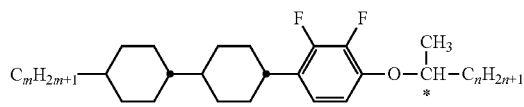
A-III-4
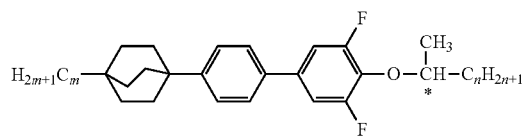
A-III-5
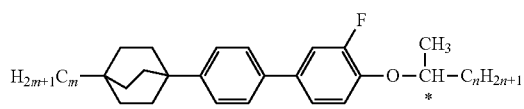
A-III-6
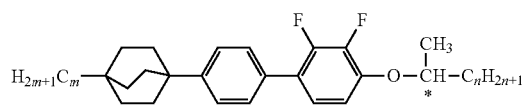
A-III-7
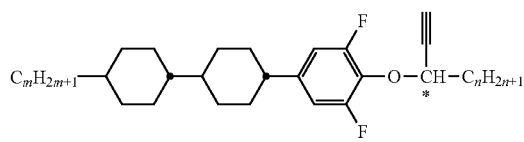
A-III-8
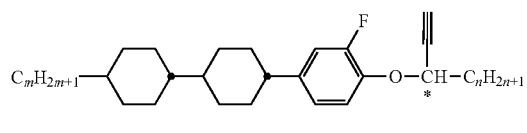
A-III-9
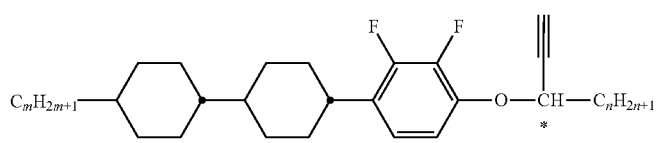
in which
- m is, on each occurrence, identically or differently, an integer from 1 to 9, and
- n is, on each occurrence, identically or differently, an integer from 2 to 9.
Further preferred chiral dopants are derivatives of isosorbide, isomannitol or isoiditol of the following formula A-IV:
A-IV
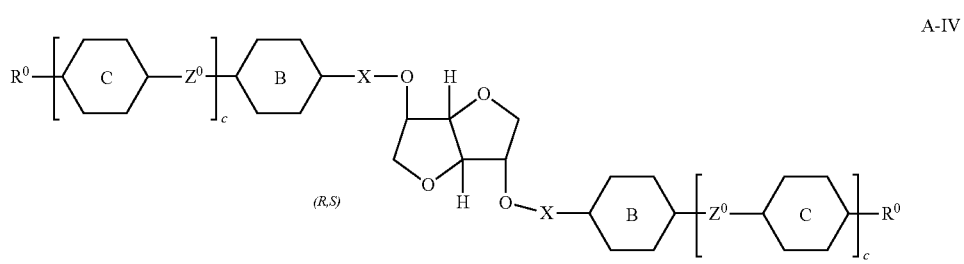
in which the group
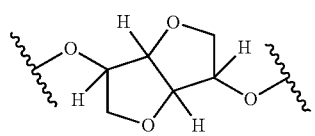 [SMILES: *OC1COC2C(O*)COC12]

is

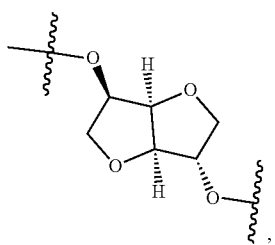

(dianhydrosorbitol)

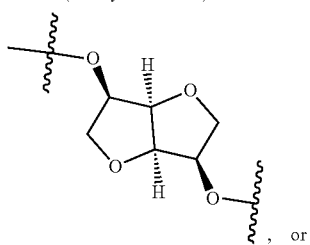

, or (dianhydromannitol)

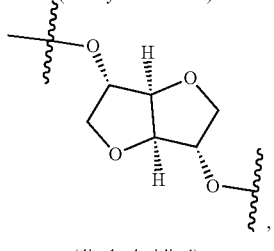

, (dianhydroiditol)

preferably dianhydrosorbitol,
and chiral ethane diols, such as, for example, diphenylethanediol (hydrobenzoin), in particular mesogenic hydrobenzoin derivatives of the following formula A-V:

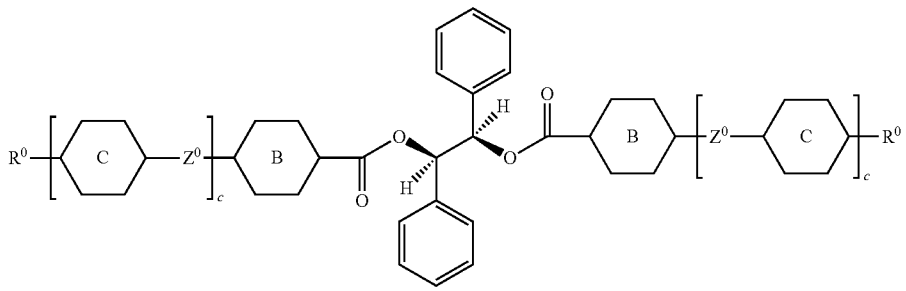

A-V including the (S,S) enantiomers, which are not shown, in which

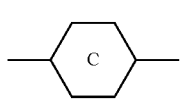

and

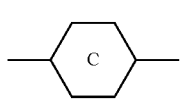

are each, independently of one another, 1,4-phenylene, which may also be mono-, di- or trisubstituted by L, or 1,4-cyclohexylene, L is H, F, Cl, CN or optionally halogenated alkyl, alkoxy, alkylcarbonyl, alkoxycarbonyl or alkoxycarbonyloxy having 1-7 carbon atoms, c is 0 or 1, X is $CH_2$ or —C(O)—, $Z^0$ is —COO—, —OCO—, —$CH_2CH_2$— or a single bond, and $R^0$ is alkyl, alkoxy, alkylcarbonyl, alkoxycarbonyl or alkylcarbonyloxy having 1-12 carbon atoms.

Examples of compounds of formula A-IV are:

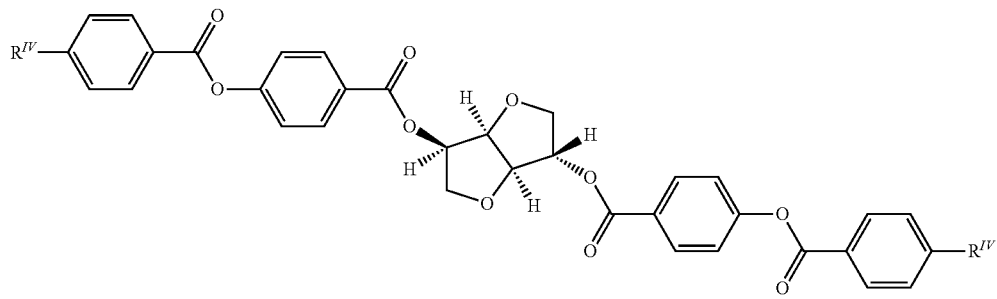
A-IV-1

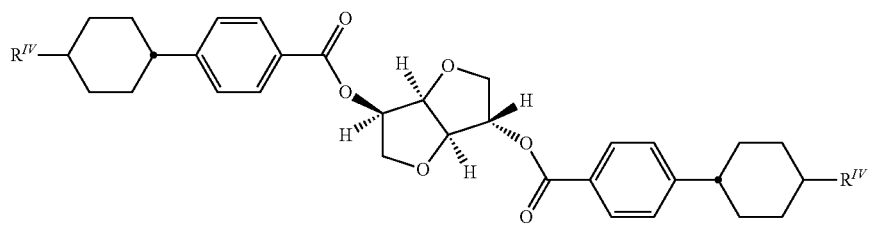
A-IV-2

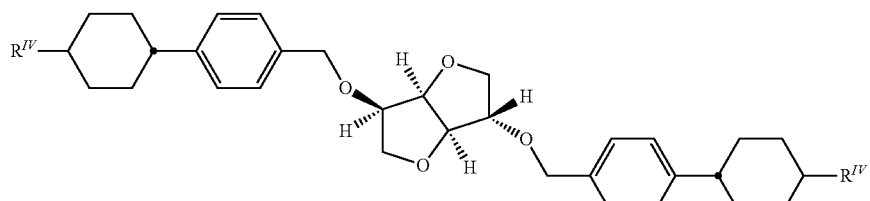
A-IV-3

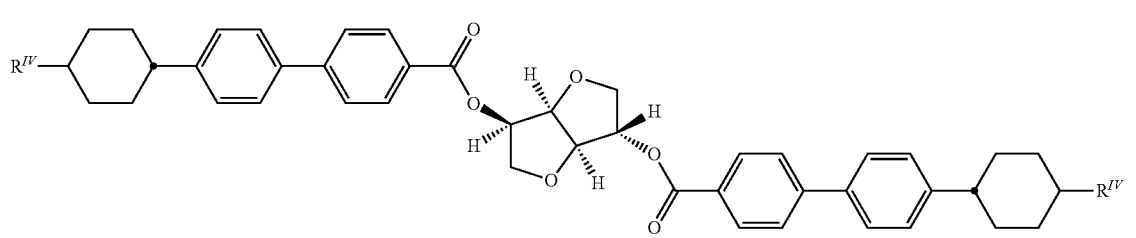
A-IV-4

A-IV-5

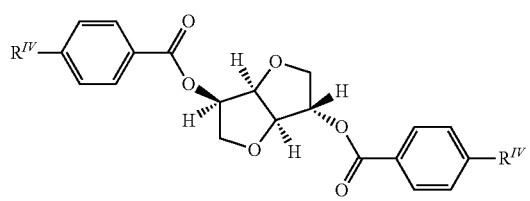

A-IV-6

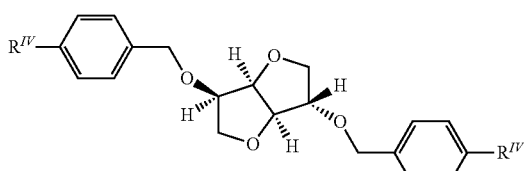

A-IV-7

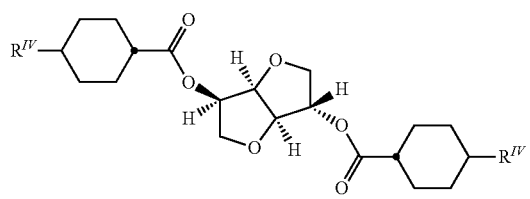

A-IV-8

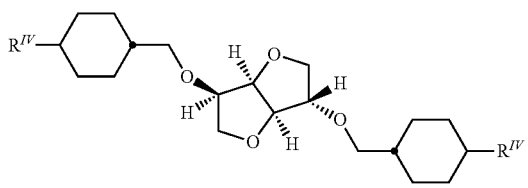

Compounds of the formula A-IV are described in WO 98/00428. Compounds of the formula A-V are described in GB-A-2,328,207.

Very particularly preferred chiral dopants are chiral binaphthyl derivatives, as described in WO 02/94805, chiral binaphthol acetal derivatives, as described in WO 02/34739, chiral TADDOL derivatives, as described in WO 02/06265, and chiral dopants having at least one fluorinated bridging group and a terminal or central chiral group, as described in WO 02/06196 and WO 02/06195.

Particular preference is given to chiral compounds of the formula A-VI

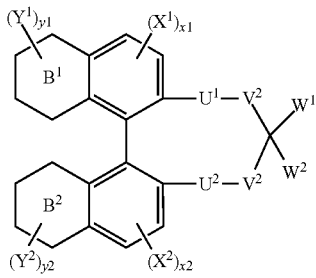

A-VI in which
- $X^1$, $X^2$, $Y^1$ and $Y^2$ are each, independently of one another, F, Cl, Br, I, CN, SCN, SF$_5$, straight-chain or branched alkyl having from 1 to 25 carbon atoms, which is unsubstituted or monosubstituted or polysubstituted by F, Cl, Br, I or CN and in which, in addition, one or more non-adjacent CH$_2$ groups may each, independently of one another, be replaced by —O—, —S—, —NH—, NR$^x$—, —CO—, —COO—, —OCO—, —OCOO—, —S—CO—, —CO—S—, —CH=CH— or —C≡C— in such a way that O and/or S atoms are not bonded directly to one another, a polymerisable group or cycloalkyl or aryl having up to 20 carbon atoms, which may optionally be monosubstituted or polysubstituted by halogen, preferably F, or by a polymerisable group,
- $x^1$ and $x^2$ are each, independently of one another, 0, 1 or 2,
- $y^1$ and $y^2$ are each, independently of one another, 0, 1, 2, 3 or 4,
- $B^1$ and $B^2$ are each, independently of one another, an aromatic or partially or fully saturated aliphatic six-membered ring in which one or more CH groups may each be replaced by N and one or more non-adjacent CH$_2$ groups may be replaced by O or S,
- $W^1$ and $W^2$ are each, independently of one another, —Z$^1$-A$^1$-(Z$^2$-A$^2$)$_m$-R, and one of the two is alternatively R$^1$ or A$^3$, but both are not simultaneously H, or

is

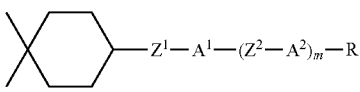

or

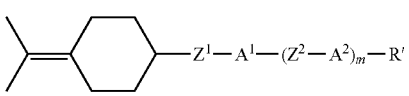

$U^1$ and $U^2$ are each, independently of one another, CH$_2$, O, S, CO or CS, $V^1$ and $V^2$ are each, independently of one another, (CH$_2$)$_n$, in which from one to four non-adjacent CH$_2$ groups may each be replaced by O or S, and one of $V^1$ and $V^2$ and, in the case where

is

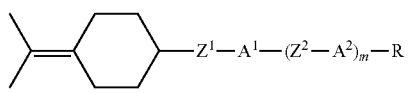

both are a single bond,
- n is 1, 2 or 3,
- $Z^1$ and $Z^2$ are each, independently of one another, —O—, —S—, —CO—, —COO—, —OCO—, —O—COO—, —CO—NR$^x$—, —NR$^x$—CO—, —O—CH$_2$—, —CH$_2$—O—, —S—CH$_2$—, —CH$_2$—S—, —CF$_2$—O—, —O—CF$_2$—, —CF$_2$—S—, —S—CF$_2$—, —CH$_2$—CH$_2$—, —CF$_2$—CH$_2$—, —CH$_2$—CF$_2$—, —CF$_2$—CF$_2$—, —CH=N—, —N=CH—, —N=N—, —CH=CH—, —CF=CH—, —CH=CF—, —CF=CF—, —C≡C—, a combination of two of these groups, where no two O and/or S and/or N atoms are bonded directly to one another, preferably —CH=CH—COO—, or —COO—CH=CH—, or a single bond,
- R$^x$ denotes alkyl having 1 to 6 C atoms,
- $A^1$, $A^2$ and $A^3$ are each, independently of one another, 1,4-phenylene, in which one or two non-adjacent CH groups may each be replaced by N, 1,4-cyclohexylene, in which one or two non-adjacent CH$_2$ groups may each be replaced by O or S, 1,3-dioxolane-4,5-diyl, 1,4-cyclohexenylene, 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl, where each of these groups may be monosubstituted or polysubstituted by L, and in addition $A^1$ can be a single bond,
- L is a halogen atom, preferably F, CN, NO$_2$, alkyl, alkoxy, alkylcarbonyl, alkoxycarbonyl or alkoxycarbonyloxy having 1-7 carbon atoms, in which one or more H atoms may each be replaced by F or C,
- m is in each case, independently, 0, 1, 2 or 3, and
- R and R$^1$ are each, independently of one another, H, F, Cl, Br, I, CN, SCN, SF$_5$, straight-chain or branched alkyl having from 1 or 3 to 25 carbon atoms respectively, which may optionally be monosubstituted or polysubstituted by F, C, Br, I or CN, and in which one or more non-adjacent CH$_2$ groups may each be replaced by —O—, —S—, —NH—, —NR$^0$—, —CO—, —COO—, —OCO—, —O—COO—, —S—CO—, —CO—S—, —CH=CH— or —C≡C—, where no two O and/or S atoms are bonded directly to one another, or a polymerisable group.

Particular preference is given to chiral binaphthyl derivatives of the formula A-VI-1

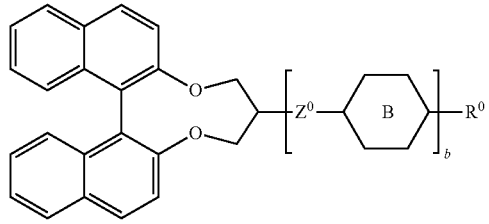

A-VI-1 in which ring B, $R^0$ and $Z^0$ are as defined for the formulae A-IV and A-V, and b is 0, 1, or 2,
in particular those selected from the following formulae A-VI-1a to A-VI-1c:

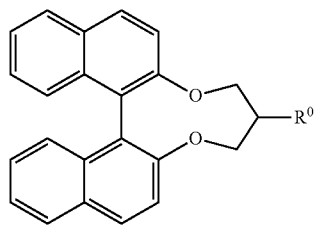

A-VI-1a

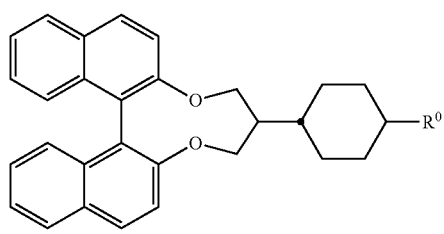

A-VI-1b

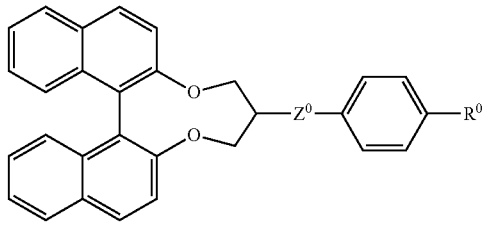

A-VI-1c in which ring B, $R^0$, and $Z^0$ are as defined for the formula A-VI-1, and $R^0$ as defined for formula A-IV or H or alkyl having from 1 to 4 carbon atoms, and b is 0, 1 or 2, and $Z^0$ is, in particular, —OC(O)— or a single bond.

The concentration of the one or more chiral dopants optionally contained in the LC medium is preferably in the range from 0.001% by weight to 20% by weight, preferably from 0.05% by weight to 5% by weight, more preferably from 0.1% by weight to 2% by weight, and most preferably from 0.5% by weight to 1.5% by weight. These preferred concentration ranges apply in particular to the chiral dopant S-4011 or R-4011 (both from Merck KGaA) and to chiral dopants having the same or a similar HTP. For chiral dopants having either a higher or a lower absolute value of the HTP compared to S-4011 these preferred concentrations may be decreased or respectively increased proportionally according to the ratio of their HTP values relative to that of S-4011.

The pitch p of the LC media preferably is in the range of from 5 μm to 50 μm, more preferably from 8 μm to 30 μm and particularly preferably from 10 μm to 20 μm.

Preferably, the media according to the invention comprise one or more stabilisers, preferably selected from the group of compounds of the formulae ST-1 to ST-19

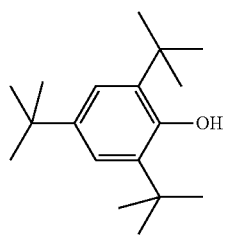

ST-1

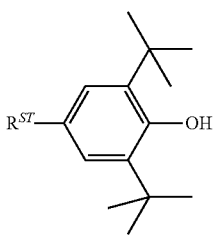

ST-2

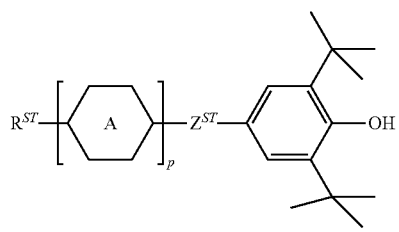

ST-3

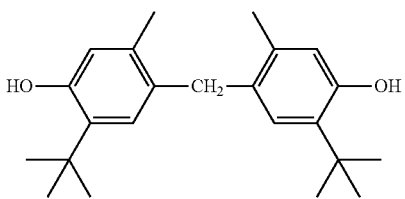

ST-4

ST-5
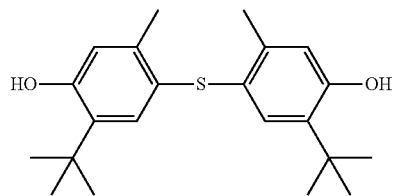
ST-6
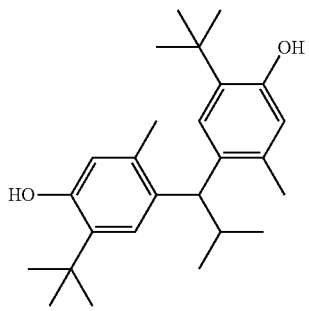
ST-7
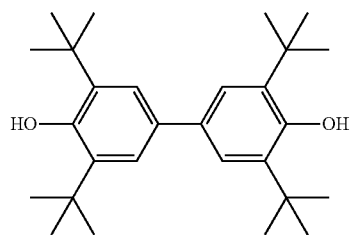
ST-8
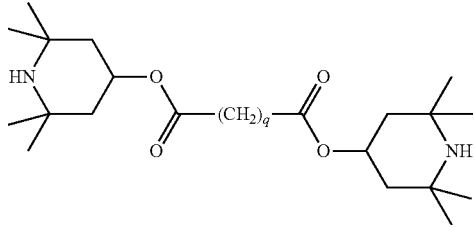
ST-9
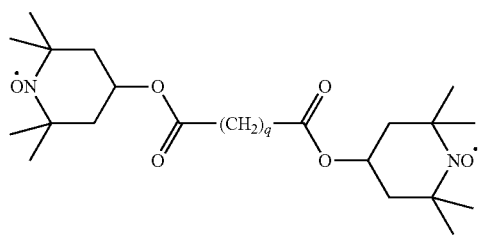
ST-10
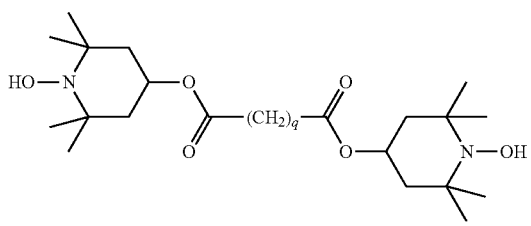
ST-11
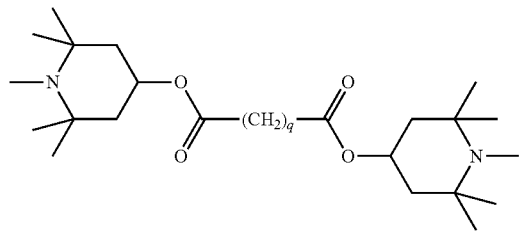
ST-12
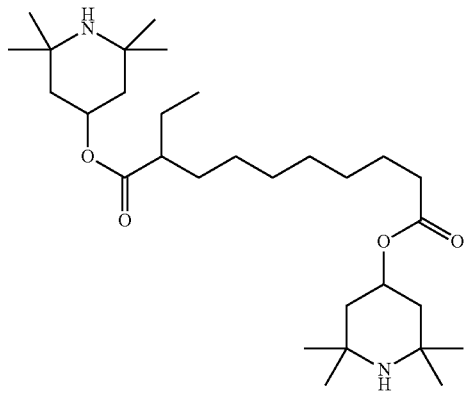
ST-13
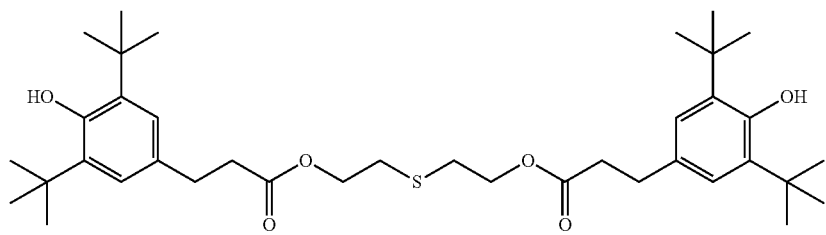

-continued
ST-14
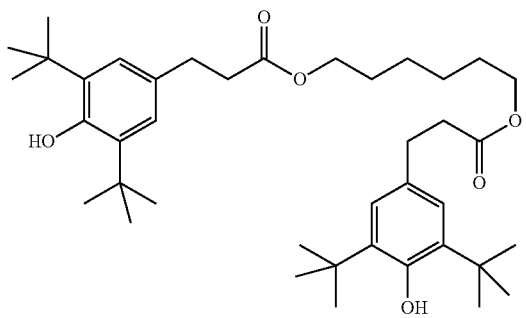
ST-15
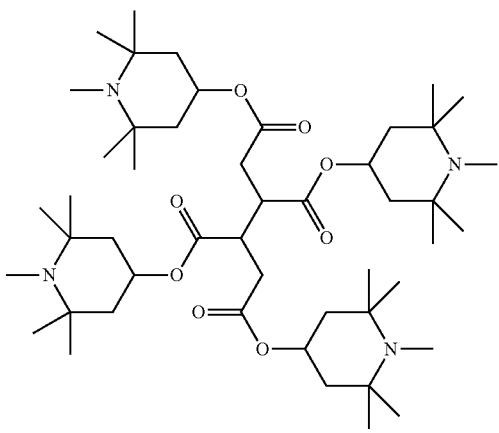
ST-16
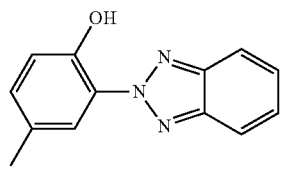
ST-17
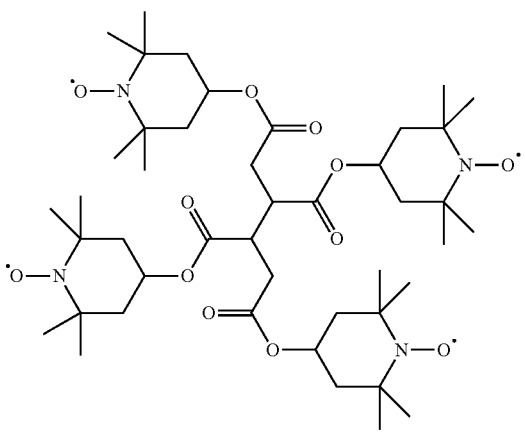
ST-18
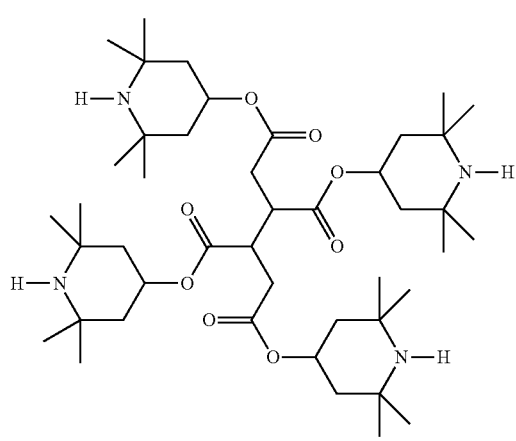

-continued

ST-19 in which
R$^{ST}$ denotes H, an alkyl or alkoxy radical having 1 to 15 C atoms, where, in addition, one or more CH$_2$ groups in these radicals may each be replaced, independently of one another, by —C≡C—, —CF$_2$O—, —OCF$_2$—, —CH=CH—, —O—, —CO—O— or —O—CO— in such a way that O atoms are not linked directly to one another, and in which, in addition, one or more H atoms may be replaced by halogen,

A denotes

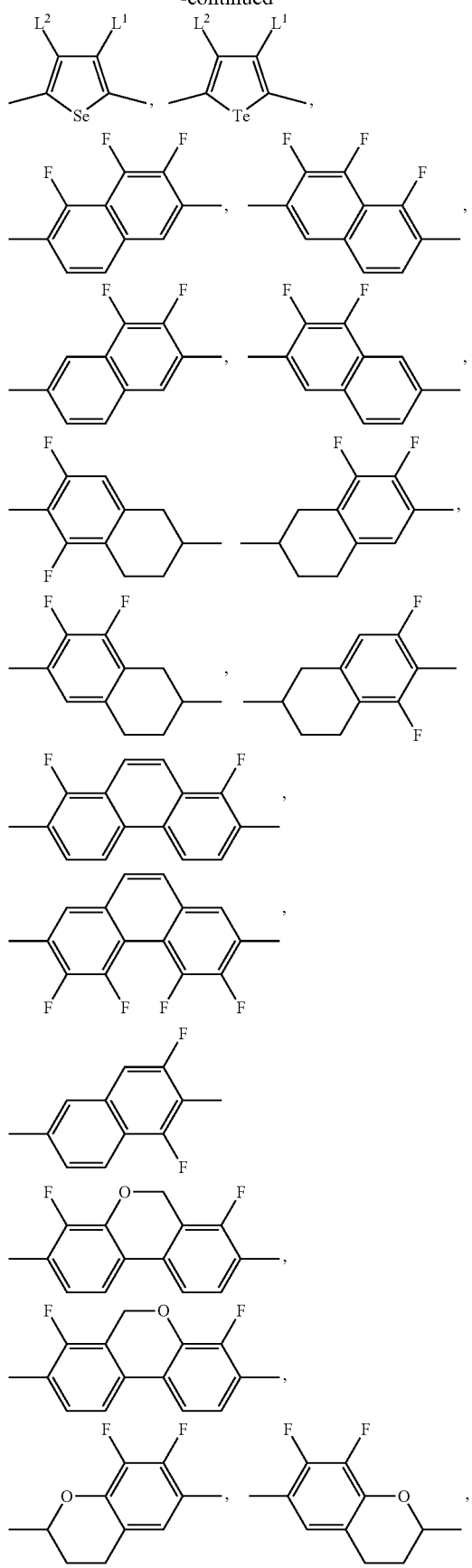

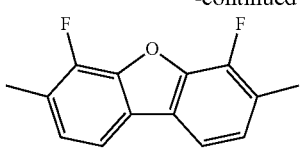

$Z^{ST}$ each, independently of one another, denote —CO—O—, —O—CO—, —CF$_2$O—, —OCF$_2$—, —CH$_2$O—, —OCH$_2$—, —CH$_2$—, —CH$_2$CH$_2$—, —(CH$_2$)$_4$—, —CH=CH—CH$_2$O—, —C$_2$F$_4$—, —CH$_2$CF$_2$—, —CF$_2$CH$_2$—, —CF=CF—, —CH=CF—, —CF=CH—, —CH=CH—, —C≡C— or a single bond, L$^1$ and L$^2$ each, independently of one another, denote F, Cl, CF$_3$ or CHF$_2$, p denotes 1 or 2, and q denotes 1, 2, 3, 4, 5, 6, 7, 8, 9 or 10.

Of the compounds of the formula ST-1 to ST-19, special preference is given to the compounds of the formulae

ST-1

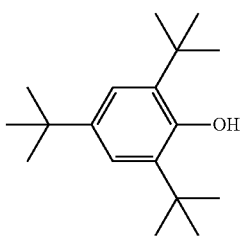

ST-2a

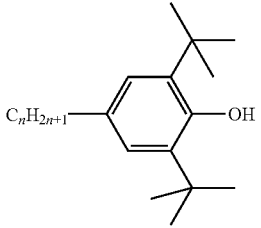

in which n=1, 2, 3, 4, 5, 6 or 7, preferably n=1 or 7

ST-3a

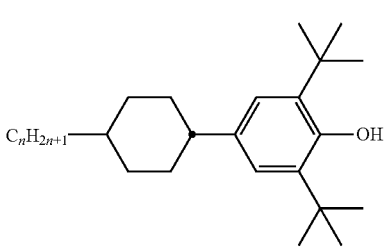

in which n=1, 2, 3, 4, 5, 6 or 7, preferably n=3

ST-3b in which n=1, 2, 3, 4, 5, 6 or 7, preferably n=3

ST-8-1

ST-9-1

ST-12

ST-16

ST-17

ST-18

In the compounds of the formulae ST-3a and ST-3b, n preferably denotes 3. In the compounds of the formula ST-2a, n preferably denotes 7.

Very particularly preferred mixtures according to the invention comprise one or more stabilisers from the group of the compounds of the formulae ST-2a-1, ST-3a-1, ST-3b-1, ST-8-1, ST-9-1 and ST-12:

ST-2a-1

ST-3a-1

-continued

ST-3b-1
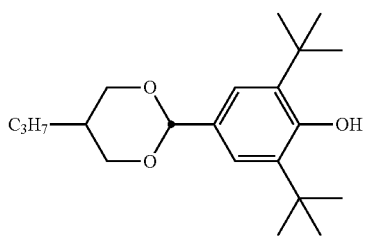

ST-8-1
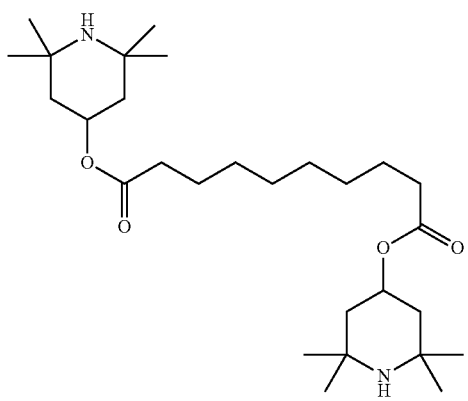

ST-9-1

ST-12
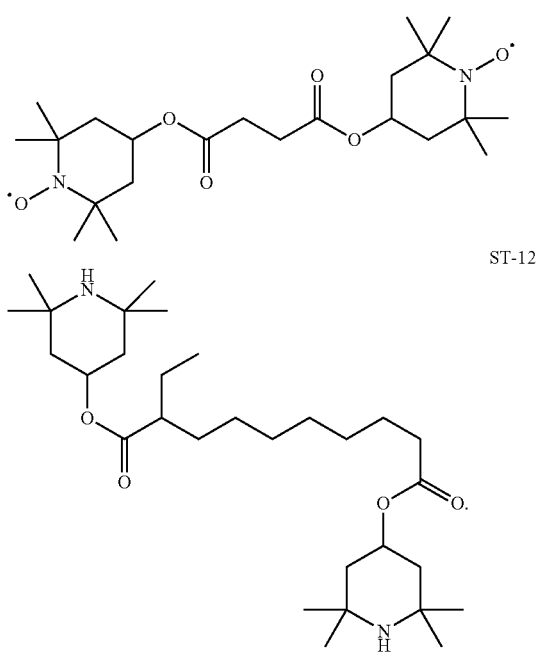

The compounds of the formulae ST-1 to ST-19 are preferably each present in the liquid-crystal mixtures according to the invention in amounts of 0.005% by weight to 0.5% by weight, based on the mixture.

If the mixtures according to the invention comprise two or more compounds from the group of the compounds of the formulae ST-1 to ST-19, the concentration correspondingly increases to 0.01% by weight to 1% by weight in the case of two compounds, based on the mixtures.

However, the total proportion of the compounds of the formulae ST-1 to ST-19, based on the mixture according to the invention, should not exceed 2% by weight.

It has surprisingly been found that the presently provided liquid-crystal medium can favourably contribute to obtaining an advantageous electro-optical device performance, e.g. in terms of the achievable contrast and the high bright state transmittance, while exhibiting functionality, reliability and stability also at high temperatures and at low temperatures.

Above and below, the definitions of the abbreviations, also referred to as acronyms, of preferred compounds are given in tables A to C below.

In further preferred embodiments, the medium according to the invention comprises the one or more compounds of formula I and in particular the further preferred compounds thereof in a total amount of 10% by weight or less, more preferably 7% by weight or less and even more preferably 4% by weight or less, preferably in the range of from 0.25% by weight to 8% by weight, more preferably from 0.5% by weight to 5% by weight and in particular from 1% by weight to 3% by weight, and/or the compound of formula I-a-1, preferably in an amount of 10% by weight or less, more preferably 7% by weight or less and even more preferably 4% by weight or less, preferably in the range of from 0.25% by weight to 8% by weight, more preferably from 0.5% by weight to 5% by weight and in particular from 1% by weight to 3% by weight, and/or one or more compounds selected from the group of compounds of formulae IIA, IIB, IIC and IID, and in particular the further preferred compounds thereof, preferably in a total amount of 5% by weight or more, more preferably 12.5% by weight or more, even more preferably 25% by weight or more and in particular 40% by weight or more, preferably in the range of from 10% by weight to 60% by weight, more preferably from 20% by weight to 55% by weight and in particular from 30% by weight to 50% by weight, and/or one or more compounds of the formulae IIA and/or IIB, preferably in an amount of at least 20% by weight, more preferably at least 30% by weight and even more preferably at least 40% by weight, and/or one or more compounds of formulae Ill, and in particular the further preferred compounds thereof, preferably in a total amount of 20% by weight or less, more preferably 15% by weight or less and even more preferably 10% by weight or less, preferably in the range of from 2.5% by weight to 15% by weight, more preferably from 5% by weight to 10% by weight and in particular from 6% by weight to 9% by weight, and/or one or more compounds of formula IV, preferably in a total amount of at least 10% by weight, more preferably at least 20% by weight, even more preferably at least 30% by weight and in particular at least 35% by weight, and/or one or more compounds of formulae IV-3-1 to IV-3-5, preferably in a total amount of at least 10% by weight, more preferably at least 20% by weight, even more preferably at least 30% by weight and in particular at least 35% by weight, and/or one or more compounds selected from the compounds of formulae IV-3-1, IV-3-3 and IV-3-4, preferably the compound of formula IV-3-1 and/or the compound of formula IV-3-3, preferably in a total amount of at least 10% by weight, more preferably at least 20% by weight and even more preferably at least 30% by weight, and/or one or more compounds of the formulae IVb-1 to IVb-3, preferably in an amount of at least 3% by weight, in particular ≥5% by weight, and/or the compound of formula IVb-2-3, preferably in an amount of at least 3% by weight, in particular at least 5% by weight and/or the compound CLP-V-1 in an amount in the range of from 0.25% by weight to 8% by weight and the compound PP-1-2V1 in an amount in the range of from 3% by weight to 8% by weight.

The invention furthermore relates to an electro-optical display having active-matrix addressing, wherein it contains, as dielectric, a liquid-crystalline medium having a negative dielectric anisotropy and containing a compound of formula I, and wherein preferably the display is a VA, SA-VA, IPS, U-IPS, FFS, UB-FFS, SA-FFS, PS-VA, PS-OCB, PS-IPS, PS-FFS, PS-UB-FFS, polymer stabilised SA-VA or polymer stabilised SA-FFS display.

It is advantageous for the liquid-crystalline medium to preferably have a nematic phase from ≤−20° C. to ≥70° C., particularly preferably from ≤−30° C. to ≥80° C., very particularly preferably from ≤−40° C. to ≥90° C.

The medium according to the invention preferably has a clearing temperature of 70° C. or more, more preferably of 77° C. or more.

The expression "have a nematic phase" here means on the one hand that no smectic phase and no crystallisation are observed at low temperatures at the corresponding temperature and on the other hand that clearing still does not occur on heating from the nematic phase. The investigation at low temperatures is carried out in a flow viscometer at the corresponding temperature and checked by storage in test cells having a layer thickness corresponding to the electro-optical use for at least 100 hours. If the storage stability at a temperature of −20° C. in a corresponding test cell is 1000 h or more, the medium is referred to as stable at this temperature. At temperatures of −30° C. and −40° C., the corresponding times are 500 h and 250 h respectively. At high temperatures, the clearing point is measured by conventional methods in capillaries.

The liquid-crystal mixture preferably has a nematic phase range of at least 60 K and a flow viscosity $v_{20}$ of at most 30 mm$^2 \cdot$s$^{-1}$ at 20° C.

The mixture preferably is nematic at a temperature of −20° C. or less, preferably at −30° C. or less, very preferably at −40° C. or less.

The rotational viscosity $\gamma_1$ of the medium at 20° C. is preferably ≤120 mPa·s, more preferably particular ≤100 mPa·s, and in particular ≤95 mPa·s.

The liquid-crystal media according to the invention preferably have relatively low values for the threshold voltage ($V_0$). They are preferably in the range from 1.7 V to 3.0 V, particularly preferably ≤2.7 V and very particularly preferably ≤2.5 V.

For the present invention, the term "threshold voltage" relates to the capacitive threshold ($V_0$), also called the Freedericksz threshold, unless explicitly indicated otherwise.

In addition, the liquid-crystal media according to the invention preferably and favourably have high values for the voltage holding ratio in liquid-crystal cells.

All temperature values indicated for the present invention are in ° C.

The mixtures according to the invention are suitable for VA-TFT applications, such as, for example, VAN, MVA, (S)-PVA, ASV, PSA (polymer sustained VA) and PS-VA (polymer stabilised VA). They are furthermore suitable for IPS (in-plane switching) and FFS (fringe field switching) applications which use media having negative Δε.

In an embodiment the mixture may optionally also comprise one or more compounds having a dielectric anisotropy of Δε≥+1.5. These so-called positive compounds are generally present in a mixture of negative dielectric anisotropy in amounts of ≤20% by weight, based on the mixture as a whole.

Besides the one or more compounds of the formula I, the medium preferably comprises 4 to 15, in particular 5 to 12, and particularly preferably <10, compounds of the formulae IIA, IIB and/or IIC and optionally one or more compounds of the formula IV-3.

The compounds according to the present invention can be synthesized by or in analogy to known methods described in the literature, for example in the standard works such as Houben-Weyl, Methoden der Organischen Chemie [Methods of Organic Chemistry], Georg-Thieme-Verlag, Stuttgart, under reaction conditions which are known and suitable for said reactions. Use may also be made here of variants which are known per se, but are not mentioned here.

The following examples explain the present invention without limiting it. However, they show the person skilled in the art preferred mixture concepts with compounds preferably to be employed and the respective concentrations thereof and combinations thereof with one another. In addition, the examples illustrate the properties and property combinations that are accessible.

For the present invention and in the following examples, the structures of the liquid-crystal compounds are indicated by means of acronyms, with the transformation into chemical formulae done in accordance with Tables A to C below. All radicals $C_nH_{2n+1}$, $C_mH_{2m+1}$ and $CH_lH_{2l+1}$ or $C_nH_{2n}$, $C_mH_{2m}$ and $C_lH_{2l}$ are straight-chain alkyl radicals or alkylene radicals, in each case having n, m and l C atoms respectively. Preferably, n, m and l are independently of each other 1, 2, 3, 4, 5, 6, or 7. Table A shows the codes for the ring elements of the nuclei of the compounds, Table B lists the bridging units, and Table C lists the meanings of the symbols for the left- and right-hand end groups of the molecules. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

| Ring elements | |
|---|---|
| C | 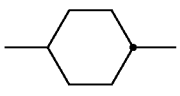 |
| D | 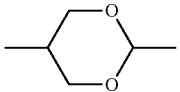 |

TABLE A-continued

| Ring elements | | | |
|---|---|---|---|
| Dl | (1,3-dioxane ring) | np | (naphthalene) |
| A | (tetrahydropyran) | n3f | (trifluoronaphthalene) |
| AI | (tetrahydropyran, reversed) | nN3fl | (trifluoronaphthalene isomer) |
| P | (1,4-phenylene) | th | (tetrahydronaphthalene) |
| G | (monofluoro phenylene) | thl | (tetrahydronaphthalene, reversed) |
| GI | (monofluoro phenylene, reversed) | tH2f | (difluoro tetrahydronaphthalene) |
| U | (difluoro phenylene) | tH2fl | (difluoro tetrahydronaphthalene, reversed) |
| UI | (difluoro phenylene, reversed) | o2f | (difluoro chromane) |
| Y | (difluoro phenylene) | o2fl | (difluoro chromane, reversed) |
| P(F, Cl)Y | (fluoro chloro phenylene) | dh | (decahydronaphthalene) |
| P(Cl, F)Y | (chloro fluoro phenylene) | | |

TABLE A-continued

Ring elements

| | | | | |
|---|---|---|---|---|
| B | 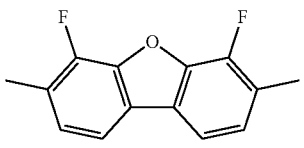 | | Bh | 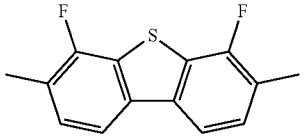 |
| B(S) | 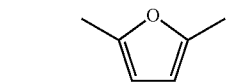 | | Bh(S) | 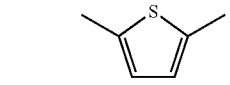 |
| O | 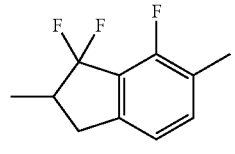 | | Bf | 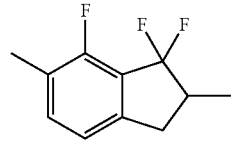 |
| S | 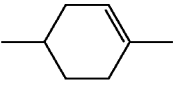 | | | |
| K | 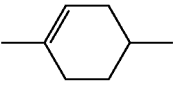 | | Bf(S) | 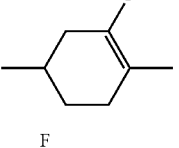 |
| KI | 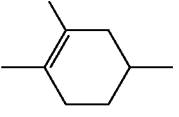 | | Bfi | 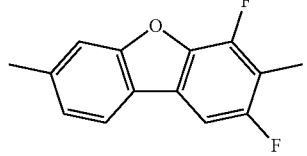 |
| L | 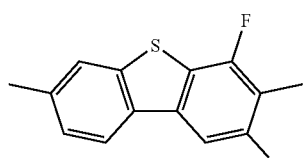 | | Bfi(S) | 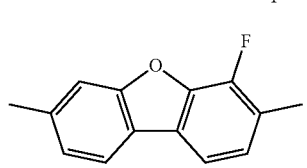 |
| LI | 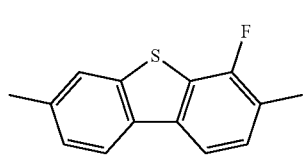 | | | |
| F | | | | |
| FI | | | | |

TABLE B

Bridging units

| | | | |
|---|---|---|---|
| E | —CH$_2$—CH$_2$— | | |
| V | —CH=CH— | | |
| T | —C≡C— | | |
| W | —CF$_2$—CF$_2$— | | |
| B | —CF=CF— | | |
| Z | —CO—O— | ZI | —O—CO— |
| X | —CF=CH— | XI | —CH=CF— |
| O | —CH$_2$—O— | OI | —O—CH$_2$— |
| Q | —CF$_2$—O— | QI | —O—CF$_2$— |

TABLE C

End groups

| On the left individually or in combination | | On the right individually or in combination | |
|---|---|---|---|
| -n- | C$_n$H$_{2n+1}$— | -n | —C$_n$H$_{2n+1}$ |
| —nO— | C$_n$H$_{2n+1}$—O— | —On | —O—C$_n$H$_{2n+1}$ |
| —V— | CH$_2$=CH— | —V | —CH=CH$_2$ |
| —nV— | C$_n$H$_{2n+1}$—CH=CH— | —nV | —C$_n$H$_{2n}$—CH=CH$_2$ |
| —Vn— | CH$_2$=CH—C$_n$H$_{2n}$— | —Vn | —CH=CH—C$_n$H$_{2n+1}$ |

TABLE C-continued

| End groups | | | |
|---|---|---|---|
| —nVm— | $C_nH_{2n+1}$—CH=CH—$C_mH_{2m}$— | —nVm | —$C_nH_{2n}$—CH=CH—$C_mH_{2m+1}$ |
| —N— | N≡C— | —N | —C≡N |
| —S— | S=C=N— | —S | —N=C=S |
| —F— | F— | —F | —F |
| —CL— | Cl— | —CL | —Cl |
| —M— | $CFH_2$— | —M | —$CFH_2$ |
| —D— | $CF_2H$— | —D | —$CF_2H$ |
| —T— | $CF_3$— | —T | —$CF_3$ |
| —MO— | $CFH_2O$— | —OM | —$OCFH_2$ |
| —DO— | $CF_2HO$— | —OD | —$OCF_2H$ |
| —TO— | $CF_3O$— | —OT | —$OCF_3$ |
| —A— | H—C≡C— | —A | —C≡C—H |
| —nA— | $C_nH_{2n+1}$—C≡C— | —An | —C≡C—$C_nH_{2n+1}$ |
| —NA— | N≡C—C≡C— | —AN | —C≡C—C≡N |
| -(cn)- | $(CH_2)_{n-2}$ (cyclopropyl) | -(cn) | $(CH_2)_{n-2}$ (cyclopropyl) |
| -(cn)m- | $(CH_2)_{n-2}$—$(CH_2)_m$— | -m(cn) | —$(CH_2)_m$—$(CH_2)_{n-2}$ |

| On the left only in combination | | On the right only in combination | |
|---|---|---|---|
| -...n...- | —$C_nH_{2n}$— | -...n... | —$C_nH_{2n}$— |
| -...M...- | —CFH— | -...M... | —CFH— |
| -...D...- | —$CF_2$— | -...D... | —$CF_2$— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | in which n and m are each integers, and the three dots "..." are placeholders for other abbreviations from this table.

Apart from the one or more compounds of formula I, and optionally one or more compounds of the formulae IIA, IIB, IIC and/or IID, the mixtures according to the invention preferably comprise one or more compounds of the compounds mentioned below.

The following abbreviations are used:

n, m, k and l are, independently of one another, each an integer, preferably 1 to 9, more preferably 1 to 7, k and l may also be 0 and preferably are 0 to 4, more preferably 0 or 2 and most preferably 2, n preferably is 1, 2, 3, 4 or 5, in the combination "-nO-" n preferably is 1, 2, 3 or 4, preferably 2 or 4, m preferably is 1, 2, 3, 4 or 5, in the combination "—Om" m preferably is 1, 2, 3 or 4, more preferably 2 or 4. The combination "-IVm" preferably is "2V1".

TABLE D

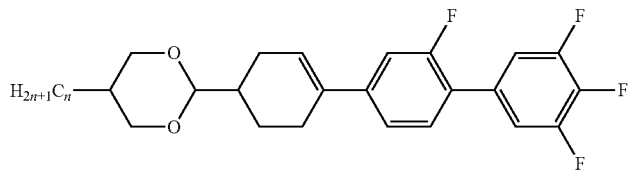

DLGU-n-F

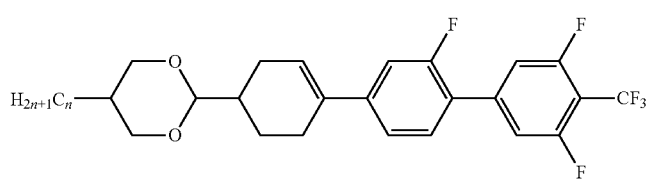

DLGU-n-OT

TABLE D-continued
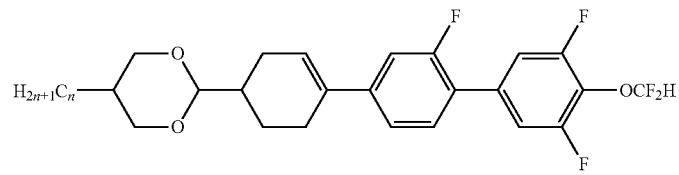
DLGU-n-OT
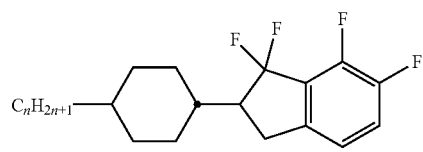
CK-n-F
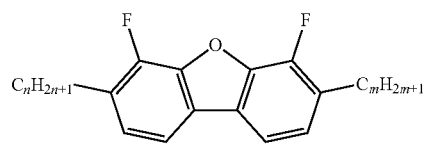
B-n-m
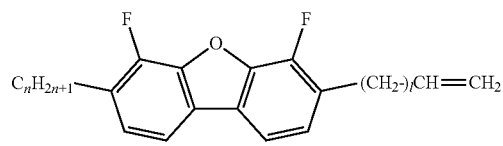
B-n-IV
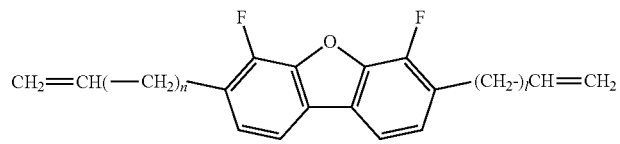
B-Vn-IV
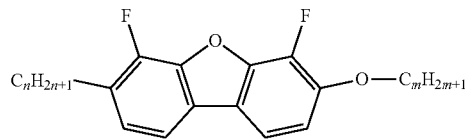
B-n-Om
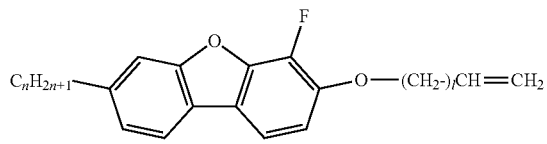
B-n-OIV
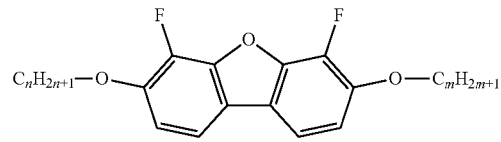
B-nO-Om TABLE D-continued
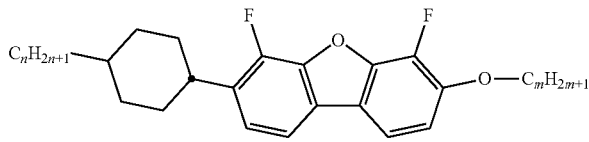
CB-n-Om
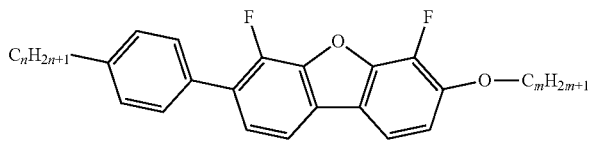
PB-n-Om
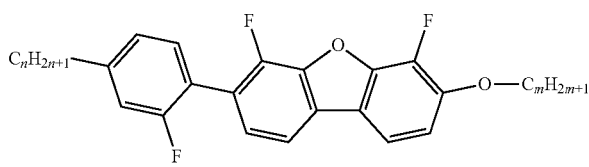
GB-n-Om
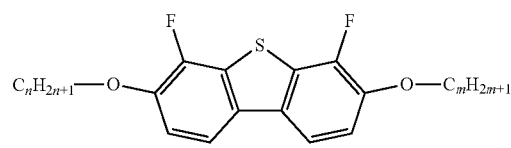
B(S)-nO-Om
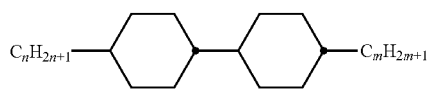
CC-n-m
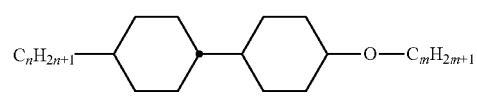
CC-n-Om
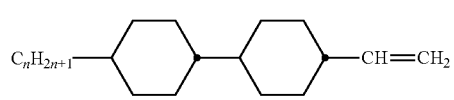
CC-n-V
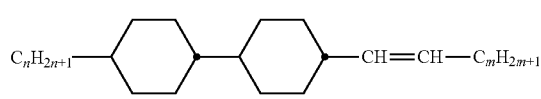
CC-n-Vm
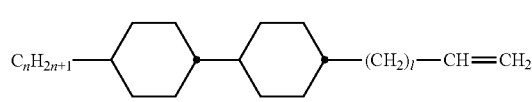
CC-n-IV
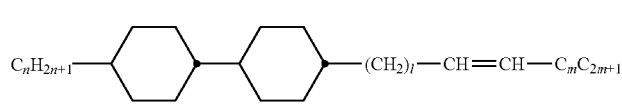
CC-n-IVm TABLE D-continued
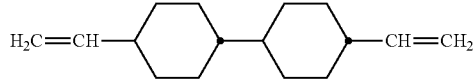
CC-V-V
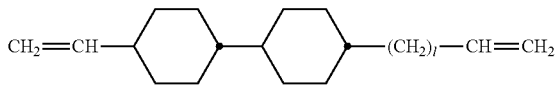
CC-V-IV
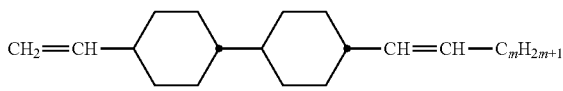
CC-V-Vm
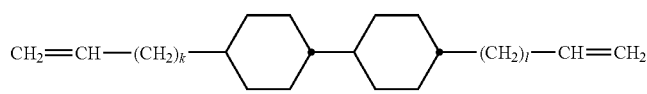
CC-Vk-IV
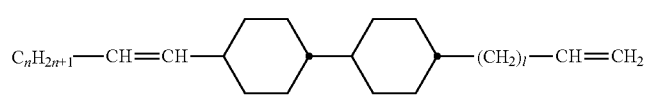
CC-nV-IV
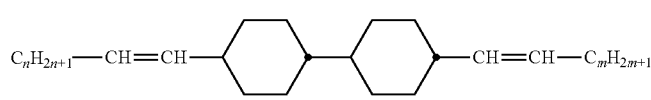
CC-nV-Vm
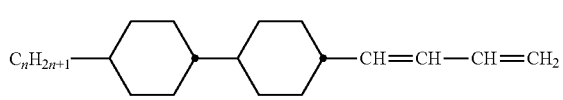
CC-n-VV
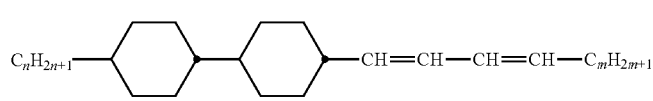
CC-n-VVm
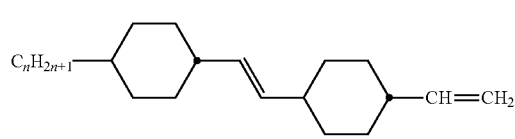
CVC-n-V
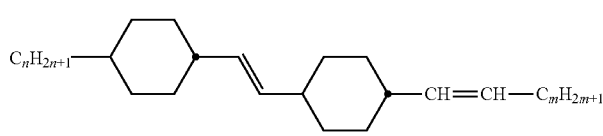
CVC-n-Vm
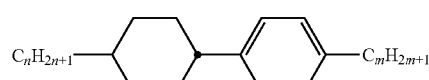
CP-n-m TABLE D-continued
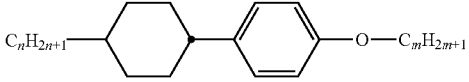
CP-n-Om
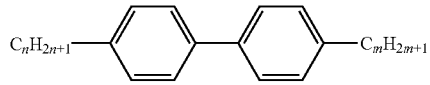
PP-n-m
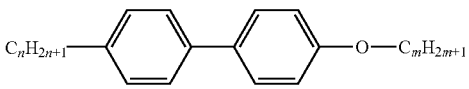
PP-n-Om
CCP-n-m
CCP-n-Om
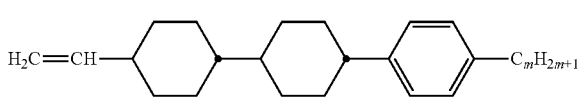
CCP-V-m
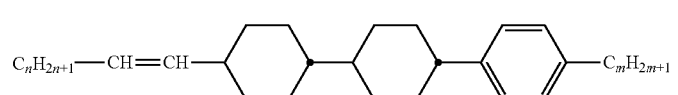
CCP-nV-m
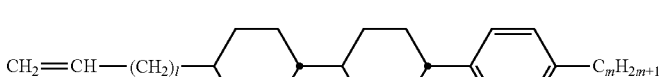
CCP-VI-m
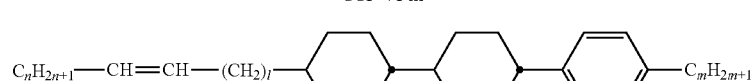
CCP-nVI-m
CCOC-n-m
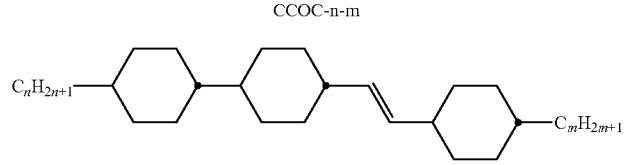
CCVC-n-m TABLE D-continued
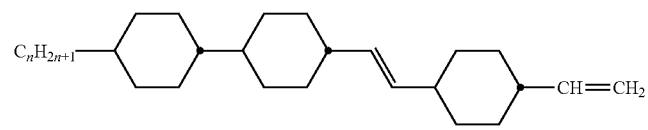
CCVC-n-V
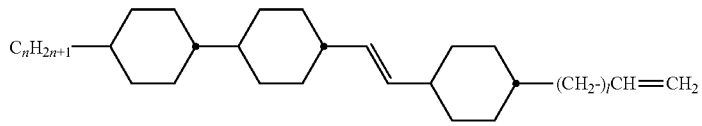
CCVC-n-IV
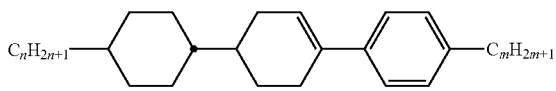
CLP-n-m
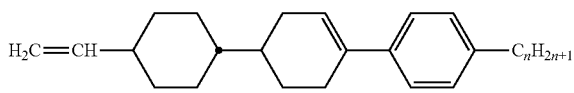
CLP-V-n
CPP-n-m
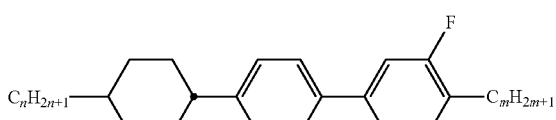
CPG-n-m
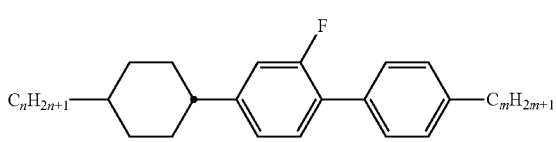
CGP-n-m
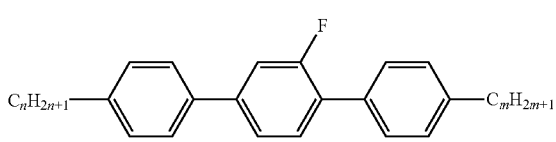
PGP-n-m
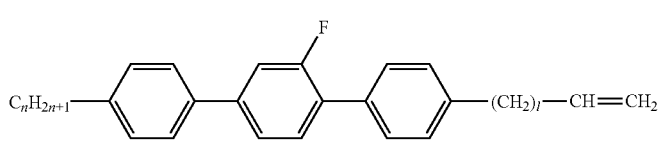
PGP-n-IV TABLE D-continued
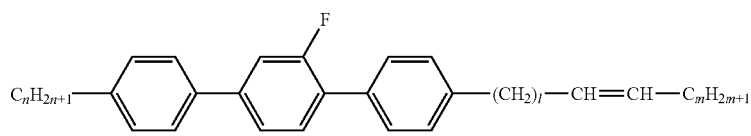
PGP-n-IVm
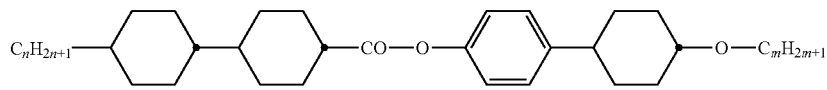
CCZPC-n-m
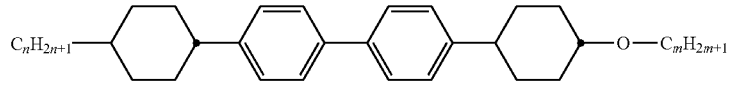
CPPC-n-m
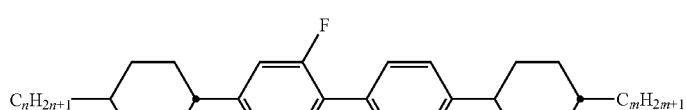
CGPC-n-m
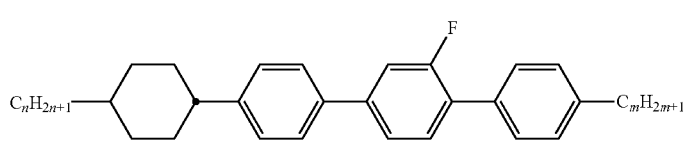
CPGP-n-m
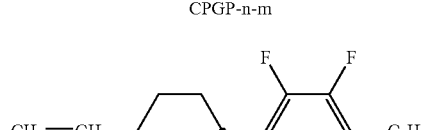
CY-V-n
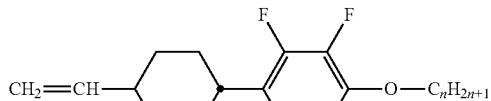
CY-V-On
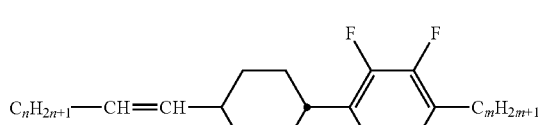
CY-nV-m
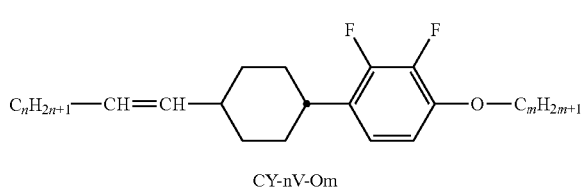
CY-nV-Om TABLE D-continued
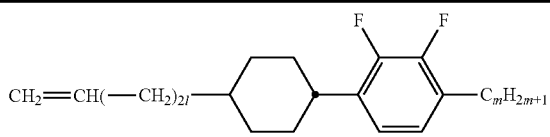
CY-VI-m
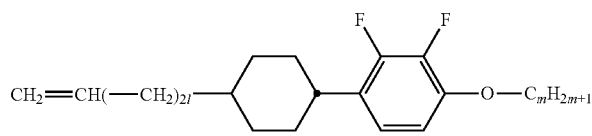
CY-VI-Om
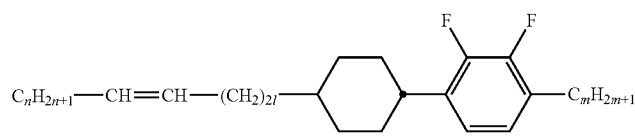
CY-nVI-m
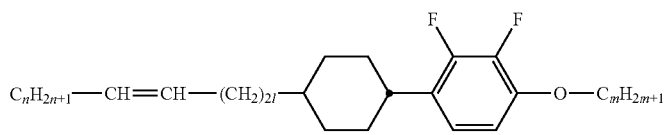
CY-nVI-Om
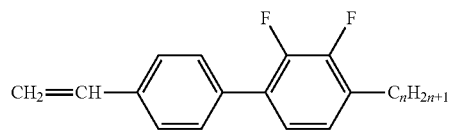
PY-V-n
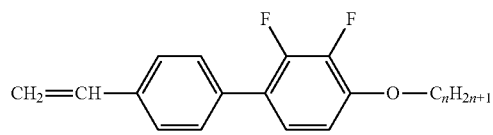
PY-V-On
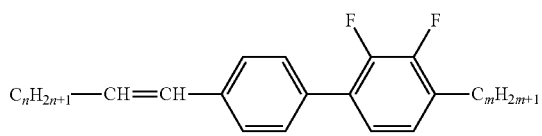
PY-nV-m
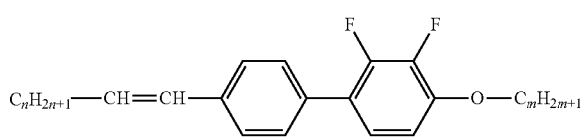
PY-nV-Om
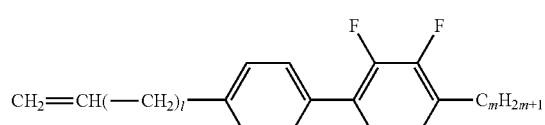
PY-VI-m TABLE D-continued
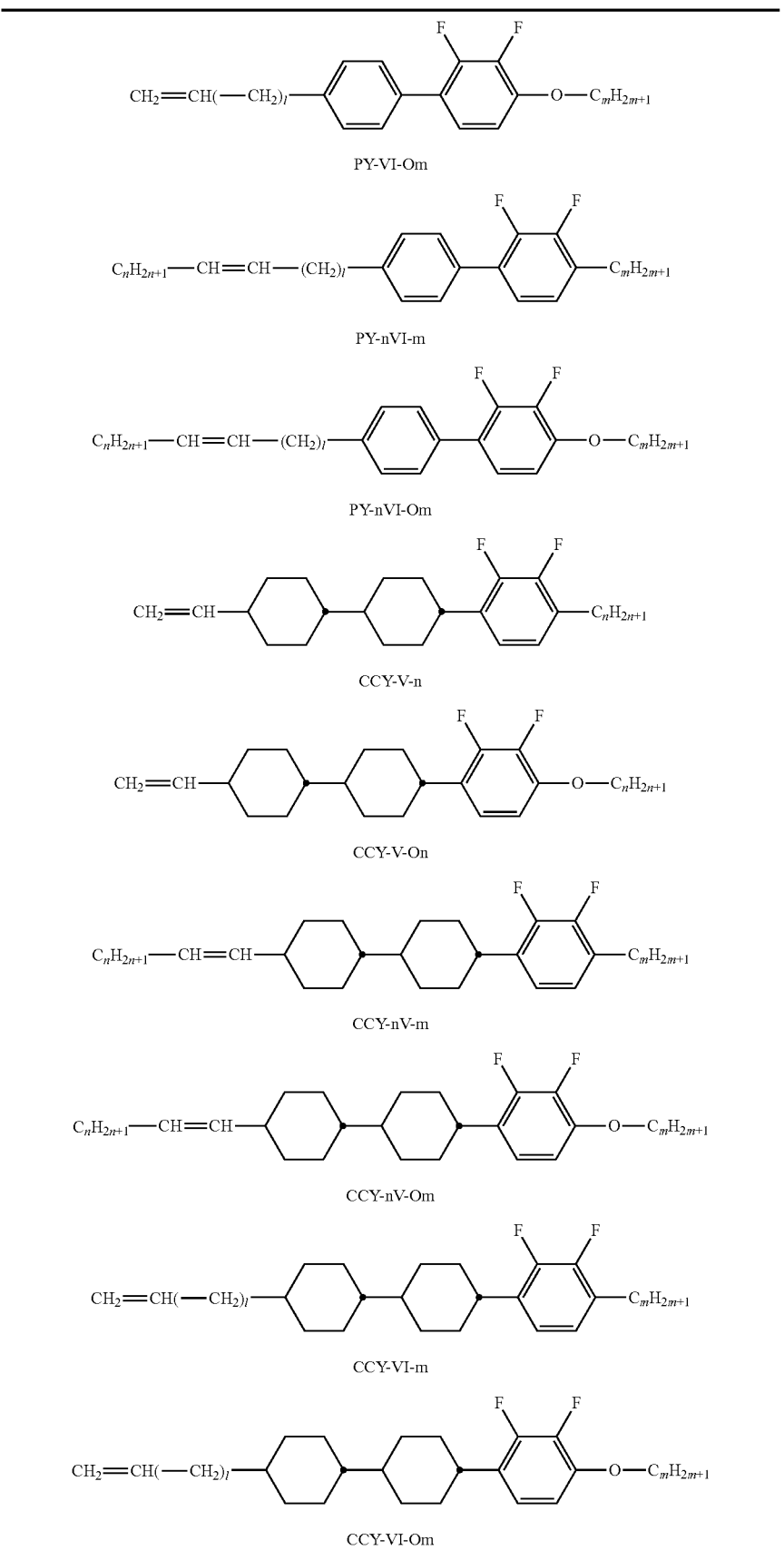

TABLE D-continued
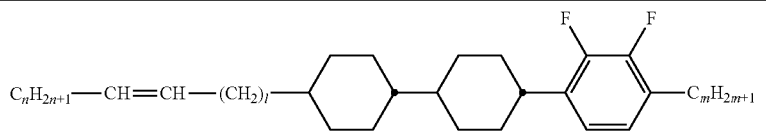
CCY-nVI-m
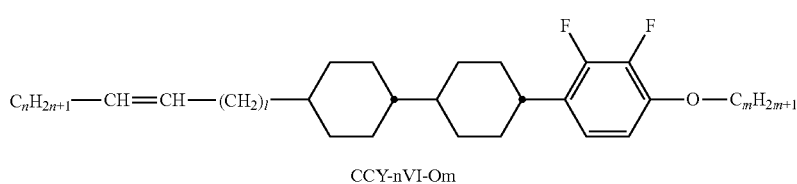
CCY-nVI-Om
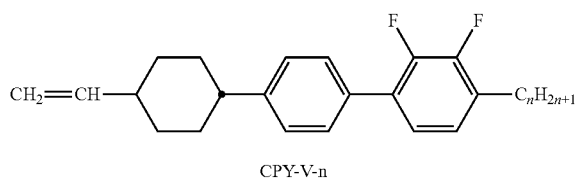
CPY-V-n
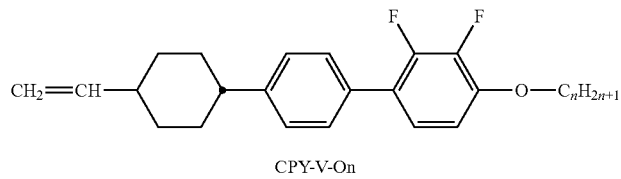
CPY-V-On
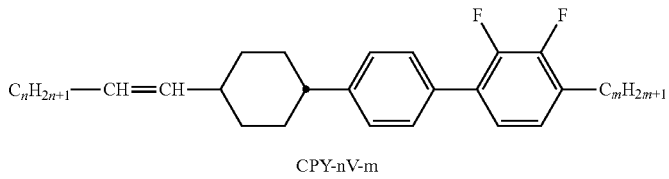
CPY-nV-m
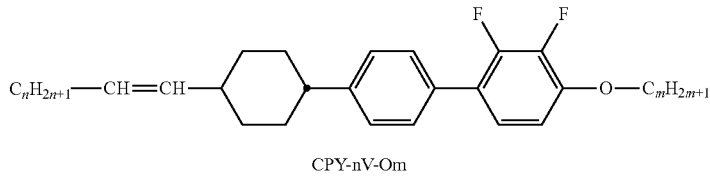
CPY-nV-Om
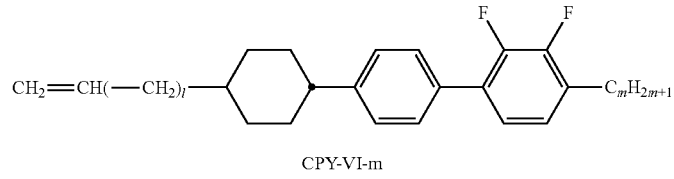
CPY-VI-m
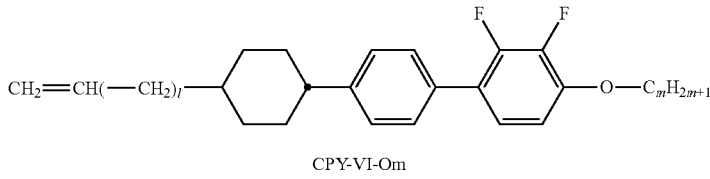
CPY-VI-Om
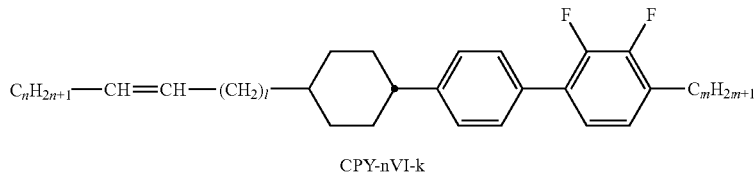
CPY-nVI-k TABLE D-continued
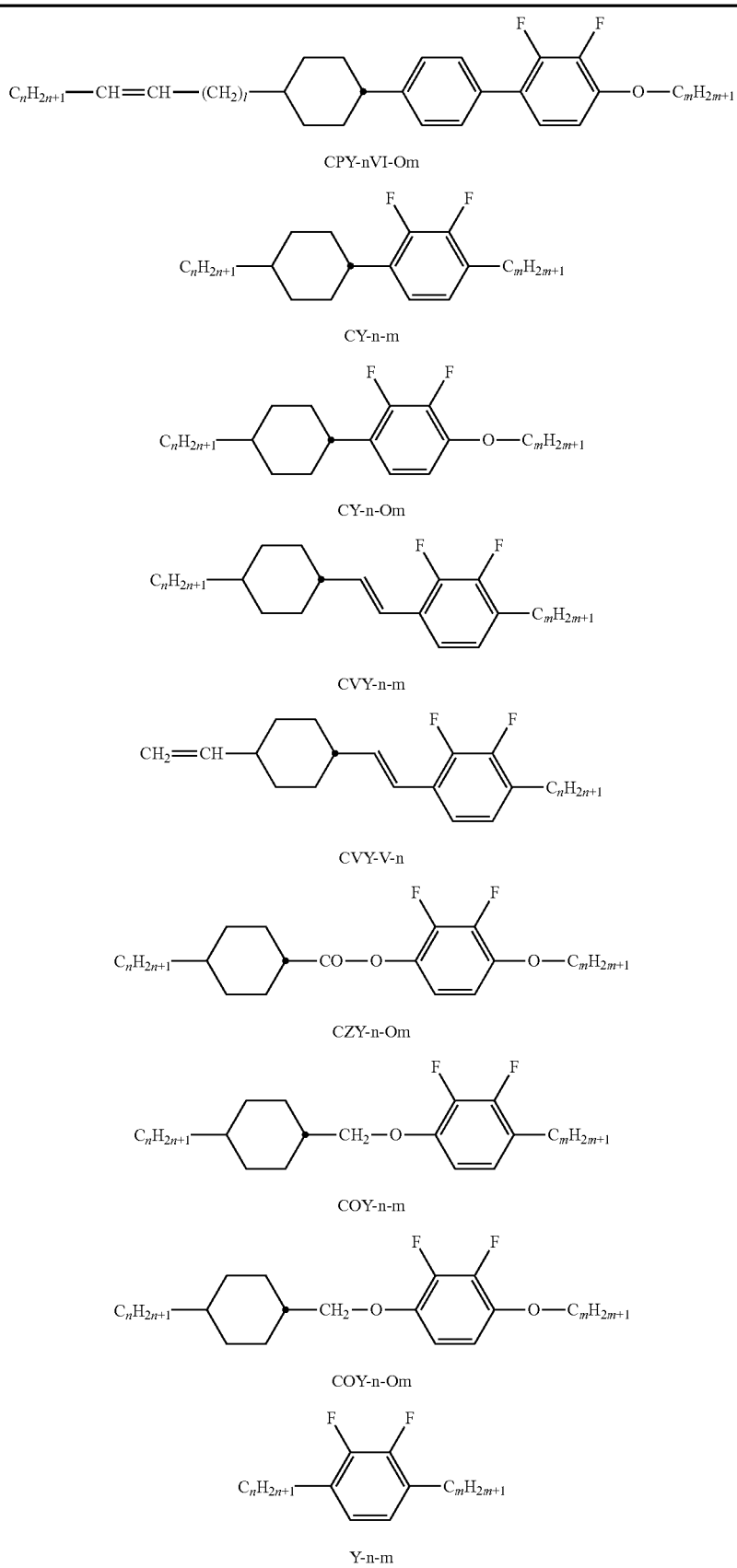

TABLE D-continued
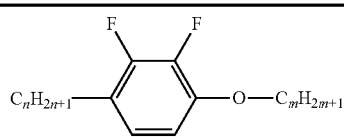
Y-n-Om
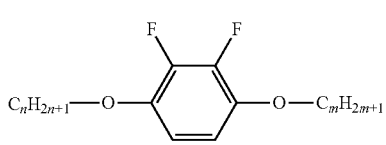
Y-nO-Om
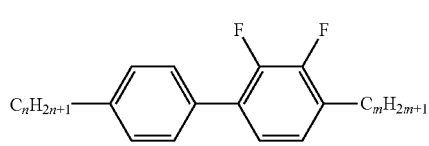
PY-n-m
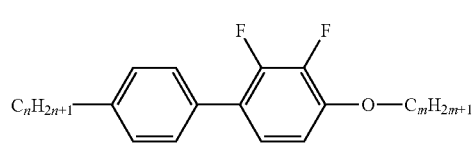
PY-n-Om
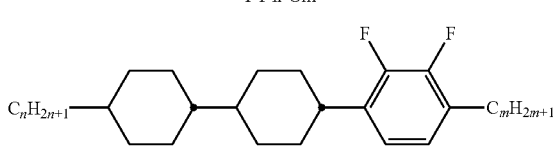
CCY-n-m
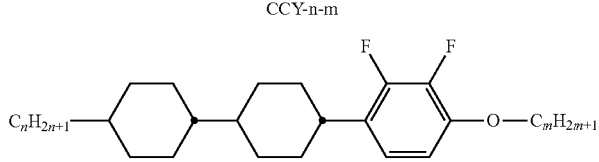
CCY-n-Om
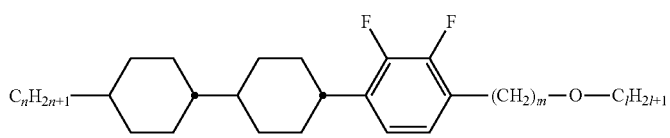
CCY-n-mOl
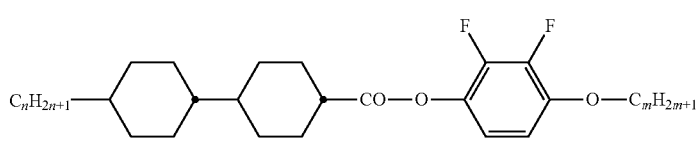
CCZY-n-Om
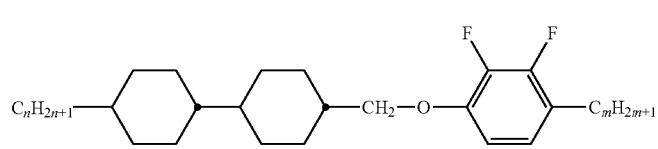
CCOY-n-m TABLE D-continued
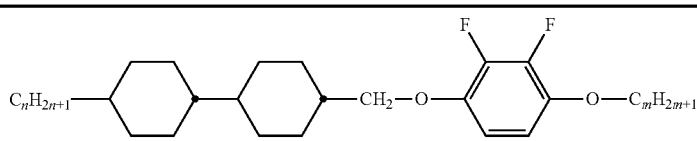
CCOY-n-Om
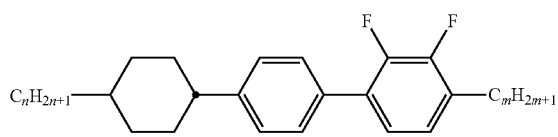
CPY-n-m
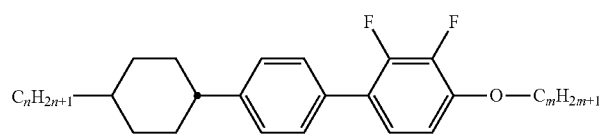
CPY-n-Om
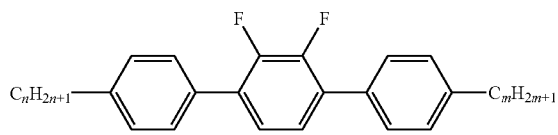
PYP-n-m
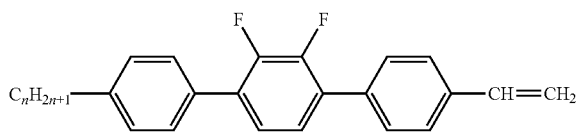
PYP-n-V
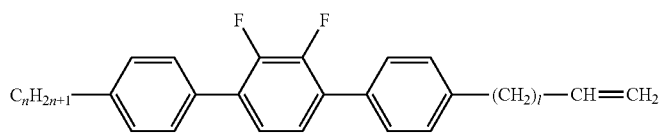
PYP-n-IV
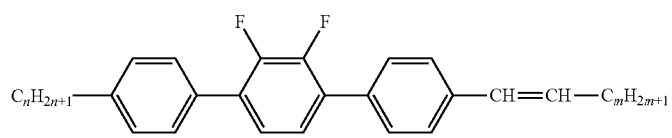
PYP-n-Vm
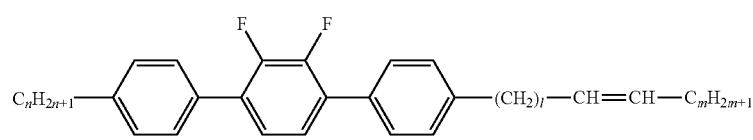
PYP-n-IVm
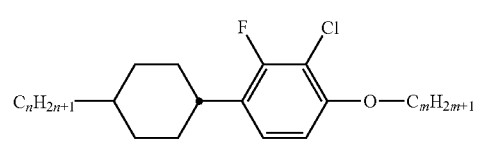
CP(F,Cl)-n-Om TABLE D-continued
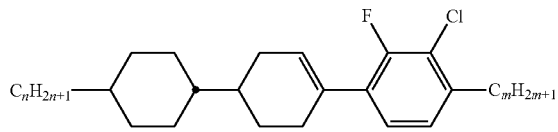
CLY-n-m
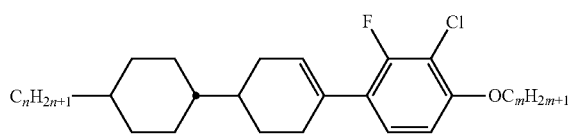
CLY-n-Om
COB(S)-n-Om
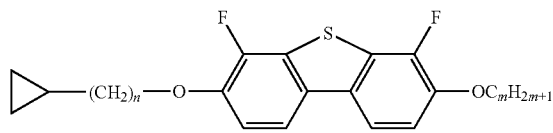
B(S)-(c3)nO-Om
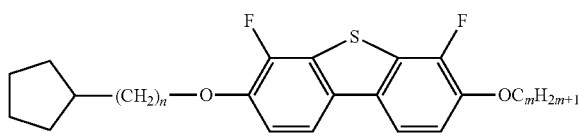
B(S)-(c5)nO-Om
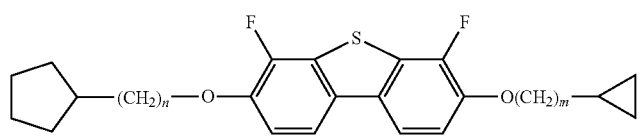
B(S)-(c5)nO-Om(c3)
Table E shows chiral dopants which can be added to the LC media according to the invention.
TABLE E
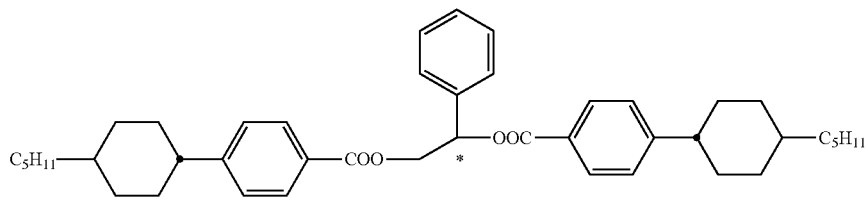
R/S-1011

TABLE E-continued
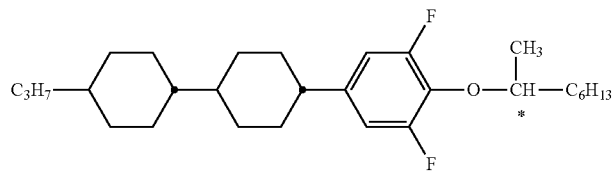
R/S-2011
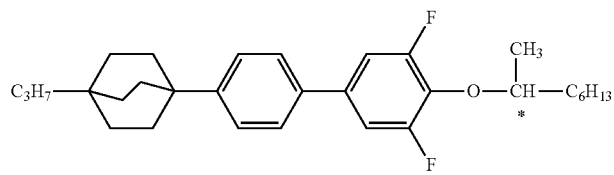
R/S-4011
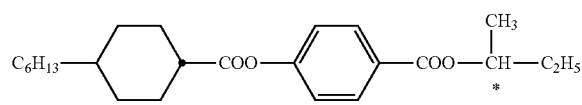
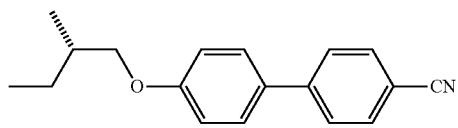 [SMILES: CC[C@H](C)COc1ccc(-c2ccc(C#N)cc2)cc1]
C 15
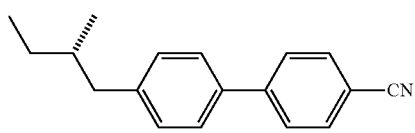
CB 15
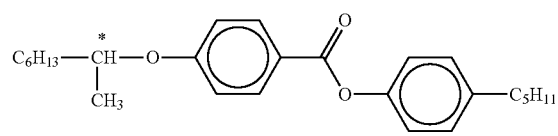
CM 21
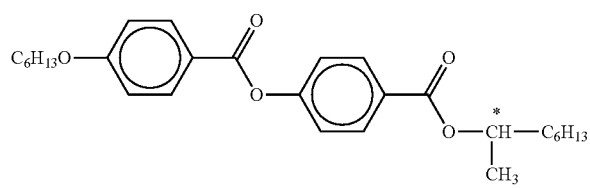
R/S-811
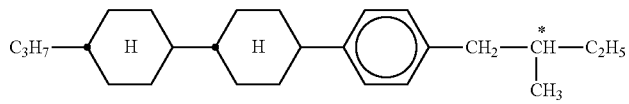
CM 44

TABLE E-continued
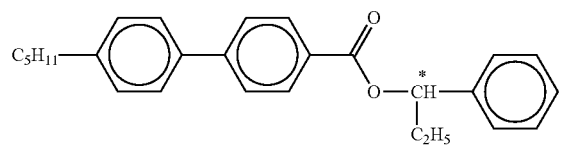
CM 45
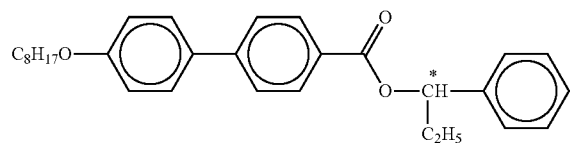
CM 47
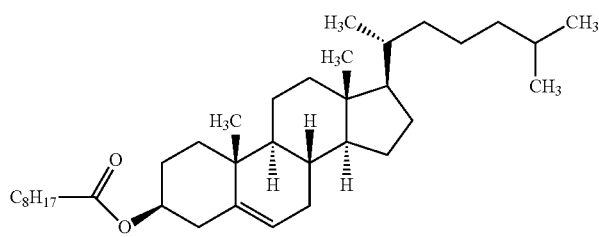
CN
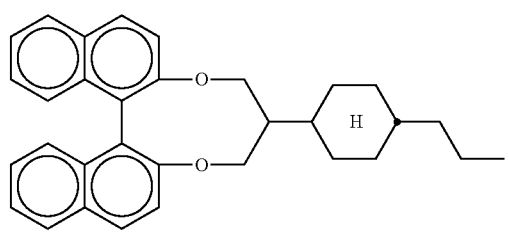
R/S-5011
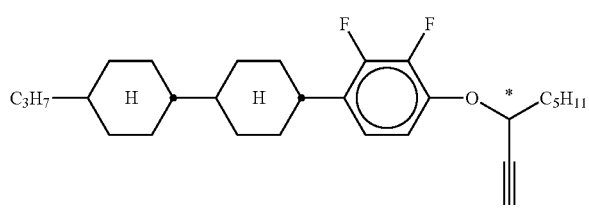
R/S-3011
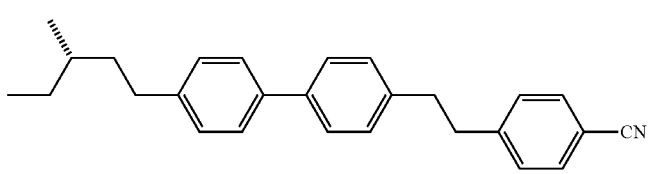 [SMILES: CC[C@H](C)CCc1ccc(-c2ccc(CCc3ccc(C#N)cc3)cc2)cc1]
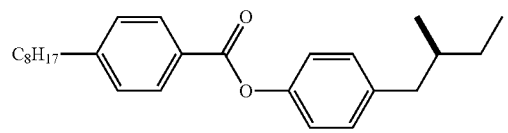
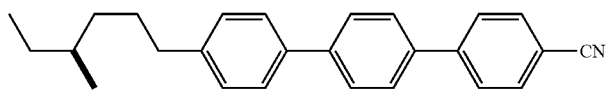 [SMILES: CC[C@H](C)CCCc1ccc(-c2ccc(-c3ccc(C#N)cc3)cc2)cc1]

TABLE E-continued
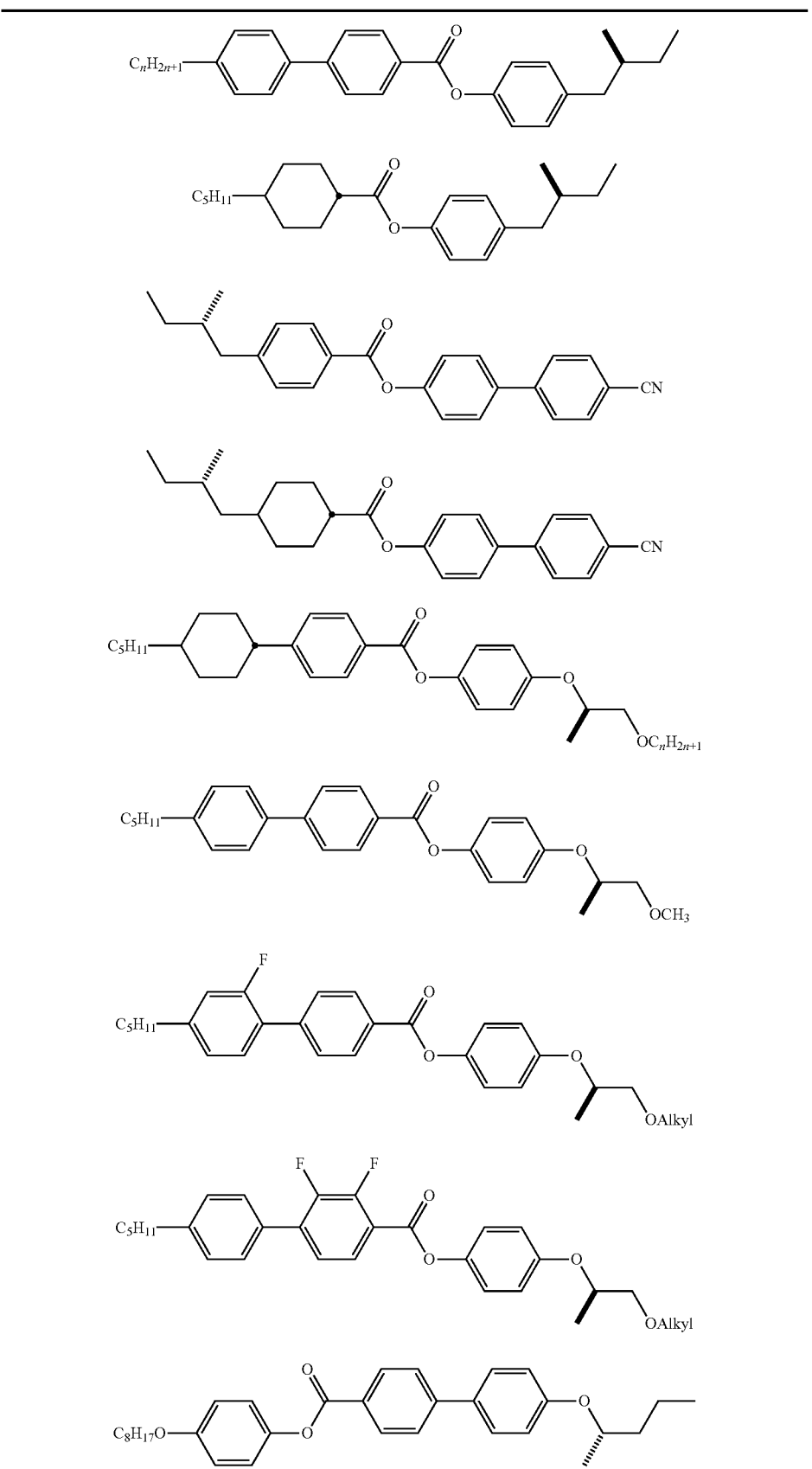

TABLE E-continued
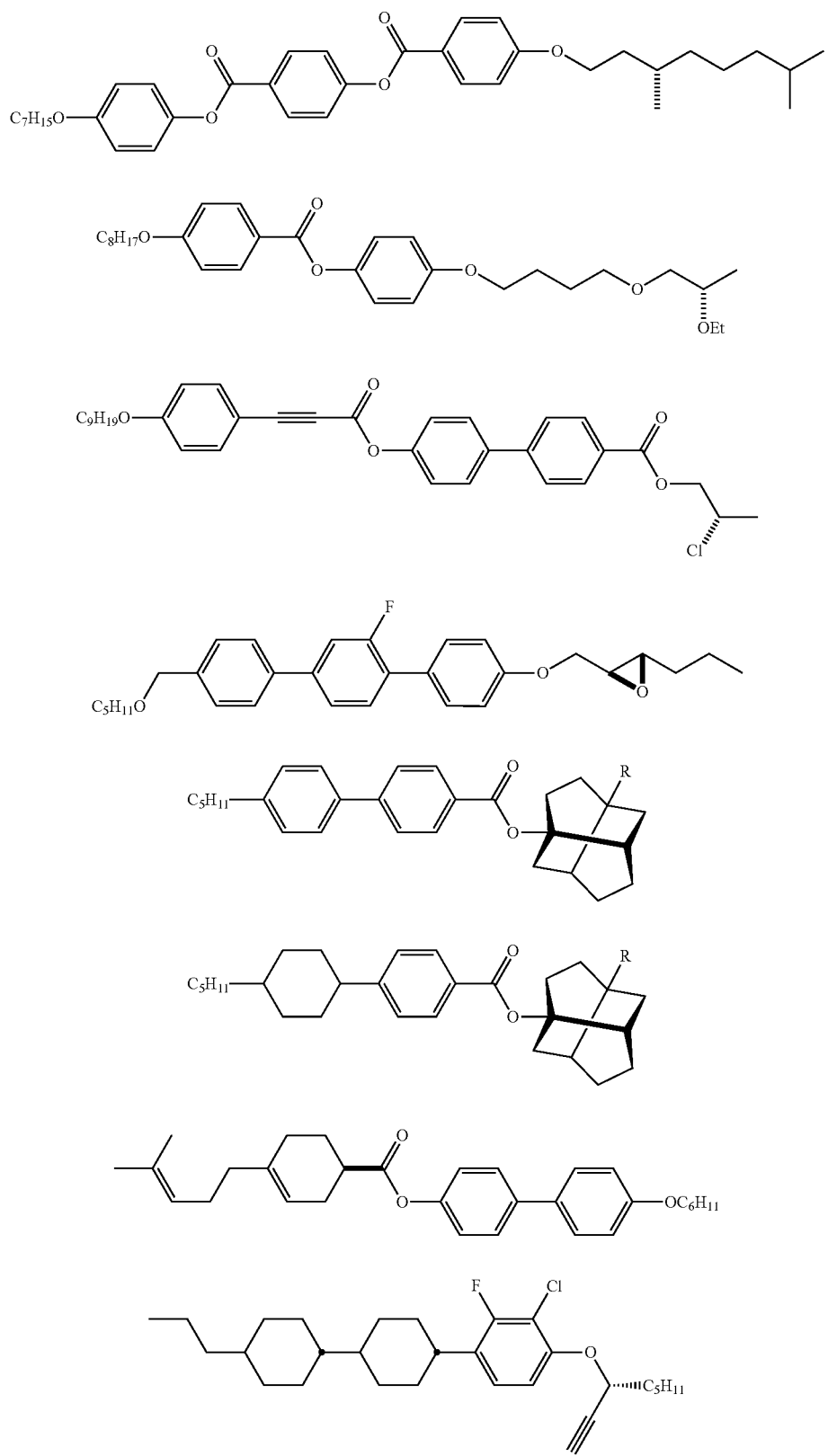

Table F shows illustrative reactive mesogenic compounds (RM) which can be used in the LC media in accordance with the present invention.

TABLE F

| Structure | ID |
|---|---|
| (biphenyl with methacrylate on both ends) | RM-1 |
| (biphenyl with acrylate and methacrylate) | RM-2 |
| (biphenyl with methacrylate and acrylate) | RM-3 |
| (naphthalene-2,6-diyl with methacrylate on both ends) | RM-4 |
| (naphthalene-2,6-diyl with methacrylate and acrylate) | RM-5 |
| (naphthalene with methacrylate and vinyl) | RM-6 |
| (biphenyl with methacrylate and CH2-methacrylate) | RM-7 |
| (biphenyl with methacrylate and CH2CH2-methacrylate) | RM-8 |

TABLE F-continued
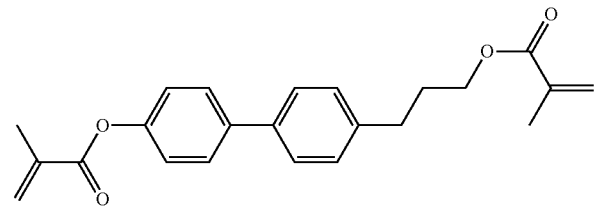 [SMILES: C=C(C)C(=O)OCCCc1ccc(-c2ccc(OC(=O)C(=C)C)cc2)cc1] RM-9
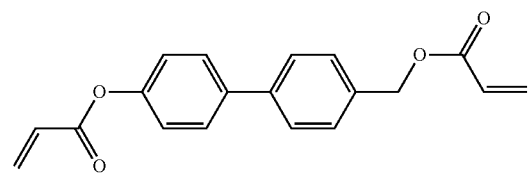 [SMILES: C=CC(=O)OCc1ccc(-c2ccc(OC(=O)C=C)cc2)cc1] RM-10
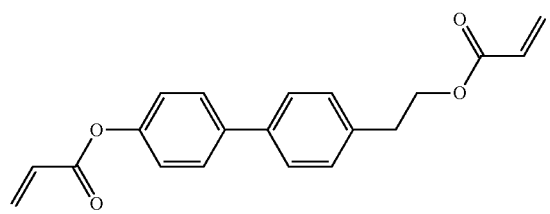 [SMILES: C=CC(=O)OCCc1ccc(-c2ccc(OC(=O)C=C)cc2)cc1] RM-11
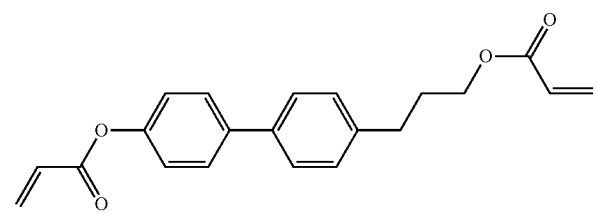 [SMILES: C=CC(=O)OCCCc1ccc(-c2ccc(OC(=O)C=C)cc2)cc1] RM-12
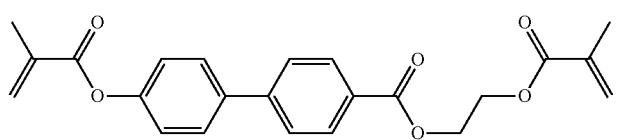 [SMILES: C=C(C)C(=O)OCCOC(=O)c1ccc(-c2ccc(OC(=O)C(=C)C)cc2)cc1] RM-13
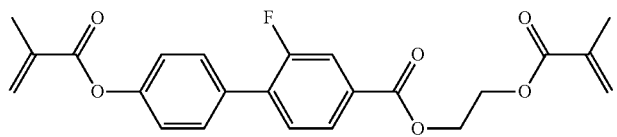 [SMILES: C=C(C)C(=O)OCCOC(=O)c1ccc(-c2ccc(OC(=O)C(=C)C)cc2)c(F)c1] RM-14
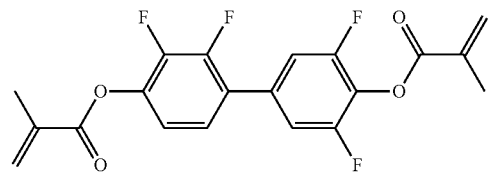 [SMILES: C=C(C)C(=O)Oc1ccc(-c2cc(F)c(OC(=O)C(=C)C)c(F)c2)c(F)c1F] RM-15
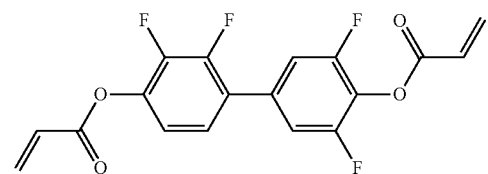 [SMILES: C=CC(=O)Oc1ccc(-c2cc(F)c(OC(=O)C=C)c(F)c2)c(F)c1F] RM-16

TABLE F-continued
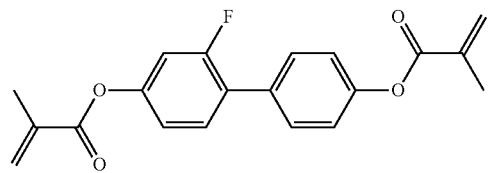 RM-17
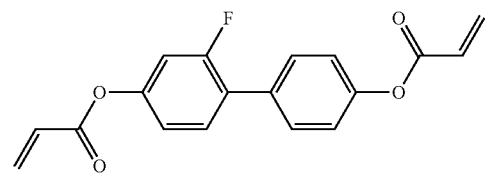 [SMILES: C=CC(=O)Oc1ccc(-c2ccc(OC(=O)C=C)cc2F)cc1] RM-18
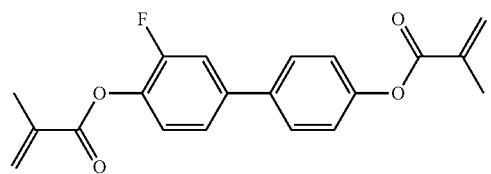 RM-19
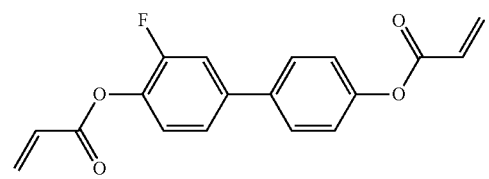 [SMILES: C=CC(=O)Oc1ccc(-c2ccc(OC(=O)C=C)c(F)c2)cc1] RM-20
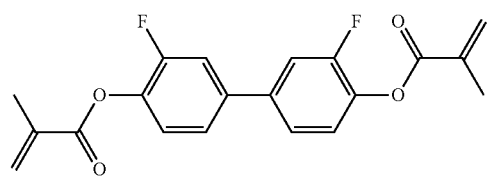 [SMILES: C=C(C)C(=O)Oc1ccc(-c2ccc(OC(=O)C(=C)C)c(F)c2)cc1F] RM-21
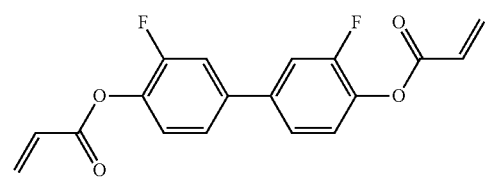 RM-22
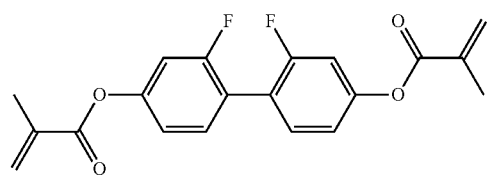 [SMILES: C=C(C)C(=O)Oc1ccc(-c2ccc(OC(=O)C(=C)C)cc2F)c(F)c1] RM-23
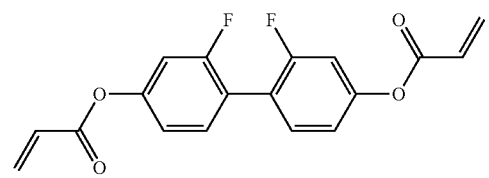 [SMILES: C=CC(=O)Oc1ccc(-c2ccc(OC(=O)C=C)cc2F)c(F)c1] RM-24
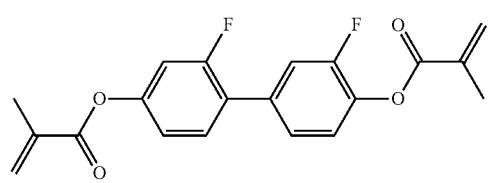 RM-25

TABLE F-continued
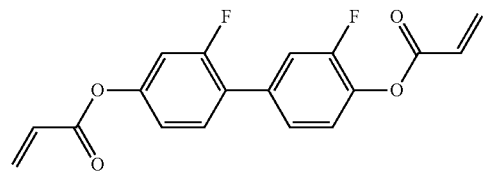 [SMILES: C=CC(=O)Oc1ccc(-c2ccc(OC(=O)C=C)c(F)c2)c(F)c1]  RM-26
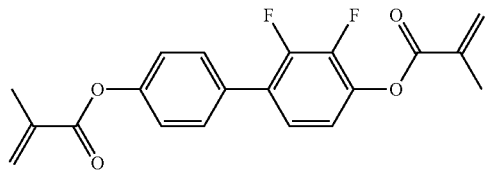 [SMILES: C=C(C)C(=O)Oc1ccc(-c2ccc(OC(=O)C(=C)C)c(F)c2F)cc1]  RM-27
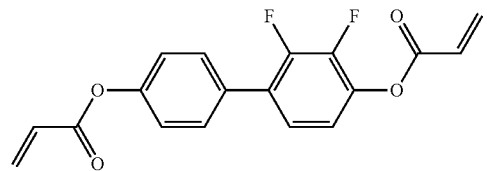  RM-28
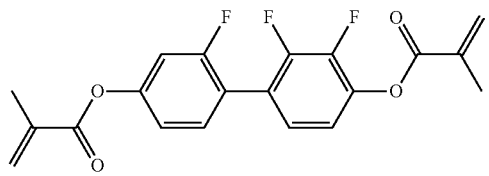 [SMILES: C=C(C)C(=O)Oc1ccc(-c2ccc(OC(=O)C(=C)C)c(F)c2F)c(F)c1]  RM-29
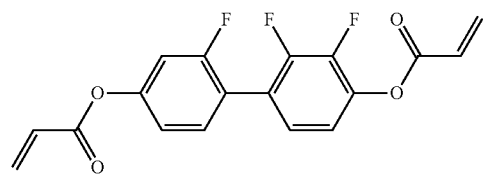 [SMILES: C=CC(=O)Oc1ccc(-c2ccc(OC(=O)C=C)c(F)c2F)c(F)c1]  RM-30
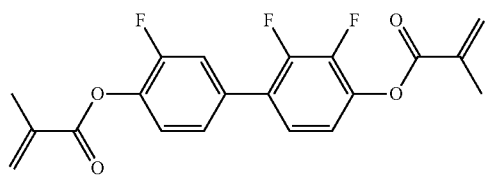 [SMILES: C=C(C)C(=O)Oc1ccc(-c2ccc(OC(=O)C(=C)C)c(F)c2F)cc1F]  RM-31
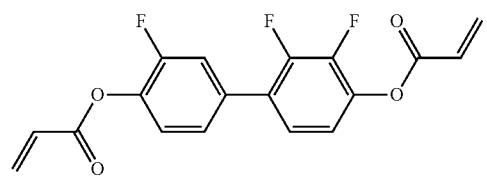 [SMILES: C=CC(=O)Oc1ccc(-c2ccc(OC(=O)C=C)c(F)c2F)cc1F]  RM-32
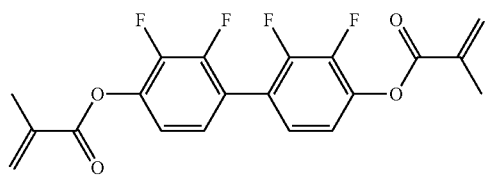  RM-33
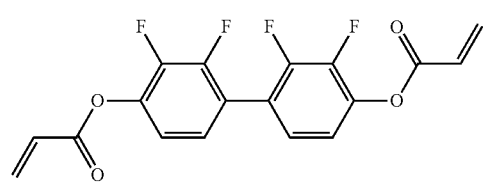  RM-34

TABLE F-continued
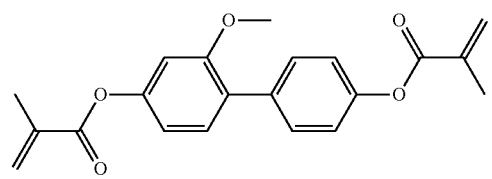 RM-35
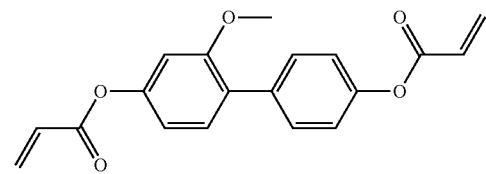 RM-36
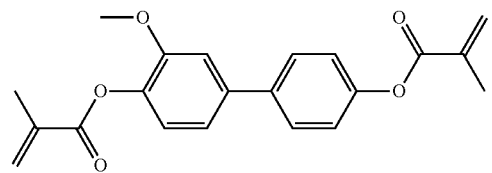 RM-37
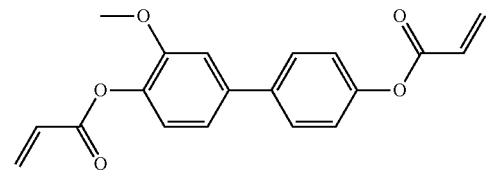 [SMILES: C=CC(=O)Oc1ccc(-c2ccc(OC(=O)C=C)c(OC)c2)cc1] RM-38
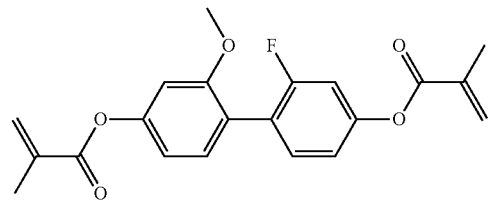 [SMILES: C=C(C)C(=O)Oc1ccc(-c2ccc(OC(=O)C(=C)C)cc2OC)c(F)c1] RM-39
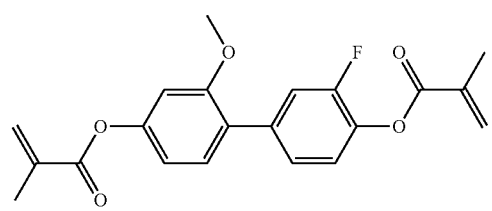 [SMILES: C=C(C)C(=O)Oc1ccc(-c2ccc(OC(=O)C(=C)C)c(F)c2)c(OC)c1] RM-40
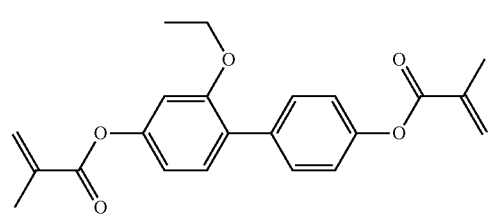 [SMILES: C=C(C)C(=O)Oc1ccc(-c2ccc(OC(=O)C(=C)C)cc2OCC)cc1] RM-41
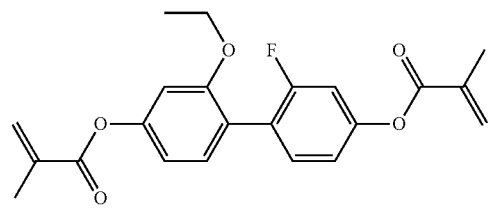 [SMILES: C=C(C)C(=O)Oc1ccc(-c2ccc(OC(=O)C(=C)C)cc2OCC)c(F)c1] RM-42

TABLE F-continued
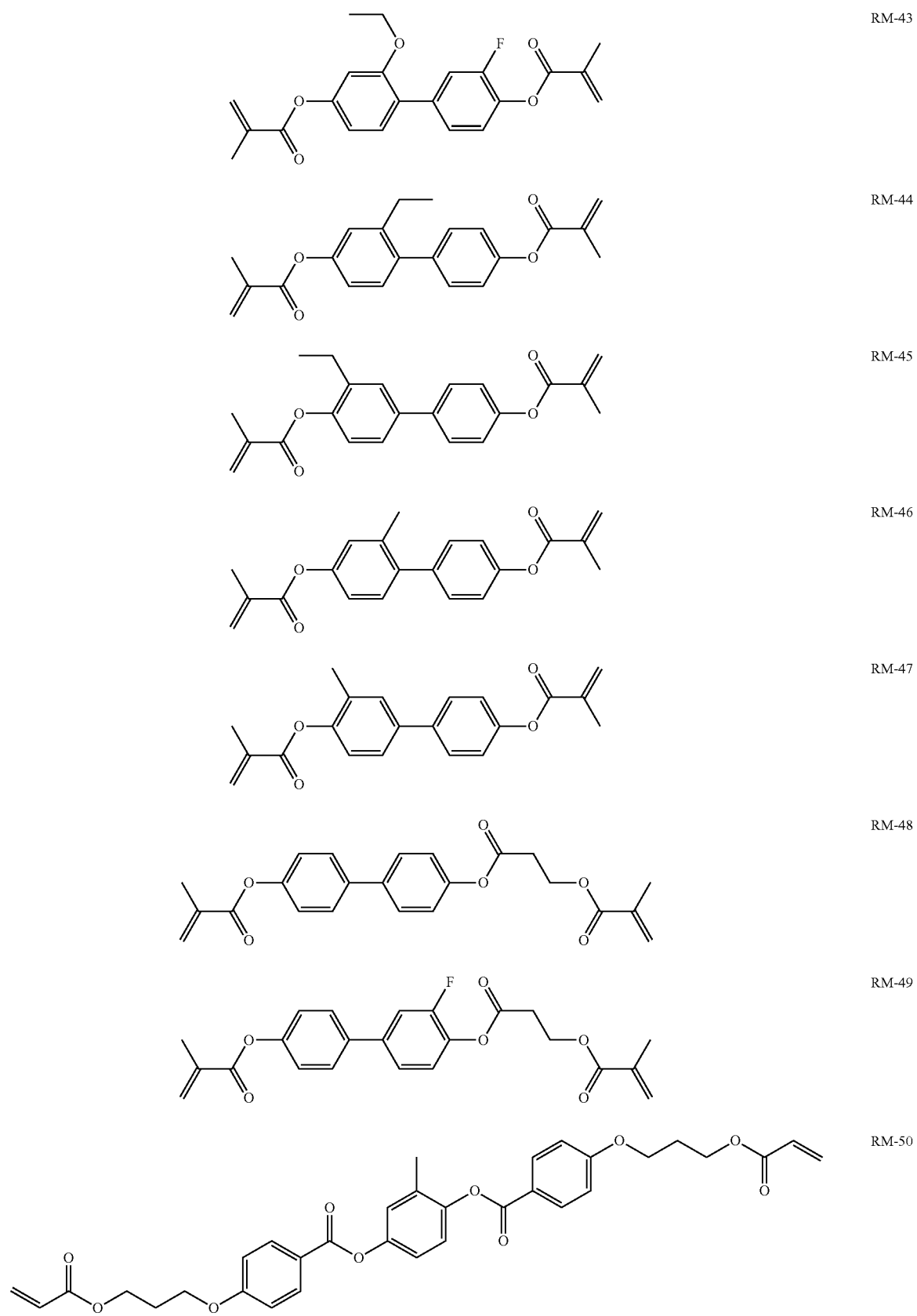

TABLE F-continued
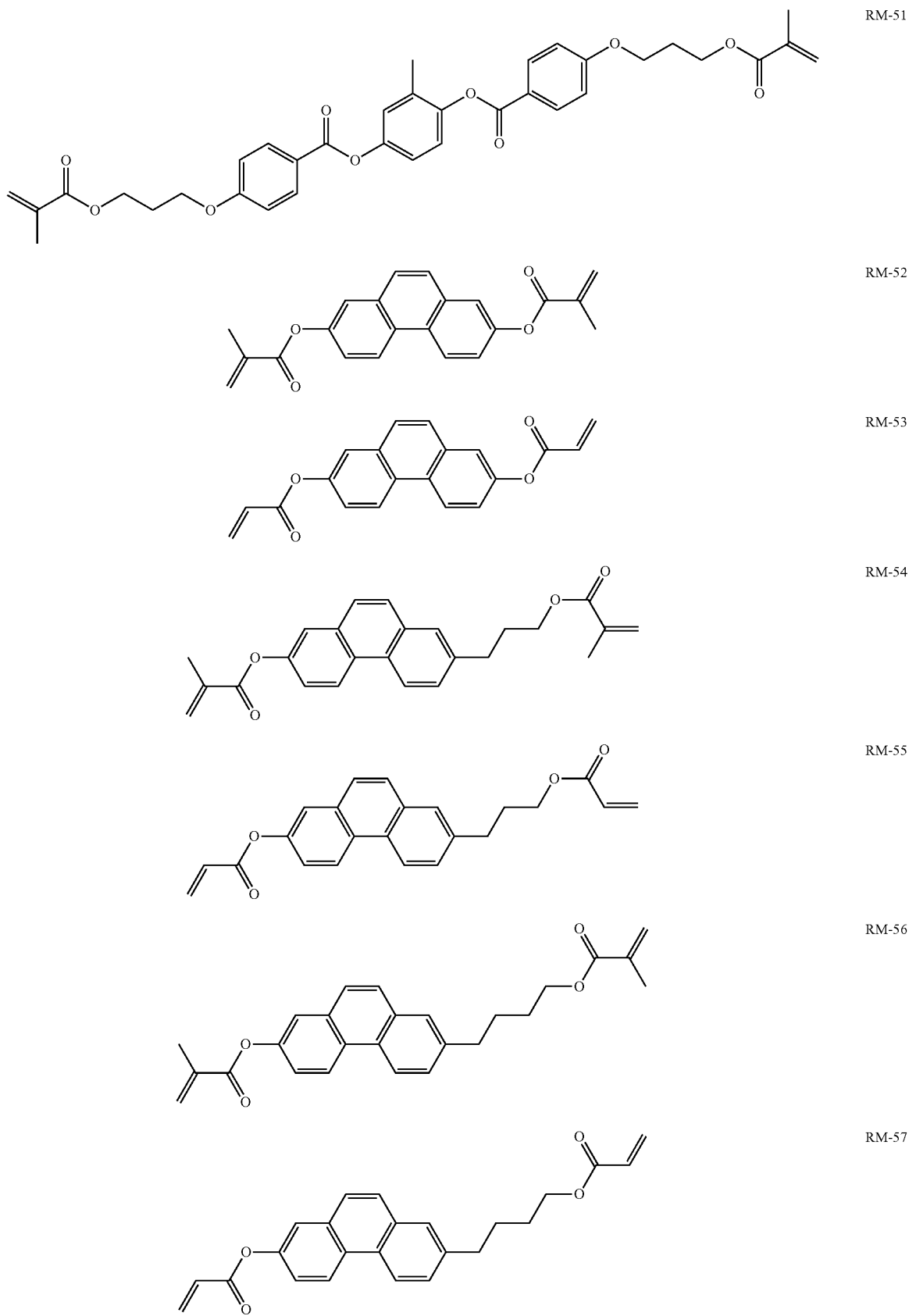

TABLE F-continued
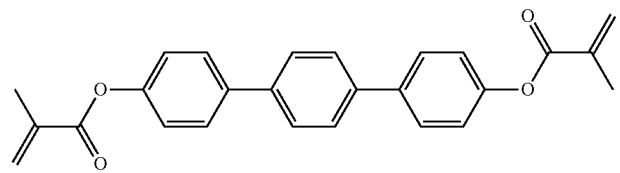 [SMILES: C=C(C)C(=O)Oc1ccc(-c2ccc(-c3ccc(OC(=O)C(=C)C)cc3)cc2)cc1] RM-58
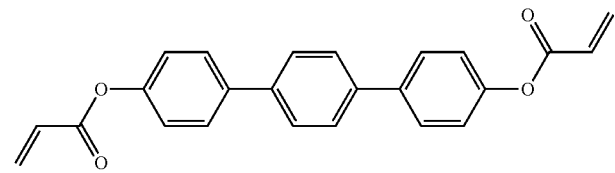 RM-59
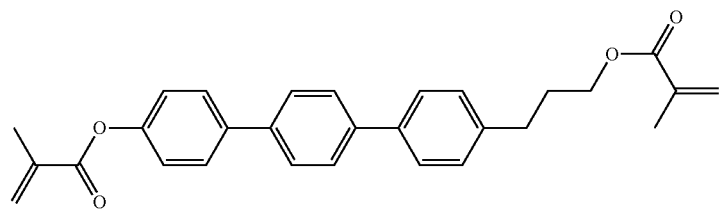 [SMILES: C=C(C)C(=O)OCCCc1ccc(-c2ccc(-c3ccc(OC(=O)C(=C)C)cc3)cc2)cc1] RM-60
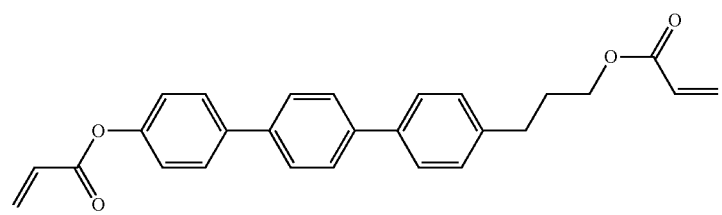 [SMILES: C=CC(=O)OCCCc1ccc(-c2ccc(-c3ccc(OC(=O)C=C)cc3)cc2)cc1] RM-61
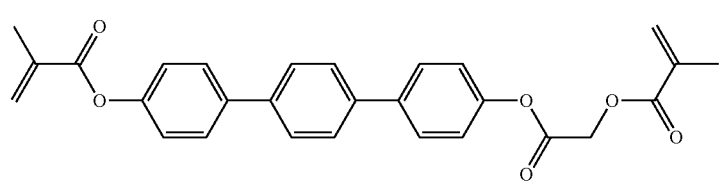 [SMILES: C=C(C)C(=O)OCC(=O)Oc1ccc(-c2ccc(-c3ccc(OC(=O)C(=C)C)cc3)cc2)cc1] RM-62
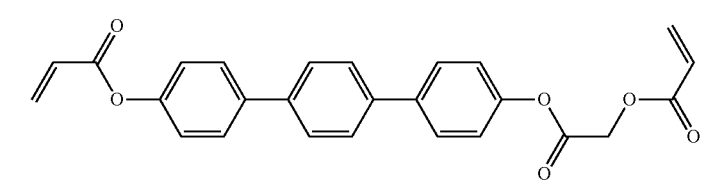 [SMILES: C=CC(=O)OCC(=O)Oc1ccc(-c2ccc(-c3ccc(OC(=O)C=C)cc3)cc2)cc1] RM-63
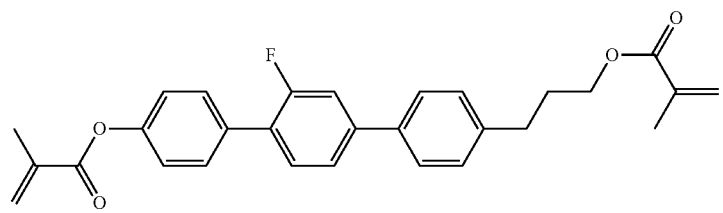 [SMILES: C=C(C)C(=O)OCCCc1ccc(-c2ccc(-c3ccc(OC(=O)C(=C)C)cc3)c(F)c2)cc1] RM-64
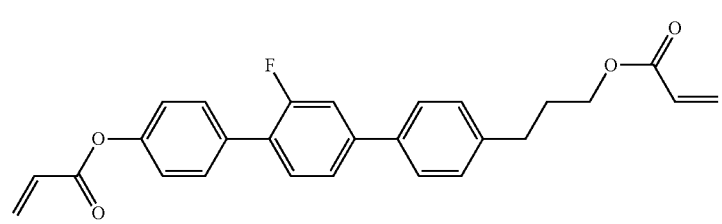 [SMILES: C=CC(=O)OCCCc1ccc(-c2ccc(-c3ccc(OC(=O)C=C)cc3)c(F)c2)cc1] RM-65

TABLE F-continued
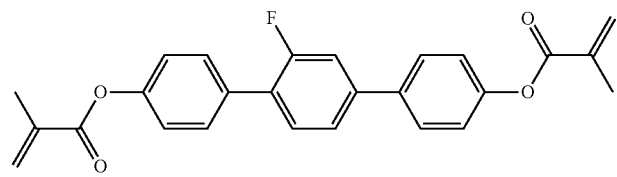 RM-66
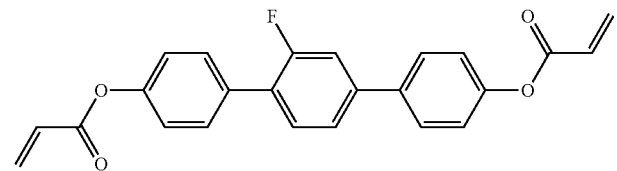 [SMILES: C=CC(=O)Oc1ccc(-c2ccc(-c3ccc(OC(=O)C=C)cc3)c(F)c2)cc1] RM-67
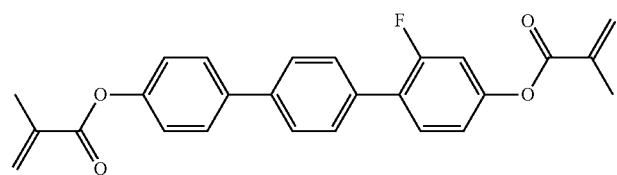 [SMILES: C=C(C)C(=O)Oc1ccc(-c2ccc(-c3ccc(OC(=O)C(=C)C)cc3F)cc2)cc1] RM-68
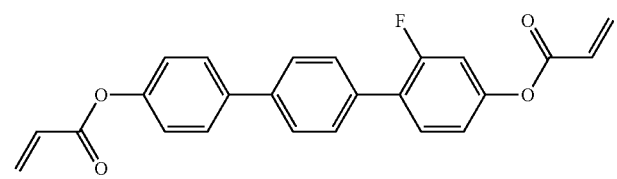 RM-69
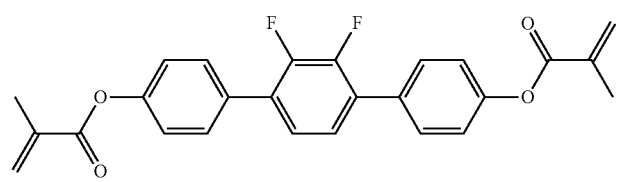 [SMILES: C=C(C)C(=O)Oc1ccc(-c2ccc(-c3ccc(OC(=O)C(=C)C)cc3)c(F)c2F)cc1] RM-70
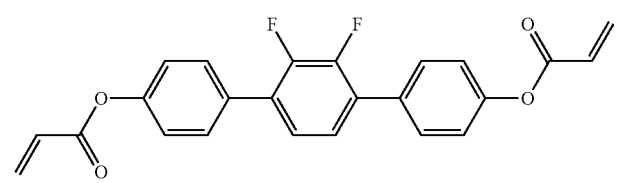 [SMILES: C=CC(=O)Oc1ccc(-c2ccc(-c3ccc(OC(=O)C=C)cc3)c(F)c2F)cc1] RM-71
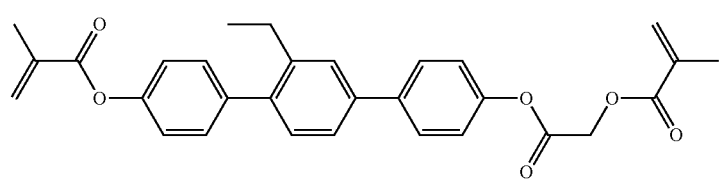 [SMILES: C=C(C)C(=O)OCC(=O)Oc1ccc(-c2ccc(-c3ccc(OC(=O)C(=C)C)cc3)c(CC)c2)cc1] RM-72
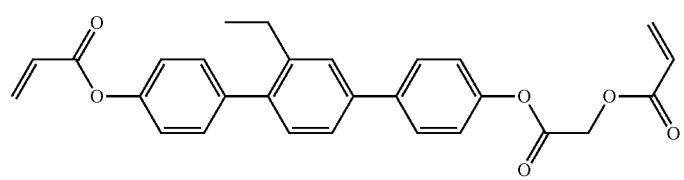 [SMILES: C=CC(=O)OCC(=O)Oc1ccc(-c2ccc(-c3ccc(OC(=O)C=C)cc3)c(CC)c2)cc1] RM-73
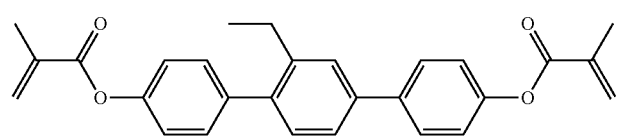 RM-74

TABLE F-continued
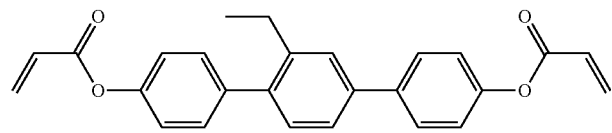 [SMILES: C=CC(=O)Oc1ccc(-c2ccc(-c3ccc(OC(=O)C=C)cc3)c(CC)c2)cc1] RM-75
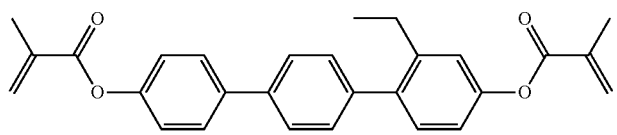 RM-76
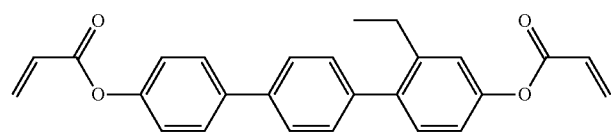 [SMILES: C=CC(=O)Oc1ccc(-c2ccc(-c3ccc(OC(=O)C=C)cc3CC)cc2)cc1] RM-77
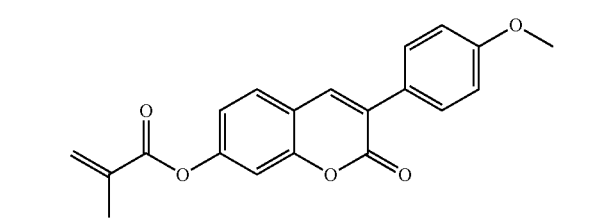 [SMILES: C=C(C)C(=O)Oc1ccc2cc(-c3ccc(OC)cc3)c(=O)oc2c1] RM-78
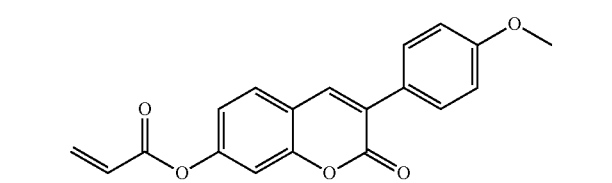 [SMILES: C=CC(=O)Oc1ccc2cc(-c3ccc(OC)cc3)c(=O)oc2c1] RM-79
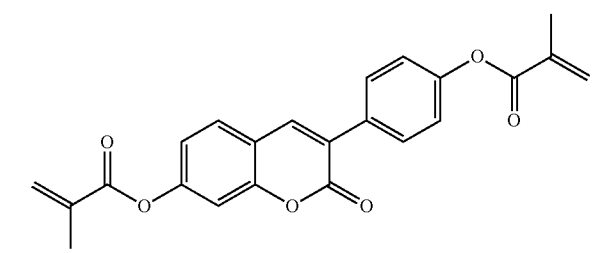 [SMILES: C=C(C)C(=O)Oc1ccc(-c2cc3ccc(OC(=O)C(=C)C)cc3oc2=O)cc1] RM-80
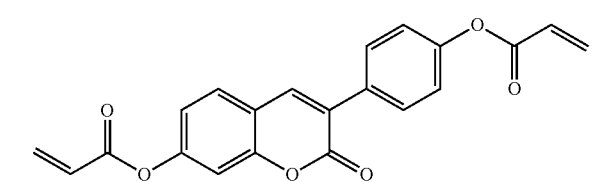 [SMILES: C=CC(=O)Oc1ccc(-c2cc3ccc(OC(=O)C=C)cc3oc2=O)cc1] RM-81
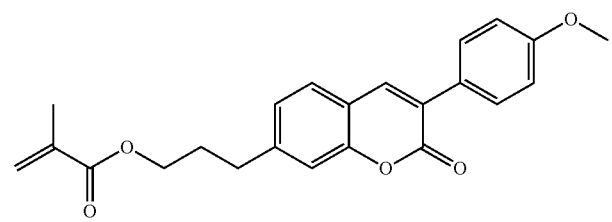 [SMILES: C=C(C)C(=O)OCCCc1ccc2cc(-c3ccc(OC)cc3)c(=O)oc2c1] RM-82

TABLE F-continued
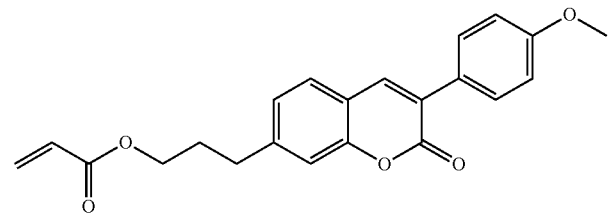 [SMILES: C=CC(=O)OCCCc1ccc2cc(-c3ccc(OC)cc3)c(=O)oc2c1]
RM-83
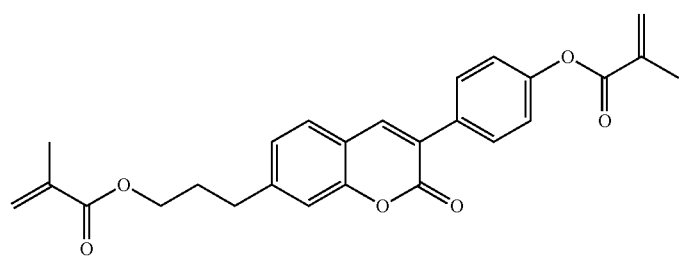 [SMILES: C=C(C)C(=O)OCCCc1ccc2cc(-c3ccc(OC(=O)C(=C)C)cc3)c(=O)oc2c1]
RM-84
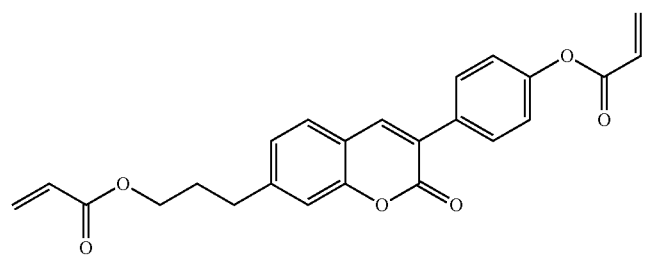 [SMILES: C=CC(=O)OCCCc1ccc2cc(-c3ccc(OC(=O)C=C)cc3)c(=O)oc2c1]
RM-85
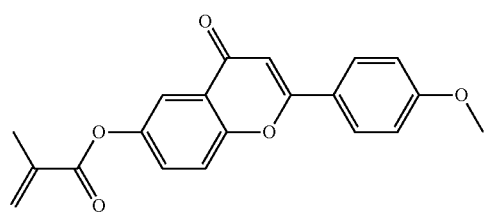 [SMILES: C=C(C)C(=O)Oc1ccc2oc(-c3ccc(OC)cc3)cc(=O)c2c1]
RM-86
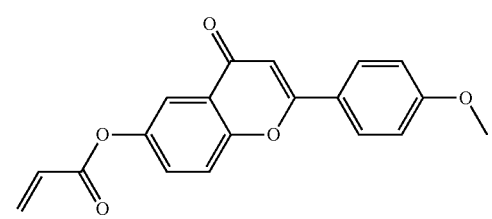 [SMILES: C=CC(=O)Oc1ccc2oc(-c3ccc(OC)cc3)cc(=O)c2c1]
RM-87
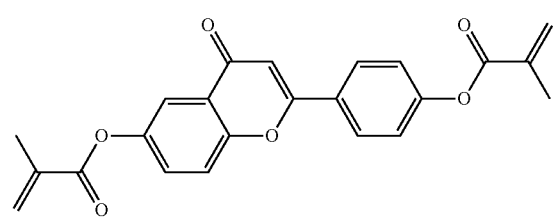 [SMILES: C=C(C)C(=O)Oc1ccc(-c2cc(=O)c3cc(OC(=O)C(=C)C)ccc3o2)cc1]
RM-88
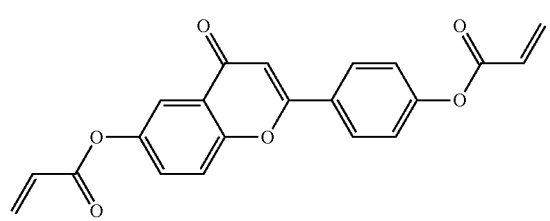 [SMILES: C=CC(=O)Oc1ccc(-c2cc(=O)c3cc(OC(=O)C=C)ccc3o2)cc1]
RM-89

TABLE F-continued
RM-90
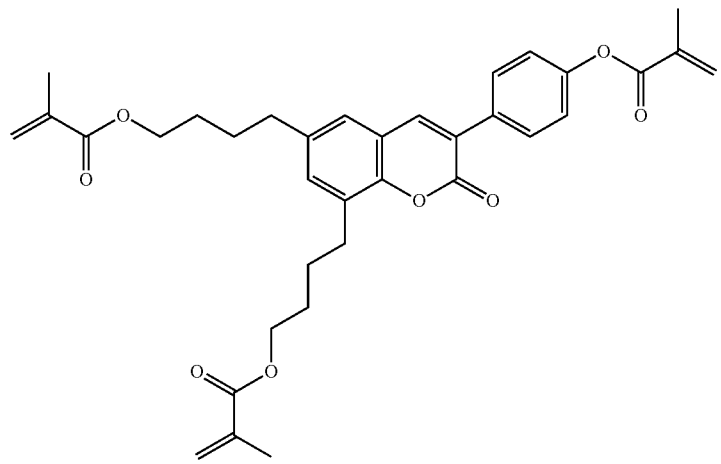 [SMILES: C=C(C)C(=O)OCCCCc1cc(CCCCOC(=O)C(=C)C)c2oc(=O)c(-c3ccc(OC(=O)C(=C)C)cc3)cc2c1]
RM-91
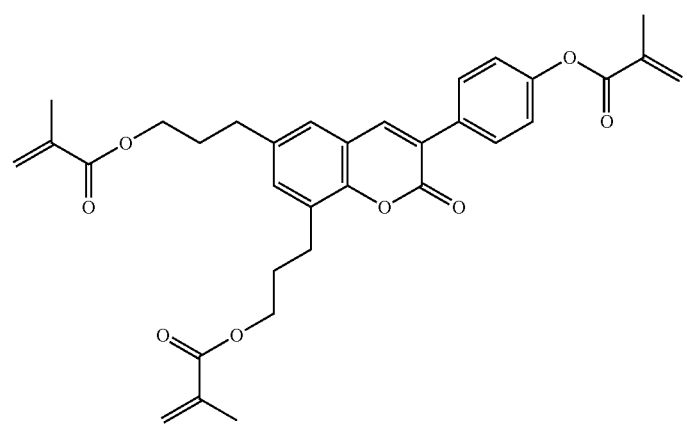 [SMILES: C=C(C)C(=O)OCCCc1cc(CCCOC(=O)C(=C)C)c2oc(=O)c(-c3ccc(OC(=O)C(=C)C)cc3)cc2c1]
RM-92
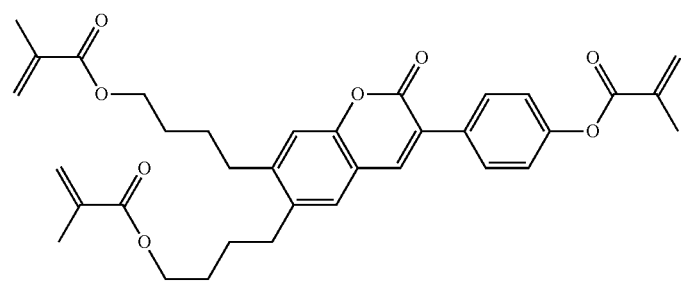 [SMILES: C=C(C)C(=O)OCCCCc1cc2cc(-c3ccc(OC(=O)C(=C)C)cc3)c(=O)oc2cc1CCCCOC(=O)C(=C)C]
RM-93
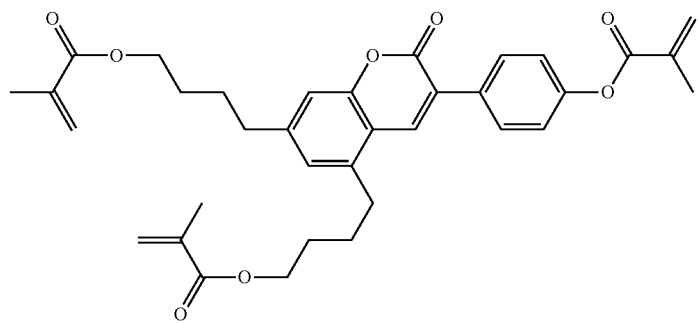 [SMILES: C=C(C)C(=O)OCCCCc1cc(CCCCOC(=O)C(=C)C)c2cc(-c3ccc(OC(=O)C(=C)C)cc3)c(=O)oc2c1]

TABLE F-continued
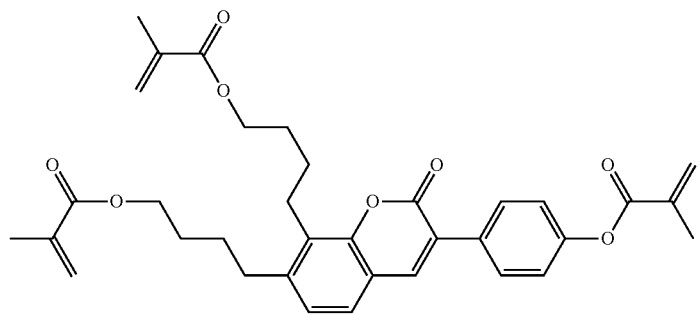 [SMILES: C=C(C)C(=O)OCCCCc1ccc2cc(-c3ccc(OC(=O)C(=C)C)cc3)c(=O)oc2c1CCCCOC(=O)C(=C)C]
RM-94
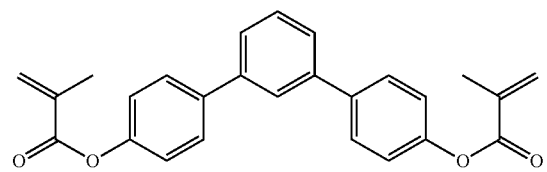 [SMILES: C=C(C)C(=O)Oc1ccc(-c2cccc(-c3ccc(OC(=O)C(=C)C)cc3)c2)cc1]
RM-95
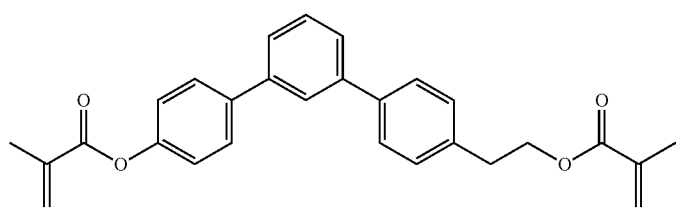 [SMILES: C=C(C)C(=O)OCCc1ccc(-c2cccc(-c3ccc(OC(=O)C(=C)C)cc3)c2)cc1]
RM-96
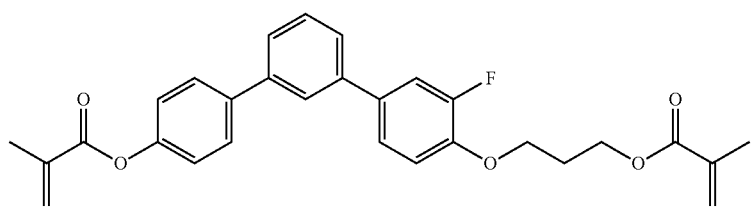 [SMILES: C=C(C)C(=O)OCCCOc1ccc(-c2cccc(-c3ccc(OC(=O)C(=C)C)cc3)c2)cc1F]
RM-97
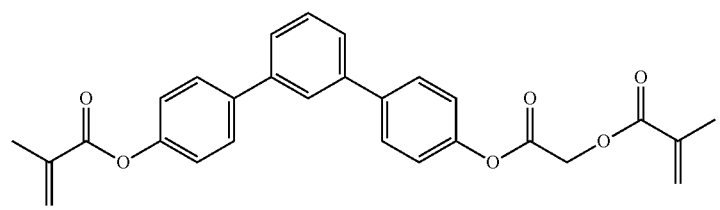 [SMILES: C=C(C)C(=O)OCC(=O)Oc1ccc(-c2cccc(-c3ccc(OC(=O)C(=C)C)cc3)c2)cc1]
RM-98
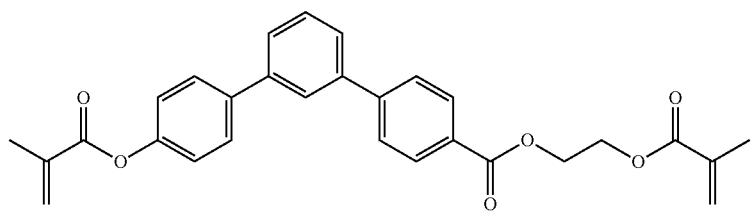 [SMILES: C=C(C)C(=O)OCCOC(=O)c1ccc(-c2cccc(-c3ccc(OC(=O)C(=C)C)cc3)c2)cc1]
RM-99

TABLE F-continued
RM-100
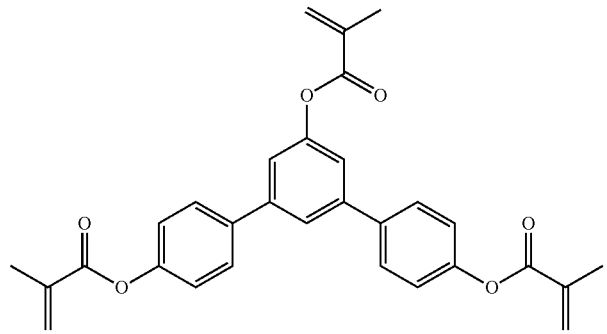 [SMILES: C=C(C)C(=O)Oc1ccc(-c2cc(OC(=O)C(=C)C)cc(-c3ccc(OC(=O)C(=C)C)cc3)c2)cc1]
RM-101
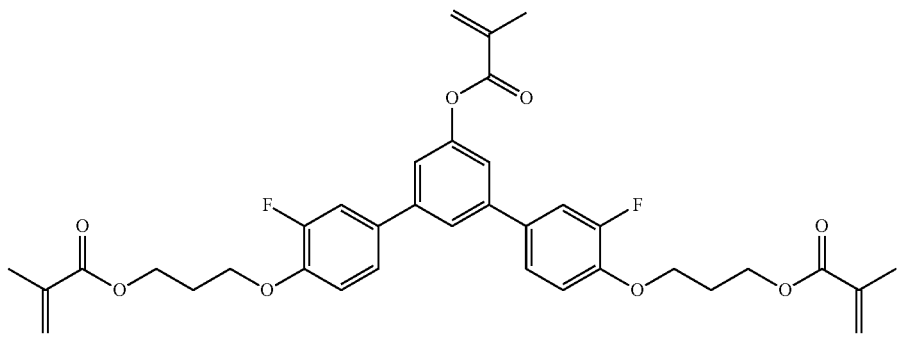 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-102
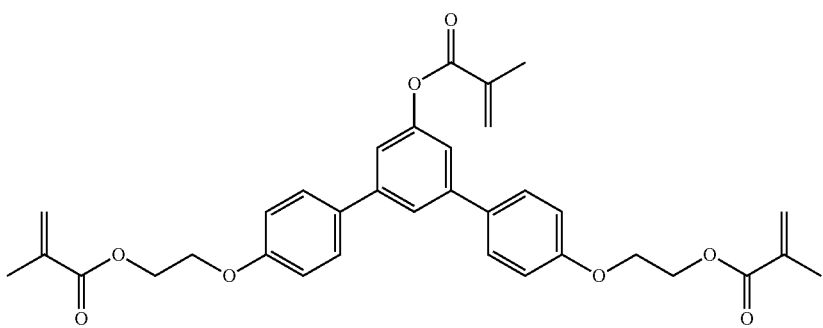 [SMILES: C=C(C)C(=O)OCCOc1ccc(-c2cc(OC(=O)C(=C)C)cc(-c3ccc(OCCOC(=O)C(=C)C)cc3)c2)cc1]
RM-103
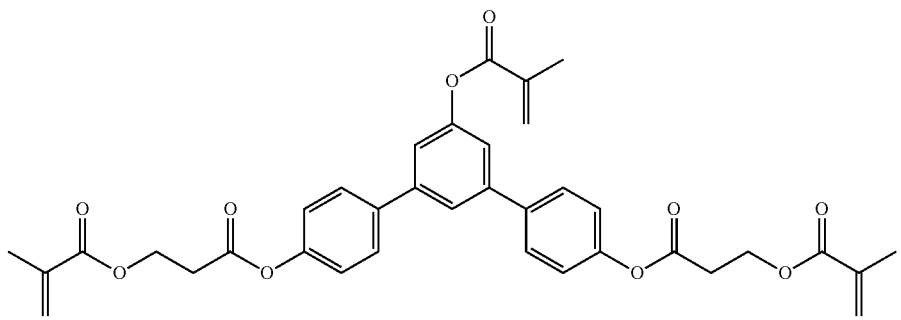 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]

TABLE F-continued
RM-104
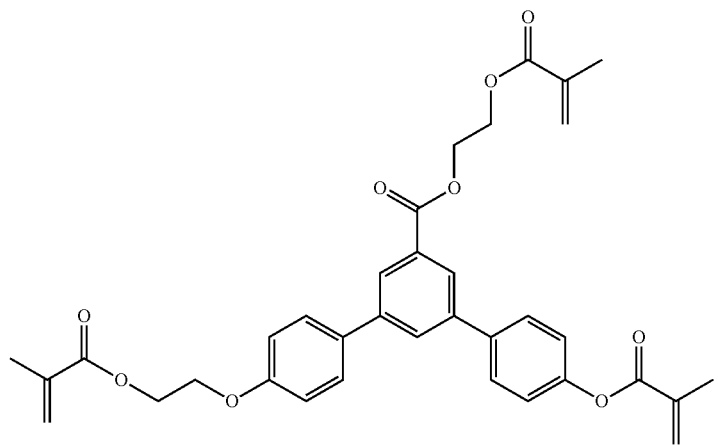 [SMILES: C=C(C)C(=O)OCCOC(=O)c1cc(-c2ccc(OCCOC(=O)C(=C)C)cc2)cc(-c2ccc(OC(=O)C(=C)C)cc2)c1]
RM-105
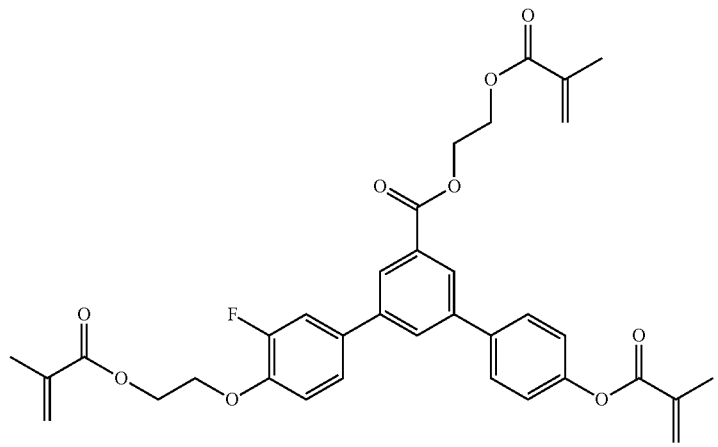 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]
RM-106
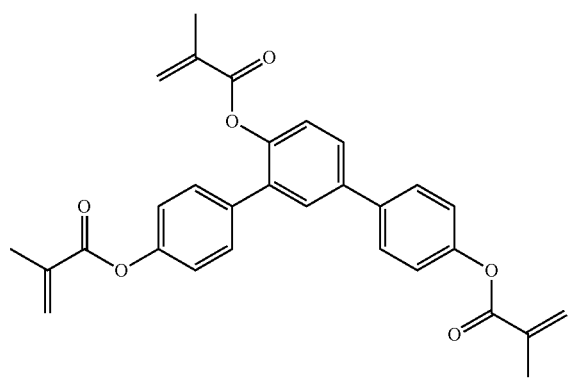 [SMILES: C=C(C)C(=O)Oc1ccc(-c2ccc(OC(=O)C(=C)C)c(-c3ccc(OC(=O)C(=C)C)cc3)c2)cc1]

TABLE F-continued
RM-107
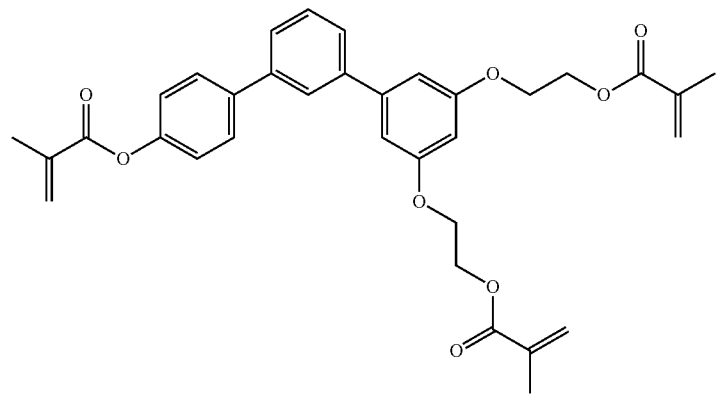 [SMILES: C=C(C)C(=O)OCCOc1cc(OCCOC(=O)C(=C)C)cc(-c2cccc(-c3ccc(OC(=O)C(=C)C)cc3)c2)c1]
RM-108
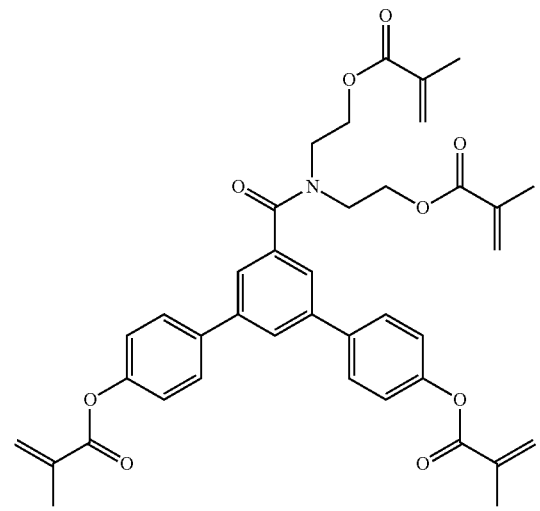 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]
RM-109
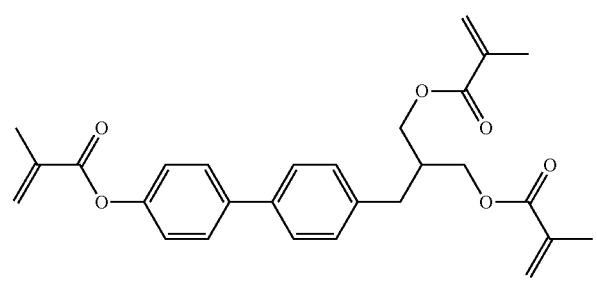
RM-110
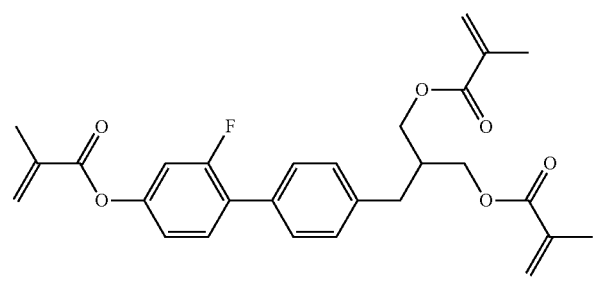 [SMILES: C=C(C)C(=O)OCC(COC(=O)C(=C)C)Cc1ccc(-c2ccc(OC(=O)C(=C)C)cc2F)cc1]

TABLE F-continued
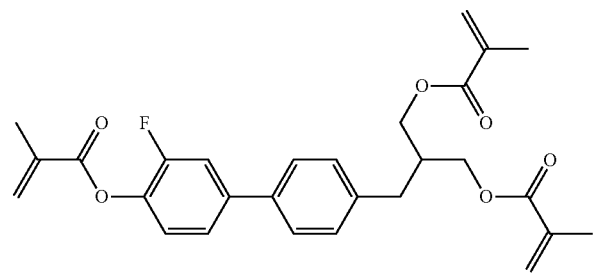 [SMILES: C=C(C)C(=O)OCC(COC(=O)C(=C)C)Cc1ccc(-c2ccc(OC(=O)C(=C)C)c(F)c2)cc1]
RM-111
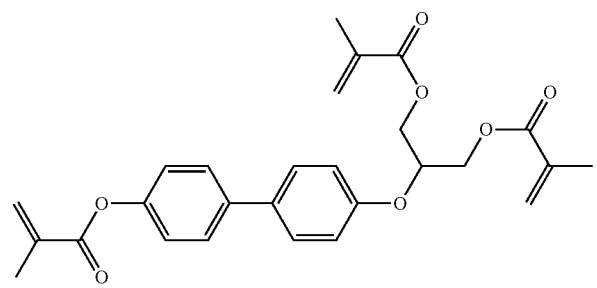 [SMILES: C=C(C)C(=O)OCC(COC(=O)C(=C)C)Oc1ccc(-c2ccc(OC(=O)C(=C)C)cc2)cc1]
RM-112
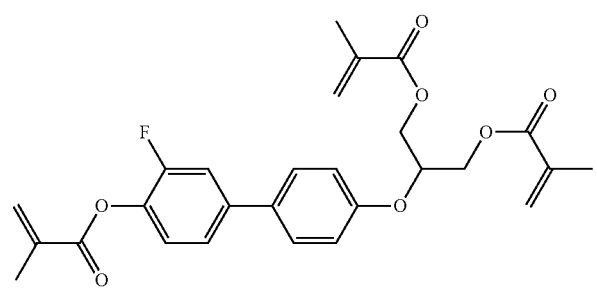 [SMILES: C=C(C)C(=O)OCC(COC(=O)C(=C)C)Oc1ccc(-c2ccc(OC(=O)C(=C)C)c(F)c2)cc1]
RM-113
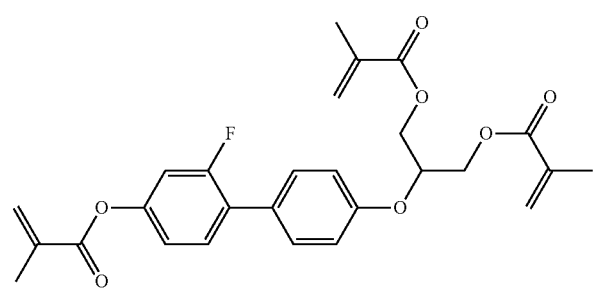 [SMILES: C=C(C)C(=O)OCC(COC(=O)C(=C)C)Oc1ccc(-c2ccc(OC(=O)C(=C)C)cc2F)cc1]
RM-114
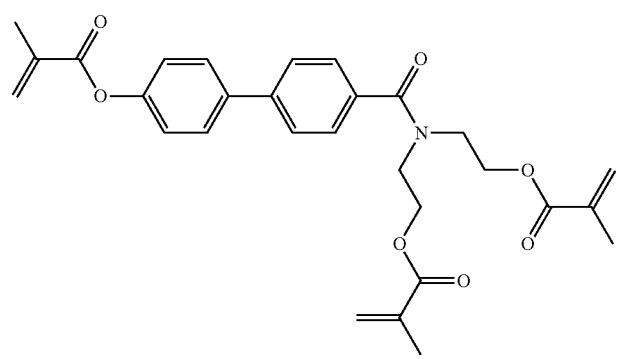 [SMILES: C=C(C)C(=O)OCCN(CCOC(=O)C(=C)C)C(=O)c1ccc(-c2ccc(OC(=O)C(=C)C)cc2)cc1]
RM-115

TABLE F-continued
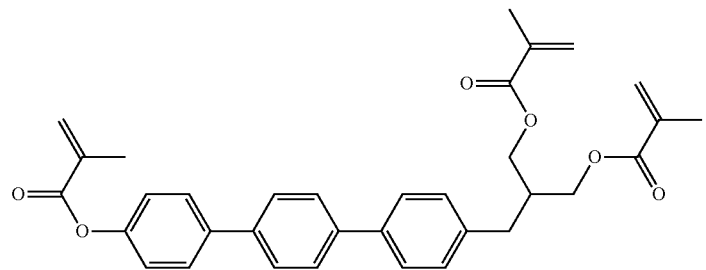 [SMILES: C=C(C)C(=O)OCC(COC(=O)C(=C)C)Cc1ccc(-c2ccc(-c3ccc(OC(=O)C(=C)C)cc3)cc2)cc1]
RM-116
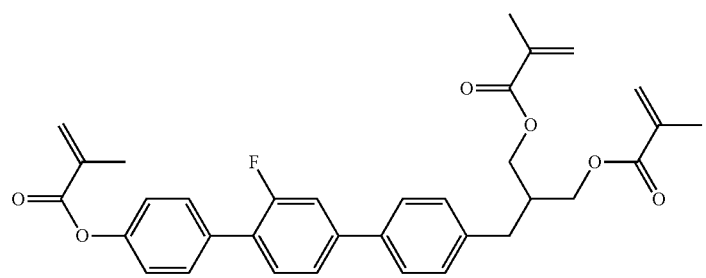 [SMILES: C=C(C)C(=O)OCC(COC(=O)C(=C)C)Cc1ccc(-c2ccc(-c3ccc(OC(=O)C(=C)C)cc3)c(F)c2)cc1]
RM-117
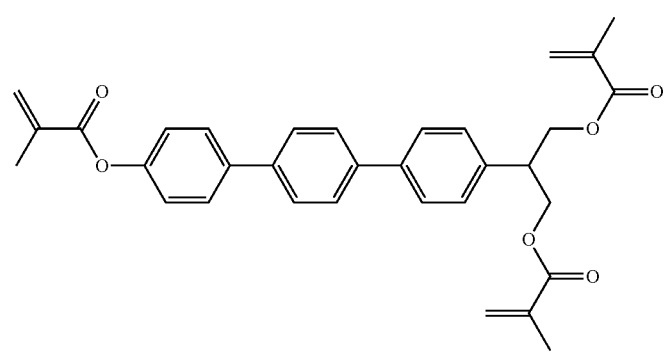 [SMILES: C=C(C)C(=O)OCC(COC(=O)C(=C)C)c1ccc(-c2ccc(-c3ccc(OC(=O)C(=C)C)cc3)cc2)cc1]
RM-118
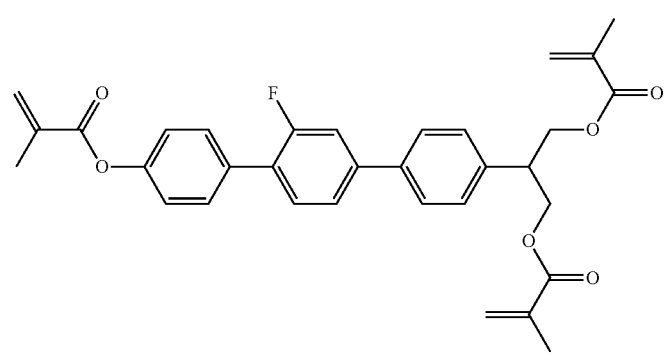 [SMILES: C=C(C)C(=O)OCC(COC(=O)C(=C)C)c1ccc(-c2ccc(-c3ccc(OC(=O)C(=C)C)cc3)c(F)c2)cc1]
RM-119
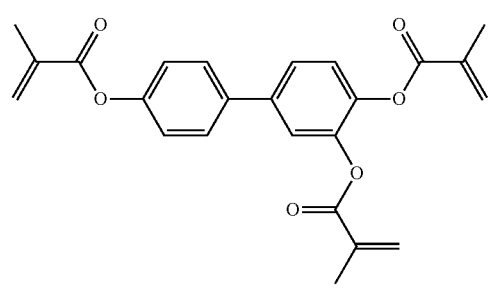 [SMILES: C=C(C)C(=O)Oc1ccc(-c2ccc(OC(=O)C(=C)C)c(OC(=O)C(=C)C)c2)cc1]
RM-120

TABLE F-continued
RM-121
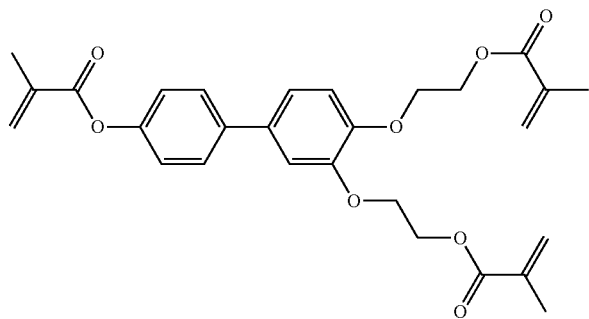 [SMILES: C=C(C)C(=O)OCCOc1ccc(-c2ccc(OC(=O)C(=C)C)cc2)cc1OCCOC(=O)C(=C)C]
RM-122
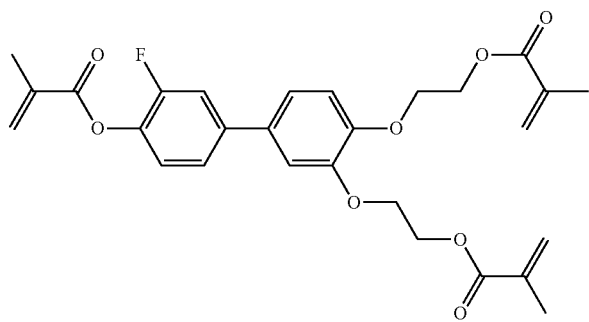 [SMILES: C=C(C)C(=O)OCCOc1ccc(-c2ccc(OC(=O)C(=C)C)c(F)c2)cc1OCCOC(=O)C(=C)C]
RM-123
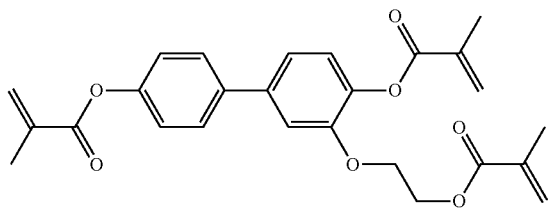
RM-124
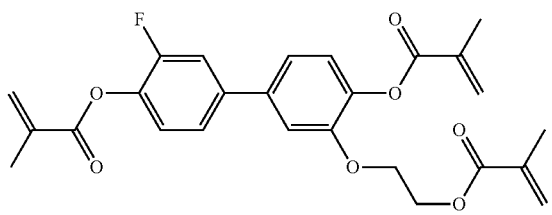 [SMILES: C=C(C)C(=O)OCCOc1cc(-c2ccc(OC(=O)C(=C)C)cc2)ccc1OC(=O)C(=C)C]
RM-125
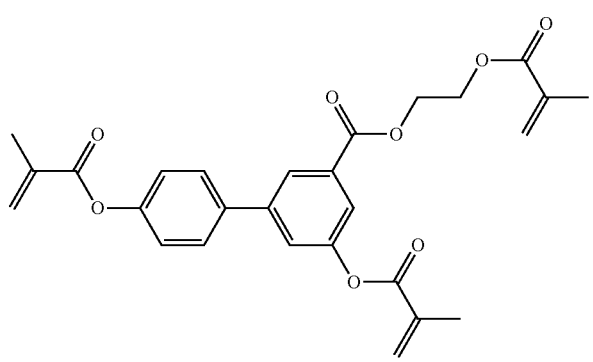 [SMILES: C=C(C)C(=O)OCCOC(=O)c1cc(OC(=O)C(=C)C)cc(-c2ccc(OC(=O)C(=C)C)cc2)c1]

TABLE F-continued
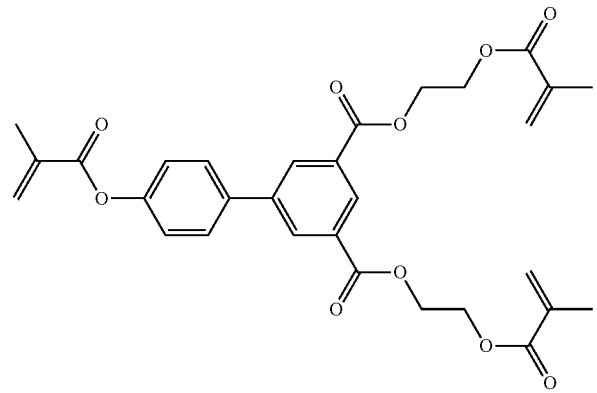 [SMILES: C=C(C)C(=O)OCCOC(=O)c1cc(C(=O)OCCOC(=O)C(=C)C)cc(-c2ccc(OC(=O)C(=C)C)cc2)c1]
RM-126
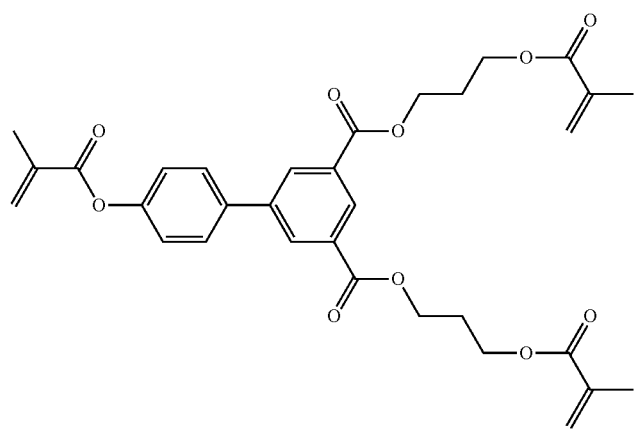 [SMILES: C=C(C)C(=O)OCCCOC(=O)c1cc(C(=O)OCCCOC(=O)C(=C)C)cc(-c2ccc(OC(=O)C(=C)C)cc2)c1]
RM-127
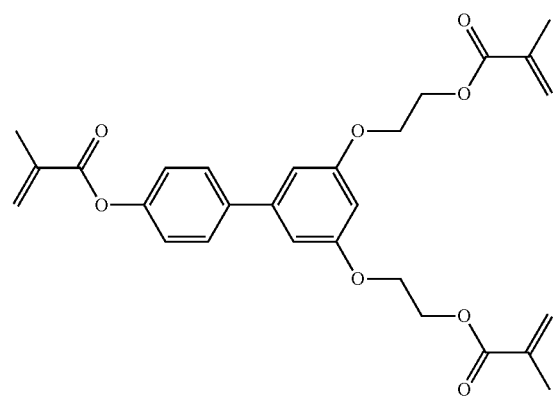 [SMILES: C=C(C)C(=O)OCCOc1cc(OCCOC(=O)C(=C)C)cc(-c2ccc(OC(=O)C(=C)C)cc2)c1]
RM-128
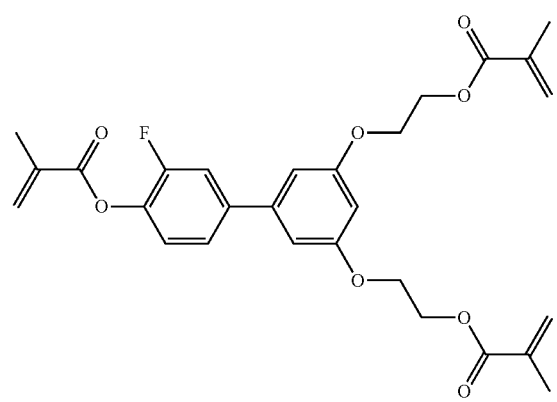 [SMILES: C=C(C)C(=O)OCCOc1cc(OCCOC(=O)C(=C)C)cc(-c2ccc(OC(=O)C(=C)C)c(F)c2)c1]
RM-129

TABLE F-continued
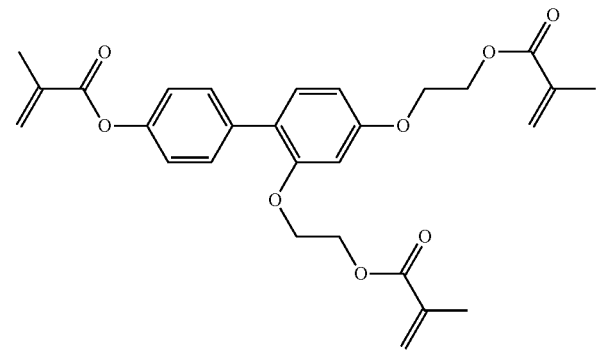 [SMILES: C=C(C)C(=O)OCCOc1ccc(-c2ccc(OC(=O)C(=C)C)cc2)c(OCCOC(=O)C(=C)C)c1]
RM-130
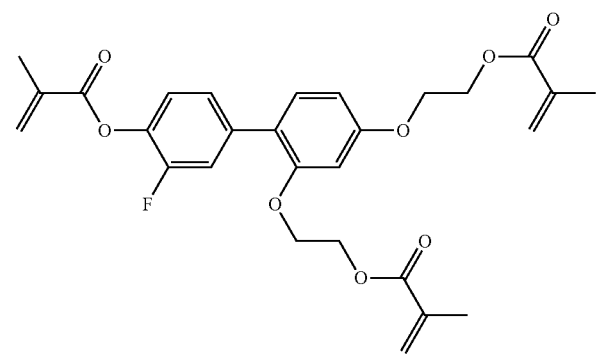 [SMILES: C=C(C)C(=O)OCCOc1ccc(-c2ccc(OC(=O)C(=C)C)c(F)c2)c(OCCOC(=O)C(=C)C)c1]
RM-131
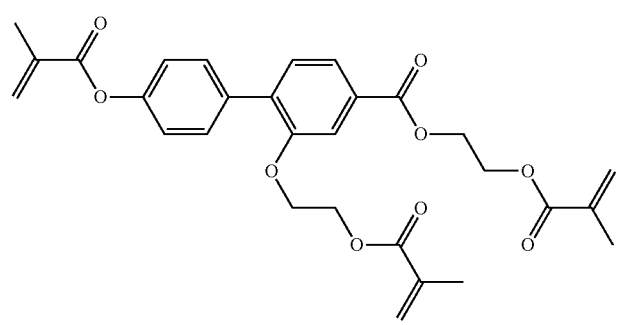 [SMILES: C=C(C)C(=O)OCCOC(=O)c1ccc(-c2ccc(OC(=O)C(=C)C)cc2)c(OCCOC(=O)C(=C)C)c1]
RM-132
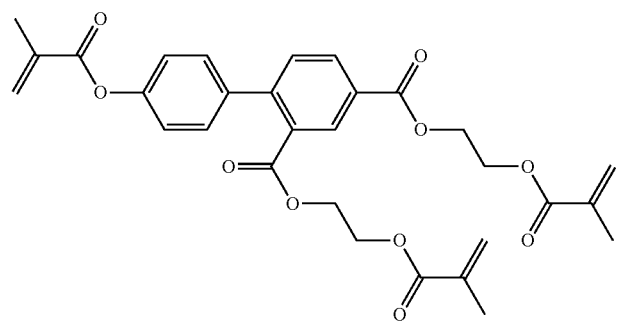 [SMILES: C=C(C)C(=O)OCCOC(=O)c1ccc(-c2ccc(OC(=O)C(=C)C)cc2)c(C(=O)OCCOC(=O)C(=C)C)c1]
RM-133
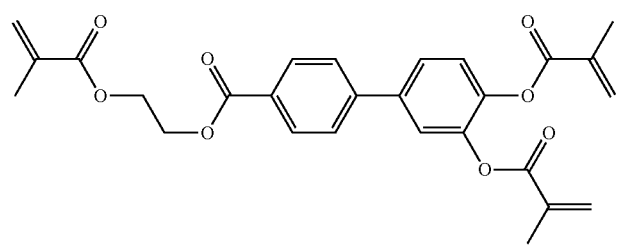 [SMILES: C=C(C)C(=O)OCCOC(=O)c1ccc(-c2ccc(OC(=O)C(=C)C)c(OC(=O)C(=C)C)c2)cc1]
RM-134

TABLE F-continued
RM-135
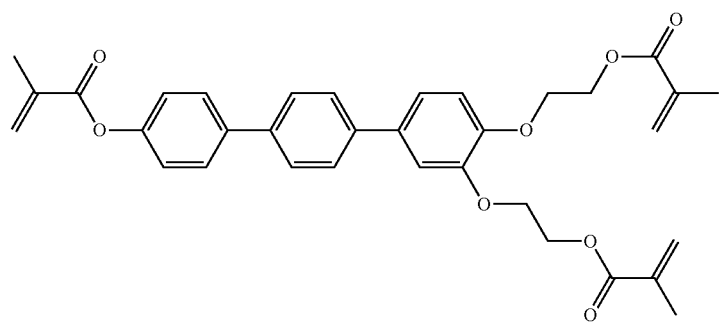 [SMILES: C=C(C)C(=O)OCCOc1ccc(-c2ccc(-c3ccc(OC(=O)C(=C)C)cc3)c(F)c2)cc1OCCOC(=O)C(=C)C]
RM-136
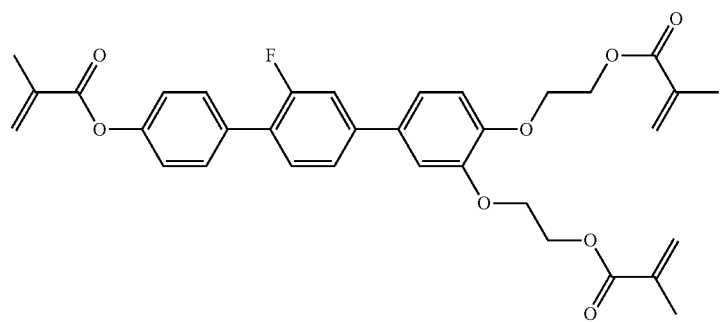
RM-137
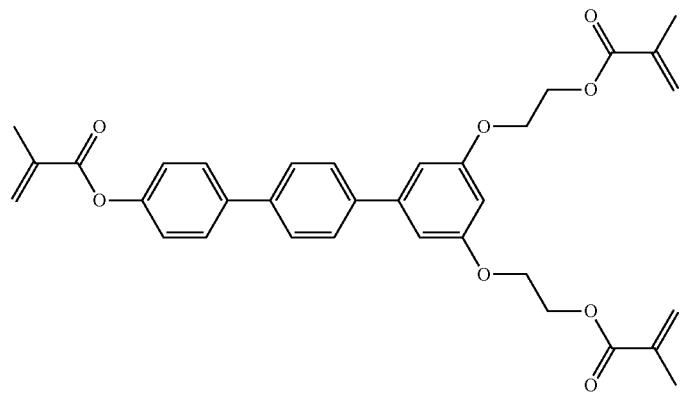 [SMILES: C=C(C)C(=O)OCCOc1cc(OCCOC(=O)C(=C)C)cc(-c2ccc(-c3ccc(OC(=O)C(=C)C)cc3)cc2)c1]
RM-138
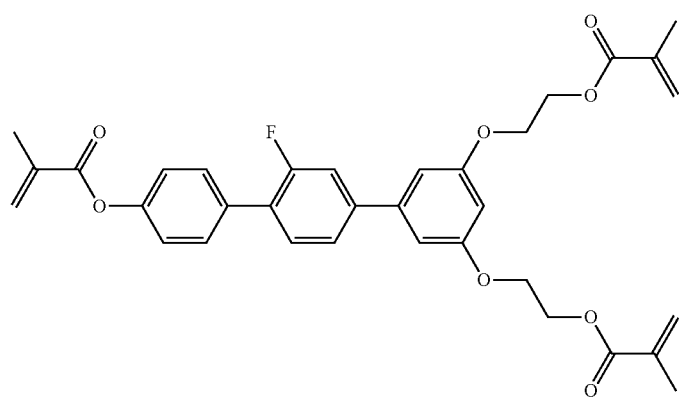 [SMILES: C=C(C)C(=O)OCCOc1cc(OCCOC(=O)C(=C)C)cc(-c2ccc(-c3ccc(OC(=O)C(=C)C)cc3)c(F)c2)c1]

TABLE F-continued
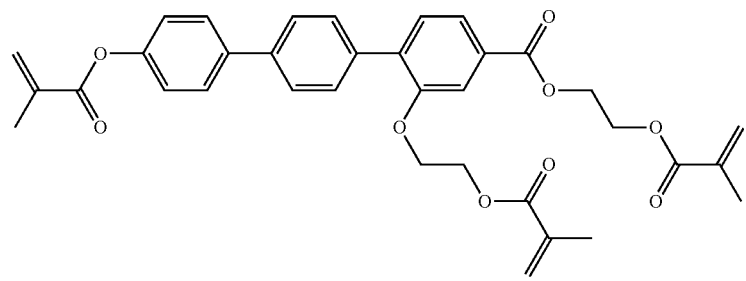 [SMILES: C=C(C)C(=O)OCCOC(=O)c1ccc(-c2ccc(-c3ccc(OC(=O)C(=C)C)cc3)cc2)c(OCCOC(=O)C(=C)C)c1]
RM-139
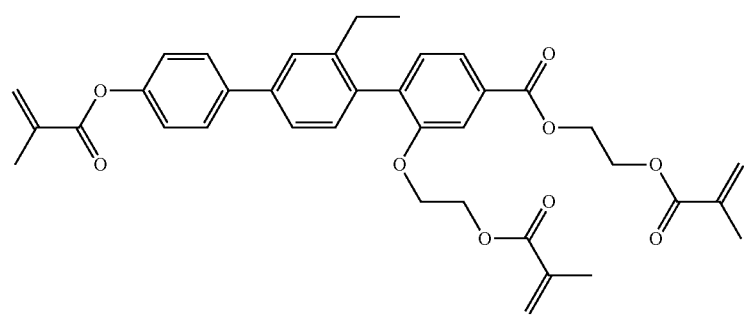 [SMILES: C=C(C)C(=O)OCCOC(=O)c1ccc(-c2ccc(-c3ccc(OC(=O)C(=C)C)cc3)cc2CC)c(OCCOC(=O)C(=C)C)c1]
RM-140
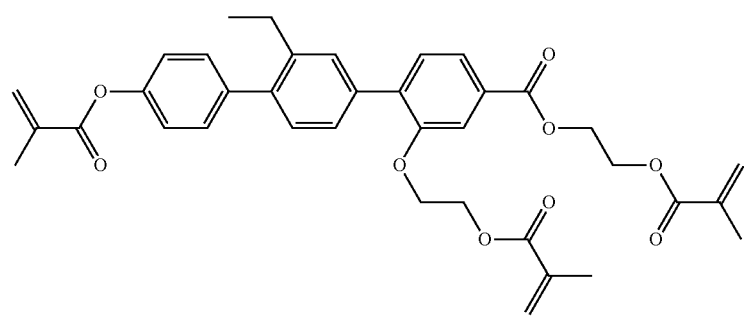 [SMILES: C=C(C)C(=O)OCCOC(=O)c1ccc(-c2ccc(-c3ccc(OC(=O)C(=C)C)cc3)c(CC)c2)c(OCCOC(=O)C(=C)C)c1]
RM-141
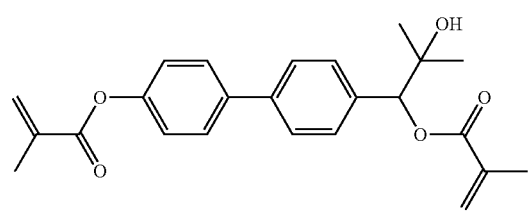 [SMILES: C=C(C)C(=O)Oc1ccc(-c2ccc(C(OC(=O)C(=C)C)C(C)(C)O)cc2)cc1]
RM-142
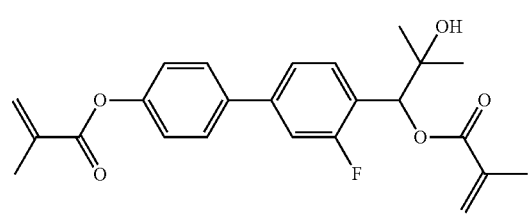 [SMILES: C=C(C)C(=O)Oc1ccc(-c2ccc(C(OC(=O)C(=C)C)C(C)(C)O)c(F)c2)cc1]
RM-143
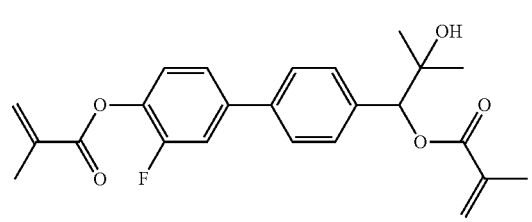
RM-144

TABLE F-continued
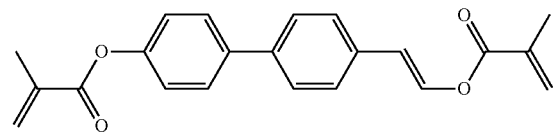 [SMILES: C=C(C)C(=O)O/C=C/c1ccc(-c2ccc(OC(=O)C(=C)C)cc2)cc1]
RM-145
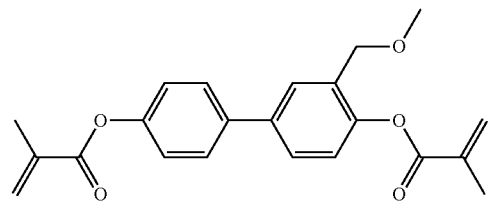 [SMILES: C=C(C)C(=O)Oc1ccc(-c2ccc(OC(=O)C(=C)C)c(COC)c2)cc1]
RM-146
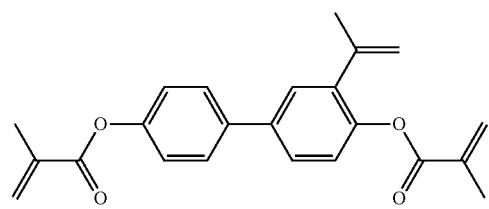 [SMILES: C=C(C)C(=O)Oc1ccc(-c2ccc(OC(=O)C(=C)C)c(C(=C)C)c2)cc1]
RM-147
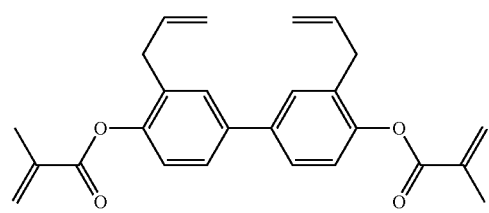 [SMILES: C=CCc1cc(-c2ccc(OC(=O)C(=C)C)c(CC=C)c2)ccc1OC(=O)C(=C)C]
RM-148
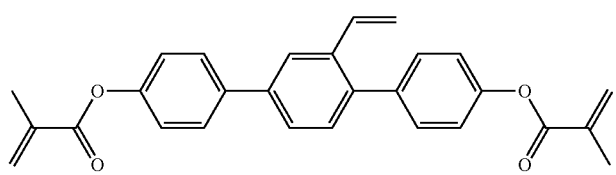 [SMILES: C=Cc1cc(-c2ccc(OC(=O)C(=C)C)cc2)ccc1-c1ccc(OC(=O)C(=C)C)cc1]
RM-149
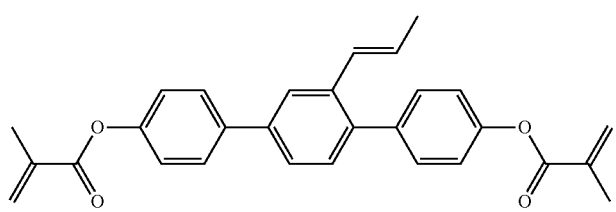 [SMILES: C=C(C)C(=O)Oc1ccc(-c2ccc(-c3ccc(OC(=O)C(=C)C)cc3)c(/C=C/C)c2)cc1]
RM-150
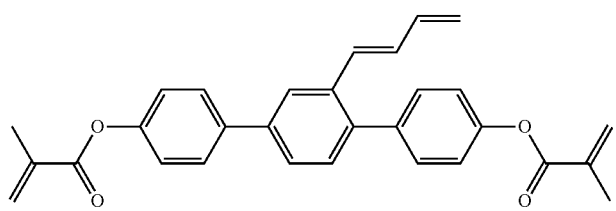 [SMILES: C=C/C=C/c1cc(-c2ccc(OC(=O)C(=C)C)cc2)ccc1-c1ccc(OC(=O)C(=C)C)cc1]
RM-151
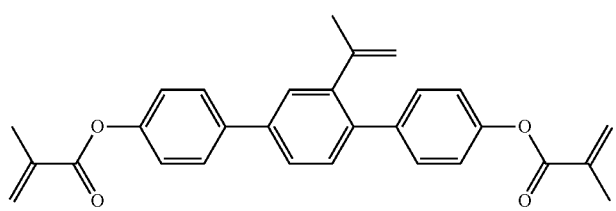 [SMILES: C=C(C)C(=O)Oc1ccc(-c2ccc(-c3ccc(OC(=O)C(=C)C)cc3)c(C(=C)C)c2)cc1]
RM-152

TABLE F-continued

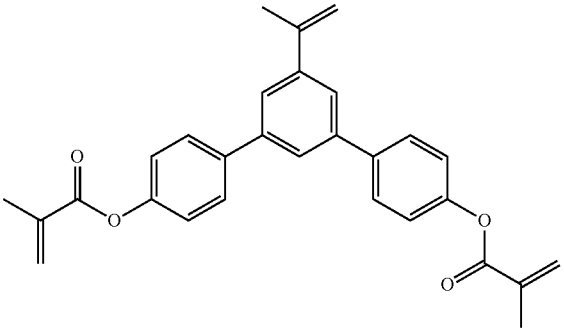 [SMILES: C=C(C)C(=O)Oc1ccc(-c2cc(C(=C)C)cc(-c3ccc(OC(=O)C(=C)C)cc3)c2)cc1]
RM-153

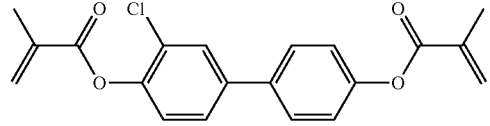 [SMILES: C=C(C)C(=O)Oc1ccc(-c2ccc(OC(=O)C(=C)C)c(Cl)c2)cc1]
RM-154

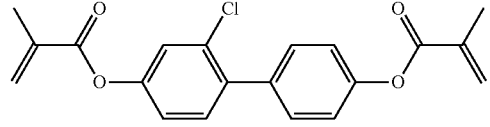 [SMILES: C=C(C)C(=O)Oc1ccc(-c2ccc(OC(=O)C(=C)C)cc2Cl)cc1]
RM-155

In a preferred embodiment, the mixtures according to the invention comprise one or more polymerisable compounds, preferably selected from the polymerisable compounds of the formulae RM-1 to RM-155. Of these, compounds RM-1, RM-4, RM-8, RM-17, RM-19, RM-35, RM-37, RM-39, RM-40, RM-41, RM-48, RM-52, RM-54, RM-57, RM-64, RM-74, RM-76, RM-88, RM-102, RM-103, RM-109, RM-117, RM-120, RM-121, RM-122 and RM-145 to RM-153 are particularly preferred.

In another preferred embodiment, the mixtures according to the invention comprise one or more polymerisable compounds selected from the compounds of formulae RM-145 to RM-152, very preferably from the formulae RM-147 to RM-152.

TABLE G

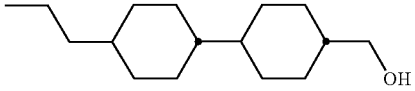
SA-1

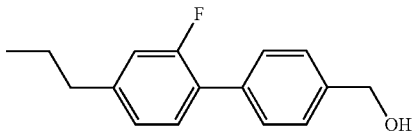 [SMILES: CCCc1ccc(-c2ccc(CO)cc2)c(F)c1]
SA-2

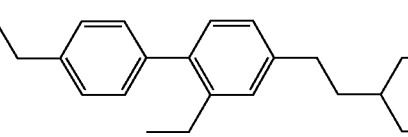
SA-3

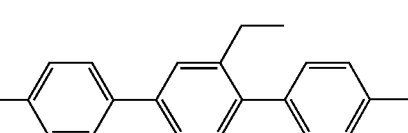
SA-4

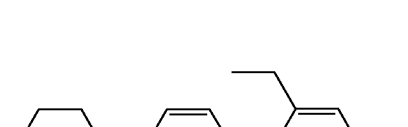
SA-5

TABLE G-continued
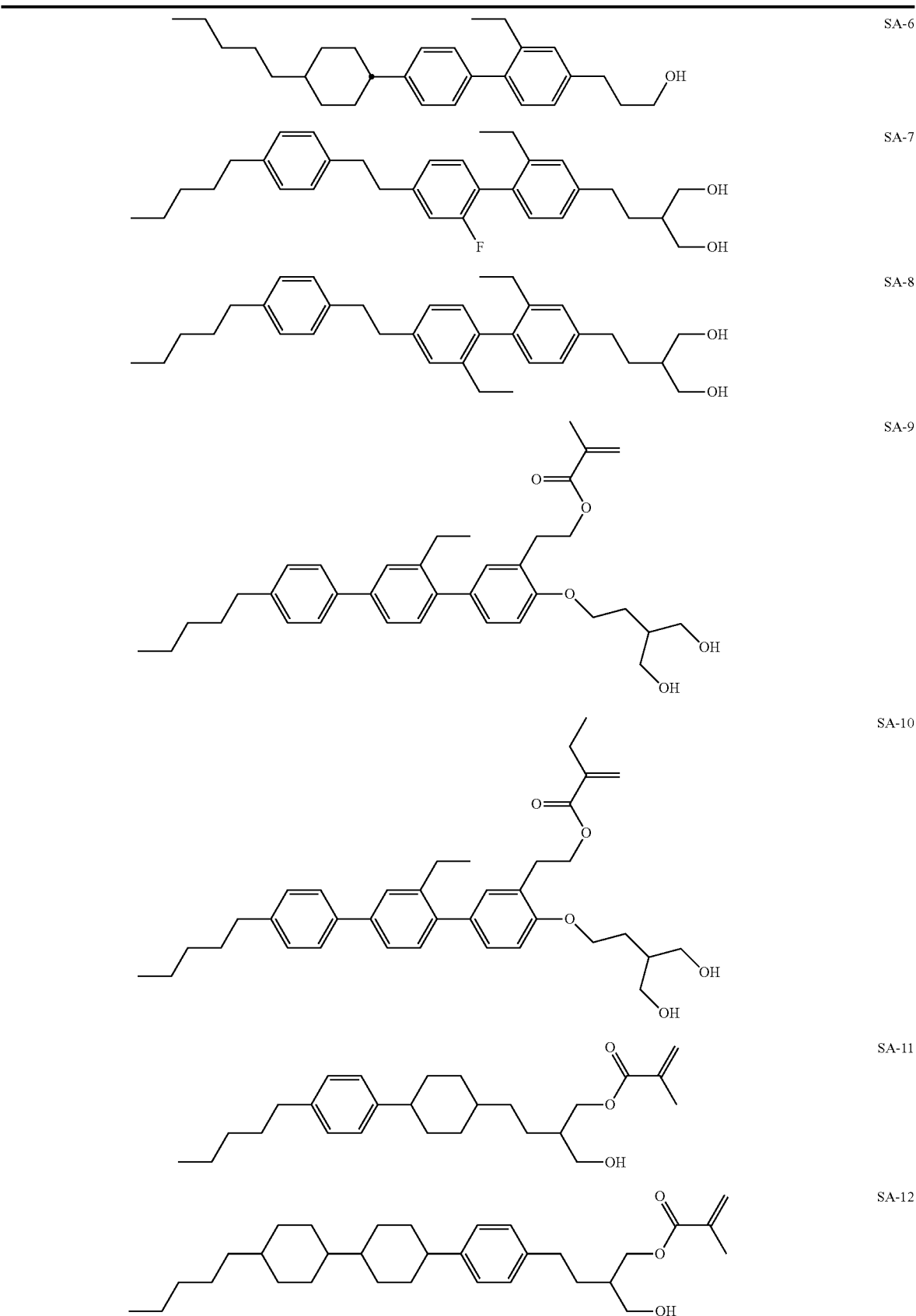

TABLE G-continued
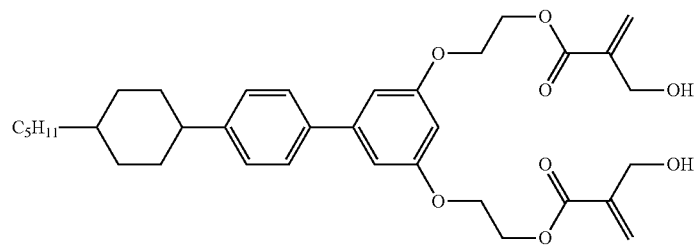
SA-13
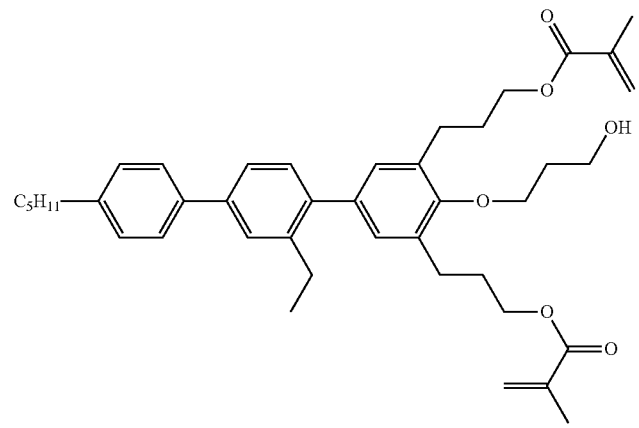
SA-14
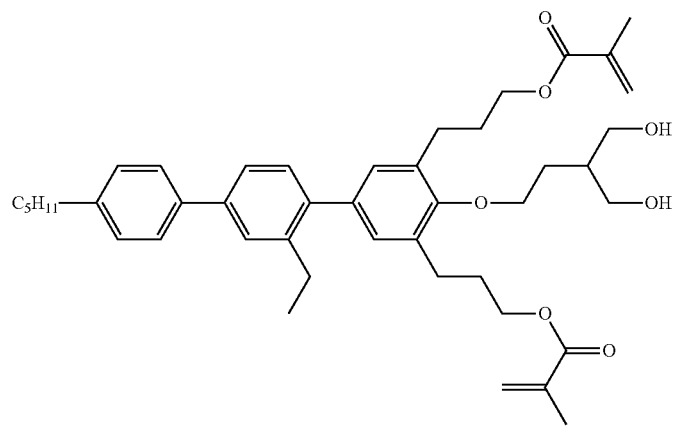
SA-15
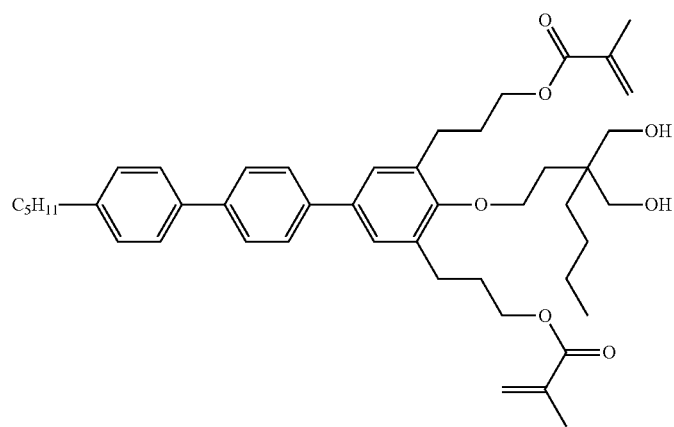
SA-16

TABLE G-continued
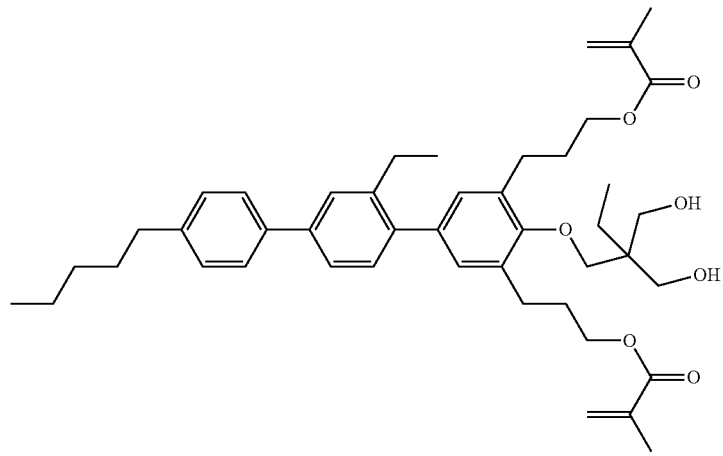 [SMILES: C=C(C)C(=O)OCCCc1cc(-c2ccc(-c3ccc(CCCCC)cc3)cc2CC)cc(CCCOC(=O)C(=C)C)c1OCC(CC)(CO)CO]
SA-17
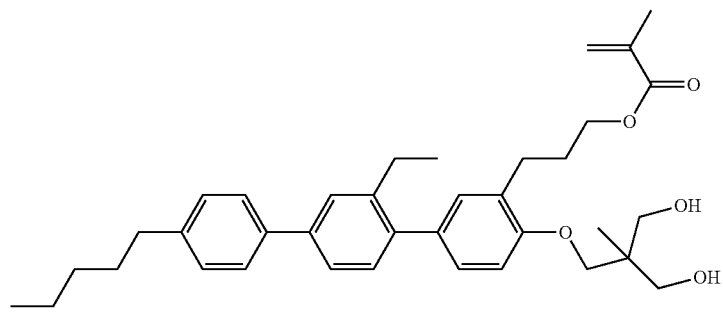 [SMILES: C=C(C)C(=O)OCCCc1cc(-c2ccc(-c3ccc(CCCCC)cc3)cc2CC)ccc1OCC(C)(CO)CO]
SA-18
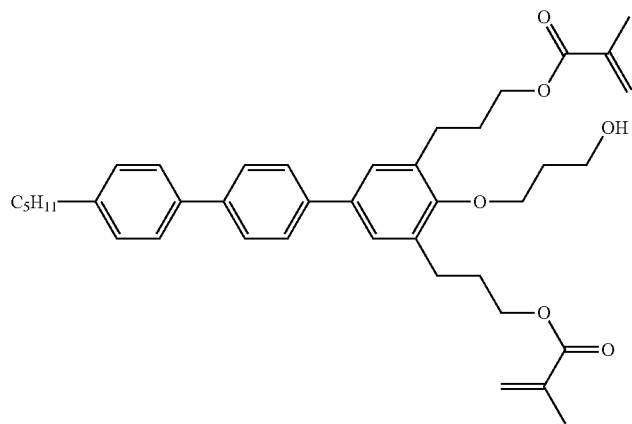
SA-19
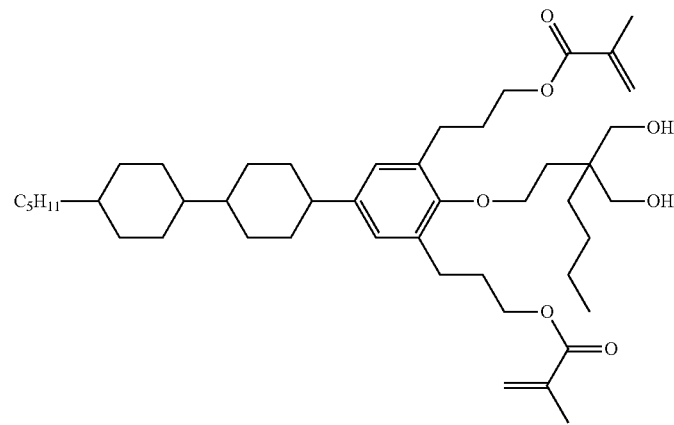
SA-20

TABLE G-continued
SA-21
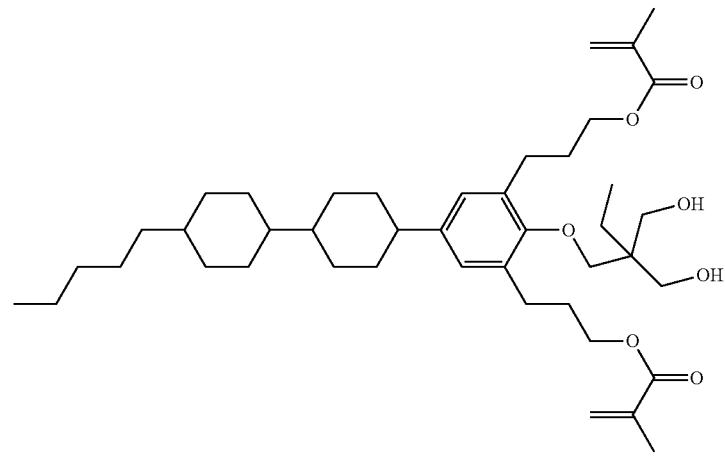 [SMILES: C=C(C)C(=O)OCCCc1cc(C2CCC(C3CCC(CCCCC)CC3)CC2)cc(CCCOC(=O)C(=C)C)c1OCC(CC)(CO)CO]
SA-22
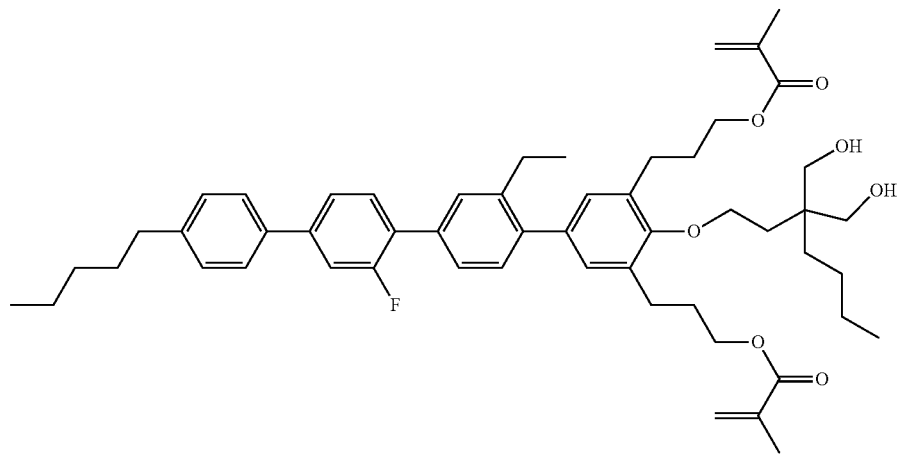 [SMILES: C=C(C)C(=O)OCCCc1cc(-c2ccc(-c3ccc(-c4ccc(CCCCC)cc4)cc3F)cc2CC)cc(CCCOC(=O)C(=C)C)c1OCCC(CO)(CO)CCCC]
SA-23
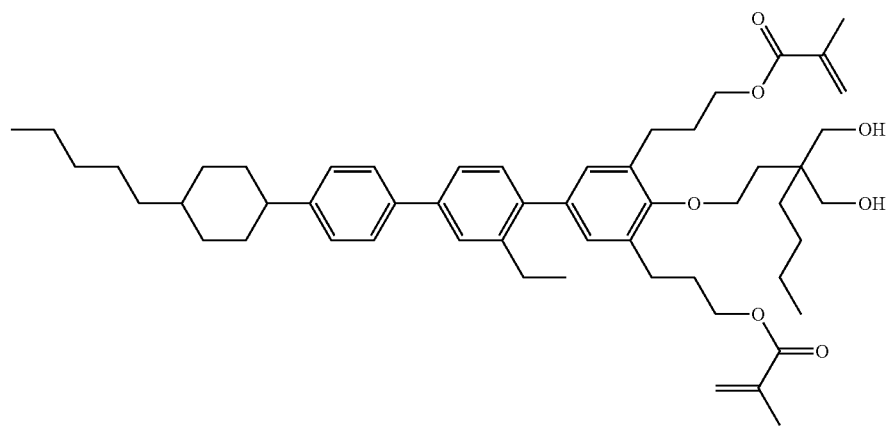 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCCC]

TABLE G-continued
SA-24
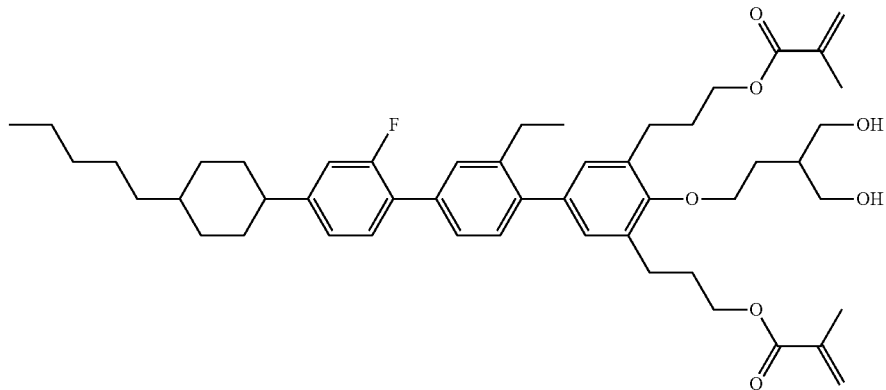 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)CO]
SA-25
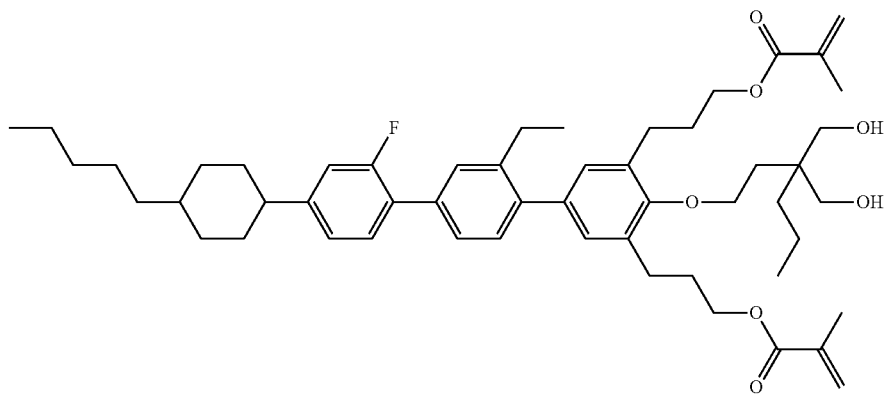 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)(CO)CCC]
SA-26
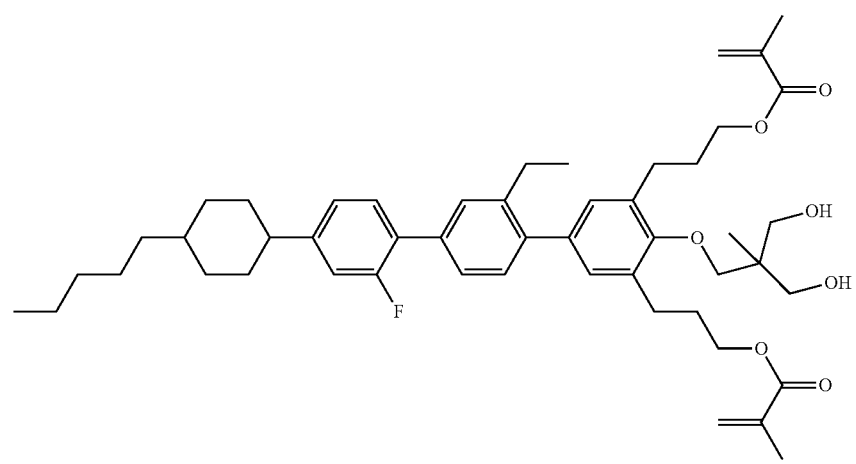 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCC(C)(CO)CO]

TABLE G-continued
SA-27
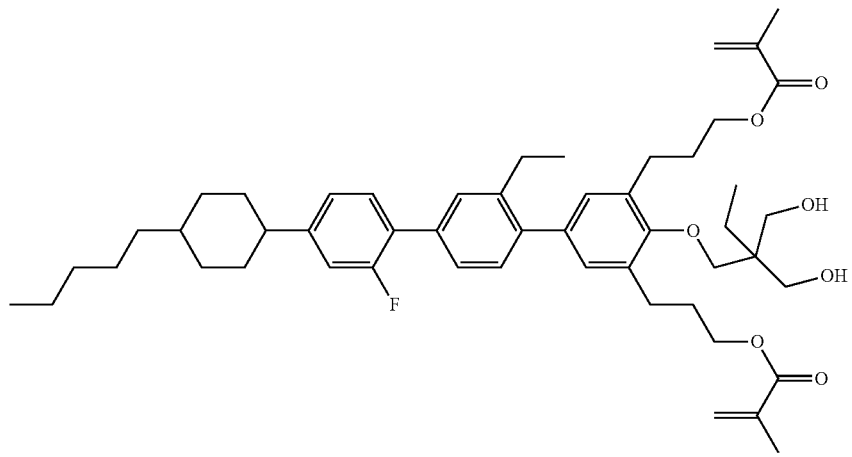 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCC(CC)(CO)CO]
SA-28
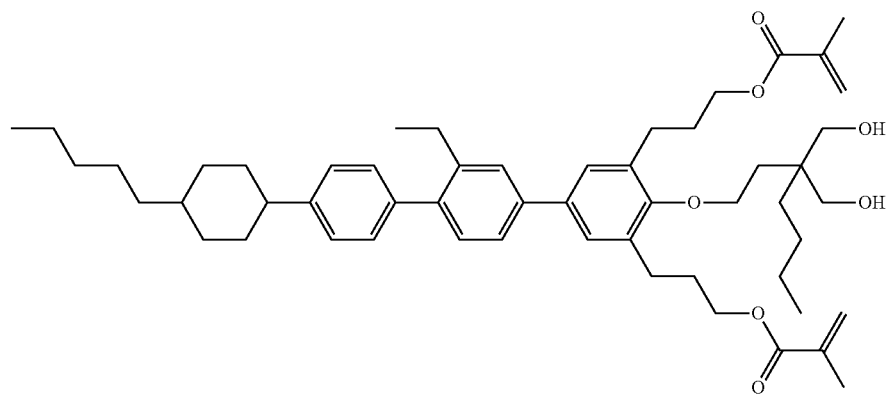 [SMILES: C=C(C)C(=O)OCCCc1cc(-c2ccc(-c3ccc(C4CCC(CCCCC)CC4)cc3)c(CC)c2)cc(CCCOC(=O)C(=C)C)c1OCCC(CO)(CO)CCCC]
SA-29
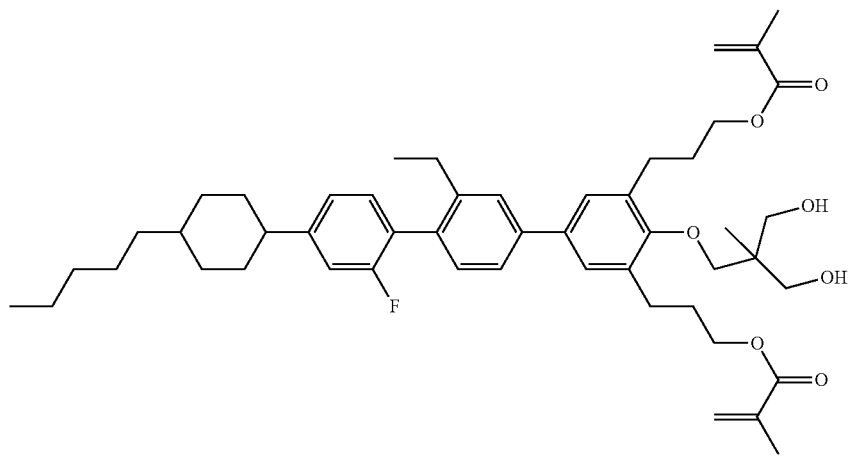 [SMILES: C=C(C)C(=O)OCCCc1cc(-c2ccc(-c3ccc(C4CCC(CCCCC)CC4)cc3F)c(CC)c2)cc(CCCOC(=O)C(=C)C)c1OCC(C)(CO)CO]

TABLE G-continued
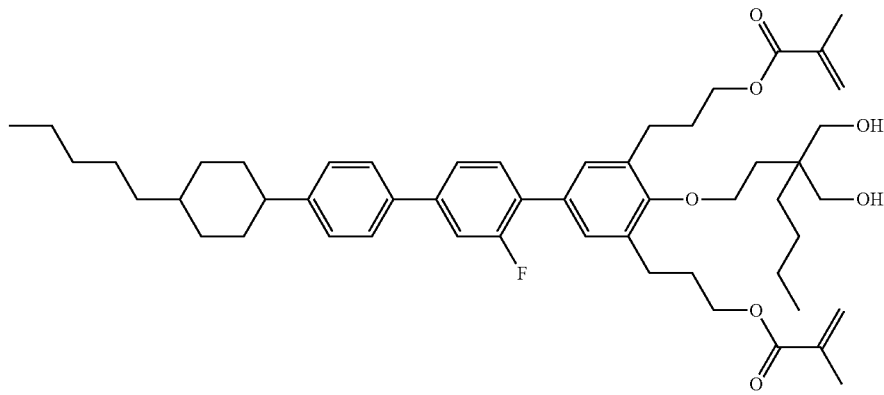 [SMILES: C=C(C)C(=O)OCCCc1cc(-c2ccc(-c3ccc(C4CCC(CCCCC)CC4)cc3)cc2F)cc(CCCOC(=O)C(=C)C)c1OCCC(CO)(CO)CCCC]
SA-30
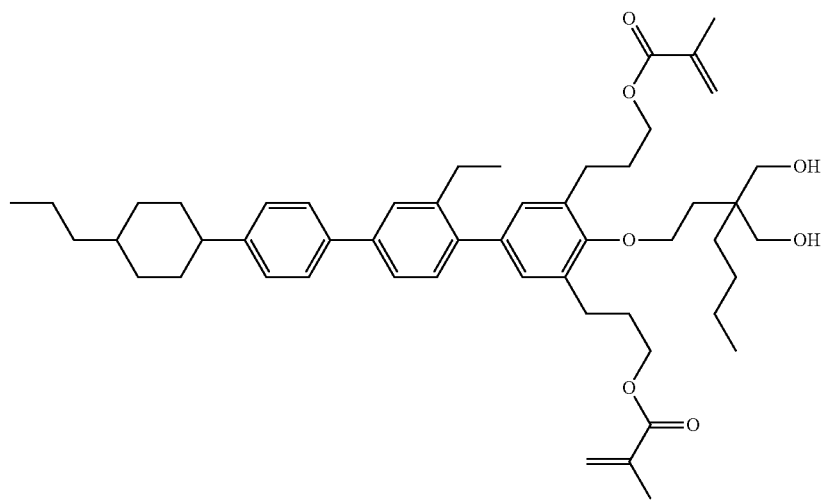 [SMILES: C=C(C)C(=O)OCCCc1cc(-c2ccc(-c3ccc(C4CCC(CCC)CC4)cc3)cc2CC)cc(CCCOC(=O)C(=C)C)c1OCCC(CO)(CO)CCCC]
SA-31
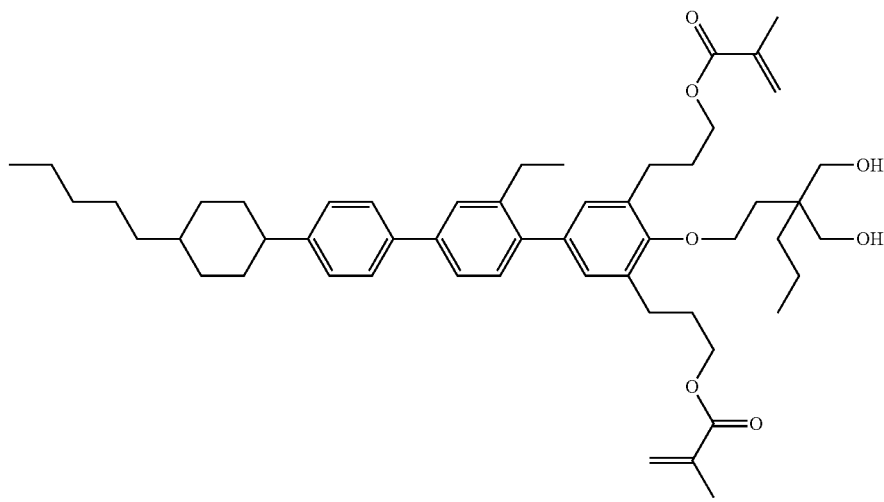 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCC]
SA-32

TABLE G-continued
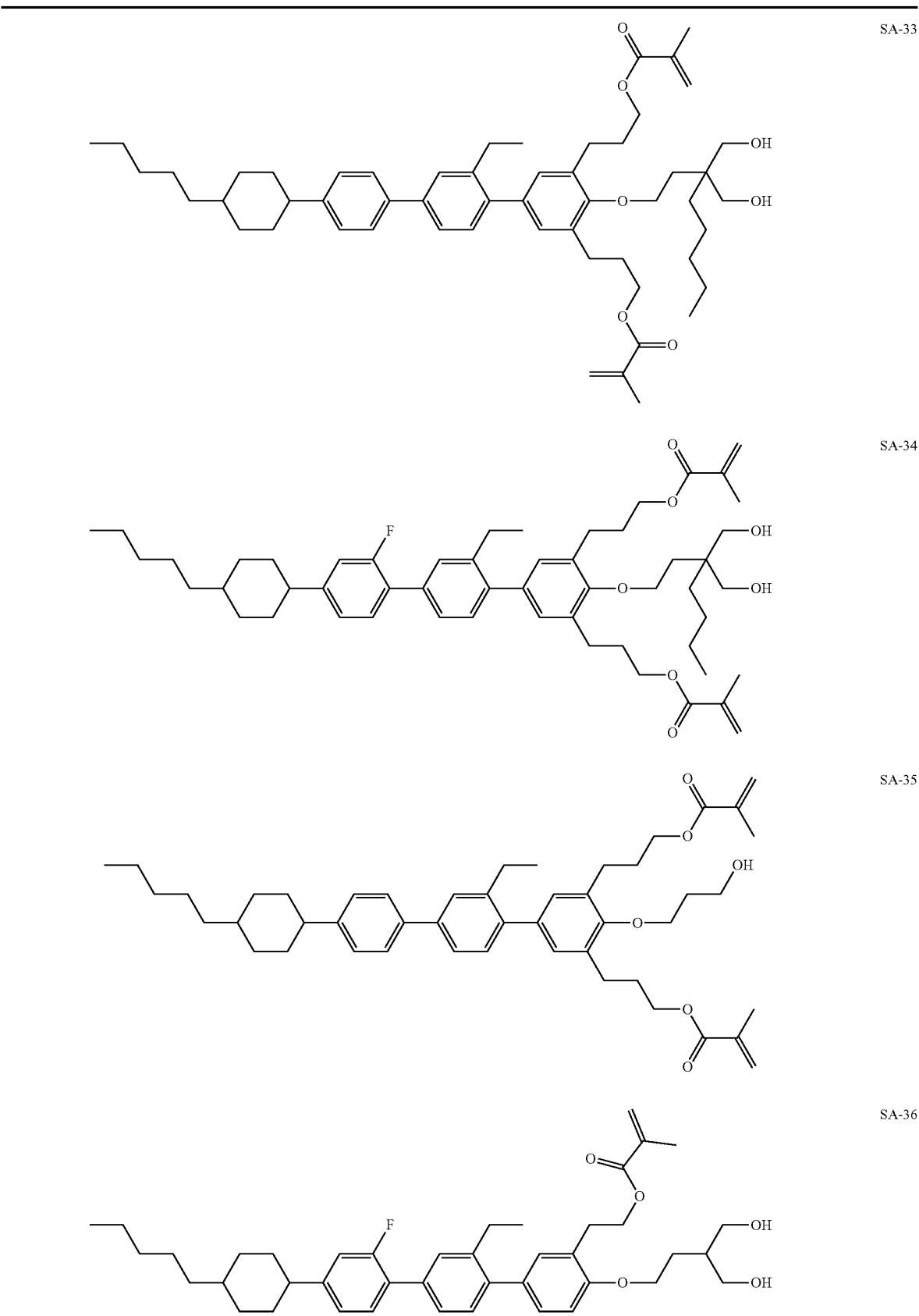

TABLE G-continued
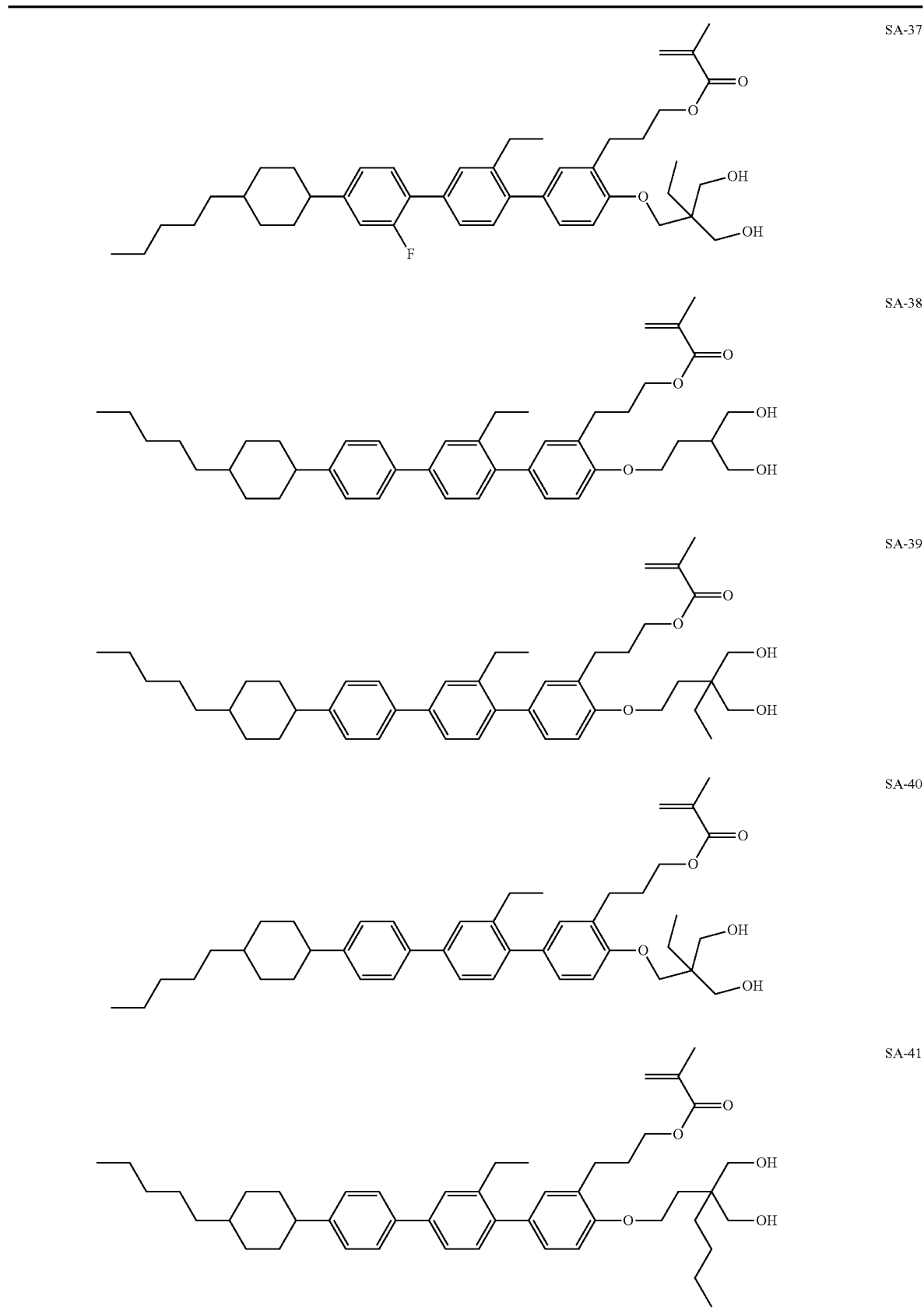

TABLE G-continued
SA-42
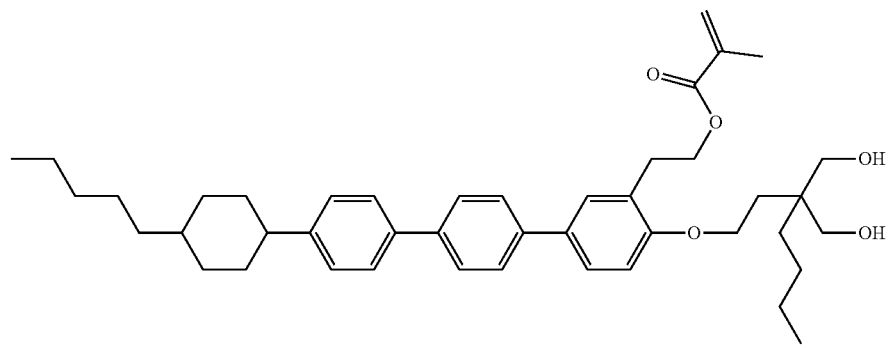 [SMILES: C=C(C)C(=O)OCCc1cc(-c2ccc(-c3ccc(C4CCC(CCCCC)CC4)cc3)cc2)ccc1OCCC(CO)(CO)CCCC]
SA-43
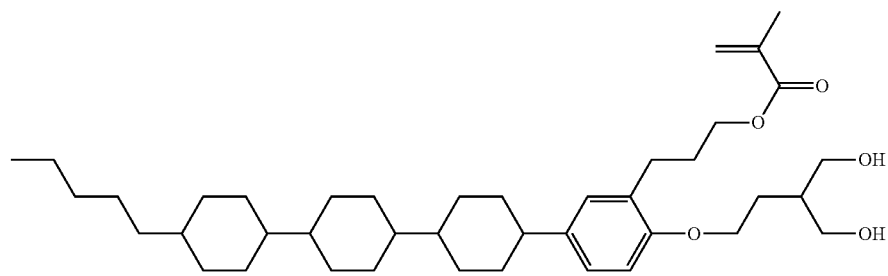 [SMILES: C=C(C)C(=O)OCCCc1cc(C2CCC(C3CCC(C4CCC(CCCCC)CC4)CC3)CC2)ccc1OCCC(CO)CO]
SA-44
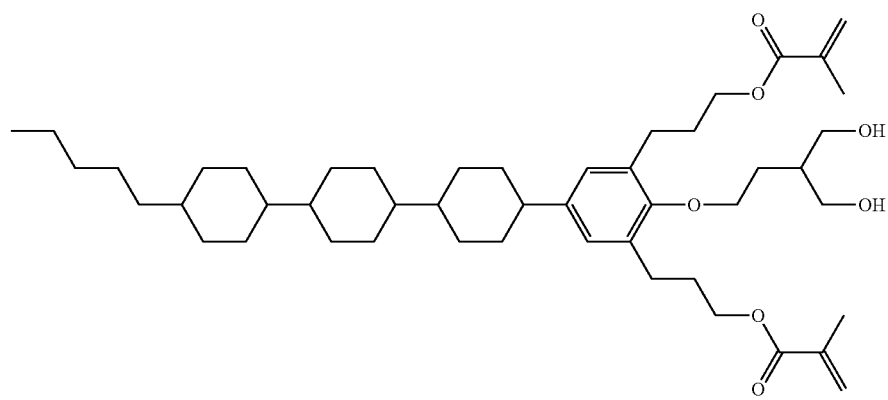 [SMILES: C=C(C)C(=O)OCCCc1cc(C2CCC(C3CCC(C4CCC(CCCCC)CC4)CC3)CC2)cc(CCCOC(=O)C(=C)C)c1OCCC(CO)CO]
SA-45
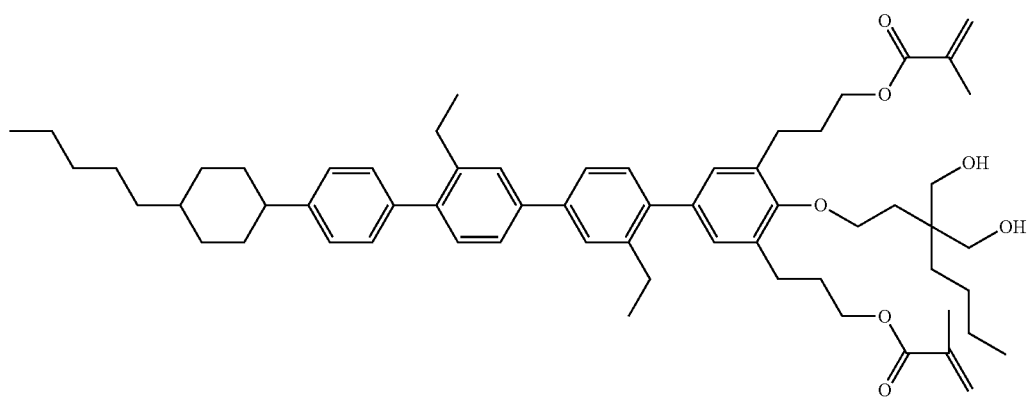 [SMILES: C=C(C)C(=O)OCCCc1cc(-c2ccc(-c3ccc(-c4ccc(C5CCC(CCCCC)CC5)cc4)c(CC)c3)cc2CC)cc(CCCOC(=O)C(=C)C)c1OCCC(CO)(CO)CCCC]

TABLE G-continued

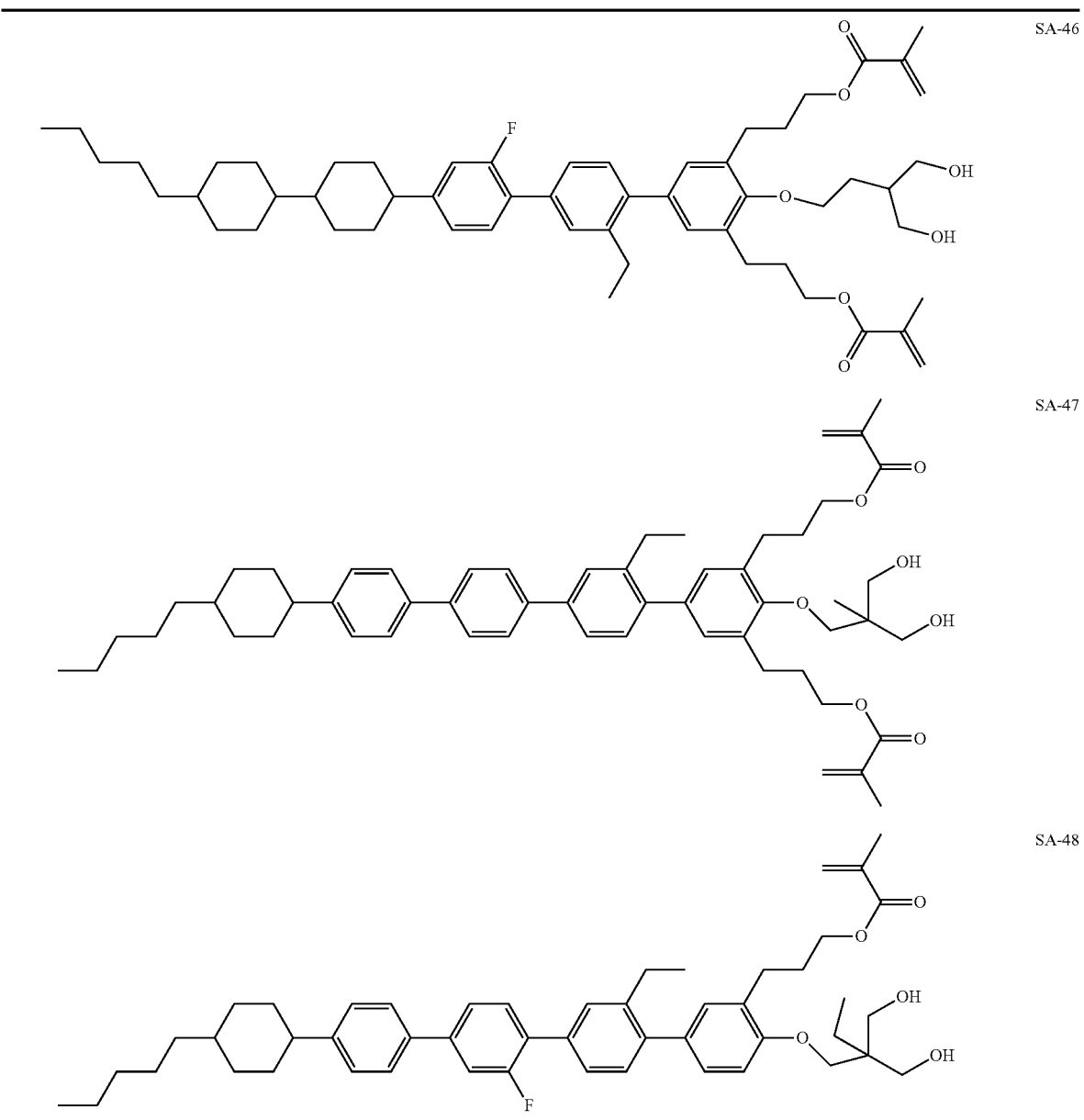

Table G shows self-alignment additives for vertical alignment which can be used in LC media, in particular for SA-VA and SA-FFS displays, according to the present invention, optionally together with the polymerisable compounds of formula P:

In a preferred embodiment, the LC media, SA-VA and SA-FFS displays according to the present invention comprise one or more SA additives selected from formulae SA-1 to SA-48, preferably from formulae SA-14 to SA-48, very preferably from formulae SA-20 to SA-34 and SA-44, preferably in combination with one or more RMs of formula P.

The following Examples are merely illustrative of the present invention and they should not be considered as limiting the scope of the invention in any way. The Examples and modifications or other equivalents thereof will become apparent to those skilled in the art in the light of the present disclosure.

However, the physical properties and compositions shown in the following illustrate which properties can be achieved and in which ranges they can be modified. Especially the combination of the various properties, which can be preferably achieved, is thus well defined.

WORKING EXAMPLES

Unless indicated otherwise, all concentrations herein are indicated in percent by weight and relate to the corresponding mixture as a whole, comprising all solid or liquid-crystalline components, without solvents. All physical properties are determined in accordance with "Merck Liquid Crystals, Physical Properties of Liquid Crystals", Status November 1997, Merck KGaA, Germany, and apply for a temperature of 20° C., unless explicitly indicated otherwise.

The symbols and abbreviations have the following meanings:

$V_0$ Freedericksz threshold voltage, capacitive [V] at 20° C.,
$V_{10}$ voltage [V] for 10% transmission,
$n_e$ extraordinary refractive index measured at 20° C. and 589 nm,
$n_0$ ordinary refractive index measured at 20° C. and 589 nm,
Δn optical anisotropy measured at 20° C. and 589 nm,
$\varepsilon_\perp$ dielectric susceptibility (or "dielectric constant") perpendicular to the longitudinal axes of the molecules at 20° C. and 1 kHz,
$\varepsilon_\parallel$ dielectric susceptibility (or "dielectric constant") parallel to the longitudinal axes of the molecules at 20° C. and 1 kHz,
Δε dielectric anisotropy at 20° C. and 1 kHz, cl.p. or T(N,I) clearing point [° C.],
ν flow viscosity measured at 20° C. [mm²·s⁻¹],
$\gamma_1$ rotational viscosity measured at 20° C. [mPa·s],
$K_{11}$ elastic constant, "splay" deformation at 20° C. [pN],
$K_{22}$ elastic constant, "twist" deformation at 20° C. [pN],
$K_{33}$ elastic constant, "bend" deformation at 20° C. [pN],
LTS low-temperature stability of the phase, determined in bulk, and
VHR voltage holding ratio.

The term "threshold voltage" for the present invention relates to the capacitive threshold ($V_0$), unless explicitly indicated otherwise. In the Examples, as is generally usual, the optical threshold can also be indicated, for example for 10% relative contrast ($V_{10}$).

EXAMPLES AND COMPARATIVE EXAMPLES

Mixture Examples and Comparative Mixture Examples

| Comparative Mixture C1 | | | |
|---|---|---|---|
| CC-3-V | 31.0% | Clearing point/° C.: | 82.5 |
| CC-3-V1 | 4.0% | Δn (589 nm, 20° C.): | 0.1096 |
| PP-1-2V1 | 2.0% | Δε (1 kHz, 20° C.): | -4.2 |
| CY-3-O2 | 14.0% | $K_1$ (pN, 20° C.): | 14.2 |
| CCY-3-O1 | 6.0% | $K_3$ (pN, 20° C.): | 15.6 |
| CCY-3-O2 | 6.0% | $\gamma_1$ (20° C.)/mPa·s: | 90 |
| CCY-5-O2 | 6.0% | $\gamma_1/K_1$: | 6.3 |
| CPY-2-O2 | 8.0% | | |
| CPY-3-O2 | 9.0% | | |
| PGIY-2-O4 | 2.0% | | |
| PYP-2-3 | 3.0% | | |
| B(S)-2O-O4 | 5.0% | | |
| B(S)-2O-O5 | 4.0% | | |
| Σ | 100.0% | | |

| Comparative Mixture C2 | | | |
|---|---|---|---|
| CC-3-V | 33.0% | Clearing point/° C.: | 83.1 |
| CC-3-V1 | 4.0% | Δn (589 nm, 20° C.): | 0.1088 |
| CY-3-O2 | 14.0% | Δε (1 kHz, 20° C.): | -4.3 |
| CCY-3-O1 | 2.0% | $K_1$ (pN, 20° C.): | 14.1 |
| CCY-3-O2 | 12.0% | $K_3$ (pN, 20° C.): | 15.7 |
| CLY-3-O2 | 2.0% | $\gamma_1$ (20° C.)/mPa·s: | 91 |
| CPY-2-O2 | 9.0% | $\gamma_1/K_1$: | 6.5 |
| CPY-3-O2 | 10.0% | | |
| PGIY-2-O4 | 2.0% | | |
| PYP-2-3 | 3.0% | | |
| B(S)-2O-O4 | 5.0% | | |
| B(S)-2O-O5 | 4.0% | | |
| Σ | 100.0% | | |

| Comparative Mixture C3 | | | |
|---|---|---|---|
| CC-3-V | 34.0% | Clearing point/° C.: | 83.2 |
| CC-3-V1 | 3.0% | Δn (589 nm, 20° C.): | 0.1097 |
| CY-3-O2 | 14.0% | Δε (1 kHz, 20° C.): | -4.3 |
| CCY-3-O2 | 7.0% | $K_1$ (pN, 20° C.): | 14.1 |
| CLY-4-O2 | 5.0% | $K_3$ (pN, 20° C.): | 15.5 |
| CLY-3-O2 | 5.0% | $\gamma_1$ (20° C.)/mPa·s: | 88 |
| CPY-2-O2 | 8.0% | $\gamma_1/K_1$: | 6.2 |
| CPY-3-O2 | 10.0% | | |
| PGIY-2-O4 | 2.0% | | |
| PYP-2-3 | 3.0% | | |
| B(S)-2O-O4 | 5.0% | | |
| B(S)-2O-O5 | 4.0% | | |
| Σ | 100.0% | | |

| Comparative Mixture C4 | | | |
|---|---|---|---|
| CC-3-V | 30.0% | Clearing point/° C.: | 80.4 |
| CC-3-V1 | 5.0% | Δn (589 nm, 20° C.): | 0.1108 |
| PP-1-2V1 | 6.0% | Δε (1 kHz, 20° C.): | -4.0 |
| CY-3-O2 | 13.0% | $K_1$ (pN, 20° C.): | 14.3 |
| CCY-3-O1 | 5.0% | $K_3$ (pN, 20° C.): | 16.0 |
| CCY-3-O2 | 10.0% | $\gamma_1$ (20° C.)/mPa·s: | 85 |
| CPY-2-O2 | 11.0% | $\gamma_1/K_1$: | 5.9 |
| CPY-3-O2 | 11.0% | | |
| B(S)-2O-O4 | 4.0% | | |
| B(S)-2O-O5 | 5.0% | | |
| Σ | 100.0% | | |

| Comparative Mixture C5 | | | |
|---|---|---|---|
| CC-3-V | 33.0% | Clearing point/° C.: | 78.1 |
| PP-1-2V1 | 6.0% | Δn (589 nm, 20° C.): | 0.1075 |
| CY-3-O2 | 15.0% | Δε (1 kHz, 20° C.): | -4.0 |
| CY-5-O2 | 4.0% | $K_1$ (pN, 20° C.): | 13.4 |
| CCY-3-O2 | 11.0% | $K_3$ (pN, 20° C.): | 14.9 |
| CPY-2-O2 | 11.0% | $\gamma_1$ (20° C.)/mPa·s: | 88 |
| CPY-3-O2 | 11.0% | $\gamma_1/K_1$: | 6.6 |
| COB(S)-2-O4 | 9.0% | | |
| Σ | 100.0% | | |

| Mixture M1 | | | |
|---|---|---|---|
| CC-3-V | 30.0% | Clearing point/° C.: | 80.4 |
| CC-3-V1 | 5.0% | Δn (589 nm, 20° C.): | 0.1099 |
| PP-1-2V1 | 5.0% | Δε (1 kHz, 20° C.): | -4.0 |
| CLP-V-1 | 1.0% | $K_1$ (pN, 20° C.): | 14.4 |
| CY-3-O2 | 14.0% | $K_3$ (pN, 20° C.): | 15.8 |
| CCY-3-O1 | 4.0% | $\gamma_1$ (20° C.)/mPa·s: | 86 |
| CCY-3-O2 | 10.0% | $\gamma_1/K_1$: | 6.0 |
| CPY-2-O2 | 11.0% | | |
| CPY-3-O2 | 11.0% | | |
| B(S)-2O-O4 | 4.0% | | |
| B(S)-2O-O5 | 5.0% | | |
| Σ | 100.0% | | |

| Mixture M2 | | | |
|---|---|---|---|
| CC-3-V | 30.0% | Clearing point/° C.: | 81.2 |
| CC-3-V1 | 4.0% | Δn (589 nm, 20° C.): | 0.1101 |
| PP-1-2V1 | 4.0% | Δε (1 kHz, 20° C.): | -4.0 |
| CLP-V-1 | 3.0% | $K_1$ (pN, 20° C.): | 14.3 |
| CY-3-O2 | 15.0% | $K_3$ (pN, 20° C.): | 15.9 |
| CCY-3-O1 | 3.0% | $\gamma_1$ (20° C.)/mPa·s: | 87 |
| CCY-3-O2 | 10.0% | $\gamma_1/K_1$: | 6.1 |
| CPY-2-O2 | 11.0% | | |
| CPY-3-O2 | 11.0% | | |
| B(S)-2O-O4 | 4.0% | | |
| B(S)-2O-O5 | 5.0% | | |
| Σ | 100.0% | | |

| Mixture M3 | | | |
|---|---|---|---|
| CC-3-V | 32.0% | Clearing point/° C.: | 79.3 |
| PP-1-2V1 | 6.0% | Δn (589 nm, 20° C.): | 0.1088 |
| CY-3-O2 | 15.0% | Δε (1 kHz, 20° C.): | -4.0 |
| CY-5-O2 | 4.0% | $K_1$ (pN, 20° C.): | 13.6 |
| CLP-V-1 | 1.0% | $K_3$ (pN, 20° C.): | 15.2 |
| CCY-3-O2 | 11.0% | $\gamma_1$ (20° C.)/mPa·s: | 92 |

-continued

| | | | |
|---|---|---|---|
| CPY-2-O2 | 11.0% | $\gamma_1/K_1$: | 6.8 |
| CPY-3-O2 | 11.0% | | |
| COB(S)-2-O4 | 9.0% | | |
| Σ | 100.0% | | |

Mixture M4

| | |
|---|---|
| CC-3-V | 30.0% |
| CC-3-V1 | 4.0% |
| PP-1-2V1 | 4.0% |
| CLP-V-1 | 3.0% |
| CY-3-O2 | 15.0% |
| CCY-3-O1 | 3.0% |
| CCY-3-O2 | 10.0% |
| CPY-2-O2 | 11.0% |
| CPY-3-O2 | 11.0% |
| B(S)-(c5)2O-O4 | 4.0% |
| B(S)-2O-O5 | 5.0% |
| Σ | 100.0% |

Mixture M5

The following mixture is prepared, wherein the compound I-a-2 is specified and shown in the description above.

| | |
|---|---|
| CC-3-V | 32.0% |
| PP-1-2V1 | 6.0% |
| CY-3-O2 | 15.0% |
| CY-5-O2 | 4.0% |
| compound I-a-2 | 1.0% |
| CCY-3-O2 | 11.0% |
| CPY-2-O2 | 11.0% |
| CPY-3-O2 | 11.0% |
| COB(S)-2-O4 | 9.0% |
| Σ | 100.0% |

Mixture M6

| | |
|---|---|
| CC-3-V | 32.0% |
| PP-1-2V1 | 6.0% |
| CY-3-O2 | 15.0% |
| CY-5-O2 | 4.0% |
| CLP-V-1 | 1.0% |
| CCY-(c5)-O2 | 11.0% |
| CPY-2-O2 | 11.0% |
| CPY-3-O2 | 11.0% |
| COB(S)-2-O4 | 9.0% |
| Σ | 100.0% |

Mixtures M7, M8 and M9

Mixtures M7, M8 and M9 are respectively prepared by mixing 99.70% of mixtures M1, M2 and respectively M3 as described above with 0.30% of the compound of formula

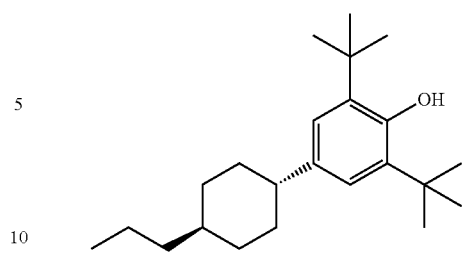

Mixture M10

A mixture M10 is prepared by mixing 99.51% of mixture M7 and 0.49% of chiral dopant S-811 available from Merck KGaA, Darmstadt, Germany.

Mixture M11

A mixture M11 is prepared by mixing 99.70% of mixture M8 and 0.30% of the compound of formula

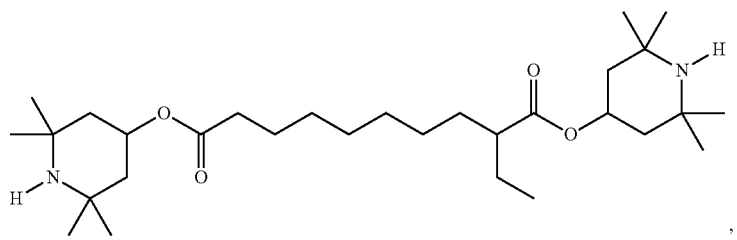

Mixture M12

A mixture M12 is prepared by mixing 99.60% of mixture M9 and 0.40% of the compound of formula

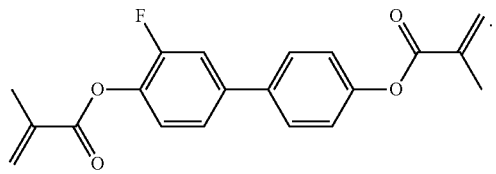 [SMILES: C=C(C)C(=O)Oc1ccc(-c2ccc(OC(=O)C(=C)C)c(F)c2)cc1]

The mixtures M1 to M12 having negative dielectric anisotropy are suitable for liquid-crystal displays, in particular IPS, FFS, UB-FFS (ultra-bright FFS) and VA displays.

VHR Measurements

The VHR values of the comparative mixtures C4 and C5 and the mixtures M1, M2 and M3 are measured at 60° C. in VHR test cells (3 μm cell gap thickness), using 1V with a frequency of 3 Hz, before and after UV exposure using a metal halide lamp (600W, 200-780 nm with a 320 nm cut filter) for 128 s at room temperature. The results are shown below in Table 1.

TABLE 1

| | VHR values | |
|---|---|---|
| | VHR/% before UV | VHR/% after UV |
| C4 | 95.8 | 92.7 |
| M1 | 95.6 | 93.9 |
| M2 | 95.9 | 93.9 |

TABLE 1-continued

| | VHR values | |
|---|---|---|
| | VHR/% before UV | VHR/% after UV |
| C5 | 96.2 | 94.2 |
| M3 | 96.8 | 95.3 |

The comparisons show favourable VHR characteristics of the liquid-crystal media according to the invention, while at the same time exhibiting suitable electro-optical performance.

It is surprisingly found that the compounds of formula I can contribute to the stabilising effect giving favourable reliability of the media.

The preceding examples can be repeated with similar success by substituting the generically or specifically described reactants and/or operating conditions of this invention for those used in the preceding examples.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever. From the description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding EO application No. 21159636.6, filed Feb. 26, 2021, are incorporated by reference herein.

The invention claimed is:

1. A liquid-crystal medium having a negative dielectric anisotropy and comprising
one or more compounds of formula I in a total amount of 0.25% by weight to 3% by weight

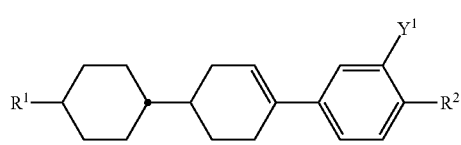

in which
$R^1$ denotes a straight-chain alkenyl radical having 2 to 15 C atoms or a branched alkenyl radical having 4 to 15 C atoms, where one or more $CH_2$ groups may each be replaced, independently of one another, by

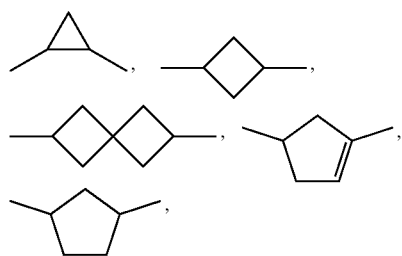

—C≡C—, —CF$_2$O—, —OCF$_2$—, —O—, —CO—O— or —O—CO— in such a way that O atoms are not linked directly to one another, and in which one or more H atoms may be replaced by halogen, $R^2$ denotes H, a straight-chain alkyl radical having 1 to 15 C atoms or a branched alkyl radical having 4 to 15 C atoms, where one or more $CH_2$ groups may each be replaced, independently of one another, by

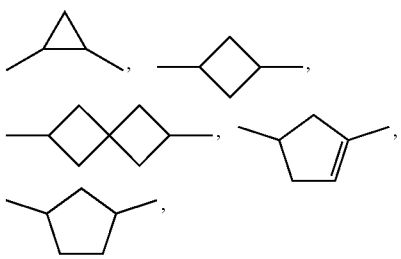

—C≡C—, —CF$_2$O—, —OCF$_2$—, —CH=CH—, —CO—O— or —O—CO— in such a way that O atoms are not linked directly to one another, and in which one or more H atoms may be replaced by halogen, and $Y^1$ denotes H, F, Cl or $CH_3$;
and
one or more compounds of formula III

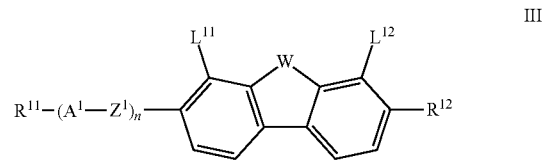

in which
$R^{11}$ and $R^{12}$ each, independently of one another, denote H, an alkyl or alkoxy radical having 1 to 15 C atoms, where one or more $CH_2$ groups may each be replaced, independently of one another, by

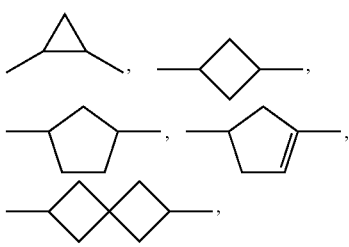

—C≡C—, —CF$_2$O—, —OCF$_2$—, —CH=CH—, —O—, —CO—O— or —O—CO— in such a way that O atoms are not linked directly to one another, and in which one or more H atoms may be replaced by halogen, $A^1$ on each occurrence, independently of one another, denotes
a) a 1,4-cyclohexenylene or 1,4-cyclohexylene radical, in which one or two non-adjacent $CH_2$ groups may be replaced by —O— or —S—, b) a 1,4-phenylene radical, in which one or two CH groups may be replaced by N, or
c) a radical selected from the group consisting of spiro[3.3]heptane-2,6-diyl, 1,4-bicyclo[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl,
where the radicals in a), b) and c) may be mono- or polysubstituted by halogen atoms, n is 0, 1 or 2, $Z^1$ on each occurrence, independently of one another, denotes —CO—O—, —O—CO—, —CF$_2$O—, —OCF$_2$—, —CH$_2$O—, —OCH$_2$—, —CH$_2$—, —CH$_2$CH$_2$—, —(CH$_2$)$_4$—, —CH=CH—CH$_2$O—, —C$_2$F$_4$—, —CH$_2$CF$_2$—, —CF$_2$CH$_2$—, —CF=CF—, —CH=CF—, —CF=CH—, —CH=CH—, —C≡C— or a single bond, $L^{11}$ and $L^{12}$ each, independently of one another, denote F, Cl, CF$_3$ or CHF$_2$, and W denotes O or S;

and one or more stabilisers.

2. The liquid-crystal medium according to claim 1, further comprising one or more compounds selected from the group consisting of compounds of formulae IIA, IIB, IIC and IID

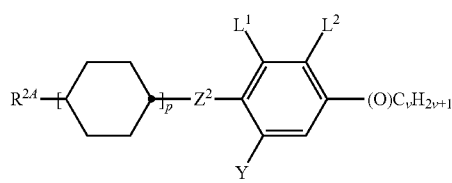

IIA

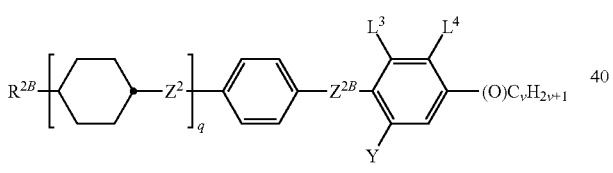

IIB

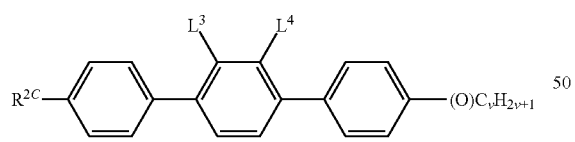

IIC

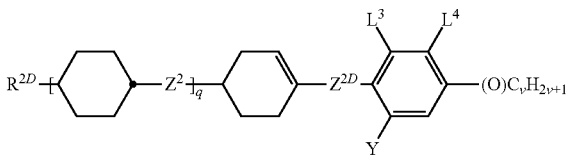

IID in which $R^{2A}, R^{2B}, R^{2C}$ and $R^{2D}$ each, independently of one another, denote H, or an alkyl radical having 1 to 15 C atoms or an alkenyl radical having 2 to 15 C atoms, which is un-substituted, monosubstituted by CN or CF$_3$ or at least monosubstituted by halogen, where one or more CH$_2$ groups may be replaced by —O—, —S—,

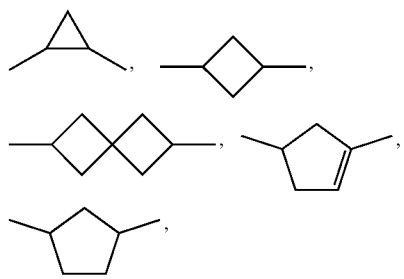

—C≡C—, —CF$_2$O—, —OCF$_2$—, —OC—O— or —O—CO— in such a way that O atoms are not linked directly to one another, $L^1$ to $L^4$ each, independently of one another, denote F, Cl, CF$_3$ or CHF$_2$, Y denotes H, F, Cl, CF$_3$, CHF$_2$ or CH$_3$, $Z^2, Z^{2B}$ and $Z^{2D}$ each, independently of one another, denote a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF— or —CH=CHCH$_2$O—, p denotes 0, 1 or 2, q denotes 0 or 1, and v denotes 1, 2, 3, 4, 5 or 6.

3. The medium according to claim 1, wherein the one or more stabilisers are selected from the group consisting of

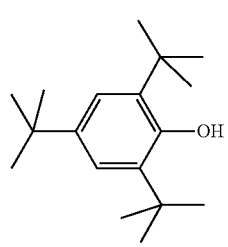

ST-1

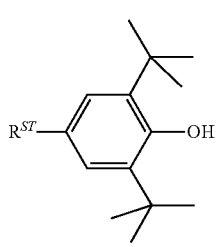

ST-2

-continued
ST-3
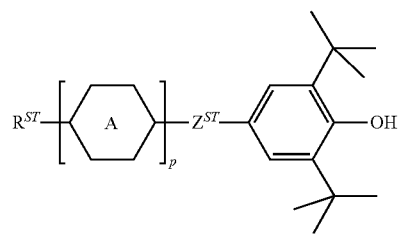
ST-4
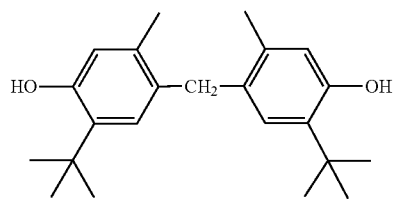
ST-5
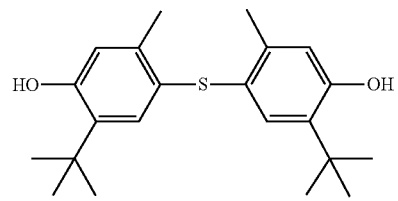
ST-6
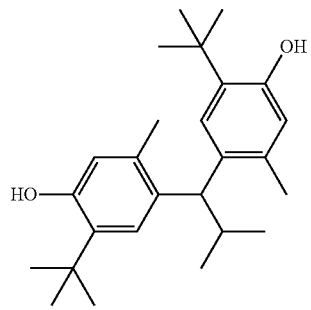
ST-7
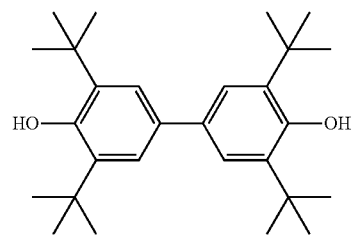
ST-8
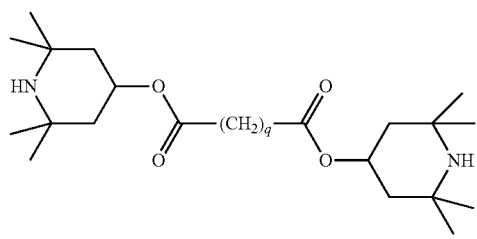
ST-9
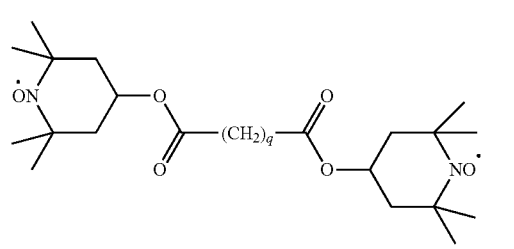
ST-10
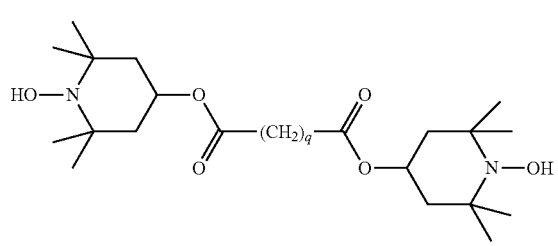
ST-11
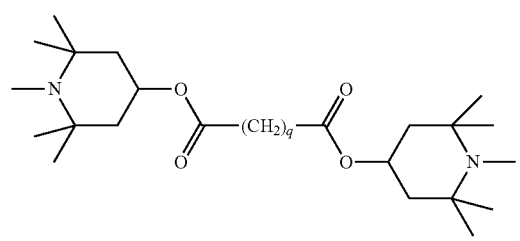
ST-12
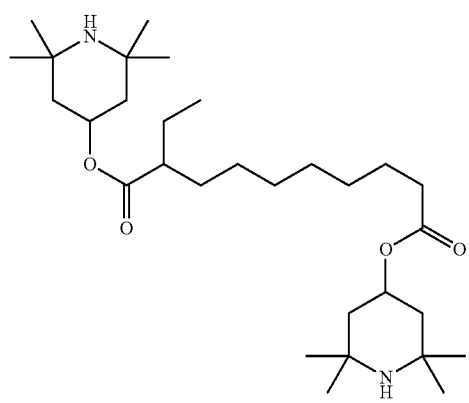

-continued
ST-13
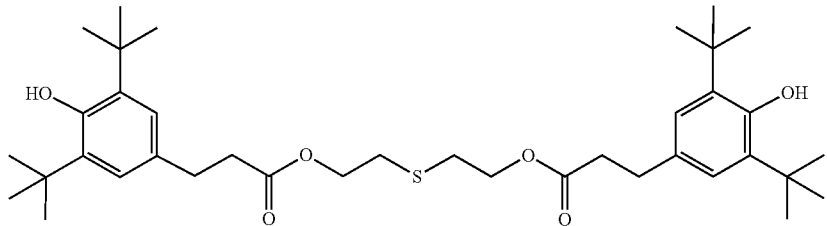
ST-14
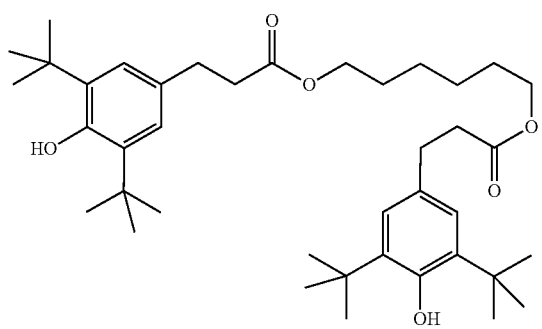
ST-15
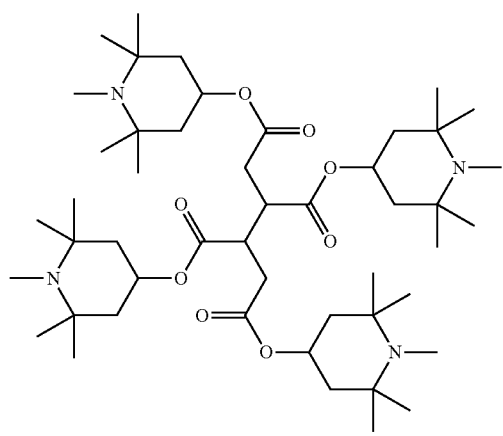
ST-16
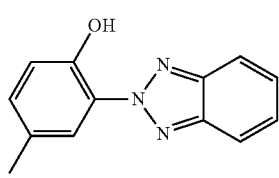
ST-17
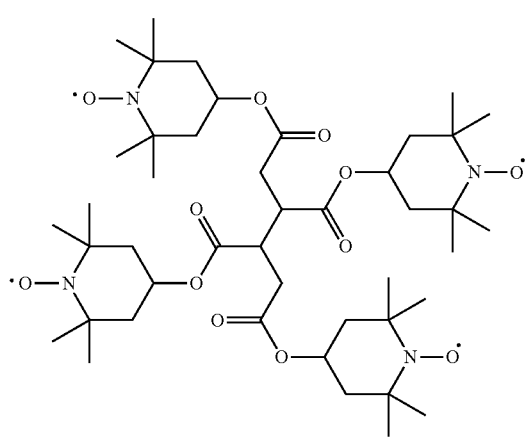
ST-18
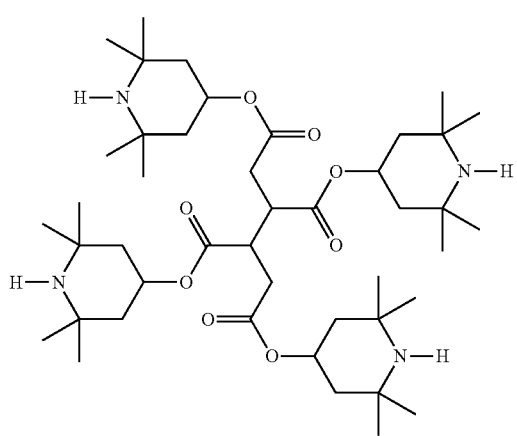

ST-19
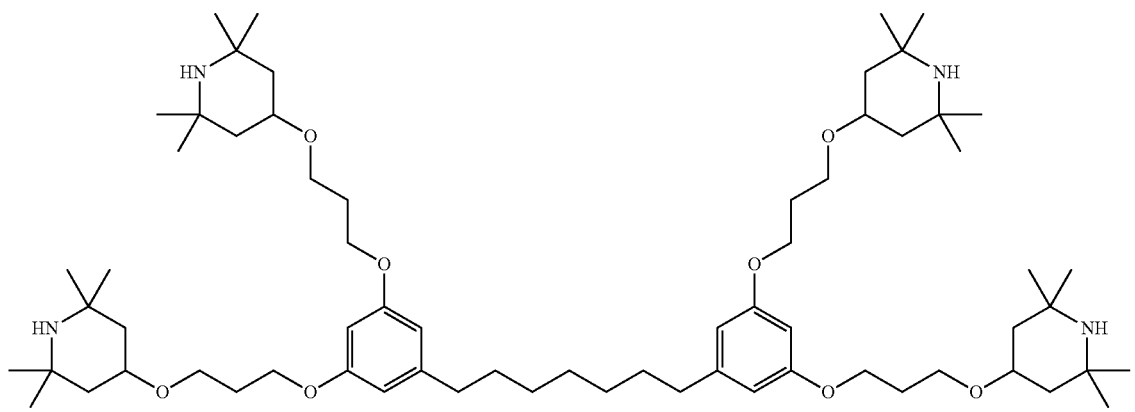
in which
R$^{ST}$ denotes H, an alkyl or alkoxy radical having 1 to 15 C atoms, wherein one or more CH$_2$ groups may each be replaced, independently of one another, by —C≡C—, —CF$_2$O—, —OCF$_2$—, —CH=CH—,
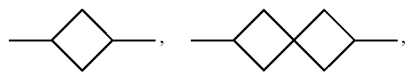
—O—, —CO—O— or —O—CO— in such a way that O atoms are not linked directly to one another, and in which one or more H atoms may be replaced by halogen,
denotes
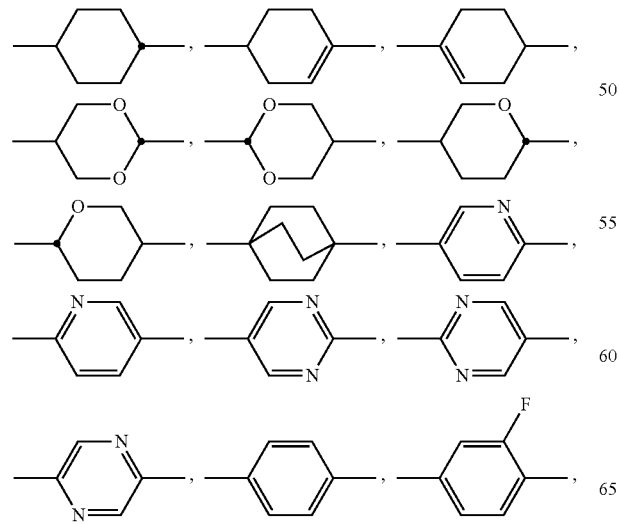
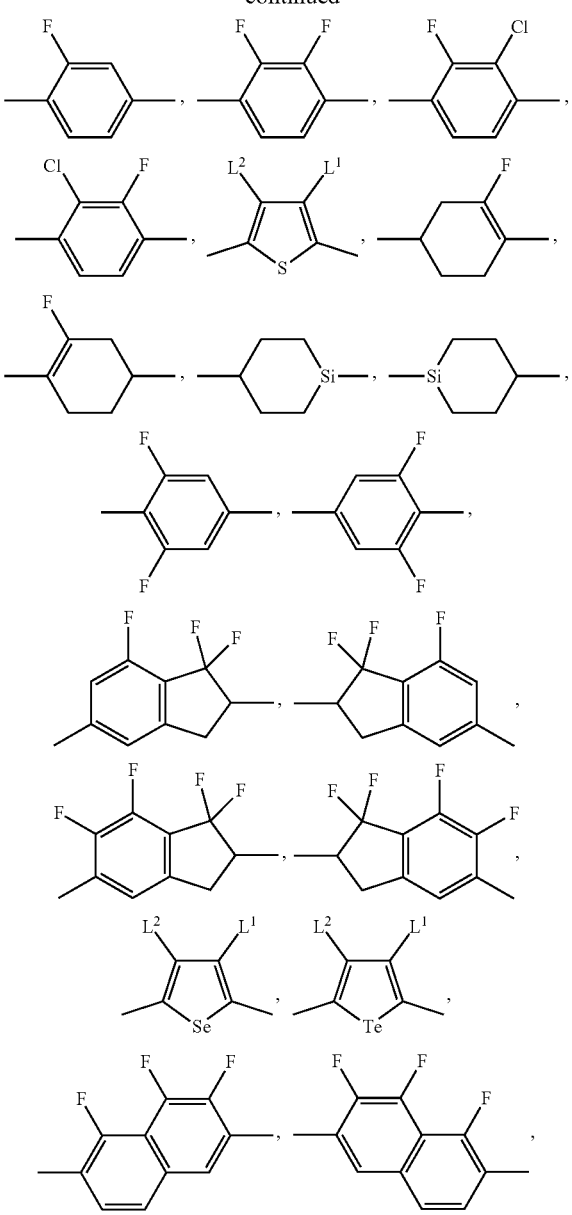

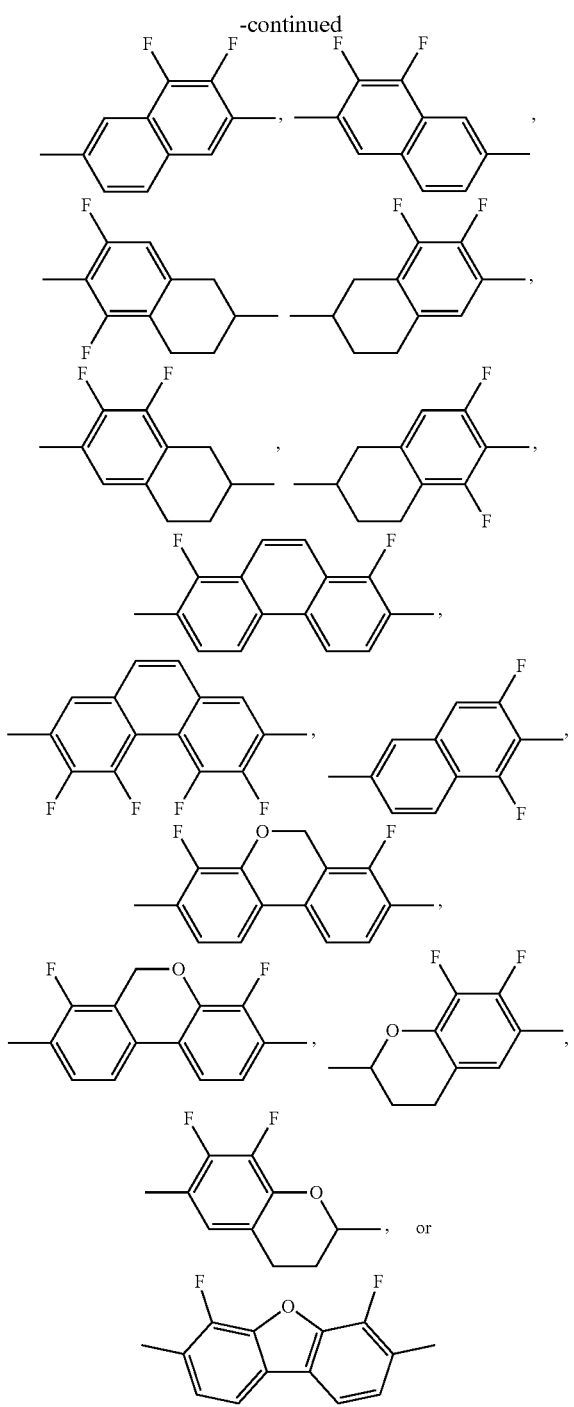

$Z^{ST}$ each, independently of one another, denote —CO—O—, —O—CO—, —CF$_2$O—, —OCF$_2$—, —CH$_2$O—, —OCH$_2$—, —CH$_2$—, —CH$_2$CH$_2$—, —(CH$_2$)$_4$—, —CH=CH—CH$_2$O—, —C$_2$F$_4$—, —CH$_2$CF$_2$—, —CF$_2$CH$_2$—, —CF=CF—, —CH=CF—, —CF=CH—, —CH=CH—, —C≡C— or a single bond, L$^1$ and L$^2$ each, independently of one another, denote F, Cl, CF$_3$ or CHF$_2$, p denotes 1 or 2, and q denotes 1, 2, 3, 4, 5, 6, 7, 8, 9 or 10.

4. The medium according to claim 1, further comprising one or more compounds of formula IV

IV in which
R$^{41}$ denotes alkyl having 1 to 7 C atoms or alkenyl having 2 to 7 C atoms, and
R$^{42}$ denotes alkyl having 1 to 7 C atoms or alkoxy having 1 to 6 C atoms or alkenyl having 2 to 7 C atoms.

5. The medium according to claim 1, further comprising one or more compounds selected from the group consisting of compounds of the following formulae

IV-3-1

IV-3-2

IV-3-3

IV-3-4 and

IV-3-5

6. The medium according to claim 1, further comprising one or more compounds of formulae IVb-1 to IVb-3

IVb-1

IVb-2 and

IVb-3 in which
alkyl and alkyl* each, independently of one another, denote alkyl having 1 to 6 C atoms, and
alkenyl and alkenyl* each, independently of one another, denote alkenyl having 2 to 6 C atoms.

7. The medium according to claim 1, further comprising one or more compounds of formula V

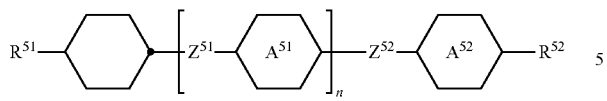

in which
R$^{51}$ and R$^{52}$ each, independently of one another, denote alkyl having 1 to 7 C atoms, alkoxy having 1 to 7 C atoms or alkoxyalkyl, alkenyl or alkenyloxy having 2 to 7 C atoms,

and

identically or differently, denote

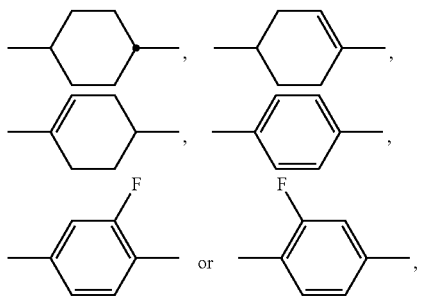

Z$^{51}$ and Z$^{52}$ each, independently of one another, denote —CH$_2$—CH$_2$—, —CH$_2$—O—, —CH=CH—, —C≡C—, —COO— or a single bond, and
n is 1 or 2.

8. The medium according to claim 1, further comprising a chiral dopant.

9. The medium according to claim 1, further comprising one or more polymerisable compounds of formula P

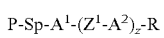

in which
P denotes a polymerisable group,
Sp denotes a spacer group or a single bond,
A$^1$ and A$^2$ identically or differently, denote an aromatic, heteroaromatic, alicyclic or heterocyclic group, which may contain fused rings, and which is unsubstituted, or mono- or polysubstituted by L,
L denotes F, Cl, —CN, P-Sp- or a straight-chain alkyl having 1 to 25 C atoms or a branched alkyl having 4 to 25 C atoms or a cyclic alkyl having 3 to 25 C atoms, wherein one or more non-adjacent CH$_2$ groups are optionally replaced by —O—, —S—, —CO—, —CO—O—, —O—CO— or —O—CO—O— in such a manner that O and/or S atoms are not directly connected with each other, and wherein one or more H atoms are each optionally replaced by P-Sp-, F or Cl,
Z$^1$ denotes —O—, —S—, —CO—, —CO—O—, —O—CO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —CH=CF—, —CF=CH—, —C≡C—, —CH=CH—CO—O—, —O—CO-CH=CH—, —CH$_2$—CH$_2$—CO—O—, —O—CO—CH$_2$—CH$_2$—, —CR$^0$R$^{00}$— or a single bond,
R$^0$ and R$^{00}$ identically or differently, denote H or alkyl having 1 to 12 C atoms,
R denotes H, L, or P-Sp-,
z is 0, 1, 2 or 3, and
n1 is 1, 2, 3 or 4.

10. The medium according to claim 9, wherein the one or more polymerisable compounds of formula P are polymerised.

11. A liquid-crystal display, comprising the medium according to claim 1.

12. The display according to claim 11, which is a PSA display.

13. The display according to claim 12, which is a PS-VA, PS-IPS, PS-FFS, PS-UB-FFS, polymer stabilised SA-VA or polymer stabilised SA-FFS display.

14. The display according to claim 11, wherein the display is a VA, IPS, U-IPS, FFS, UB-FFS, SA-FFS or SA-VA display.

15. An electro-optical display, comprising the medium according to claim 1.

16. The medium according to claim 1, exhibiting a dielectric anisotropy Δε of −6 to −2.

17. The medium according to claim 1, exhibiting an optical anisotropy Δn of 0.08 to 0.13.

18. The medium according to claim 1, wherein the compound of formula I is a compound of one of formulae I-1 and I-2

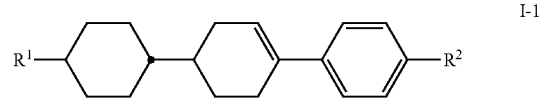

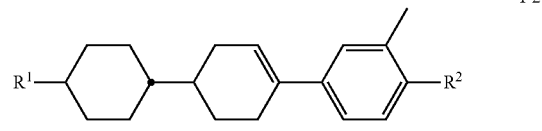

in which R$^1$ and R$^2$ have the meanings given for formula I.

19. The medium according to claim 1, wherein the compound of formula I is a compound of one of formulae I-a to I-f

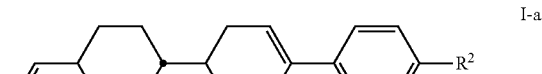

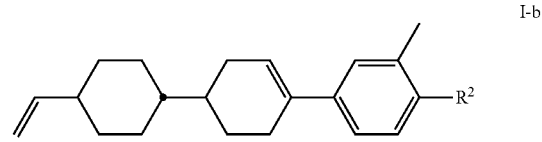

-continued

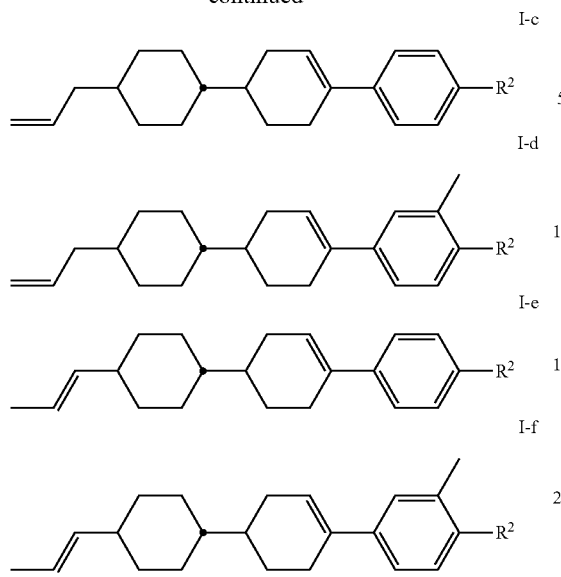

in which R² has the meaning given for formula I.

20. The medium according to claim 1, wherein the compound of formula I is a compound of one of formulae I-a-1 or I-a-2

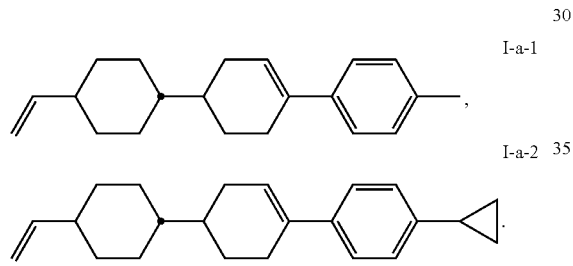

21. A liquid-crystal medium having a negative dielectric anisotropy and comprising one or more compounds of formulae I-3 to I-10

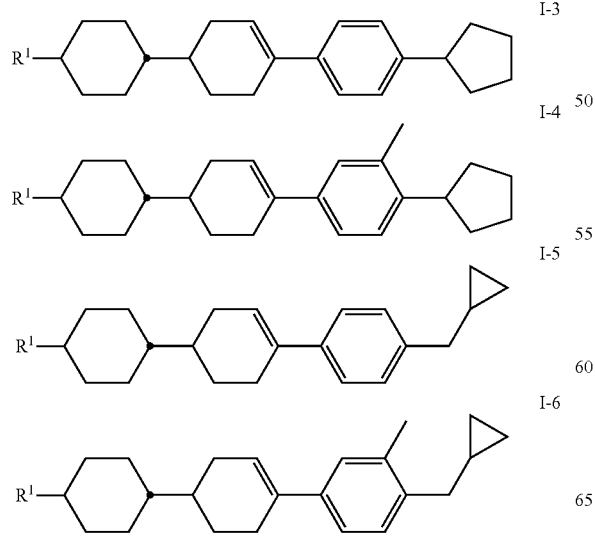

-continued

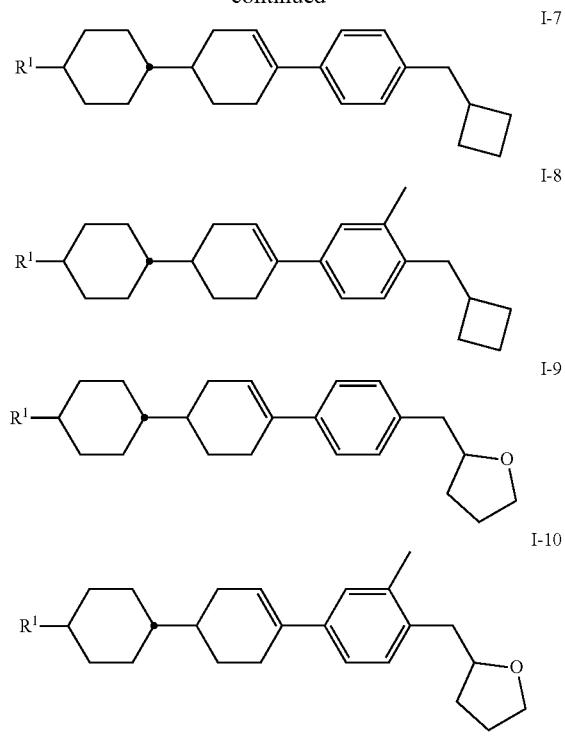

in which
R¹ denotes a straight-chain alkenyl radical having 2 to 15 C atoms or a branched alkenyl radical having 4 to 15 C atoms, where one or more CH₂ groups may each be replaced, independently of one another, by

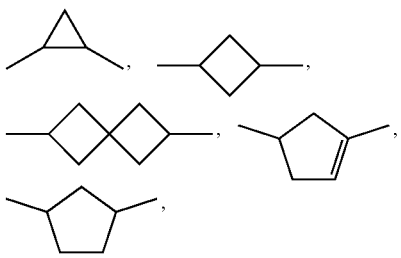

—C≡C—, —CF₂O—, —OCF₂—, —O—, —CO—O— or —O—CO— in such a way that O atoms are not linked directly to one another, and in which one or more H atoms may be replaced by halogen.

22. A liquid-crystal medium having a negative dielectric anisotropy and comprising
one or more compounds of formula I-3 to I-10

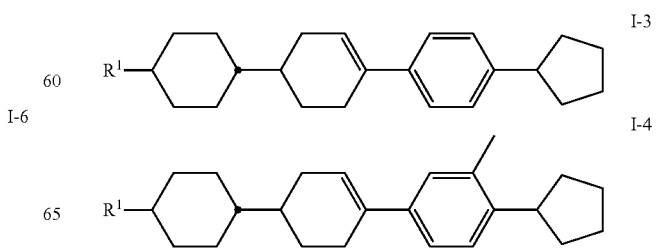

I-5

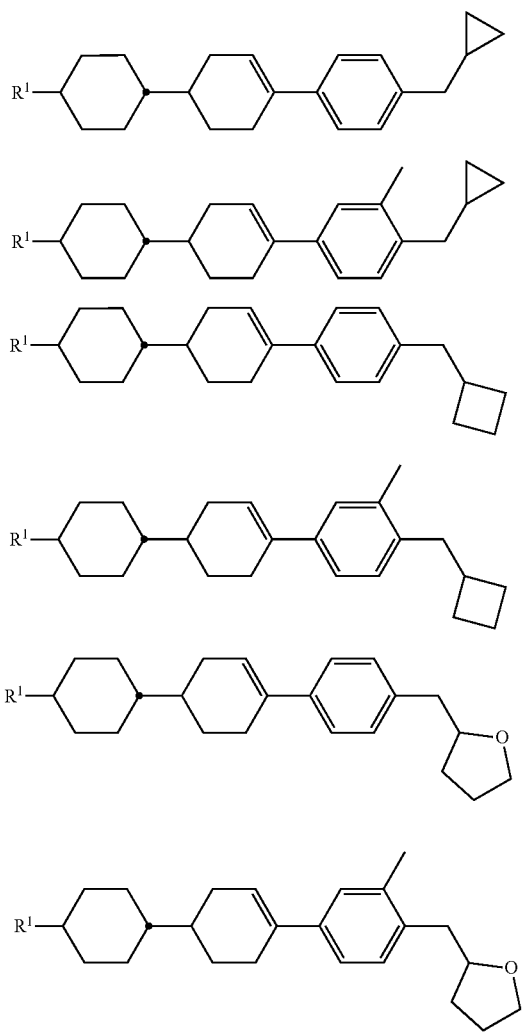

I-6

I-7

I-8

I-9

I-10 in which
R¹ denotes a straight-chain alkenyl radical having 2 to 15 C atoms or a branched alkenyl radical having 4 to 15 C atoms, where one or more CH₂ groups may each be replaced, independently of one another, by

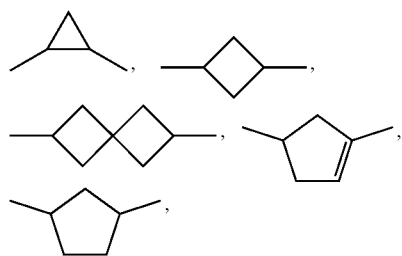

—C≡C—, —CF₂O—, —OCF₂—, —O—, —CO—O— or —O—CO— in such a way that O atoms are not linked directly to one another, and in which one or more H atoms may be replaced by halogen;

and
one or more compounds of formula III

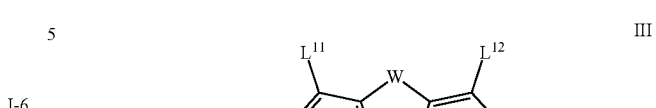

III in which
R¹¹ and R¹² each, independently of one another, denote H, an alkyl or alkoxy radical having 1 to 15 C atoms, where one or more CH₂ groups may each be replaced, independently of one another, by

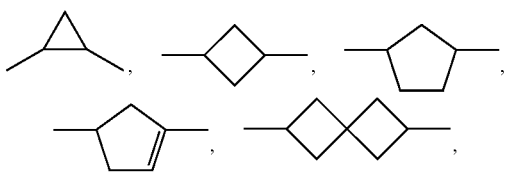

—C≡C—, —CF₂O—, —OCF₂—, —CH=CH—, —O—, —CO—O— or —O—CO— in such a way that O atoms are not linked directly to one another, and in which one or more H atoms may be replaced by halogen, A¹ on each occurrence, independently of one another, denotes
  a) a 1,4-cyclohexenylene or 1,4-cyclohexylene radical, in which one or two non-adjacent CH₂ groups may be replaced by —O— or —S—,
  b) a 1,4-phenylene radical, in which one or two CH groups may be replaced by N, or
  c) a radical selected from the group consisting of spiro[3.3]heptane-2,6-diyl, 1,4-bicyclo[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl,
  where the radicals in a), b) and c) may be mono- or polysubstituted by halogen atoms,
n is 0, 1 or 2,
Z¹ on each occurrence, independently of one another, denotes —CO—O—, —O—CO—, —CF₂O—, —OCF₂—, —CH₂O—, —OCH₂—, —CH₂—, —CH₂CH₂—, —(CH₂)₄—, —CH=CH—CH₂O—, —C₂F₄—, —CH₂CF₂—, —CF₂CH₂—, —CF=CF—, —CH=CF—, —CF=CH—, —CH=CH—, —C≡C— or a single bond,
L¹¹ and L¹² each, independently of one another, denote F, Cl, CF₃ or CHF₂, and
W denotes O or S;
and
one or more stabilisers.

23. The liquid-crystal medium according to claim 1, wherein the one or more compounds of formula I are present in the liquid-crystal medium in a total amount of 0.25% by weight to 2% by weight.

24. The liquid-crystal medium according to claim 1, wherein the one or more compounds of formula I are present in the liquid-crystal medium in a total amount of 0.25% by weight to 1% by weight.

* * * * *